US012242222B2

(12) United States Patent
Morioka et al.

(10) Patent No.: US 12,242,222 B2
(45) Date of Patent: Mar. 4, 2025

(54) ELECTROPHOTOGRAPHIC IMAGE FORMING APPARATUS, CARTRIDGE AND DRUM UNIT

(71) Applicant: CANON KABUSHIKI KAISHA, Tokyo (JP)

(72) Inventors: Masanari Morioka, Kanagawa (JP); Takeo Kawanami, Kanagawa (JP); Yu Fukasawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/542,933

(22) Filed: Dec. 18, 2023

(65) Prior Publication Data

US 2024/0118657 A1 Apr. 11, 2024

Related U.S. Application Data

(60) Division of application No. 17/407,213, filed on Aug. 20, 2021, which is a continuation of application No. PCT/JP2020/012811, filed on Mar. 17, 2020.

(30) Foreign Application Priority Data

Mar. 18, 2019 (JP) ................................ 2019-050355

(51) Int. Cl.
*G03G 15/00* (2006.01)
*G03G 21/18* (2006.01)

(52) U.S. Cl.
CPC ..... *G03G 21/1814* (2013.01); *G03G 21/1857* (2013.01); *G03G 21/186* (2013.01)

(58) Field of Classification Search
CPC ........... G03G 21/1814; G03G 21/1857; G03G 21/186
USPC .......................................................... 399/167
See application file for complete search history.

(56) References Cited

U.S. PATENT DOCUMENTS

| | | | |
|---|---|---|---|
| 5,903,803 | A | 5/1999 | Kawai et al. |
| 6,157,799 | A | 12/2000 | Asakura et al. |
| 6,473,580 | B1 | 10/2002 | Inomata |
| 6,829,455 | B2 | 12/2004 | Yasumoto et al. |

(Continued)

FOREIGN PATENT DOCUMENTS

| | | | |
|---|---|---|---|
| CN | 108614404 | A | 10/2018 |
| EP | 0 735 432 | A1 | 10/1996 |

(Continued)

OTHER PUBLICATIONS

Dec. 1, 2023 Office Action in Chinese Patent Application No. 202080021684.7 (with English translation).

(Continued)

*Primary Examiner* — Hoang X Ngo
(74) *Attorney, Agent, or Firm* — Venable LLP

(57) ABSTRACT

A cartridge includes a casing, a photosensitive drum, and a coupling operatively connected to the photosensitive drum. The coupling includes a guiding portion, an engaging portion, and a visor portion. The visor portion projects outwardly in a direction perpendicular to the axis of the coupling. The visor portion covers a space downstream of the engaging portion in the rotational direction of the coupling or the visor portion is positioned upstream of the guiding portion in the rotational direction of the coupling and adjacent to the guiding portion.

44 Claims, 110 Drawing Sheets

(56) References Cited

U.S. PATENT DOCUMENTS

| | | | |
|---|---|---|---|
| 2002/0057924 | A1 | 5/2002 | Ueno et al. |
| 2005/0089345 | A1 | 4/2005 | Yasumoto et al. |
| 2006/0164500 | A1 | 7/2006 | Murumoto |
| 2009/0317129 | A1 | 12/2009 | Abe et al. |
| 2013/0248315 | A1 | 9/2013 | Iijima et al. |
| 2015/0110522 | A1 | 4/2015 | Ikeda et al. |
| 2016/0246250 | A1 | 8/2016 | Kamoshida et al. |
| 2016/0259290 | A1 | 9/2016 | Ikeda |
| 2016/0370750 | A1 | 12/2016 | Ikeda et al. |
| 2017/0082971 | A1* | 3/2017 | Maeshima ......... G03G 21/1842 |
| 2017/0227925 | A1 | 8/2017 | Ueno et al. |
| 2017/0351214 | A1 | 12/2017 | Uesugi et al. |
| 2017/0357210 | A1* | 12/2017 | Inaba ................... G03G 15/757 |
| 2019/0179249 | A1 | 6/2019 | Mori et al. |
| 2019/0187608 | A1 | 6/2019 | Uesugi et al. |
| 2019/0271938 | A1* | 9/2019 | Huck ...................... F16H 57/00 |

FOREIGN PATENT DOCUMENTS

| | | | |
|---|---|---|---|
| JP | H08-328449 | A | 12/1996 |
| JP | H11-007173 | A | 1/1999 |
| JP | 2001-117467 | A | 4/2001 |
| JP | 2002-147479 | A | 5/2002 |
| JP | 2002-202690 | A | 7/2002 |
| JP | 2006-126467 | A | 5/2006 |
| JP | 2006-240783 | A | 9/2006 |
| JP | 2007-133025 | A | 5/2007 |
| JP | 2010-002688 | A | 1/2010 |
| JP | 2012-013727 | A | 1/2012 |
| JP | 2013-213549 | A | 10/2013 |
| JP | 2015-022186 | A | 2/2015 |
| JP | 2015-121776 | A | 7/2015 |
| JP | 2016-027355 | A | 2/2016 |
| KR | 2015-0031027 | A | 3/2015 |
| TW | 201516590 | A | 5/2015 |
| TW | 201807516 | A | 3/2018 |
| TW | 201827956 | A | 8/2018 |
| WO | 2008/078836 | A1 | 7/2008 |
| WO | 2009/154312 | A1 | 12/2009 |

OTHER PUBLICATIONS

Apr. 12, 2024 Office Action in Taiwanese Patent Application No. 112130434.

Information re Offers for Sale of Claimed Invention Before Mar. 18, 2019 and Mar. 17, 2020.

Jul. 25, 2024 Notice of Acceptance in Korean Patent Application No. 10-2021-7033409.

International Search Report and Written Opinion for International Patent Application No. PCT/JP2020/012811, dated Mar. 17, 2020.

English translation of Japanese Patent Application Pub. No. 2013-213549.

English translation of Japanese Patent Application Pub. No. 2013-133025.

English translation of Japanese Patent Application Pub. No. 2015-022186.

Mar. 31, 2022 Office Action in Indian Patent Application Pub. No. 202147045194.

May 16, 2022 extended European Search Report in European Patent Application No. 21 216 816.5.

May 13, 2022 Office Action of Taiwanese Patent Application No. 109108788.

Sep. 21, 2022 Examination Report in Australian Patent Application No. 2020241005.

Nov. 2, 2022 Communication in European Patent Application No. 20 774 309.7.

Apr. 12, 2023 Office Action in Chilean Patent Application No. 202102417.

Aug. 9, 2023 Office Action in Singapore Patent Application No. 11202109868W.

Oct. 2, 2023 Extended Search Report in European Patent Application No. 23 174 494.7.

Sep. 18, 2023 Notice of Acceptance in Australian Patent Application No. 2020241005.

Oct. 23, 2023 Office Action in Korean Patent Application No. 10-2021-7033409 (with English translation).

May 17, 2023 Notice of Allowance in Taiwanese Patent Application No. 112104758.

Jan. 17, 2023 Office Action in Japanese Patent Application No. 2020-048157.

Oct. 7, 2022 Office Action in Chilean Patent Application No. 202102417.

May 9, 2024 Examination Report in Australian Patent Application No. 2023226720.

Sep. 4, 2024 Office Action in Chilean Patent Application No. 2023-02047.

Oct. 21, 2024 Extended Search Report in European Patent Application No. 24 177 576.6.

Oct. 14, 2024 Office Action in United Arab Emirates Patent Application No. P6001650/2021.

Nov. 26, 2024 Office Action in Canadia Patent Application No. 3,206,818.

Dec. 10, 2024 Office Action in Indian Patent Application No. 202248075769.

* cited by examiner (a)

(b)

(a)

(b)

(a)

(b)

(a)

(b)

(a)

(b)

(c)

(a)

(b)

(a)

(b)

(a)

(b)

(a)

(b)

(a)

(b)

(c)

(a)

(b)

(a)

(b)

(c)

(d)

(a)

(b)

(a)

(b)

(a)

(b)

(c)

(a)

(b)

(a)

(b)

ELECTROPHOTOGRAPHIC IMAGE FORMING APPARATUS, CARTRIDGE AND DRUM UNIT

FIELD OF THE INVENTION

The present invention relates to an electrophotographic image forming apparatus such as a copying machine or a printer which employs an electrophotographic method, and a cartridge usable with the electrophotographic image forming apparatus. The present invention also relates to a drum unit usable with the electrophotographic image forming apparatus and the cartridge.

Here, the electrophotographic image forming apparatus (hereinafter, also referred to as an "image forming apparatus") is an apparatus which forms an image on a recording material by using the electrophotographic image forming method. Examples of the image forming apparatus include a copying machine, a facsimile machine, a printer (laser beam printer, LED printer, and so on), a multifunction printer of them, and the like.

The cartridge is dismountable from the main assembly of the image forming apparatus (apparatus main assembly). Examples of the cartridge include a process cartridge in which a photosensitive member and at least one of the process means acting on the photosensitive member is integrally formed into a cartridge.

The drum unit is a unit including a photosensitive drum, and is used for the cartridge or the image forming apparatus.

BACKGROUND ART

Conventionally, in the field of the image forming apparatus using the electrophotographic forming process, it is known that an electrophotographic photosensitive member (hereinafter referred to as a photosensitive drum) and a process means acting on the photosensitive drum are integrally formed into a cartridge. Such a cartridge is dismountable from the main assembly of the image forming apparatus.

According to this cartridge method, the maintenance of the image forming apparatus can be performed by the user himself/herself without relying on a service person, so that the maintainability can be remarkably improved. Therefore, this cartridge type is widely used in an image forming apparatus.

In a structure in which the cartridge can be mounted to and dismounted from the image forming apparatus main assembly (device main assembly), there is a structure in which the main assembly and the cartridge are connected by using a coupling to input a driving force from the device main assembly to the cartridge (JP H8-328449).

The amount of torque required to drive the cartridge varies depending on the structure of the cartridge.

JP 2002-202690 proposes a structure of a cartridge including a load generating member which applies a load to the rotation of the photosensitive drum. The load generating member stabilizes the rotation of the photosensitive drum by increasing the torque of the photosensitive drum (JP 2002-202690).

SUMMARY OF THE INVENTION

The object of the present invention is to further develop the above-mentioned conventional technology.

An example of the cartridge according to the present application is a cartridge detachably mountable to a main assembly of an electrophotographic image forming apparatus, the main assembly including a driving force application member and a braking force application member, the cartridge comprising:

- a casing;
- a photosensitive drum rotatably supported by the casing;
- a coupling connected with the photosensitive drum so as to be capable of drive transmission,
- wherein the coupling including,
- a driving force receiving portion for receiving a driving force for rotating the coupling by engagement with the driving force application member, and
- a braking force receiving portion for receiving a braking force for applying a load against rotation of the coupling, by engagement with the braking force application member, and
- a guide for moving the braking force application member relative to the driving force application member.

An example of the drum unit according to the present application is a drum unit detachably mountable to a main assembly of an image forming apparatus, the main assembly including a driving force application member and a braking force application member, the drum unit comprising:

- a photosensitive drum;
- a coupling connected with the photosensitive drum so as to is capable of drive transmission,
- wherein the coupling including,
- a driving force receiving portion for receiving driving force for rotating the coupling by engagement with the driving force application member, and
- a braking force receiving portion for receiving a braking force for applying a load against rotation of the coupling, by engagement with the braking force application member, and
- a guide for moving the braking force application member relative to the driving force application member.

Another example of the cartridge according to the present application is a cartridge comprising:

- a casing having a first end portion and a second end portion opposite from the first end portion;
- a photosensitive drum rotatably supported by the first end portion and the second end portion of the casing; and
- a coupling connected with the photosensitive drum so as to be capable of drive transmission, the coupling being provided adjacent to the first end portion of the casing,
- wherein the coupling includes a first shaped portion and a second shaped portion,
- the first shaped portion has a portion at a position which is more remote from the second end portion of the casing than the second shaped portion,
- a distance measured from the second end portion of the casing to the remote portion of the first shaped portion along an axis direction of the coupling decreases toward downstream in a rotational moving direction of the coupling,
- the second shaped portion has a first side portion at a position upstream in the rotational moving direction and the second side portion at a position downstream in the rotational moving direction, and
- at least a part of the second shaped portion is more remote from an axis of the coupling than the remote portion of the first shaped portion in a radial direction of the coupling.

Another example of the drum unit according to the present application is usable with a cartridge a drum unit comprising, a photosensitive drum rotatably supported by the first end portion and the second end portion of the casing, and a coupling connected with the photosensitive drum so as to be capable of drive transmission, the coupling being provided adjacent to the first end portion of the photosensitive drum, wherein the coupling includes a first shaped portion and a second shaped portion, the first shaped portion has a portion at a position which is more remote from the second end portion of the photosensitive drum than the second shaped portion, a distance measured from the second end portion of the photosensitive drum to the remote portion of the first shaped portion along an axis direction of the coupling decreases toward downstream in a predetermined circumferential direction of the coupling, the second shaped portion has a first side portion at a position upstream in the circumferential direction and the second side portion at a position downstream in the circumferential directing direction, and at least a part of the second shaped portion is more remote from an axis of the coupling than the remote portion of the first shaped portion in a radial direction of the coupling.

Another example of the cartridge according to the present application is a cartridge comprising:

a casing having a first end portion and a second end portion opposite from the first end portion;

a photosensitive drum rotatably supported by the first end portion and the second end portion of the casing;

a coupling provided adjacent to the first end portion of the casing, the coupling being connected with the photosensitive drum so as to be capable of drive transmission, wherein the coupling including, a first side portion facing upstream in a rotational moving direction of the coupling;

a second side portion facing downstream in the rotational moving direction; and a guide extending so as to be closer to the second end portion of the casing toward downstream in the rotational moving direction of the coupling, the guide having a portion more remote from the second end portion of the photosensitive drum than the first side portion, in an axial direction of the coupling, wherein at least a part of the first side portion is more remote from an axis of the drum unit than the remote portion of the guide, in a radial direction of the coupling.

Another example of the drum unit according to the present application is a drum unit comprising:

a photosensitive drum having a first end portion and a second end portion opposite from the first end portion; and a coupling provided adjacent to the first end portion of the photosensitive drum, the coupling being connected with the photosensitive drum so as to be capable of drive transmission, wherein the coupling including, a first side portion facing the upstream in a predetermined circumferential direction of the coupling, a second side portion facing downstream in the circumferential direction, and a guide extending so as to be closer to the second end portion of the casing toward a downstream in the circumferential direction, the guide having a portion more remote from the second end portion of the photosensitive drum in an axial direction of the coupling than the first side portion, wherein at least a part of the first side portion is more remote from an axis of the coupling than the remote portion of the guide, in a radial direction of the coupling.

Another example of the cartridge according to the present application is a cartridge detachably mountable to a main assembly of an electrophotographic image forming apparatus, the main assembly including a driving force application member and a braking force application member movable relative to the driving force application member, the cartridge comprising:

a casing;

a photosensitive drum rotatably supported by the casing; and a coupling connected with the photosensitive drum so as to be capable of drive transmission, wherein the coupling including, a driving force receiving portion for receiving a driving force for rotating the coupling by engagement with the driving force application member, and a braking force receiving portion for receiving a braking force for applying a load against rotation of the coupling, by engagement with the braking force application member.

Another example of the drum unit according to the present application is a drum unit detachably mountable to a main assembly of an electrophotographic image forming apparatus, the main assembly including a driving force application member and a braking force application member movable relative to the driving force application member, the drum unit comprising:

a photosensitive drum rotatably supported by the casing; and a coupling connected with the photosensitive drum so as to be capable of drive transmission, wherein the coupling including, a driving force receiving portion for receiving a driving force for rotating the coupling by engagement with the driving force application member, and a braking force receiving portion for receiving a braking force for applying a load against rotation of the coupling, by engagement with the braking force application member.

Further, another example of the cartridge according to the present application includes one of the above-mentioned drum units and a casing which supports the drum unit.

Furthermore, an example of the electrophotographic image forming apparatus according to the present application includes any of the above-mentioned cartridges and the main assembly of the electrophotographic image forming apparatus.

Effect of the Invention

Conventional technology can be developed.

DESCRIPTION OF THE EMBODIMENTS

Embodiment 1

Hereinafter, a mode for carrying out the present invention will be described in detail exemplarily with reference to the drawings and examples. However, the functions, materials, shapes, relative arrangements, and the like of the components described in this embodiment are not intended to limit the scope of the present invention to those, unless otherwise specified.

Hereinafter, the Embodiment 1 will be described with reference to the drawings.

In the following embodiment, as the image forming apparatus, an image forming apparatus which four process cartridges can be mounted to and dismounted from is illustrated.

The number of process cartridges mounted on the image forming apparatus is not limited to this example. It is selected appropriately as needed.

Further, in the embodiment described below, a laser beam printer is exemplified as one aspect of the image forming apparatus.

[Outline Structure of Image Forming Apparatus]

Figure 2:
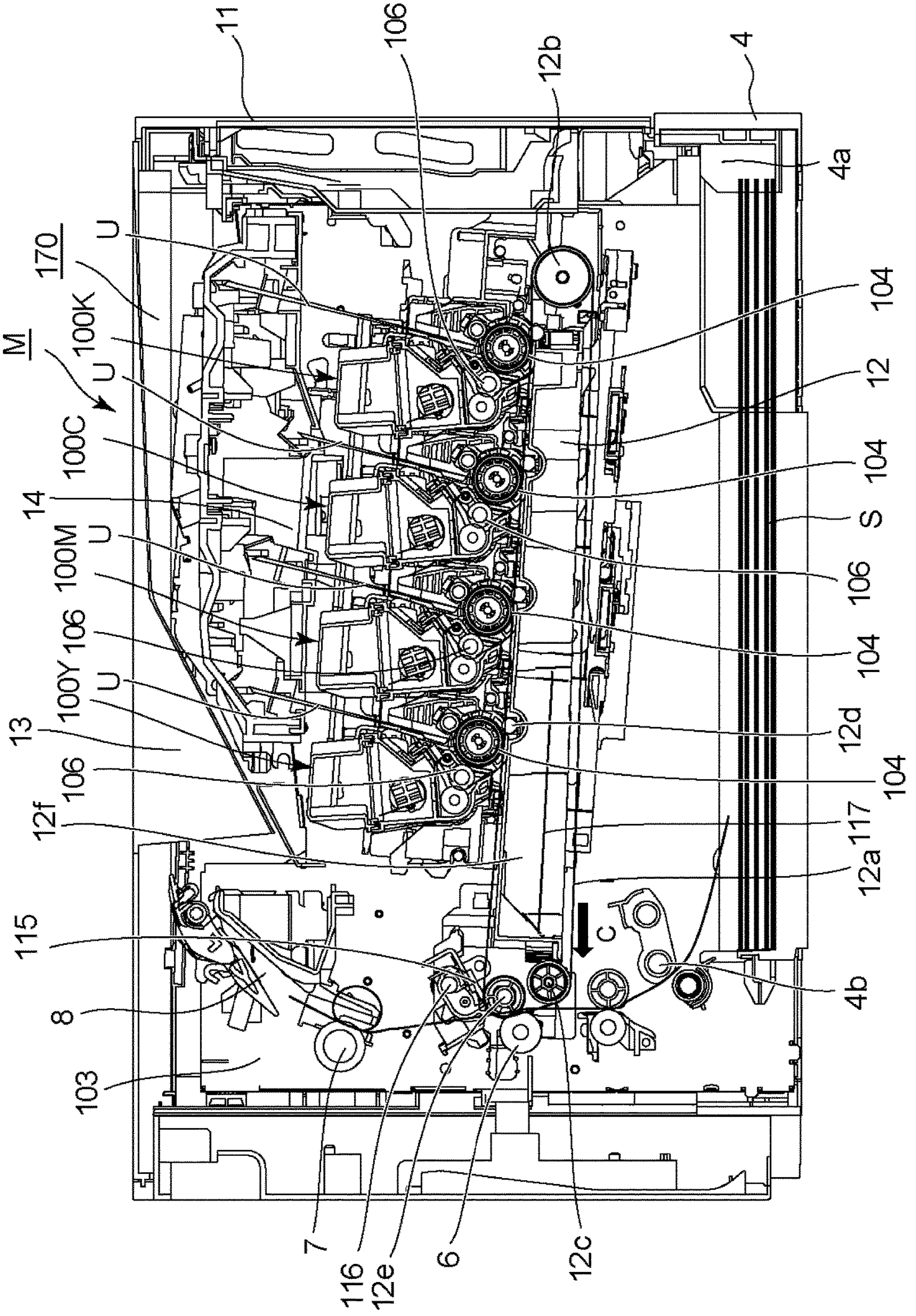
FIG. 2 is a schematic sectional view of an image forming apparatus.
Figure 3:
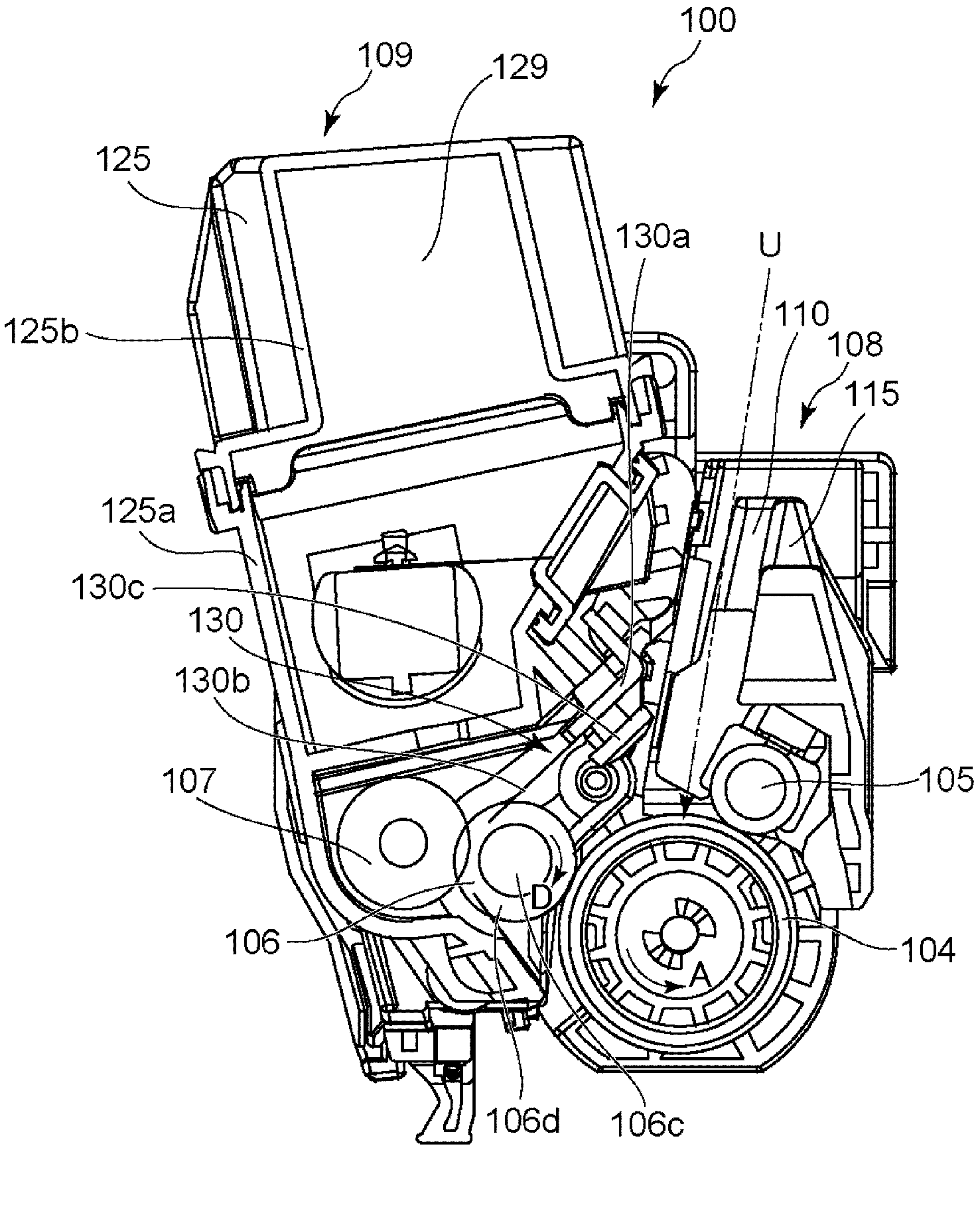
FIG. 3 is a sectional view of a process cartridge.

FIG. 2 is a schematic sectional view of the image forming apparatus M. Further, FIG. 3 is a sectional view of the process cartridge 100.

The image forming apparatus M is a four-color full-color laser printer using an electrophotographic process, and forms a color image on the recording material S. The image forming apparatus M is a process cartridge type, and a process cartridge is dismountably mounted to the image forming apparatus main assembly (apparatus main assembly, electrophotographic image forming apparatus main assembly) 170 to form a color image on the recording material S.

Here, regarding the image forming apparatus M, the side where the front door 11 is provided is the front surface (front surface), and the surface opposite to the front surface is the back surface (rear surface). Further, the right side of the image forming apparatus M as viewed from the front is referred to as a driving side, and the left side is referred to as a non-driving side.

Further, as the image forming apparatus M is viewed from the front side, the upper side is the upper surface and the lower side is the lower surface. FIG. 2 is a sectional view of the image forming apparatus M as viewed from the non-driving side; the front side of the sheet of the drawing is the non-driving side of the image forming apparatus M; the right side of the sheet of the drawing is the front side; and the rear side of the sheet of the drawing is the driving side of the image forming apparatus.

The driving side of the process cartridge 100 is the side on which the drum coupling (photosensitive member coupling) which will be described hereinafter is disposed in the axial direction of the photosensitive drum. Further, the driving side of the process cartridge 100 is also the side on which the development coupling described hereinafter is arranged in the axial direction of the developing roller (developing member).

The axial direction of the photosensitive drum is a direction parallel to the rotation axis of the photosensitive drum, which will be described hereinafter. Similarly, the axial direction of the developing roller is a direction parallel to the rotation axis of the developing roller, which will be described hereinafter. In this embodiment, the axis of the photosensitive drum and the axis of the developing roller are substantially parallel, and therefore, the axial direction of the photosensitive drum and the axial direction of the developing roller are considered to be substantially the same.

The image forming apparatus main assembly 170 has four process cartridges 100 (100Y, 100M, 100C, 100K), namely a first process cartridge 100Y, a second process cartridge 100M, a third process cartridge 100C, and a fourth process cartridge 100K, which are arranged almost horizontally.

Each of the first to fourth process cartridges 100 (100Y, 100M, 100C, 100K) has the same electrophotographic process mechanism, and the colors of the developer (hereinafter referred to as toner) are different. Rotational driving force is transmitted to the first to fourth process cartridges 100 (100Y, 100M, 100C, 100K) from a drive output portion (details will be described hereinafter) of the image forming apparatus main assembly 170.

Further, bias voltages (charging bias, development bias, and so on) are supplied from the image forming apparatus main assembly 170 to each of the first to fourth process cartridges 100 (100Y, 100M, 100C, 100K) (not shown).

As shown in FIG. 3, each of the first to fourth process cartridges 100 (100Y, 100M, 100C, 100K) of this embodiment includes a photosensitive drum 104 and a drum holding unit 108 which is provided with charging means functioning as a process means acting on the photosensitive drum 104. Further, each of the first to fourth process cartridges 100 (100Y, 100M, 100C, 100K) includes a developing unit 109 provided with a developing means for developing an electrostatic latent image on the photosensitive drum 104.

The drum holding unit 108 and the developing unit 109 are coupled to each other. A more specific structure of the process cartridge 100 will be described hereinafter.

The first process cartridge 100Y contains yellow (Y) toner in a development frame 125, and forms a yellow-color toner image on the surface of the photosensitive drum 104.

The second process cartridge 100M contains magenta (M) toner in a development frame 125, and forms a magenta-color toner image on the surface of the photosensitive drum 104.

The third process cartridge 100C contains cyan (C) toner in a development frame 125, and forms a cyan-color toner image on the surface of the photosensitive drum 104.

The fourth process cartridge 100K contains black (K) toner in a development frame 125, and forms a black toner image on the surface of the photosensitive drum 104. A laser scanner unit 14 as an exposure means is provided above the first to fourth process cartridges 100 (100Y, 100M, 100C, 100K). The laser scanner unit 14 outputs a laser beam U corresponding to the image information. The laser beam U passes through the exposure window 110 of the process cartridge 100 and scans so that the surface of the photosensitive drum 104 is exposed to the laser beam U.

Below the first to fourth process cartridges 100 (100Y, 100M, 100C, 100K), an intermediary transfer unit 12 as a transfer member is provided. The intermediary transfer unit 12 includes a drive roller 12*e*, a turn roller 12*c*, and a tension roller 12*b*, and a flexible transfer belt 12*a* is extended around these rollers.

The lower surface of the photosensitive drum 104 of each of the first to fourth process cartridges 100 (100Y, 100M, 100C, 100K) is in contact with the upper surface of the transfer belt 12*a*. The contact portion is the primary transfer portion. Inside the transfer belt 12*a*, a primary transfer roller 12*d* is provided so as to oppose the photosensitive drum 104.

The secondary transfer roller 6 is brought into contact with the turn roller 12*c* by way of the transfer belt 12*a*. The contact portion between the transfer belt 12*a* and the secondary transfer roller 6 is the secondary transfer portion.

A feeding unit 4 is provided below the intermediary transfer unit 12. The feeding unit 4 includes a sheet feed tray 4*a* on which the recording material S is loaded and accommodated, and a sheet feeding roller 4*b*.

A fixing device 7 and a paper discharge ion device 8 are provided on the upper left side of the image forming apparatus main assembly 170 in FIG. 2. The upper surface of the image forming apparatus main assembly 170 functions as a paper discharge tray 13.

The toner image is fixed on the recording material S by a fixing means provided in the fixing device 7, and the recording material is discharged to the paper discharge tray 13.

[Image Forming Operation]

The operation for forming a full-color image is as follows.

The photosensitive drum 104 of each of the first to fourth process cartridges 100 (100Y, 100M, 100C, 100K) is rotationally driven at a predetermined speed (in the direction of arrow A in FIG. 3).

The transfer belt 12*a* is also rotationally driven in the forward direction (direction of arrow C in FIG. 2) codirectionally with the rotation of the photosensitive drum at a speed corresponding to the speed of the photosensitive drum 104.

The laser scanner unit 14 is also driven. In synchronization with the drive of the laser scanner unit 14, the charging roller 105 uniformly charges the surface of the photosensitive drum 104 to a predetermined polarity and potential in each process cartridge. The laser scanner unit 14 scans and exposes the surface of each photosensitive drum 104 with laser beam U in accordance with the image signals of each color.

By this, an electrostatic latent image corresponding to the image signal of the corresponding color is formed on the surface of each photosensitive drum 104. The formed electrostatic latent image is developed by a developing roller 106 which is rotationally driven at a predetermined speed. More specifically, the developing roller 106 is in contact with the photosensitive drum 104, and the toner moves from the developing roller 106 to the latent image of the photosensitive drum 104, so that the latent image is developed into a toner image. In this embodiment, the contact developing method is employed, and the developing roller 106 and the photosensitive drum 104 are in contact with each other. However, there a non-contact development method may be employed in which toner jumps from the developing roller 106 to the photosensitive drum 104 through a small gap between the developing roller 106 and the photosensitive drum 104.

Through the electrophotographic image forming process operation as described above, a yellow toner image corresponding to the yellow component of the full-color image is formed on the photosensitive drum 104 of the first process cartridge 100Y. Then, the toner image is primary-transferred onto the transfer belt 12*a*. A part of the photosensitive drum 104 is exposed to the outside of the cartridge and is in contact with the transfer belt 12*a*. At this contact portion, the toner image on the surface of the photosensitive drum 104 transferred onto the transfer belt 12*a*.

Similarly, a magenta color toner image corresponding to the magenta component of the full color image is formed on the photosensitive drum 104 of the second process cartridge 100M. Then, the toner image is superimposedly transferred onto the yellow toner image already transferred on the transfer belt 12*a*.

Similarly, a cyan toner image corresponding to the cyan component of the full-color image is formed on the photosensitive drum 104 of the third process cartridge 100C. Then, the toner image is superimposedly primary-transferred onto the yellow-colored and magenta-colored toner images already transferred on the transfer belt 12*a*.

Similarly, a black toner image corresponding to the black component of the full-color image is formed on the photosensitive drum 104 of the fourth process cartridge 100K. Then, the toner image is superimposedly primary-transferred onto the yellow, magenta, and cyan toner images already transferred on the transfer belt 12*a*.

In this manner, a four-color full-color unfixed toner image of yellow, magenta, cyan, and black is formed on the transfer belt 12*a*.

On the other hand, the recording materials S are separated and fed one by one at a predetermined controlled timing. The recording material S is introduced then into the secondary transfer portion, which is the contact portion between the secondary transfer roller 6 and the transfer belt 12*a*, at a predetermined control timing.

By this, in the process of feeding the recording material S to the secondary transfer unit, the four-color superimposed toner images on the transfer belt 12*a* are sequentially and collectively transferred onto the surface of the recording material S.

In more detail, the structure of the image forming apparatus main assembly will be described below.

[Outline of Process Cartridge Mounting/Dismounting Structure]

Figure 4:
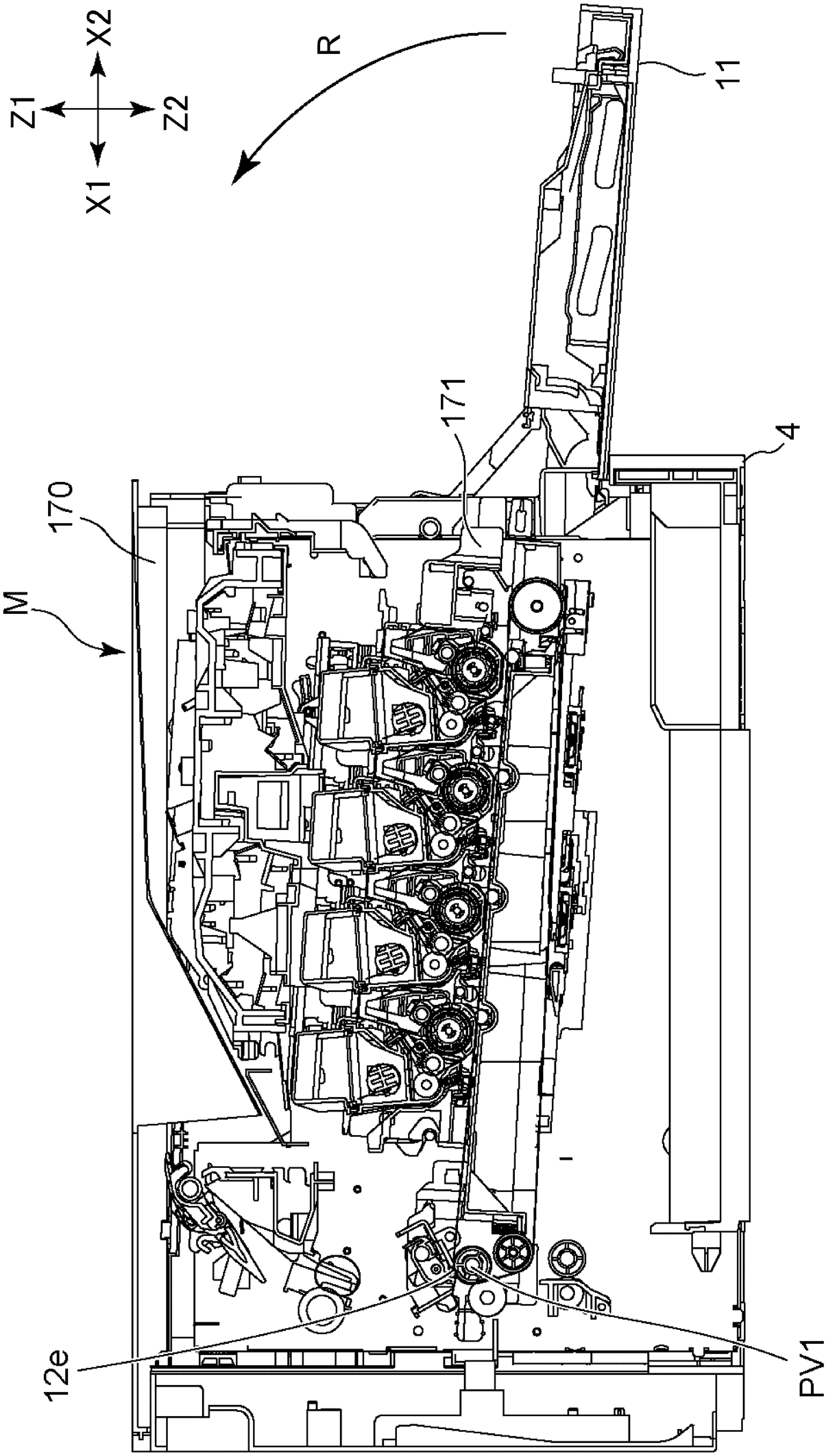
FIG. 4 is a sectional view of the image forming apparatus.
Figure 5:
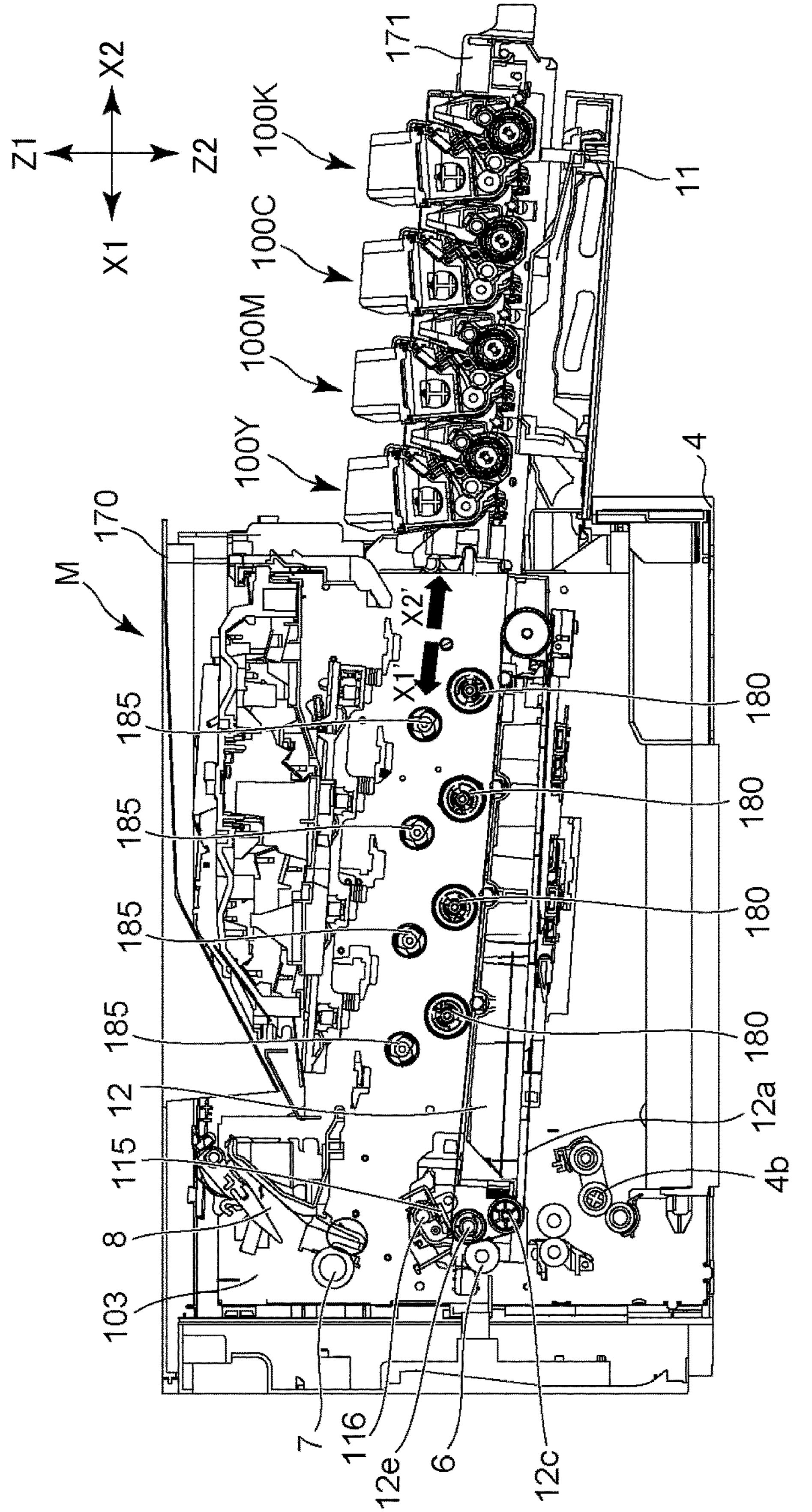
FIG. 5 is a sectional view of the image forming apparatus.
Figure 6:
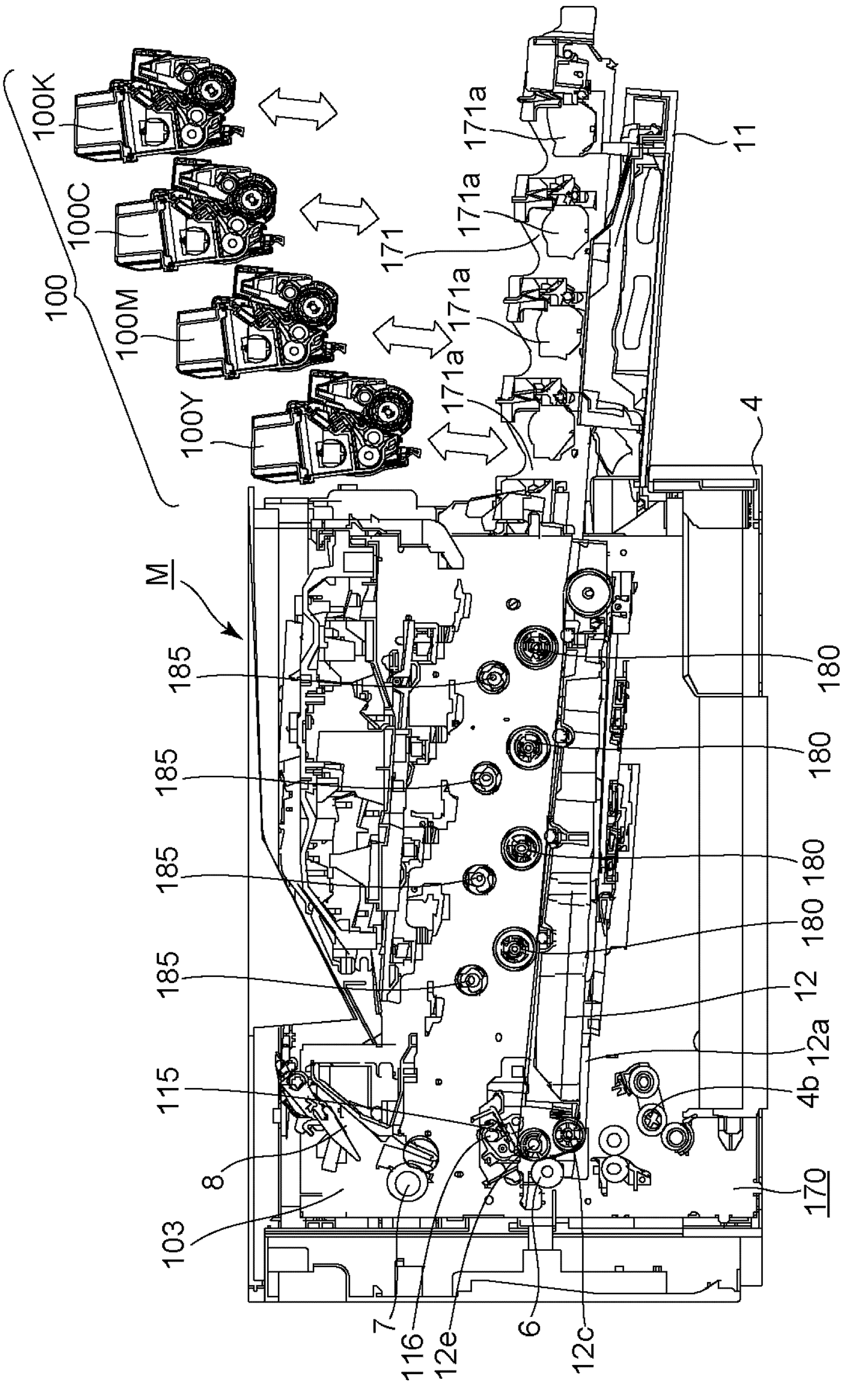
FIG. 6 is a sectional view of the image forming apparatus.
Figure 7:
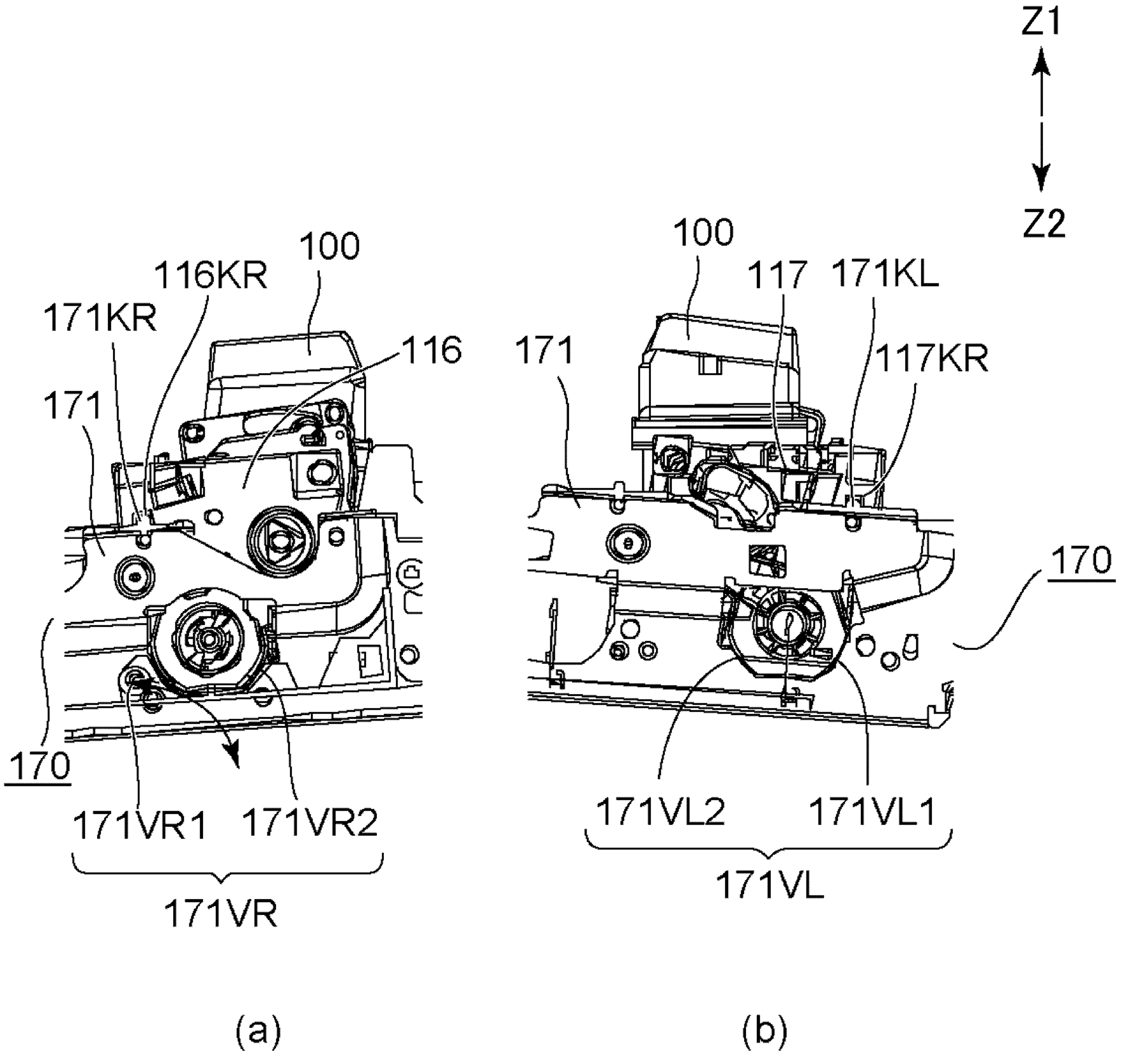
FIG. 7 is a partial detailed view of the tray.

Referring to FIGS. 42 and 4 to 7, the tray 171 which supports the process cartridge will be described in more detail. FIG. 4 is a sectional view of the image forming apparatus M in which the tray 171 is located inside the image forming apparatus main assembly 170 with the front door 11 open. FIG. 5 is a sectional view of the image forming apparatus M in a state in which the tray 171 is located outside the image forming apparatus main assembly 170 with the front door 11 open and the process cartridges 100 accommodated in the tray. FIG. 6 is a sectional view of the image forming apparatus M in a state in which the tray 171 is located outside the image forming apparatus main assembly 170 with the front door 11 open and the process cartridge 100 having been removed from the tray. Part (a) of FIG. 7 is a partial detailed view of the tray 171 as viewed from the driving side in the state shown in FIG. 4. Part (b) of FIG. 7 is a partial detailed view of the tray 171 as viewed from the non-driving side in the state of FIG. 4.

As shown in FIGS. 4 and 5, the tray 171 can be moved in the arrow X1 direction (pushing direction) and the arrow X2 direction (pulling direction) relative to the image forming apparatus main assembly 170. That is, the tray 171 is provided so as to be retractable from and insert able into the image forming apparatus main assembly 170, and the tray 171 is structured to be movable in a substantially horizontal direction in a state where the image forming apparatus main assembly 170 is installed on a horizontal floor. Here, the state in which the tray 171 is located outside the image forming apparatus main assembly 170 (the state shown in FIG. 5) is referred to as an outside position. Further, a state in which the tray is placed inside the image forming apparatus main assembly 170 with the front door 11 open and the photosensitive drum 104 and the transfer belt 12*a* are separated from each other (state in FIG. 4) is referred to as an inner position.

Further, the tray 171 has a mounting portion 171*a* in which the process cartridges 100 can be dismountably mounted as shown in FIG. 6 in the outer position. Then, each process cartridge 100 mounted on the mounting portion 171*a* in the outer position of the tray 171 is supported by the tray 171 by the driving side cartridge cover member 116 and the immovable side cartridge cover member 117 as shown in FIG. 7. Then, the process cartridge moves inside the image forming apparatus main assembly 170 with the movement of the tray 171 in a state of being placed in the mounting portion 171*a*. At this time, in the movement, a gap is kept between the transfer belt 12*a* and the photosensitive drum 104. The tray 171 can carry the process cartridge 100 into the image forming apparatus main assembly 170 without the photosensitive drum 104 contacting with the transfer belt 12*a* (details will be described hereinafter).

As described above, by using the tray 171, a plurality of process cartridges 100 can be collectively moved to a position where image formation is possible inside the image forming apparatus main assembly 170, and is collectively moved to the outside of the image forming apparatus main assembly 170.

[Positioning of Process Cartridge Relative to Electrophotographic Image Forming Apparatus Main Assembly]

Referring to FIG. 7, the positioning of the process cartridge 100 relative to the image forming apparatus main assembly 170 will be described more specifically.

As shown in FIG. 7, the tray 171 is provided with positioning portions 171VR and 171VL for holding the cartridge 100. The positioning portion 171VR has straight portions 171VR1 and 171VR2, respectively. The center of the photosensitive drum is determined by the arc portions 116VR1 and 116VR2 of the cartridge cover member 116 shown in FIG. 7 contacting with the straight portions 171VR1 and 171VR2.

Further, the tray 171 shown in FIG. 7 is provided with a rotation-determining projection 171KR. The attitude of the process cartridge 100 is determined relative to the apparatus main assembly by fitting it with the rotation determining recess 116KR of the cartridge cover member 116 shown in FIG. 7.

The positioning portion 171VL and the rotation determining projection 171KL are arranged at positions (non-driving side) so as to oppose each other across the intermediary transfer belt 12*a* in the longitudinal direction of the positioning portion 171VR and the process cartridge 100. That is, on the non-driving side as well, the position of the process cartridge is determined by engagement of the arc portions 117VL1 and 117VL2 of the cartridge cover member 117 with the positioning portion 171VL and engagement of the rotation determining recess 117KL with the rotation determining projection 171KL.

By doing so, the position of the process cartridge 100 relative to the tray 171 is correctly determined.

Then, as shown in FIG. 5, the process cartridge 100 integrated with the tray 171 is moved in the direction of the arrow X1 and inserted to the position shown in FIG. 5.

Then, by closing the front door 11 in the direction of the arrow R, the process carriage 100 is pressed by a cartridge pressing mechanism (not shown) which will be described hereinafter, and is fixed to the image forming apparatus main assembly 170 together with the tray 171. Further, the transfer belt 12*a* comes into contact with the photosensitive member 104 in interrelation with the operation of the cartridge pressing mechanism. In this state, an image formation is enabled (FIG. 2).

In this embodiment, the positioning portion 171VR and the positioning portion 171V also serve as reinforcements for maintaining the rigidity in the pull-out operation of the tray 171, and for this reason, the use is made with metal sheet, but the present invention is not limited to this.

[Cartridge Pressing Mechanism]

Next, referring to FIG. 8, the details of the cartridge pressing mechanism will be described.

Figure 8:
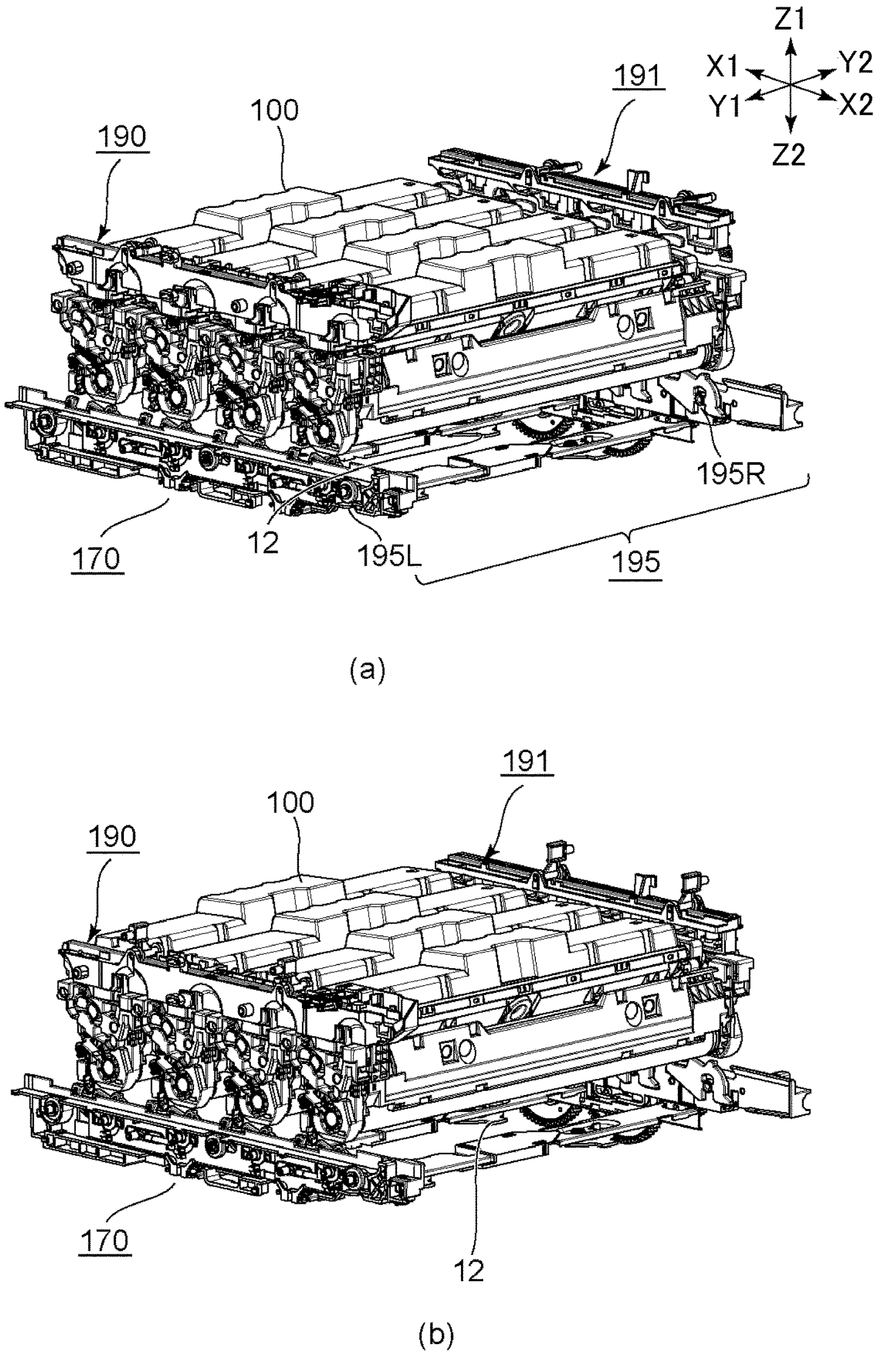
FIG. 8 is a perspective view of the storing element pressing unit and the cartridge pressing unit.

Part (a) of FIG. 8 shows only the process cartridge 100, the tray 171, the cartridge pressing mechanisms 190 and 191 and the intermediary transfer unit 12 in the state of FIG. 4. Part (b) of FIG. 8 shows only the process cartridge 100, the tray 171, the cartridge pressing mechanisms and 191 and the intermediary transfer unit 12 in the state of FIG. 2.

The process cartridge 100 receives a driving force during image formation, and further receives a reaction force from the primary transfer roller 12*d* (FIG. 2) in the direction of arrow Z1. Therefore, it is necessary to press the process cartridge in the Z2 direction in order to maintain a stable attitude without the process cartridge spacing from the positioning portions 171VR and 171VL during the image forming operation.

In order to achieve these, in this embodiment, the image forming apparatus main assembly 170 is provided with cartridge pressing mechanisms (190, 191).

As for the cartridge pressing mechanism (190, 191), the storing element pressing unit 190 works for the non-driving side, and the cartridge pressing unit 191 works for the driving side. This will be described in more detail below.

By closing the front door 11 shown in FIG. 4, the storing element pressing unit 190 and the cartridge pressing unit 191 shown in FIG. 8 lowers in the direction of arrow Z2.

The storing element pressing unit 190 is provided with a main assembly side electric contact (not shown) which mainly contacts with the electric contact of the storing element (not shown) provided in the process cartridge 100. By interlocking with the front door 11 by a link mechanism (not shown), the storing element 140 and the electric contact on the main assembly side can be brought into and out of contact with each other.

That is, the contacts are brought into contact with each other by closing the front door 11, and the contacts are separated by opening the front door 11.

By such a structure, when the process cartridge 100 moves inside the image forming apparatus main assembly together with the tray 171, the electric contacts are not rubbed and the contacts are retracted from the insertion/removal locus of the process cartridge 100, whereby insertion and removal operations of the tray 171 are not hindered.

The storing element pressing unit 190 also functions to press the process cartridge against the positioning portion 171VR described above.

Further, similarly to the storing element pressing unit 190, the cartridge pressing unit 121 also lowers in the direction of arrow Z2 in interrelation with the operation of closing the front door 11 and functions to press the process cartridge 100 against the above-mentioned positioning portion 171VL.

Further, although the details will be described hereinafter, the cartridge pressing mechanism (190, 191) also functions to press down the force applying members 152L and 152R of the process cartridge 100 as will be described hereinafter.

[Drive Transmission Mechanism]

Next, referring to FIGS. 9 and 10 (for better illustration, the tray 171 is omitted), the drive transmission mechanism of the main assembly in this embodiment will be described.

Figure 9:
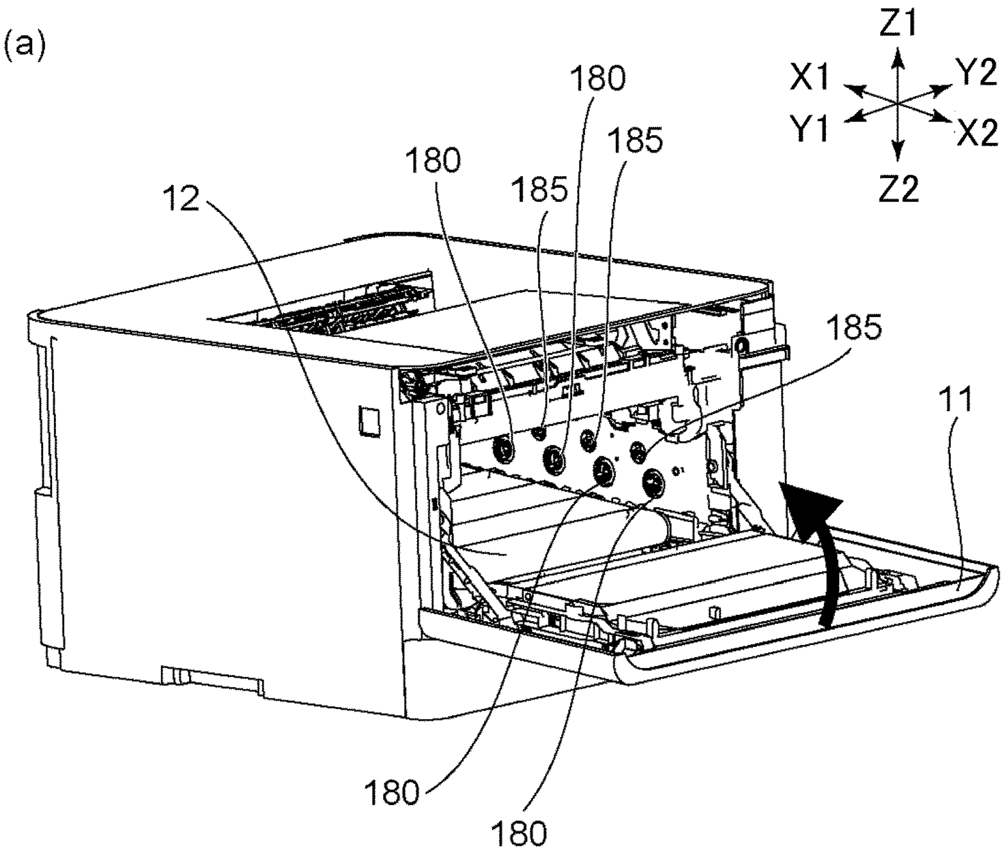
FIG. 9 is a partial perspective view of the image forming apparatus.
Figure 9:
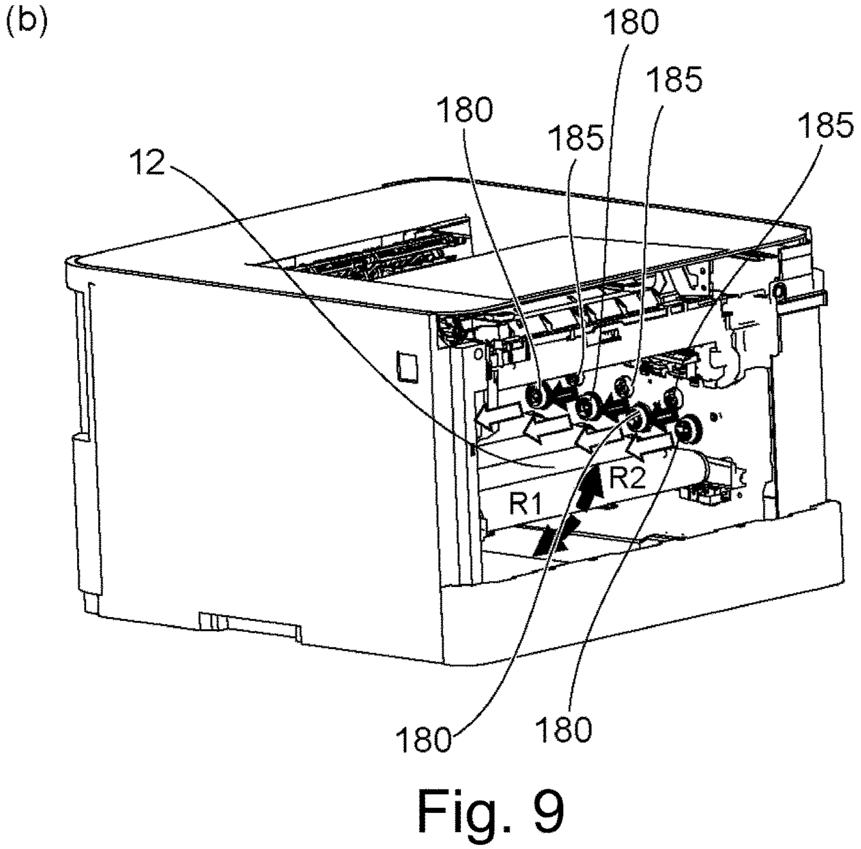

Part (a) of FIG. 9 is a perspective view in which the process cartridge 100 and the tray 171 are omitted in the state of FIG. 4 or FIG. 5. FIG. 9B is a perspective view in which the process cartridge 100, the front door 11 and the tray 171 are omitted.

Figure 10:
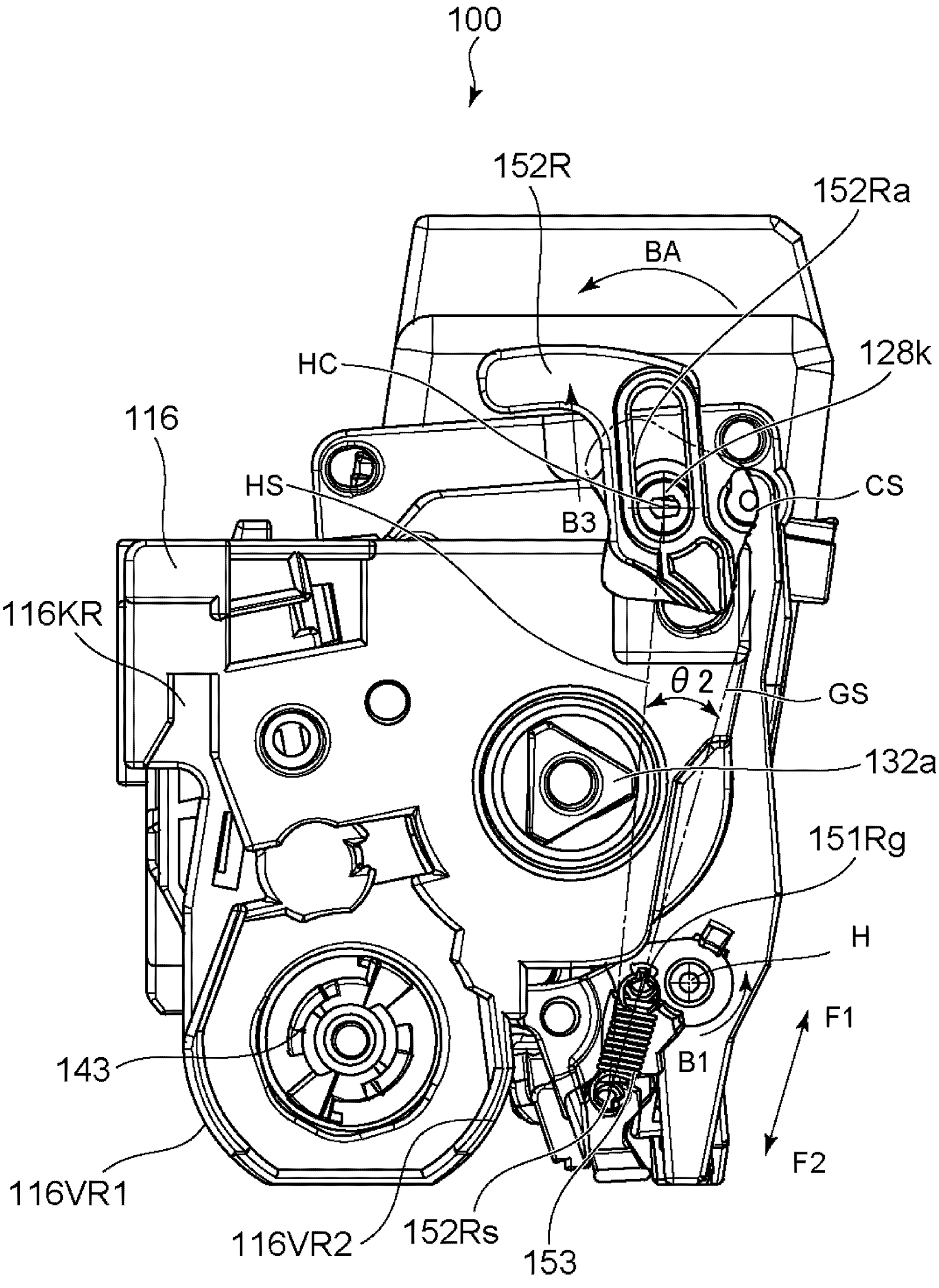
FIG. 10 is a side view (partial sectional view) of the process cartridge.

FIG. 10 is a side view of the process cartridge 100 as viewed from the driving side.

As shown in FIG. 10, the process cartridge in this embodiment includes a development coupling portion 32*a* and a drum coupling (photosensitive member coupling) 143.

The structure is such that by closing the front door 11 (state of part (b) of FIG. 9, the main assembly side drum drive coupling and the main assembly side development drive coupling 185 which drive and transmit the driving forces to the process cartridge 100 are projected in the arrow Y1 direction by a link mechanism (not shown).

Further, by opening the front door 11 (state of part (a) of FIG. 9, the drum drive coupling 180 and the development drive coupling 185 are retracted in the direction of arrow Y2.

By retracting each coupling from the insertion/removal locus of the process cartridge (X1 direction, X2 direction), the insertion/removal of the tray 171 is not hindered.

By closing the front door 11 and starting the driving of the image forming apparatus main assembly, the drum drive coupling 180 described above engages with the drum coupling (coupling member, cartridge side coupling) 143. Along with this, the development drive coupling 185 on the main assembly side engages with the development coupling portion 32*a*. As a result, the drive is transmitted to the process cartridge 100. The drive transmission to the process cartridge 100 is not limited to the structure described above, and a mechanism which inputs the drive only to the drum coupling and transmits the drive to the developing roller may be provided.

[Intermediary Transfer Unit Structure]

Next, referring to FIG. 9, the intermediary transfer unit 12 of the image forming apparatus main assembly in this embodiment will be described.

In this embodiment, the structure is such that the intermediary transfer unit 12 is raised in the direction of arrow R2 by a link mechanism (not shown) by closing the front door 11, and moves to the position for the image forming operation (photosensitive drum 104 and intermediary transfer belt 12*a* are in contact with each other).

Further, by opening the front door 11, the intermediary transfer unit 12 lowers in the direction of arrow R1, and the photosensitive drum 2 and the intermediary transfer belt 12*a* are separated from each other.

That is, in a state in which the process cartridge 100 is set in the tray 171, the photosensitive drum 104 and the intermediary transfer belt 12*a* come into and out of contact with each other depending on the opening/closing operation of the front door 11.

The structure is such that in the contact/separation operation, the intermediary transfer unit rises and falls while drawing a rotation locus about the center point PV1 shown in FIG. 4.

The intermediary transfer belt 12*a* is driven by receiving a force from a gear (not shown) provided coaxially with the PVI. Therefore, by setting the above-mentioned position PV1 as the rotation center, the intermediary transfer unit 12 can be raised and lowered without moving the gear center. By doing so, it is not necessary to move the center of the gear, and the position of the gear can be maintained with high accuracy.

With the above-described structure, in the state that the process cartridge 100 is set in the tray 171, when the tray 11 is inserted or removed, the photosensitive drum 104 and the intermediary transfer belt 12*a* do not rub relative to each of, and therefore, damage of the photosensitive drum 104 and deterioration of the image by charge memory are prevented.

[Development Separation Control Unit]

Next, referring to FIGS. 8, 11 and 12, the separation mechanism of the image forming apparatus main assembly in this embodiment will be described.

Figure 11:
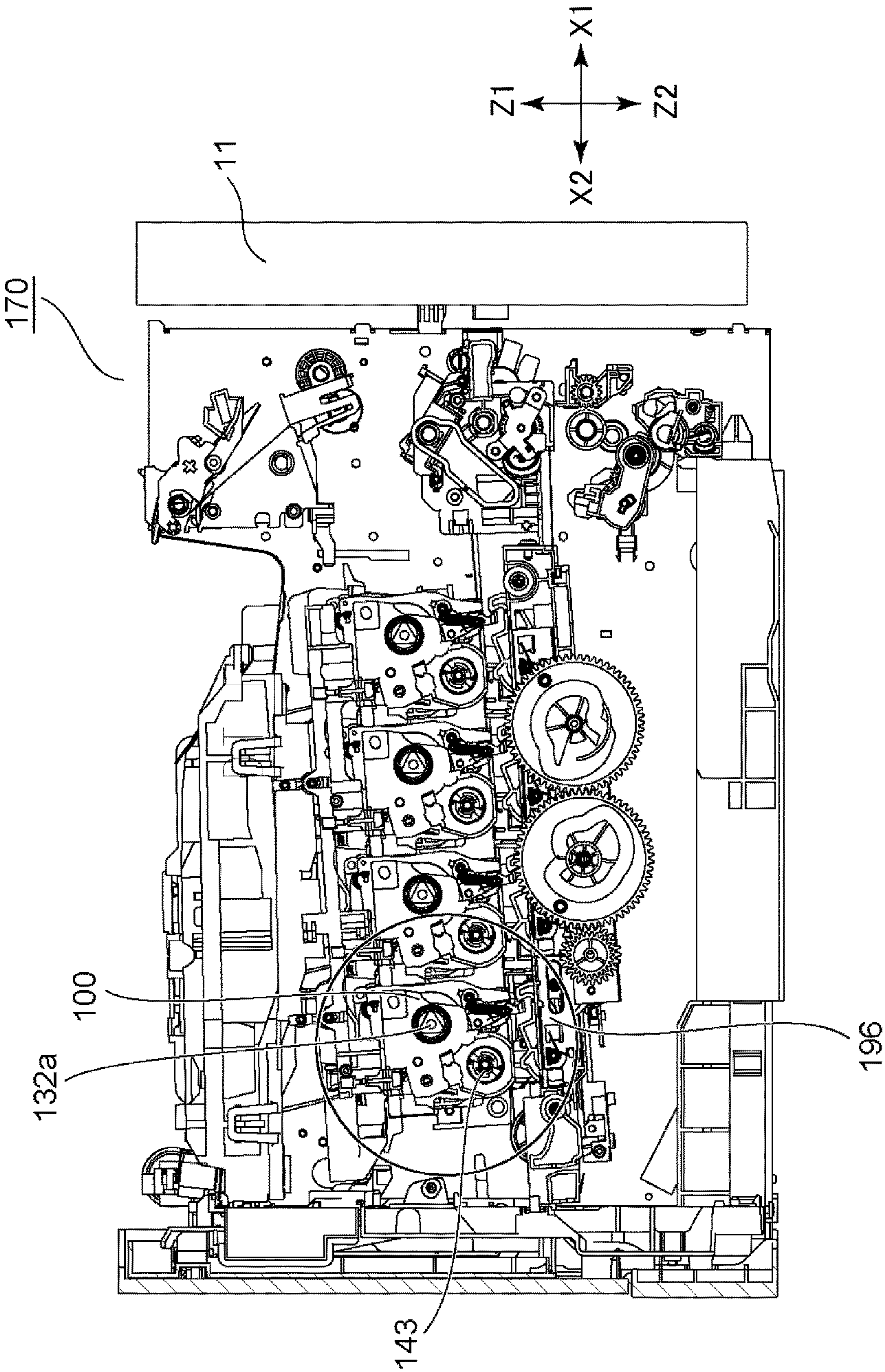
FIG. 11 is a sectional view of the image forming apparatus.
Figure 12:
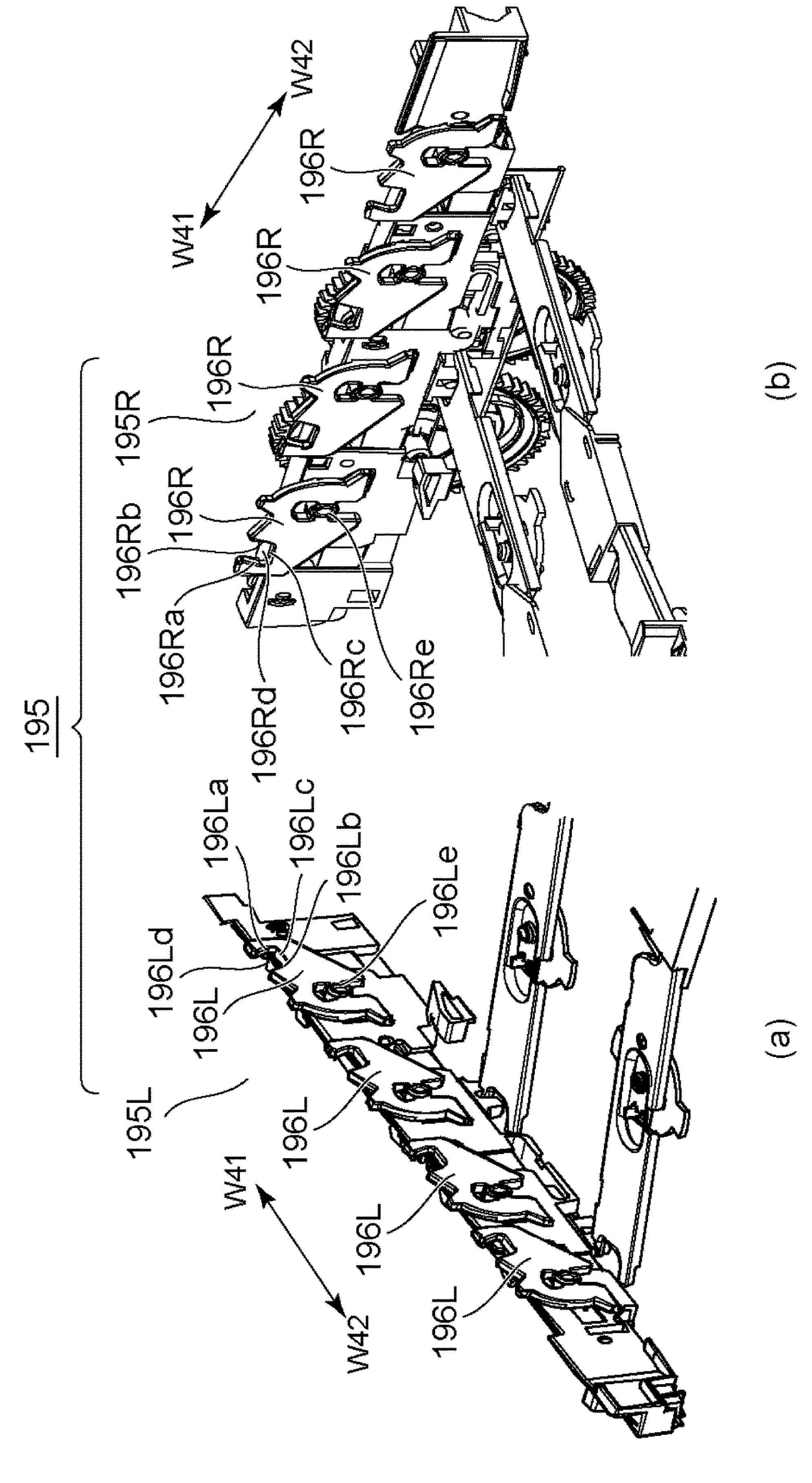
FIG. 12 is a perspective view of a development separation control unit.

FIG. 11 is a sectional view of the image forming apparatus M taken along the driving side end of the process cartridge 100. FIG. 12 is a perspective view of the development separation control unit as viewed obliquely from above.

In this embodiment, the development separation control unit 195 controls the separation contact operation of the developing unit 109 relative to the photosensitive drum 104 by engaging with a portion of the developing unit 109. The development separation control unit 195 is disposed in a lower portion the image forming apparatus main assembly 170 as shown in FIG. 8.

Specifically, the development separation control unit 195 is placed below the development input coupling portion 32*a* and the drum coupling 143 in the vertical direction (downward in the arrow Z2 direction).

Further, the development separation control unit 195 is placed in the longitudinal direction (Y1, Y2 direction) of the photosensitive drum 104 of the intermediary transfer belt 12. That is, the development separation control unit 195 includes a development separation control unit 195R on the driving side and a development separation control unit 195L on the non-driving side.

By disposing the development separation control unit 195 in the dead space of the image forming apparatus main assembly 170 as described above, the main assembly can be downsized.

The development separation control unit 195R has four separation control members 196R corresponding to the process cartridges 100 (100Y, 100M, 100C, 100K), respectively. The four separation control members have substantially the same shape. The development separation control unit 195R is always fixed to the image forming apparatus main assembly. However, the separation control member 196R is structured to be movable in the W41 and W42 directions by a control mechanism (not shown). The detailed structure will be described hereinafter.

The development separation control unit 195L has four separation control members 196L corresponding to the process cartridge 100 (100Y, 100M, 100C, 100K). The four separation control members have substantially the same shape. The development separation control unit 195L is always fixed to the image forming apparatus main assembly. However, the separation control member 196L is structured to be movable in the W41 and W42 directions by a control mechanism (not shown). The detailed structure will be described hereinafter.

Further, in order for the development separation control unit 195 to engage with a portion of the developing unit 109 and control the separation contact operation of the developing unit 109, a portion of the development control unit 196 and a portion of the developing unit are required to overlap in the vertical direction (Z1, Z2 direction).

Therefore, for the overlapping in the vertical direction (Z1 and Z2 directions) as described above after the developing unit 109 of the process cartridge 100 is inserted in the X1 direction, a part of the developing unit (in the case of this embodiment, the force applying member 152) is required to project. Details will be described hereinafter.

In the case that the development separation control unit 195 itself is raised in the same manner as in the case of the intermediary transfer unit 12 for the engagement, there are problems such as an increase in the operating force of the interlocked front door 11 and complication of the drive train.

In this embodiment, a method is employed in which the development separation control unit 195 is fixed to the image forming apparatus main assembly 170, and a part of the developing unit 109 (force applying member 152) is projected downward (Z2) in the image forming apparatus main assembly 170, and one of the reasons for this arrangement is to address this problem. Further, the mechanism for projecting the force applying member 152 utilized the mechanisms of the storing element pressing unit 190 and the cartridge pressing unit described above, and therefore, there is no above-described problem and an increase in the cost of the device main assembly can be suppressed.

The entire unit of the development separation control unit 195 is fixed to the image forming apparatus main assembly 170. However, as will be described hereinafter, a part of the developing unit is movable in order to engage with the force applying member 152 to cause an operation so that the developing unit 109 is in a separated state and a contacted state relative to the photosensitive drum 104. Details will be described hereinafter.

[Overall Structure of Process Cartridge]

Figure 13:
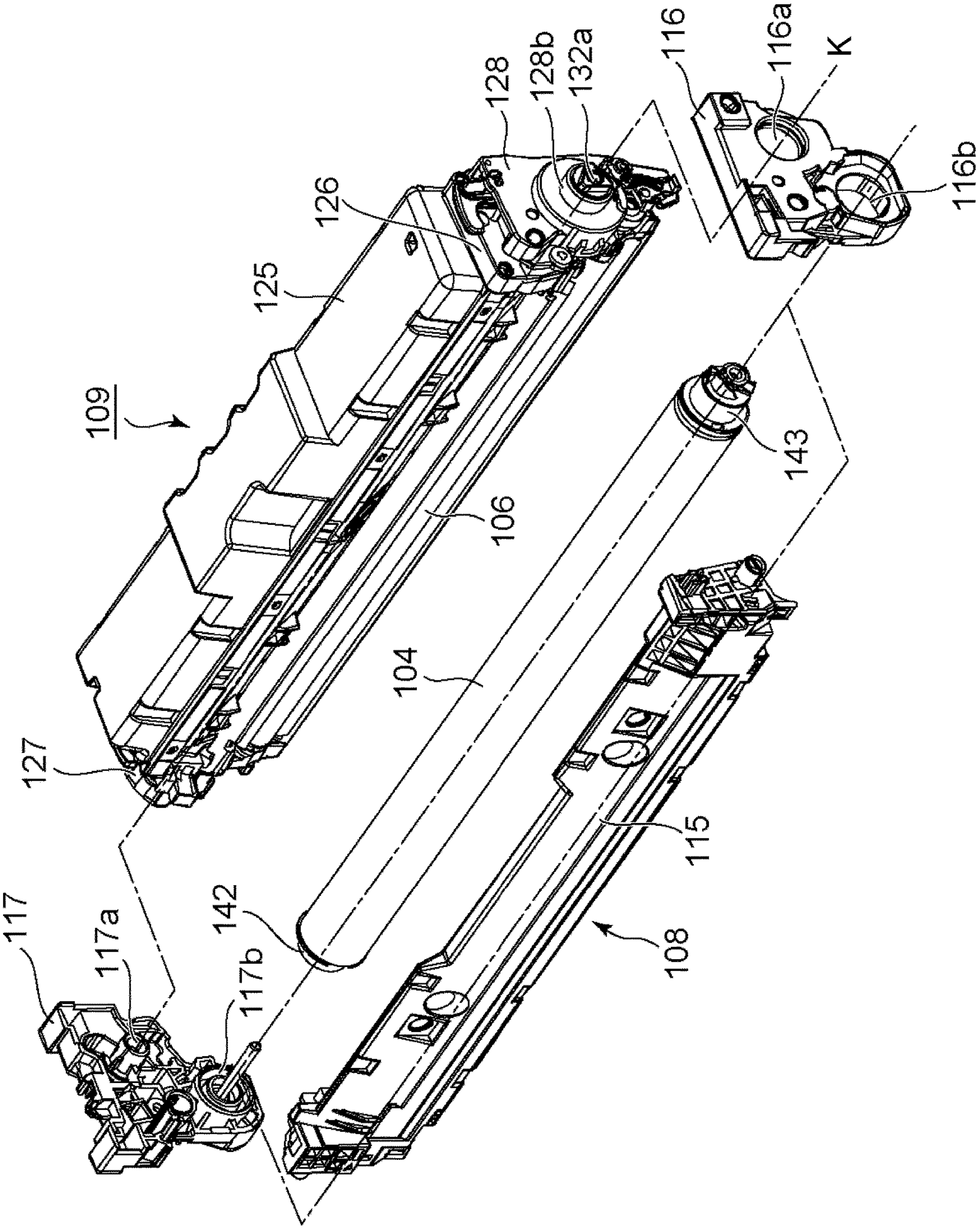
FIG. 13 is an assembly perspective view of the process cartridge.
Figure 14:
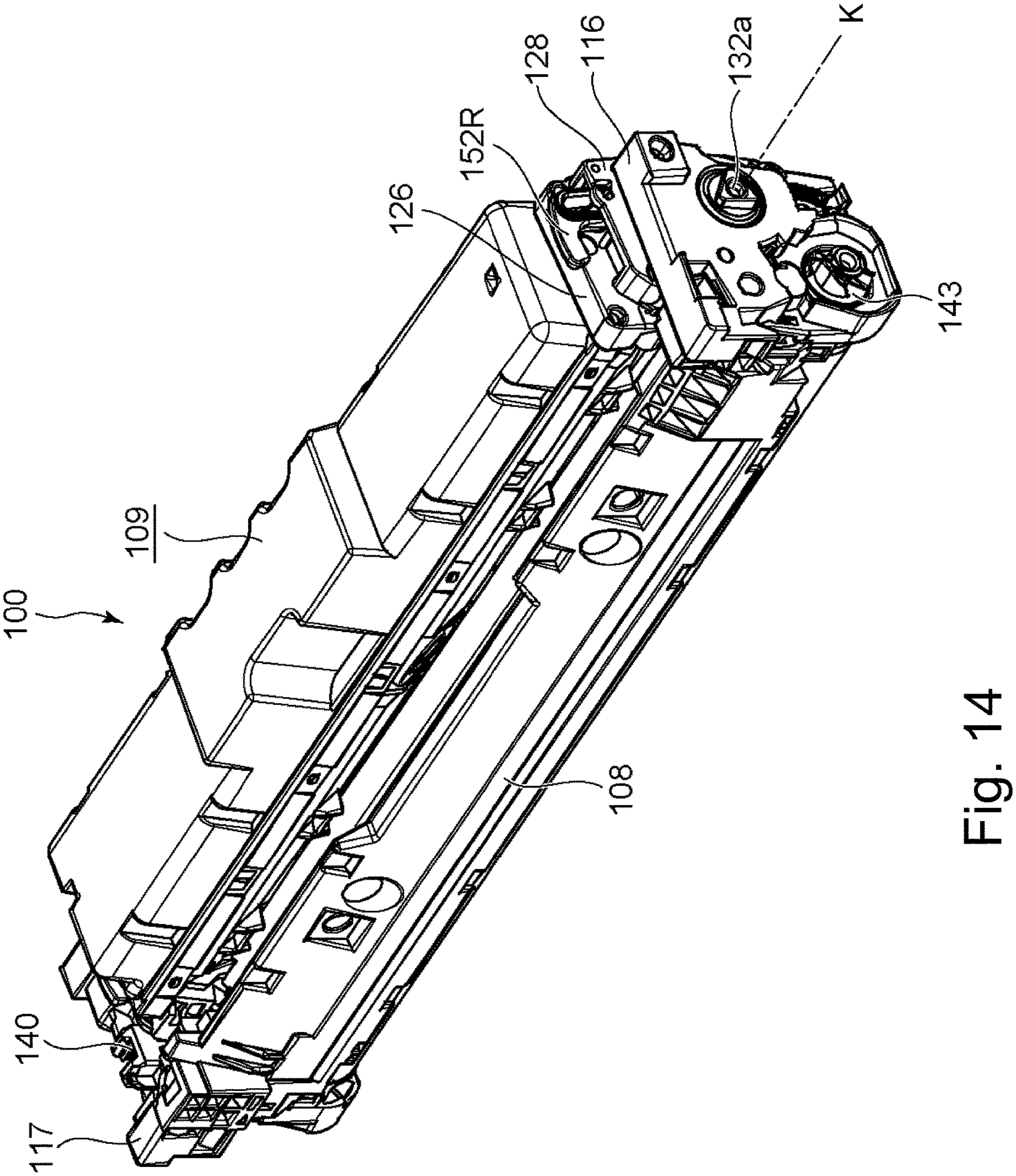
FIG. 14 is a perspective view of the process cartridge.

Referring to FIGS. 3, 13 and 14, the structure of the process cartridge will be described.

FIG. 13 is an assembly perspective view of the process cartridge 100 as viewed from the driving side, which is one side in the axial direction of the photosensitive drum 104. FIG. 14 is a perspective view of the process cartridge 100 as viewed from the driving side.

In this embodiment, the first to fourth process cartridges 100 (100Y, 100M, 100C, 100K) have the same electrophotographic process mechanism, but the color of the contained toner and the filling amount of the toner are different from each other.

The process cartridge 100 includes a photosensitive drum 104 (4Y, 4M, 4C, 4K) and process means which act on the photosensitive drum 104. The cartridge 100 includes a charging roller 105 as a process means, which is a charging means (charging member) for charging the photosensitive drum 104. Further, the cartridge 100 includes a developing roller 106 which is a developing means (developing member) for developing the latent image formed on the photosensitive drum 104 as another process means.

In addition, as an example of the process means, there is a cleaning means (for example, a cleaning blade or the like) for removing residual toner remaining on the surface of the photosensitive drum 104 can be considered. However, the image forming apparatus of this embodiment employs a structure in which the cleaning means contacting the photosensitive drum 104 is not provided.

The process cartridge 100 is divided into a drum holding unit 108 (108Y, 108M, 108C, 108K) and a developing unit 109 (109Y, 109M, 109C, 109K).

[Drum Holding Unit Structure]

As shown in FIGS. 3 and 13, the drum holding unit 108 comprises a photosensitive drum 104, a charging roller 105, and a drum frame 115 which is a first frame, and so on. The photosensitive drum 104 unified together with the coupling 143 and the drum flange 142 to provide the drum unit 103 (see part (a) of FIG. 1, the details will be described hereinafter).

The drum unit 103 is rotatably supported by a driving side cartridge cover member 116 and a non-driving side cartridge cover member 117 provided at the opposite ends in the longitudinal direction of the process cartridge 100. The driving side cartridge cover member 116 and the non-driving side cartridge cover member 117 will be described hereinafter.

Further, as shown in FIGS. 13 and 14, a drum coupling 143 for transmitting a driving force to the photosensitive drum 104 is provided in the neighborhood of one end in the longitudinal direction of the photosensitive drum 104. As described above, the coupling 143 engages with the main assembly side drum drive coupling 180 (see FIG. 9) as the drum drive output unit of the image forming apparatus main assembly 170. The driving force of the driving motor (not shown) of the image forming apparatus main assembly 170 is transmitted to the photosensitive drum 104 to rotate it in the direction of arrow A. Further, the photosensitive drum 104 is provided with a drum flange 142 in the neighborhood of the other end (second end portion) in the longitudinal direction.

The shaft portion **143*j* (see FIG. 1) of the coupling 143 is supported by the driving side cartridge cover 116, and the drum flange 142 is supported by the shaft fixed to the non-driving side cartridge cover 117. By this, the drum unit 103 is rotatably supported in the cartridge. That is, the ends of the photosensitive drum 104 are rotatably supported by the ends of the casing of the cartridge (that is, the cartridge covers 116 and 117) by way of the coupling 143 and the drum flange 142**.

The charging roller 105 is supported by the drum frame 115 in contact with the photosensitive drum 104 so that it can be rotationally driven by the photosensitive drum 104.

Figure 80:
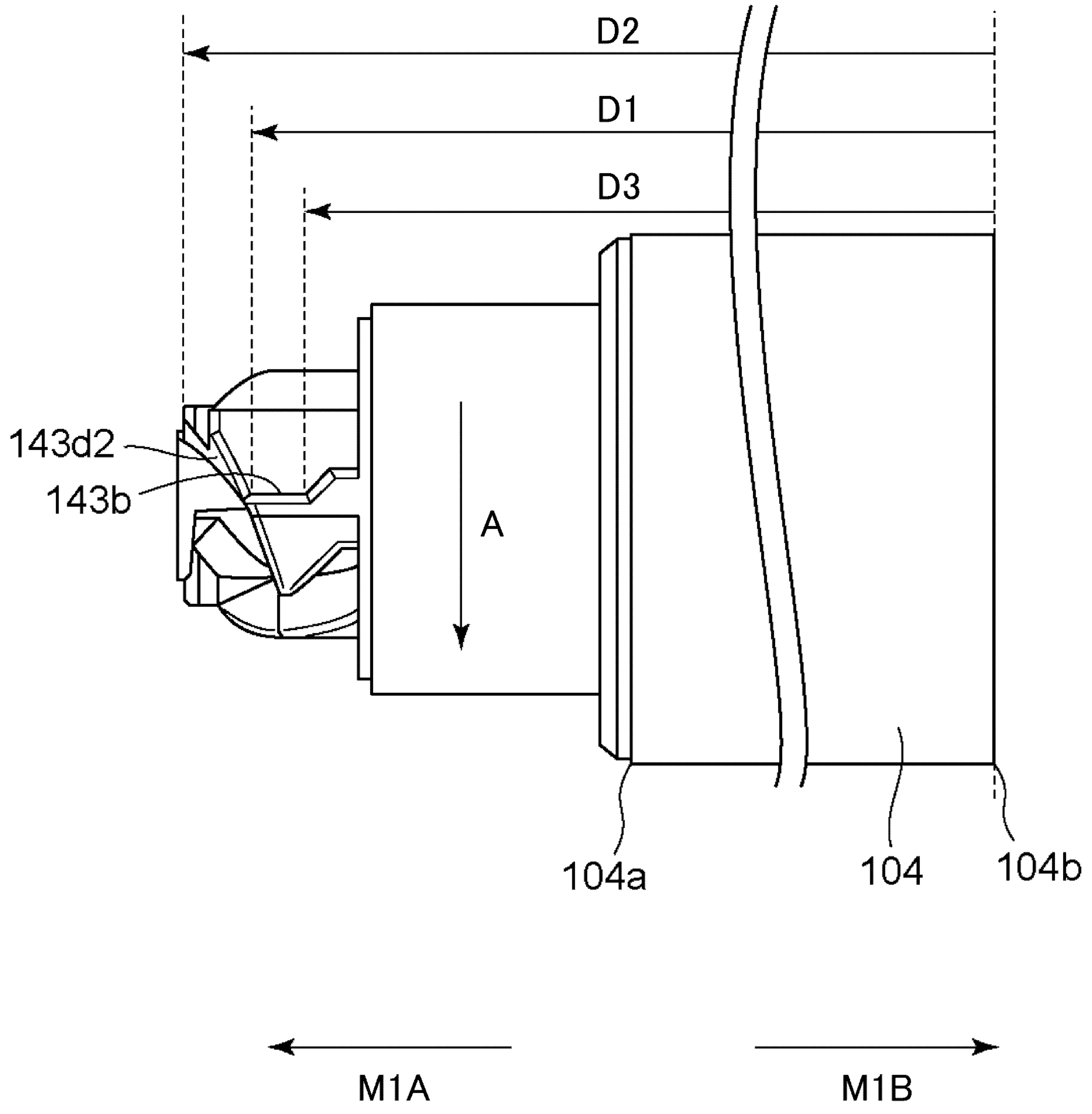
FIG. 80 is a side view of the coupling.

Of the opposite sides of the drum unit 103 in the longitudinal direction (axial direction), the side on which the coupling 143 is provided is the driving side, and the side on which the drum flange 142 is placed is the non-driving side. That is, of the opposite ends of the photosensitive drum 104 in the axial direction, the coupling 143 is fixed in the neighborhood of the end on the driving side, and the drum flange 142 is fixed in the neighborhood of the end on the opposite side to the driving side. Of opposite ends of the photosensitive drum 104, one may be referred to as a first end and the other may be referred to as a second end. FIG. 80 shows the end portion **104*a* on the drum driving side and the end portion 104*b*** on the non-driving side of the photosensitive drum.

Figure 16:
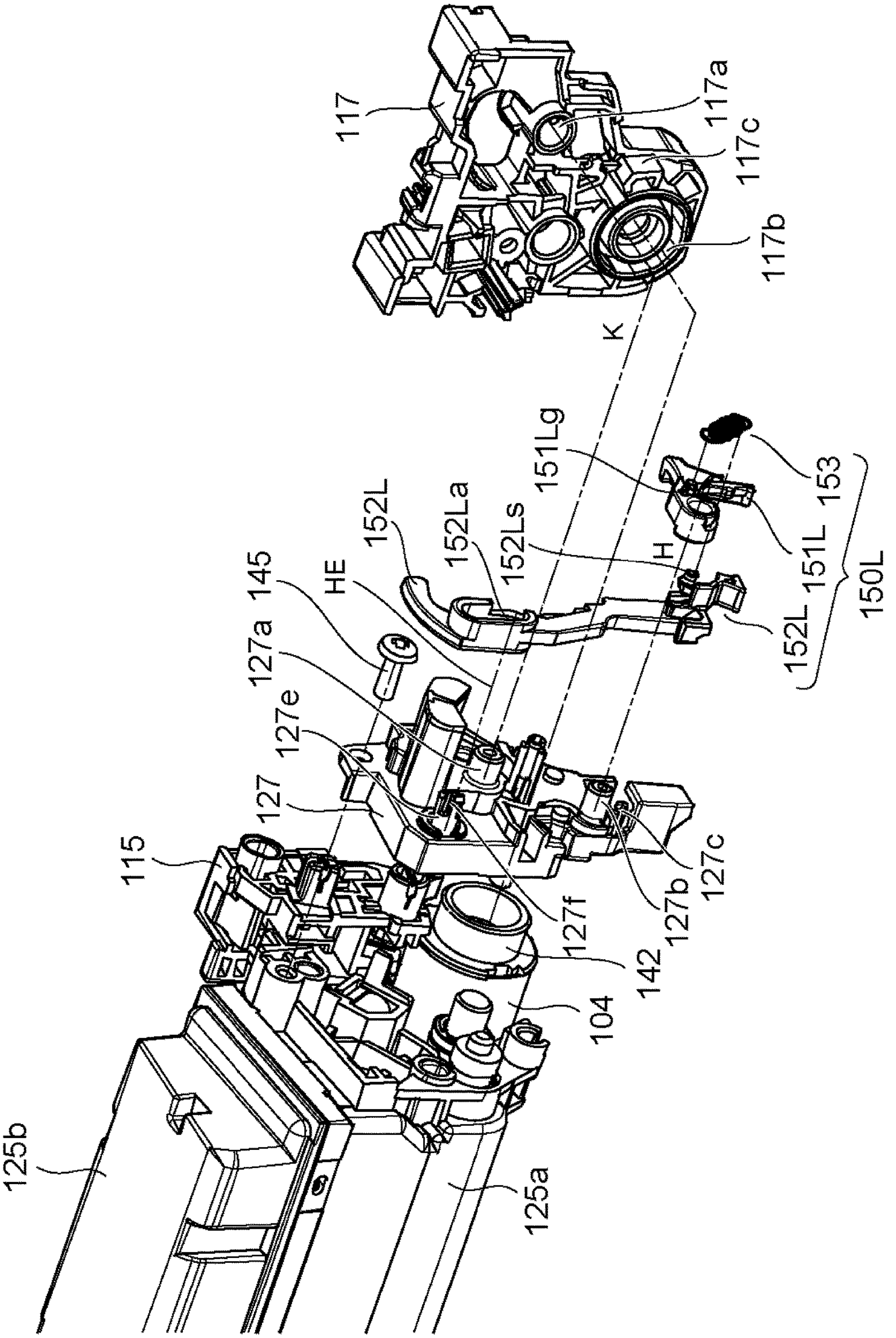
FIG. 16 is an assembly perspective view of the process cartridge.
Figure 19:
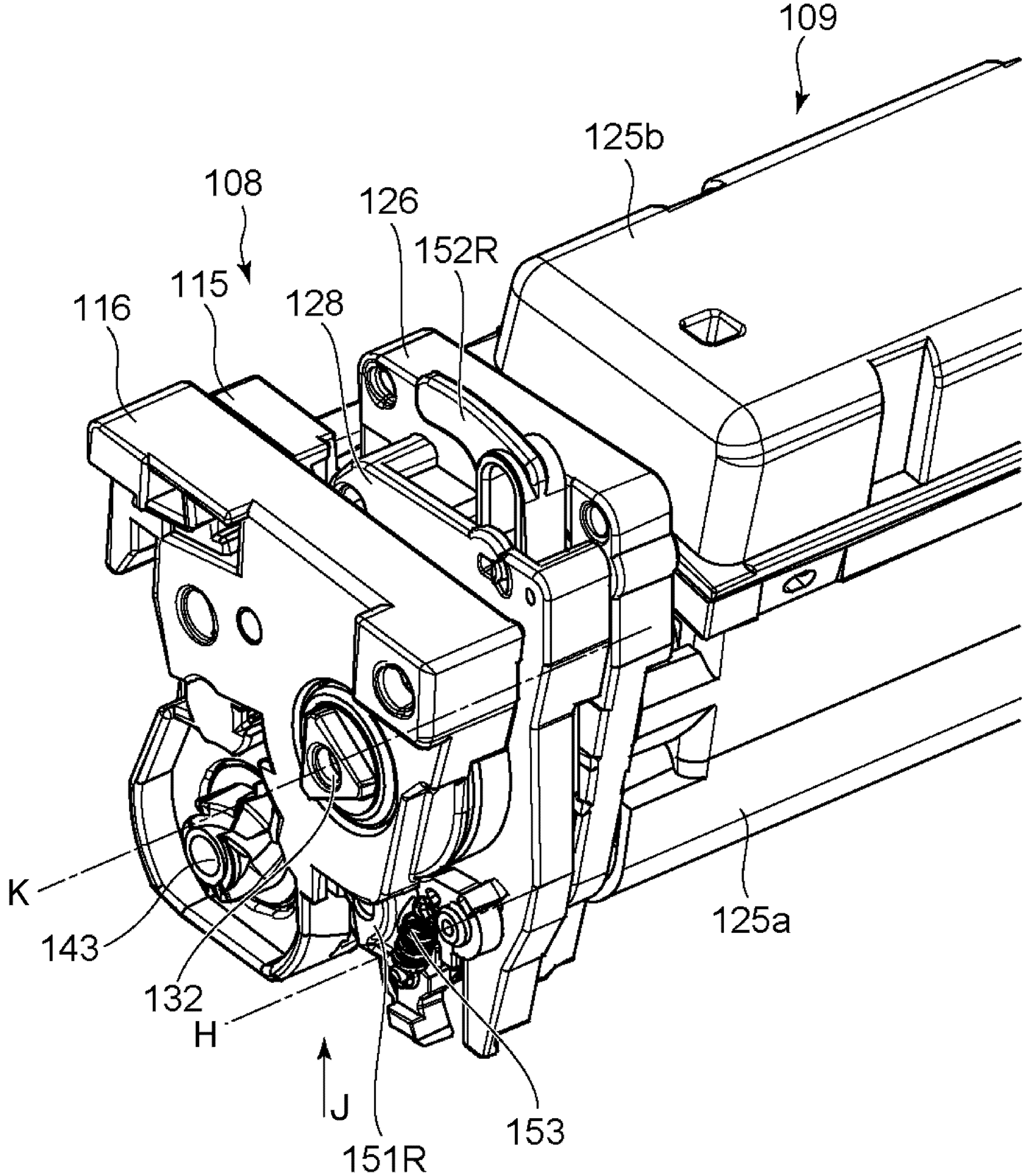
FIG. 19 is a partial sectional view of the separation holding member R after assembly.

Similarly to the drum unit 103, of the opposite sides of the cartridge 100, the side on which the coupling 143 is placed is referred to as the driving side, and the side opposite to the driving side is referred to as the non-driving side. For example, FIGS. 10 and 19 are illustrations showing the driving side of the cartridge. Further, FIG. 16 is an illustration showing the non-driving side of the cartridge.

As shown in FIGS. 13 and 14, the driving side cartridge cover 116 is a component provided at the driving side end of the casing of the cartridge 100, and the non-driving side cartridge cover is a component provided at the non-driving side end of the casing. The drum coupling 143 supported by the driving side cartridge cover 116 can be considered to be located in the neighborhood of the non-driving side end of the casing of the cartridge 100. Of the opposite ends of the cartridge 100, one may be referred to as a first end and the other may be referred to as a second end.

[Development Unit Structure]

As shown in FIGS. 3 and 13, the developing unit 109 includes a developing roller 106, a toner feeding roller (toner supply roller) 107, a developing blade 130, a developing unit frame 125, and the like. The developing unit frame 125 comprises a lower frame **125*a* and a lid member 125*b*. The lower frame 125*a* and the lid member 125*b*** are connected by ultrasonic welding or the like.

The development frame 125, which is the second frame (second casing), includes a toner accommodating portion 129 for accommodating toner to be supplied to the developing roller 106. Further, the development frame 125 rotatably supports the developing roller 106 and the toner feeding roller 107 by way of the driving side bearing 126 and the non-driving side bearing 127, which will be described hereinafter, and holds the developing blade 130 for regulating a layer thickness of the toner on the peripheral surface of the developing roller 106.

The developing blade 130 is formed by mounting an elastic member **130*b*, which is a sheet-like metal having a thickness of about 0.1 mm, on a support member 130*a*, which is a metal material having an L-shaped cross-section, by welding or the like. The developing blade 130 is mounted to the development frame 125 with fixing screws 130*c* at two locations, one in the neighborhood of one end and the other in the neighborhood of the other end in the longitudinal direction. The developing roller 106 comprises a core metal 106*c* and a rubber portion 106*d***.

The developing roller 106 is rotatably supported by a driving side bearing 126 and a non-driving side bearing 127 mounted to the opposite ends in the longitudinal direction of the development frame 125, respectively. The development frame 125, the driving side bearing 126, and the non-driving side bearing 127 are a part of the frame (casing) of the cartridge. In a broad sense, the bearings 126 and 127 may be regarded as a part of the development frame 125, and the bearings 126 and 127 and the development frame 125 may be collectively referred to as a development frame.

The toner feeding roller 107 conveys and supplies the toner contained in the toner accommodating portion 129 toward the developing roller 106 to develop the latent image on the photosensitive drum 104. The toner feeding roller 107 is in contact with the developing roller 106.

Further, as shown in FIGS. 13 and 14, a development input coupling portion (development coupling) **32*a* for transmitting a driving force to the developing unit 109 is provided on one side of the developing unit 109 in the longitudinal direction. The development input coupling portion 32*a* engages with the development drive coupling 185 (see FIG. 9) on the main assembly side as the development drive output portion of the image forming apparatus main assembly 170, and the driving force of the drive motor (not shown) of the image forming apparatus main assembly 170 is input to the developing unit 109**.

The driving force inputted to the developing unit 109 is transmitted by a driving train (not shown) provided in the developing unit 109, so that the developing roller 106 can be rotated in the direction of arrow D in FIG. 3. Similarly, the driving force received by the development input coupling portion 32*a* also rotates the toner feeding roller 107 to supply toner to the developing roller 106.

On one side of the developing unit 109 in the longitudinal direction, a development cover member 128 which supports and covers a developing input coupling portion 32*a* and a drive train (not shown) is provided. The outer diameter of the developing roller 106 is selected to be smaller than the outer diameter of the photosensitive drum 104. The outer diameter of the photosensitive drum 104 of this embodiment is selected to be in the range of Φ18 to Φ22 (mm), and the outer diameter of the developing roller 106 is selected to be in the range of Φ8 to Φ14. By the selections of such outer diameters, efficient arrangement is possible.

[Assembling of Drum Holding Unit and Developing Unit]

Referring to Figure, the assembly of the drum holding unit 108 and the developing unit 109 will be described The drum holding unit 108 and the developing unit 109 are connected by a driving side cartridge cover member 116 and a non-driving side cartridge cover member 117 provided at respective ends in the longitudinal direction of the process cartridge 100.

The driving side cartridge cover member 116 provided on one side (driving side) of the process cartridge 100 in the longitudinal direction is provided with a developing unit support hole 116*a* for supporting the developing unit so as to be swingable (movable). Similarly, the non-driving side cartridge cover member 117 provided on the other side (non-driving side) of the process cartridge 100 in the longitudinal direction is provided with a developing unit support hole 117*a* for swingably supporting the developing unit 109.

Further, the driving side cartridge cover member 116 and the non-driving side cartridge cover member 117 are provided with drum support holes 116*b* and 117*b* for rotatably supporting the photosensitive drum 104. Here, on the driving side, the outer diameter portion of the cylindrical portion 128*b* of the development cover member 128 is fitted into the developing unit support hole 116*a* of the driving side cartridge cover member 116. On the non-driving side, the outer diameter portion of the cylindrical portion (not shown) of the non-driving side bearing 127 is fitted into the developing unit support hole 117*a* of the non-moving side cartridge cover member 117.

Further, the opposite ends of the photosensitive drum 104 in the longitudinal direction are fitted into the drum support holes 116*b* of the driving side cartridge cover member 116 and the drum support holes 117*b* of the non-driving side cartridge cover member 117, respectively. Then, the driving side cartridge cover member 116 and the non-driving side cartridge cover member are fixed to the drum frame 115 of the drum holding unit 108 with screws or adhesives (not shown). By this, the developing unit 109 is rotatably supported by the driving side cartridge cover member 116 and the non-driving side cartridge cover member 117. The developing unit 109 can be moved (rotated) relative to the drum holding unit 108, and the developing roller 106 can be moved with respect to the photosensitive drum by this movement. At the time of image formation, the developing roller 106 can be placed at the position acting on the photosensitive drum 104.

The drum frame 115 and the cover members 116 and 117 are a part of the cartridge frame (casing). More specifically, they are frames of the drum holding unit 108. Further, since the cover members 116 and 117 are fixed to one end and the other end of the drum frame 115, respectively, the cover members 116 and 117 may be regarded as a part of the drum frame 115. Or, the cover members 116 and 117 and the drum frame 115 may be collectively referred to as a drum frame.

Further, one of the frame (115, 116, 117) of the drum holding unit 108 and the frame (125, 126, 127) of the developing unit may be called a first frame (first casing), and the other may be called a second frame (second casing) or the like. Further, the frame (115, 116, 117) of the drum holding unit 108 and the frame (125, 126, 127) of the developing unit may be collectively referred to as a frame of the cartridge (casing of the cartridge), without particular distinction between them.

FIG. 14 shows a state in which the drum holding unit 108 and the developing unit 109 are assembled by the above-described steps to provide an integral process cartridge 100.

The axis connecting the center of the developing unit support hole 116*a* of the driving side cartridge cover member 116 and the center of the developing unit support hole 117*a* of the non-moving side cartridge cover member 117 is referred to as a swing axis K. Here, the cylindrical portion 128*b* of the development cover member 128 on the driving side is coaxial with the development input coupling 74. That is, the developing unit 109 has a structure in which a driving force is transmitted from the image forming apparatus main assembly 170 on the swing axis K. Further, the developing unit 109 is rotatably supported about the swing axis K.

[Structure of Separation/Contact Mechanism]

Figure 15:
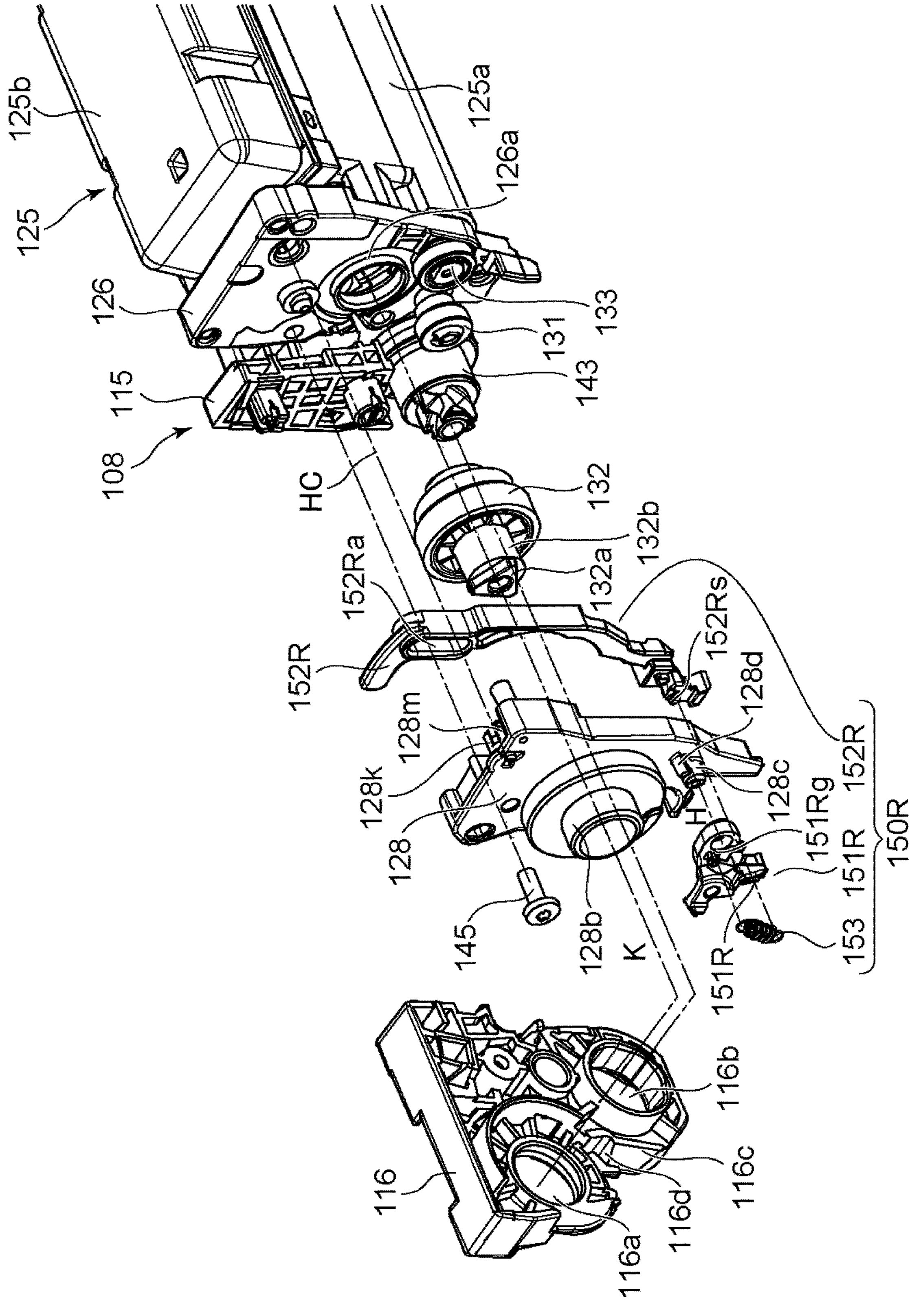
FIG. 15 is an assembly perspective view of the process cartridge.

The structure in which the photosensitive drum 104 of the process cartridge 100 and the developing roller 106 of the developing unit 109 are separated from and contacted with each other in this embodiment will be described in detail. The process cartridge includes a separation contact mechanism 150R on the driving side and a separation contact mechanism 150L on the non-driving side. FIG. 15 shows an assembly perspective view of the driving side of the developing unit 109 including the separation contact mechanism 150R. FIG. 16 shows an assembly perspective view of the developing unit including the separation contact mechanism 150L on the non-driving side. Regarding the separation contact mechanism, the details of the separation contact mechanism 150R on the driving side will first be described, and then the separation contact mechanism 150L on the non-driving side will be described.

Since the separation contact mechanisms on the driving side and the non-driving side have almost the same functions, the same reference numerals are used for both sides with the exception that R is added at the end for the driving side, and L is added for the non-driving side.

The separation contact mechanism 150R includes a separation holding member 151R which is a restriction member, a force applying member 152R which is a pressing member, and a tension spring 153.

The separation contact mechanism 150L includes a separation holding member 151L which is a restriction member, a force applying member 152L which is a pressing member, and a tension spring 153.

[Detailed Description of Separation Holding Member R]

Figure 17:
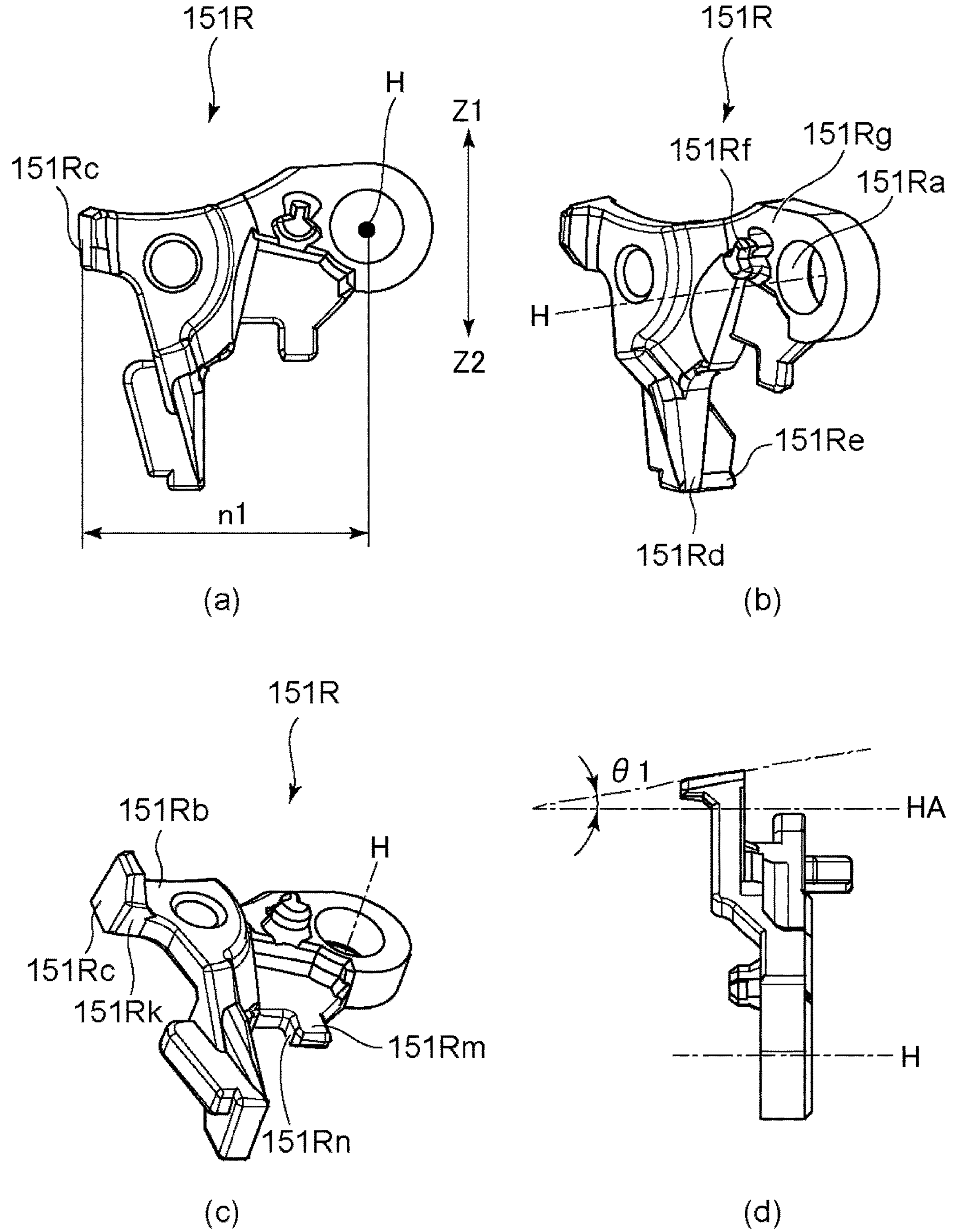
FIG. 17 is a view of a separation holding member R per se.

Referring to FIG. 17, the separation holding member 151R will be described in detail.

Part (a) of FIG. 17 is a front view of the separation holding member 151R per se of the process cartridge 100 as viewed from the driving side longitudinal direction. Parts (b) and (c) of FIG. 17 are perspective views of the separation holding member 151R per se. Part (d) of FIG. 17 is a view of the separation holding member 151R as viewed in the direction of arrow Z2 in part (a) of FIG. 17 (vertically upward in the image forming state). The separation holding member 151R includes an annular support receiving portion 151Ra, and includes a separation holding portion 151Rb projecting from the support receiving portion 151Ra in the radial direction of the support receiving portion 151Ra. The free end of the separation holding portion 151Rb has a separation holding surface 151Rc having an arc shape having a center on the separation holding member swing axis H and inclined by an angle θ1 with respect to the line HA parallel to the separation holding member swing axis H. The angle θ1 is selected so as to satisfy the equation (1).

$$0° \leq \theta 1 \leq 45° \quad (1)$$

Further, the separation holding member 151R has a second restricted surface 151Rk adjacent to the separation holding surface 151Rc. Further, the separation holding member 151R is provided with a second pressed portion 151Rd projecting in the Z2 beyond the support receiving portion 151Ra, and an arc-shaped second pressed surface 151Re projecting from the second pressed portion 151Rd in the direction of the separation holding member swing axis H of the support receiving portion 151Ra.

Furthermore, the separation holding member 151R includes a main body portion 151Rf connected to the support receiving portion 151Ra, and the main body portion 151Rf is provided with a spring hooked portion 151Rg projecting in the direction of the separation holding member swing axis H of the support receiving portion 151Ra. Further, the main body portion 151Rf is provided with a rotation (on its own axis) prevention portion 151Rm projecting in the Z2 direction, and the rotation prevention surface 151Rn is provided in a direction facing the second pressed surface 151Re.

[Detailed Description of Force Applying Member R]

Figure 18:
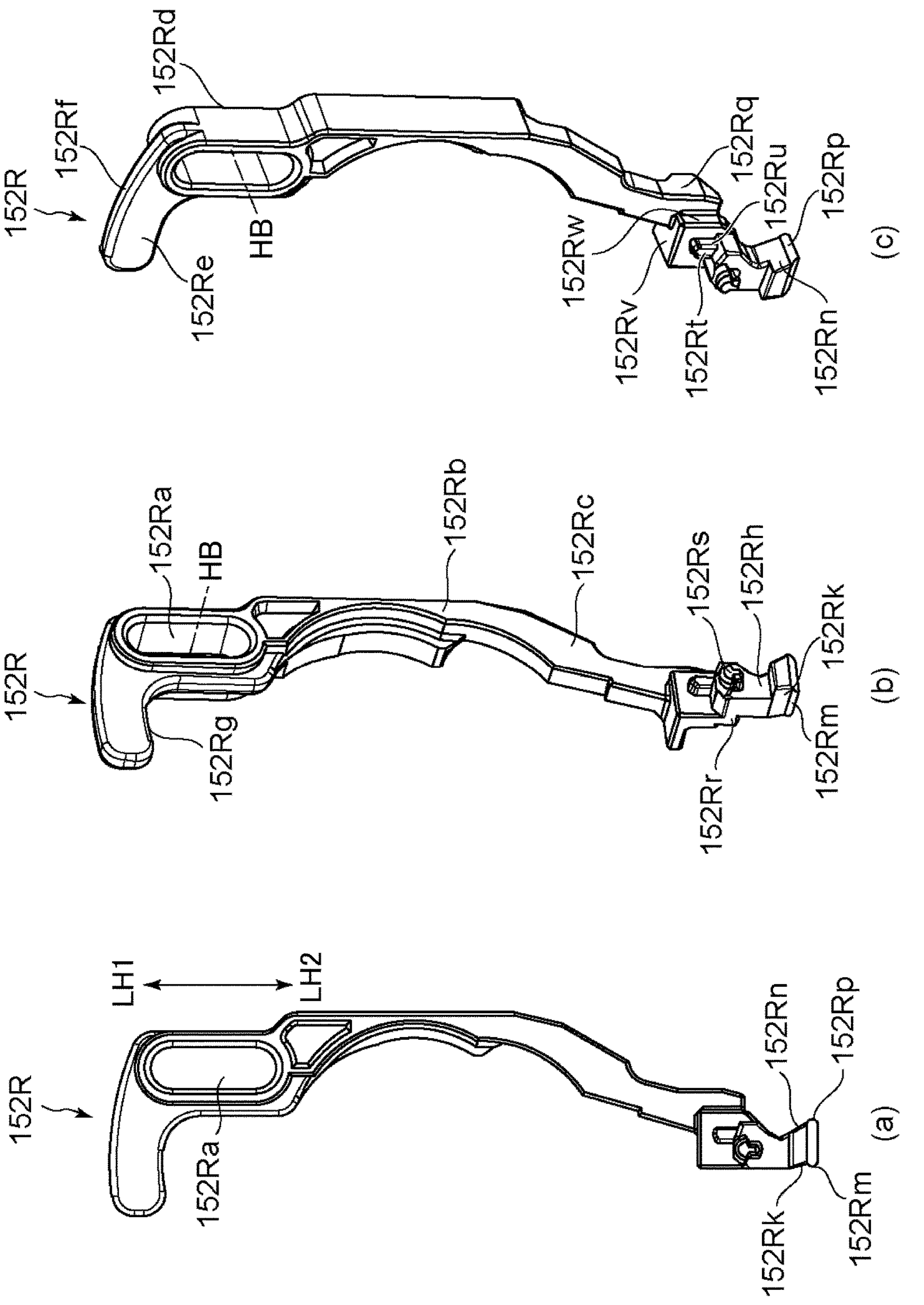
FIG. 18 is a view of a force applying member R per se.

Referring to FIG. 18, the force applying member 152R will be described in detail.

Part (a) of FIG. 18 is a front view of the force applying member 152R per se as viewed from the longitudinal direction of the process cartridge 100, and FIGS. 18B and 18C are perspective views of the force applying member 152R per se.

The force applying member 152R is provided with an oblong-shaped oblong support receiving portion 152Ra. Here, the longitudinal direction of the oblong shape of the oblong support receiving portion 152Ra is indicated by an arrow LH, the upward direction is indicated by an arrow LH1, and the downward direction is indicated by an arrow LH2. Further, the direction in which the oblong support receiving portion 152Ra is formed is indicated by as HB. The force applying member 152R has a projecting portion 152Rh formed on the downstream side in the arrow LH2 direction of the oblong support receiving portion 152Ra. The oblong support receiving portion 152Ra and the projecting portion 152Rh are connected by a main body portion 152Rb. On the other hand, the force applying member 152R includes a pressed portion 152Re projecting in the arrow LH1 direction and substantially perpendicular to the arrow LH1 direction, and has an arc-shaped pressed surface 152Rf on the downstream side in the arrow LH1 direction and has a pushing restriction surface 152Rg on the upstream side. Further, the force applying member 152R has a first at-accommodation restriction surface 152Rv extending from the main body portion 152Rb on the upstream side in the arrow LH2 direction, and a second at-accommodation restricting surface 152Rw which is adjacent to the first at-accommodation restriction surface 152Rv and which is substantially parallel to the first pressing surface 152Rq.

The projecting portion 152Rh includes a first force receiving portion 152Rk and a second force receiving portion 152Rn which are arranged so as to be opposite from each other in a direction substantially perpendicular to the arrow LH2 direction at an end portion in the arrow LH2 direction. The first force receiving portion 152Rk and the second force receiving portion 152Rn have a first force receiving surface 152Rm and a second force receiving surface 152Rp extending in the HB direction and having arc shapes, respectively. Further, the projecting portion 152Rh has a spring hooked portion 152Rs projecting in the HL direction and a locking portion 152Rt, and the locking portion 152Rt has a locking surface 152Ru facing in the same direction as the first force receiving surface 152Rp.

Further, the force applying member 152R is a part of the main body portion 152Rb, and is arranged on the upstream side of the second force receiving portion 152Rn in the arrow LH2 direction, and has a first pressing surface 152Rq facing in the same direction as the second force receiving surface 152Rp. Further, the force applying member 152R has a second pressing surface 152Rr which is perpendicular to the first at-accommodation restriction surface 152Rv and which is opposite from the first pressing surface 152Rq.

When the process cartridge 100 is mounted on the image forming apparatus main assembly 170, the LH1 direction is substantially the same as the Z1 direction, and the LH2 direction is substantially the same as the Z2 direction. Further, the HB direction is substantially the same as the longitudinal direction of the process cartridge 100.

[Assembling of Separation/Contact Mechanism R]

Next, referring to FIGS. 10 and 15 to 19, the assembly of the separation contact mechanism will be described. FIG. 19 is a perspective view of the process cartridge 100 after being assembled with the separation holding member 151R, as viewed from the driving side.

As shown in FIG. 15 described above, in the developing unit 109, the outer diameter portion of the cylindrical portion 128*b* of the development cover member 128 is fitted into the developing unit support hole portion 116*a* of the driving side cartridge cover member 116. By this, the developing unit 109 is rotatably supported relative to the photosensitive drum 104 about the swing axis K. Further, the development cover member 128 includes a cylindrical first support portion 128*c* and a second support portion 128*k* projecting in the direction of the swing axis K.

The outer diameter of the first support portion 128*c* fits with the inner diameter of the support receiving portion 151Ra of the separation holding member 151R, to rotatably support the separation holding member 151R. Here, the swing center of the separation holding member 151R assembled to the development cover member 128 is the separation holding member swing axis H. The development cover member includes a first retaining portion 128*d* which projects in the direction of the separation holding member swing axis H. As shown in FIG. 15, the movement of the separation holding member 151R assembled to the development cover member 128 in the swing axis H direction is restricted by abutment of the first retaining portion 128*d* to the separation holding member 151R.

Further, the outer diameter of the second support portion 128*k* fits with the inner wall of the oblong support receiving portion 152Ra of the force applying member 152R, to support the force applying member 152R so as to be rotatable and movable in the oblong direction. Here, the swing center of the force applying member 152R assembled to the development cover member 128 is a force applying member swing axis HC. As shown in FIG. 15, the movement of the force applying member 152R assembled to the development cover member 128 in the swing axis HC direction is restricted by abutment of the second retaining portion 128*m* to the separation holding member 151R.

FIG. 10 is a sectional view taken along a line CS with a part of the driving side cartridge cover member 116 and a part of the development cover member 128 omitted such that the fitting portion between the oblong support receiving portion 151Ra of the force applying member 152R and the cylindrical portion 128*b* of the development cover member 128 can be seen. The separation contact mechanism 150R is provided with a tension spring 153, as an urging means, for urging the separation holding member 151R to rotate in the direction of arrow B1 in the drawing about the separation holding member swing axis H and for urging the force applying member 152R in the direction of arrow B3.

The arrow B3 direction is a direction substantially parallel to the oblong direction LH2 (see FIG. 18) of the oblong support receiving portion 152Ra of the force applying member 152R. The tension spring 153 is assembled between the spring hooked portion 151Rg provided on the separation holding member 151R and the spring hooked portion 152Rs provided on the force applying member 152R. The tension spring 153 applies a force to the spring hooked portion 151Rg of the separation holding member 151R in the direction of arrow F2 in FIG. 10 to apply an urging force for rotating the separation holding member 151R in the direction of arrow B1. Further, the tension spring 153 applies a force to the spring hooked portion 152Rs of the force applying member 152R in the direction of the arrow F1 to apply an urging force for moving the force applying member 152R in the direction of the arrow B3.

The line connecting the spring hooked portion 151Rg of the separation holding member 151R and the spring hooked portion 152Rs of the force holding member 152R is GS. The line connecting the spring hooked portion 152Rs of the force applying member 152R and the force applying member swing axis HC is HS. Here, a angle θ2 formed by the line GS and the line HS is selected to satisfy the following equation (2) with the clockwise direction about the spring hooked portion 152Rs of the force applying member 152R being positive. By this, the force applying member 152R is urged to rotate in the direction of arrow BA about the force applying member swing axis HC.

$$0° \leq \theta 2 \leq 90° \quad (2)$$

As shown in FIG. 15, in the development drive input gear 132, the inner diameter portion of the cylindrical portion 128*b* of the development cover member 128 and the outer diameter portion of the cylindrical portion 32*b* of the development drive input gear 132 are fitted, and in addition, the support portion 126*a* of the driving side bearing 126 is fitted and the cylindrical portion (not shown) of the development drive input gear are fitted. By this, the driving force can be transmitted to the developing roller gear 131, the toner feeding roller gear 133, and other gears.

In this embodiment, the mounting positions of the separation holding member 151R and the force applying member 152R are as follows. As shown in FIG. 15, in the direction of the swing axis K, the separation holding member 151R is disposed on the side (outside in the longitudinal direction) where the driving side cartridge cover member 116 is provided, with the development cover member 128 interposed therebetween. The force applying member 152R is disposed on the side (inside in the longitudinal direction) where the development drive input gear 13 is arranged. However, the position thereof is not limited to this, and the positions of the separation holding member 151R and the force applying member 152R may be interchanged, and the separation holding member 151R and the force applying member 152R may be disposed in one side in the swing axis K direction with respect to the development cover member 128. Further, the arrangement order of the separation holding member 151R and the force applying member 152R may be exchanged.

The development cover member 128 is fixed to the development frame 125 by way of the driving side bearing 126 to form the developing unit 109. As shown in FIG. 15, the fixing method in this embodiment uses a fixing screw 145 and an adhesive (not shown), but the fixing method is not limited to this example, and welding such as welding by heating or pouring and hardening of resin material, for example, may be used.

Figure 20:
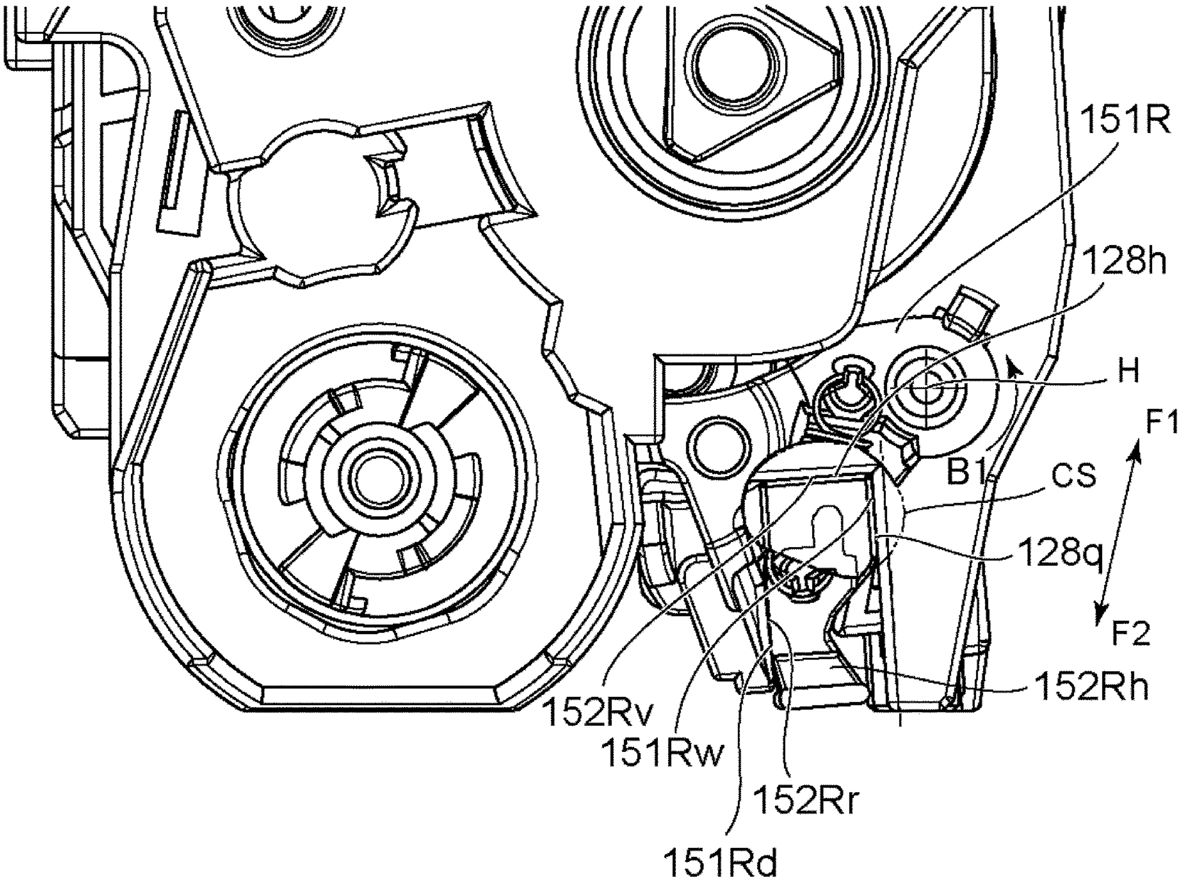
FIG. 20 is an enlarged view of the periphery of the separation holding member R.

Here, FIG. 20 is a sectional view in which the periphery of the separation holding portion 151R in FIG. 10 is enlarged and a part of the tension spring 153 and the separation holding member 151R is partially omitted by the partial sectional line CS4 for the sake of illustration. In the force applying member 152R, the first restriction surface 152Rv of the force applying member 152R comes into contact with the first restriction surface 128*h* of the development cover member 128 by the urging force of the tension spring 153 in the F1 direction in the drawing, as described above. Further, the second restriction surface 152Rw of the force applying member 152R comes into contact with the second restriction surface 128*q* of the development cover member 128 and is positioned thereby. This position is referred to as an accommodation position (reference position) of the force applying member 152R. Further, the separation holding member 151R is rotated in the B1 direction about the swing axis H of the separation holding member by the urging force of the tension spring 153 in the F2 direction, and the second pressed portion 151Rd of the separation holding member 151R comes into contact with the second pressing surface 152Rr of the force applying member 152R, by which the rotation is stopped. This position is referred to as a separation holding position (restriction position) of the separation holding member 151R.

Figure 21:
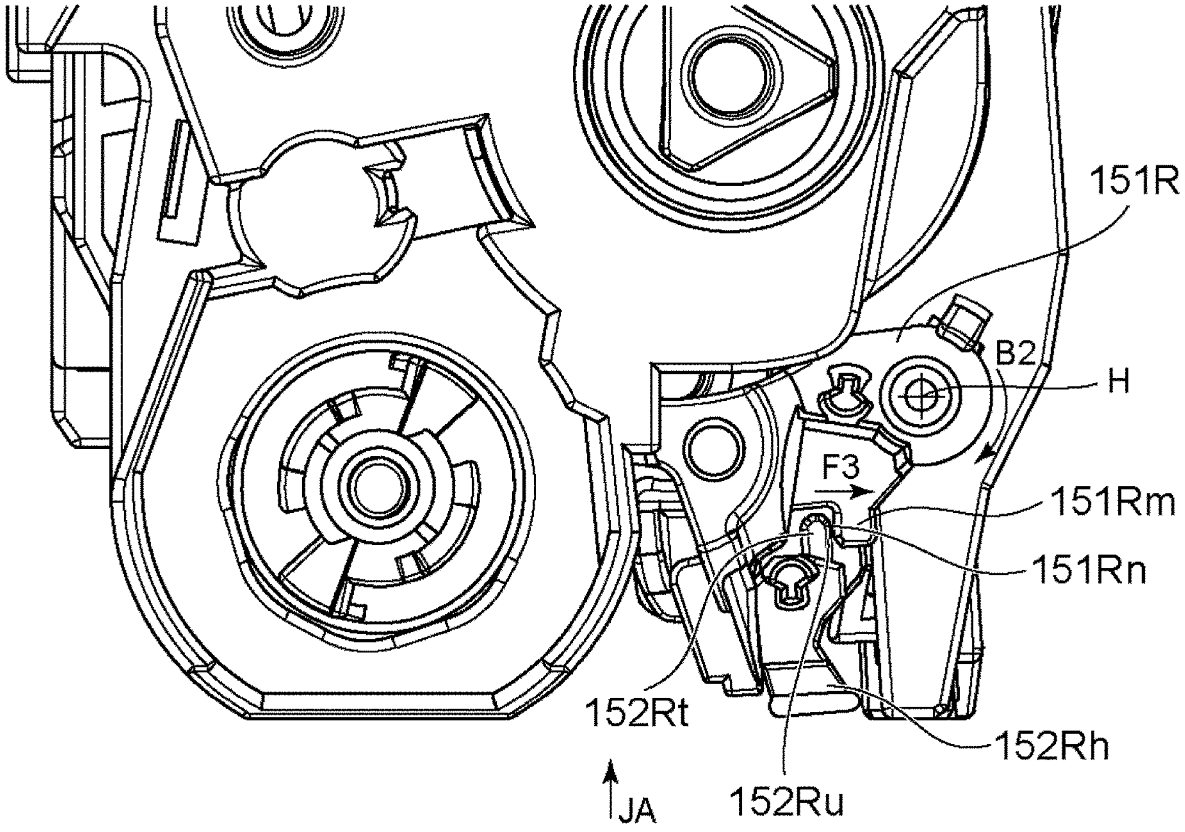
FIG. 21 is an enlarged view of the periphery of the separation holding member R.

Further, FIG. 21 is an illustration in which the periphery of the separation holding portion 151R in FIG. 10 is enlarged, and the tension spring 153 is omitted, for the sake of illustration. Here, the case is considered in which the process cartridge 100 including the separation contact mechanism 150R according to this embodiment is dropped in the JA direction of FIG. 21 when the process cartridge 100 is transported. At this time, the separation holding member 151R receives a force of rotating in the direction of arrow B2 by its own weight about the separation holding swing axis H. For this reason, when the rotation in the B2 direction occurs starts, the rotation prevention surface 151Rn of the separation holding member 151R comes into contact with the locking surface 152Ru of the force applying member 152R, and the separation holding member 151R receives the force in the F3 direction in the drawing so as to suppress the rotation in the B2 direction. By this, it is possible to prevent the separation holding member 151R from rotating in the B2 direction during transportation, and it is possible to prevent the state of separation between the photosensitive drum 104 and the developing unit 109 from being impaired.

In this embodiment, the tension spring 153 is mentioned as an urging means for urging the separation holding member 151R to the separation holding position and for urging the force applying member 152R to the accommodating position, but the urging means is not limited to this example.

For example, a torsion coil spring, a leaf spring, or the like may be used as an urging means to urge the force applying member 152R to the accommodating position and to urge the separation holding member 151R to the separation holding position. Further, the material of the urging means may be metal, a mold, or the like, which has elasticity and can urge the separation holding member 151R and the force applying member 152R.

As described above, the developing unit 109 provided with the separation contact mechanism 150R is integrally coupled with the drum holding unit 108 by the driving side cartridge cover member 116 as described above (state in FIG. 19).

Figure 22:
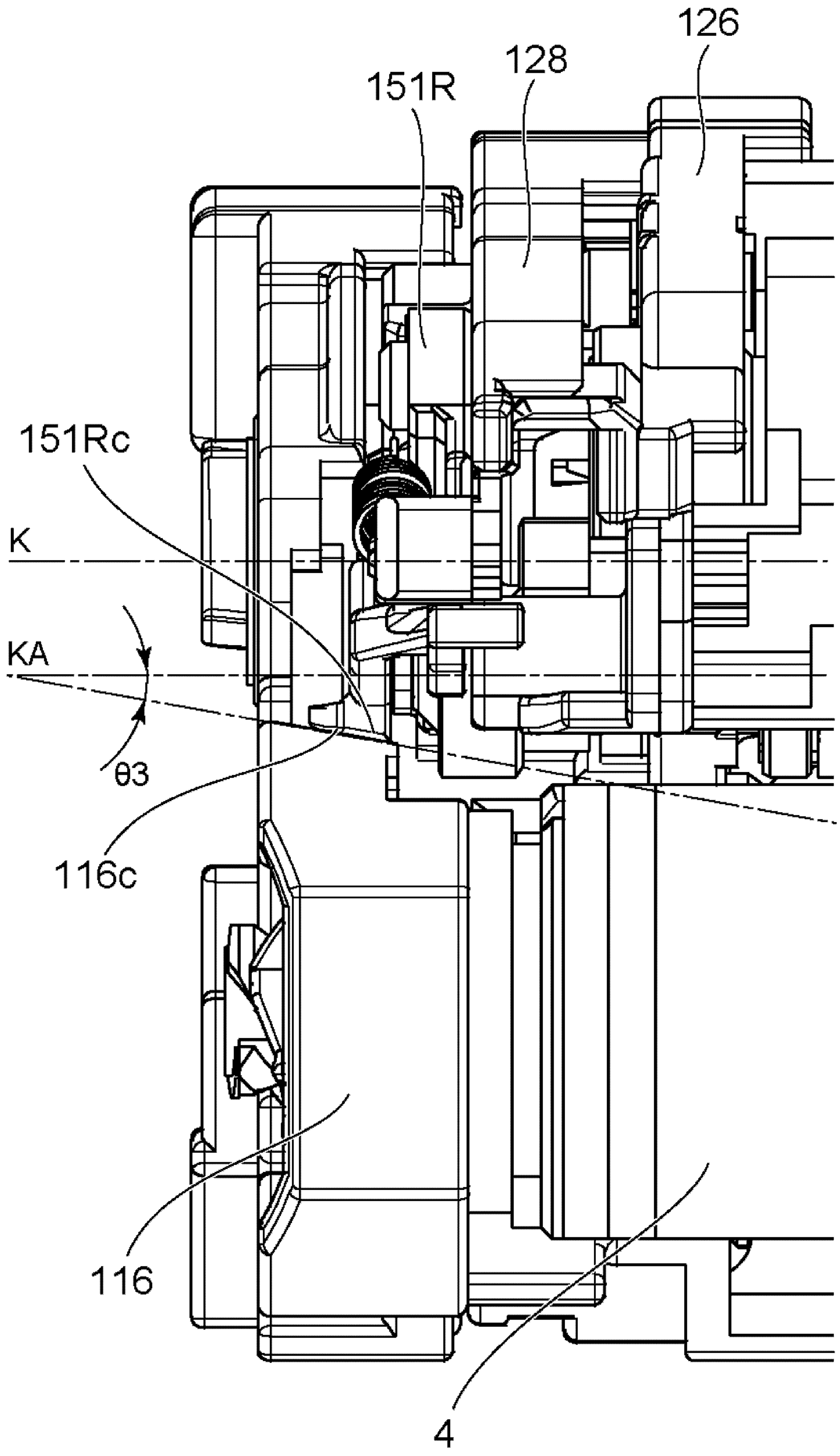
FIG. 22 is a bottom view of a driving side of the process cartridge.

FIG. 22 is a view as seen in the direction of arrow J in part (a) of FIG. 19*s* shown in FIG. 15, the driving side cartridge cover 116 of this embodiment has a contact surface 116*c*. As shown in FIG. 22, the contact surface 116*c* is slanted with an inclination of an angle θ3 relative to the swing axis K. It is desirable that the angle θ3 is the same as the angle θ1 forming the separation holding surface 151Rc of the separation holding member 151R, but the angle θ3 is not limited to this example. Further, as shown in FIGS. 15 and 19 when the driving side cartridge cover member 116 is assembled to the developing unit 109 and the drum holding unit 108, the contact surface 116*c* faces the separation holding surface 151Rc of the separation holding member 151R placed at a separation holding position. The contact surface 116*c* contacts the separation holding surface 151Rc by the urging force of the development pressure spring 134 which will be described hereinafter. The structure is such that when the engaging surface 116Rc and the separation holding surface 151Rc contact each other, the attitude of the developing unit 109 is positioned so that the developing roller 106 of the developing unit 109 and the photosensitive drum 104 are separated by a gap P1. The state in which the developing roller 106 (developing member) is separated from the photosensitive drum 104 by the gap P1 by the separation holding member 151R is referred to as a separation position (retraction position) of the developing unit 109 (see part (a) of FIG. 42).

Here, referring to FIG. 42, the separated state and the contact state of the process cartridge 100 will be described in detail.

Figure 42:
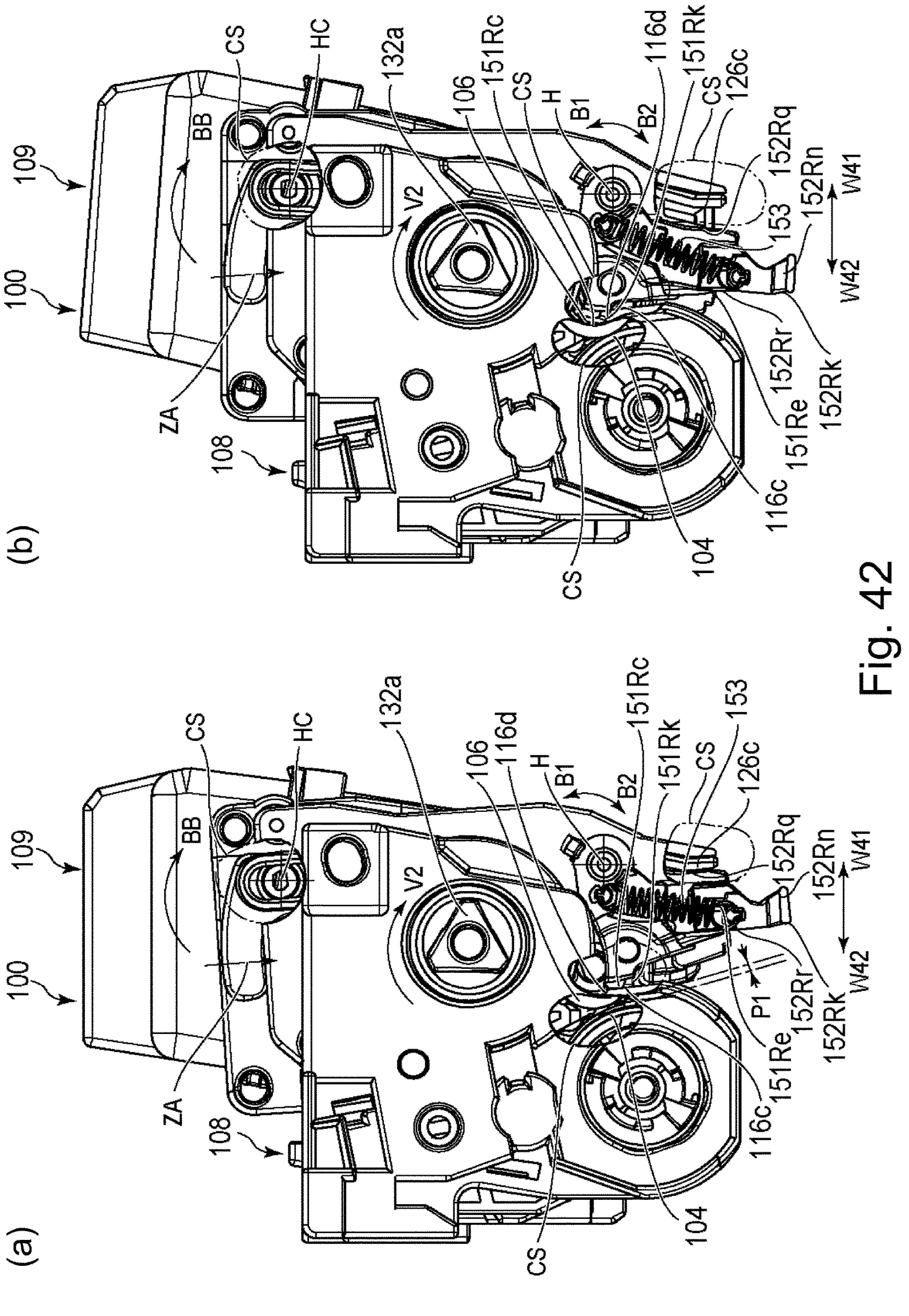
FIG. 42 is a side view as viewed from the driving side with the process cartridge 100 mounted inside the image forming apparatus main assembly.

FIG. 42 is a side view of the process cartridge 100 as viewed from the driving side with the process cartridge 100 mounted inside the image forming apparatus main assembly 170. Part (a) of FIG. 42 shows a state in which the developing unit 109 is separated from the photosensitive drum 104. Part (b) of FIG. 42 shows a state in which the developing unit 109 is in contact with the photosensitive drum 104.

First, in a state where the separation holding member 151R is placed at the separation holding position and the developing unit 109 is located at the separation position, the pressed portion 152Re of the force applying member 152R is pushed in the ZA direction. By this, the projecting portion 152Rh of the force applying member 152R projects from the process cartridge 100. The second pressed surface 151Re of the separation holding member 151R is in contact with the second pressing surface 152Rr of the force applying member 152R by the tension spring 153 as described above. Therefore, when the second force receiving portion 152Rn is pressed in the direction of the arrow W42, the force applying member 152R rotates in the direction of the arrow BB about the force applying member swing axis HC to rotate the separation holding member 151R in the direction of the arrow B2. When the separation holding member 151R rotates in the direction of arrow B2, the separation holding surface 151Rc separates from the contact surface 116*c*, by which the developing unit 109 can rotate from the separation position in the direction of arrow V2 about the swing axis K. That is, the developing unit 109 rotates in the V2 direction from the separated position, and the developing roller 106 of the developing unit 109 comes into contact with the photosensitive drum 104. Here, the position of the developing unit 109 in which the developing roller 106 and the photosensitive drum 104 contact each other is referred to as a contact position (development position) (state of part (b) of FIG. 42. The position where the separation holding surface 151Rc of the separation holding member 151R is separated from the contact surface 116*c* is referred to as a separation permission position (permission position). When the developing unit 109 is located at the contact position, the second restriction surface 151Rk of the separation holding member 151R contacts the second restriction surface 116*d* of the driving side cartridge cover 116, so that the separation holding member 151R is maintained at the separation release position.

Further, the driving side bearing 126 has a first pressed surface 126*c* which is a surface perpendicular to the swing axis K. Since the driving side bearing 126 is fixed to the developing unit 109, the developing unit 109 presses the first force receiving portion 152Rk of the force applying member 152R in the direction of the arrow 41 in the state that the developing unit is in the contact position. Then, by the first pressing surface 152Rq being brought into contact with the first pressed surface 126*c*, the developing unit 109 rotates about the swing axis K in the direction of arrow V1 to move to a separated position (state shown in part (a) of FIG. 42). Here, the direction in which the first force receiving surface 126*c* moves when the developing unit 109 moves from the contact position to the separated position is shown by arrows W41 in part (a) of FIGS. 42 and 42 (*b*). Further, the direction opposite to the arrow W41 is depicted by an arrow W42, and the arrow W41 direction and the arrow W42 direction are substantially horizontal (X1, X2 directions). The second force receiving surface 152Rp of the force applying member 152R assembled to the developing unit 109 as described above is on the upstream side of the first force receiving surface 126*c* of the driving side bearing 126 in the direction of the arrow W41. Further, the first force receiving surface 126*c* and the second force receiving surface 151Re of the separation holding member 151R are disposed at positions where they overlap at least partly in the W1 and W2 direction.

The detailed description of the operation of the separation contact mechanism 150R in the image forming apparatus main assembly 170 will be made below.

[Mounting of Process Cartridge to Image Forming Apparatus Main Assembly]

Next, referring to FIGS. 12, 23, and 24 the description will be made as to the engaging operation of 195 between the separation contact mechanism 150R of the process cartridge 100 and the development separation control unit of the image forming apparatus main assembly 170 when the process cartridge 100 is mounted to the image forming apparatus main assembly 170. For the sake of illustration, these Figures are sectional views in which a part of the development cover member 128 and a part of the driving side cartridge cover member 116 are omitted along the partial sectional lines CS1 and CS2, respectively.

Figure 23:
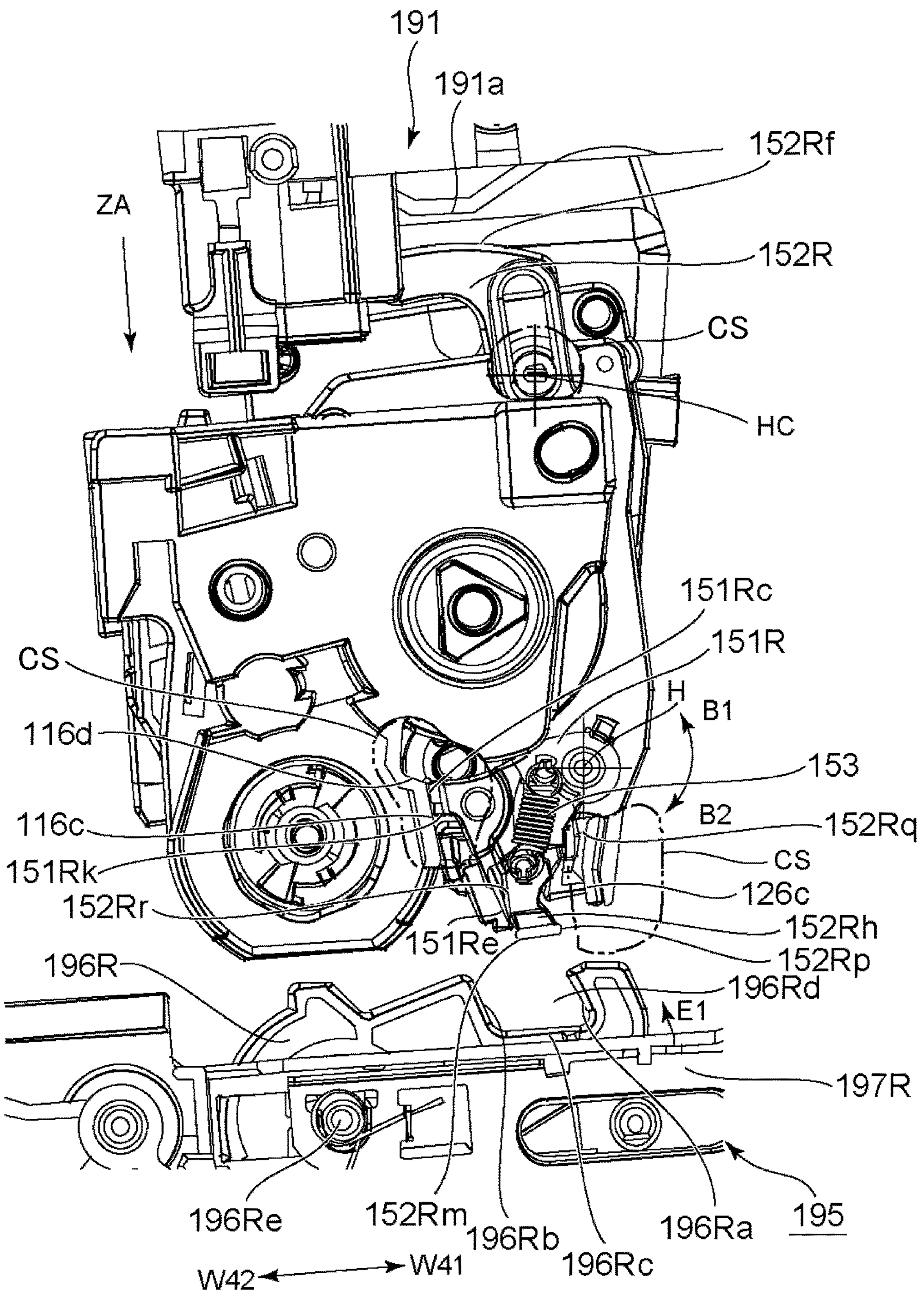
FIG. 23 is an illustration showing operation of a developing unit in the main assembly of the image forming apparatus.

FIG. 23 is a view as seen from the driving side of the process cartridge 100 when the process cartridge 100 is mounted on the cartridge tray 171 (not shown) of the image forming apparatus M and the cartridge tray 171 is inserted into the first mounting position. In this Figure, except for the process cartridge 100, the cartridge pressing unit 121, and the separation control member 196R are omitted.

As described above, the image forming apparatus main assembly 170 of this embodiment includes the separation control member 196R corresponding to each process cartridge 100 as described above. The separation control members 196R are arranged on the lower side of the image forming apparatus main assembly 170 below the separation holding member 151R when the process cartridge 100 is placed at the first inner position and the second inner position. The separation control member 196R has a first force applying surface 196Ra and a second force applying surface 196Rb which project toward the process cartridge 100 and face each other across the space 196Rd. The first force applying surface 196Ra and the second force applying surface 196Rb are connected with each other by way of a connecting portion 196Rc in the lower side of the image forming apparatus main assembly 170. Further, the separation control member 196R is supported by the control sheet metal 197 rotatably about a rotation center 196Re. The separating member 196R is normally urged in an E1 direction by an urging spring. Further, the control sheet metal 197 is structured to be movable in the W41 and W42 directions by a control mechanism (not shown), so that the separation control member 196R is structured to be movable in the W41 and W42 directions.

As described above, in interrelation with the transition of the front door 11 of the image forming apparatus main assembly 170 from the open state to the closed state, the cartridge pressing unit 121 lowers in the direction of arrow ZA, and the first force applying portion 121*a* is brought into contact with the pressed surface 152Rf of the force applying member 152R. After that, when the cartridge pressing unit 121 is lowered to a predetermined position which is the second mounting position, the projecting portion 152Rh of the force applying member 152R projects downward in the Z2 direction of the process cartridge 100 (state in FIG. 24). This position is referred to as a projecting position of the force applying member 152R. When this operation is completed, as shown in FIG. 24, a gap T4 is formed between the first force applying surface 196Ra of the separation control member 196R and the first force receiving surface 152Rp of the force applying member 152R, and a gap T3 is formed between the second force applying surface 196Rb and the second force receiving surface 152Rp. Then, it is placed at the second mounting position where the separation control member 196R does not act on the force applying member 152R. This position of the separation control member 196R is referred to as a home position. The arrangement is such that at this time, the first force receiving surface 152Rp of the force applying member 152R and the first force applying surface 196Ra of the separation control member 196R are partly overlapped in the W1 and W2 direction. Similarly, the arrangement is such that the second force receiving surface 152Rp of the force applying member 152R and the second force applying surface 196Rb of the separation control member 196R are partly overlapped in the W1 and W2 direction.

[Contact Operation of Developing Unit]

Next, referring to FIGS. 24 to 26, the detailed description will be made as to the operation of contacting between the photosensitive drum 104 and the developing roller 106 by the separation contact mechanism 150R. For the sake of illustration, these Figures are sectional views of a part of the development cover member 128, a part of the driving side cartridge cover member 116, and a part of the driving side bearing 126, taken along lines CS1, CS2 and CS3, respectively.

Figure 24:
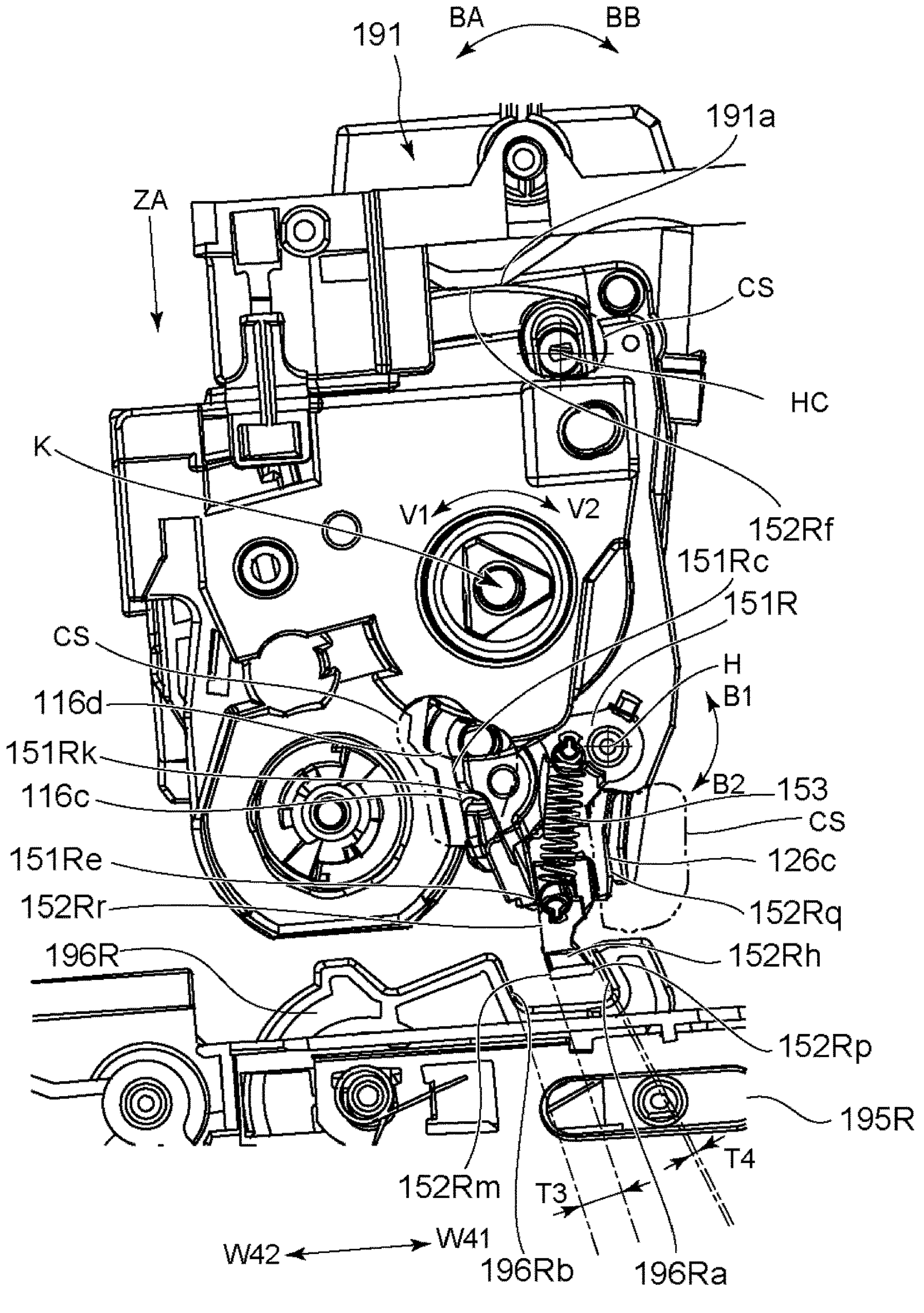
FIG. 24 is an illustration showing the operation of the developing unit in the main assembly of the image forming apparatus.
Figure 25:
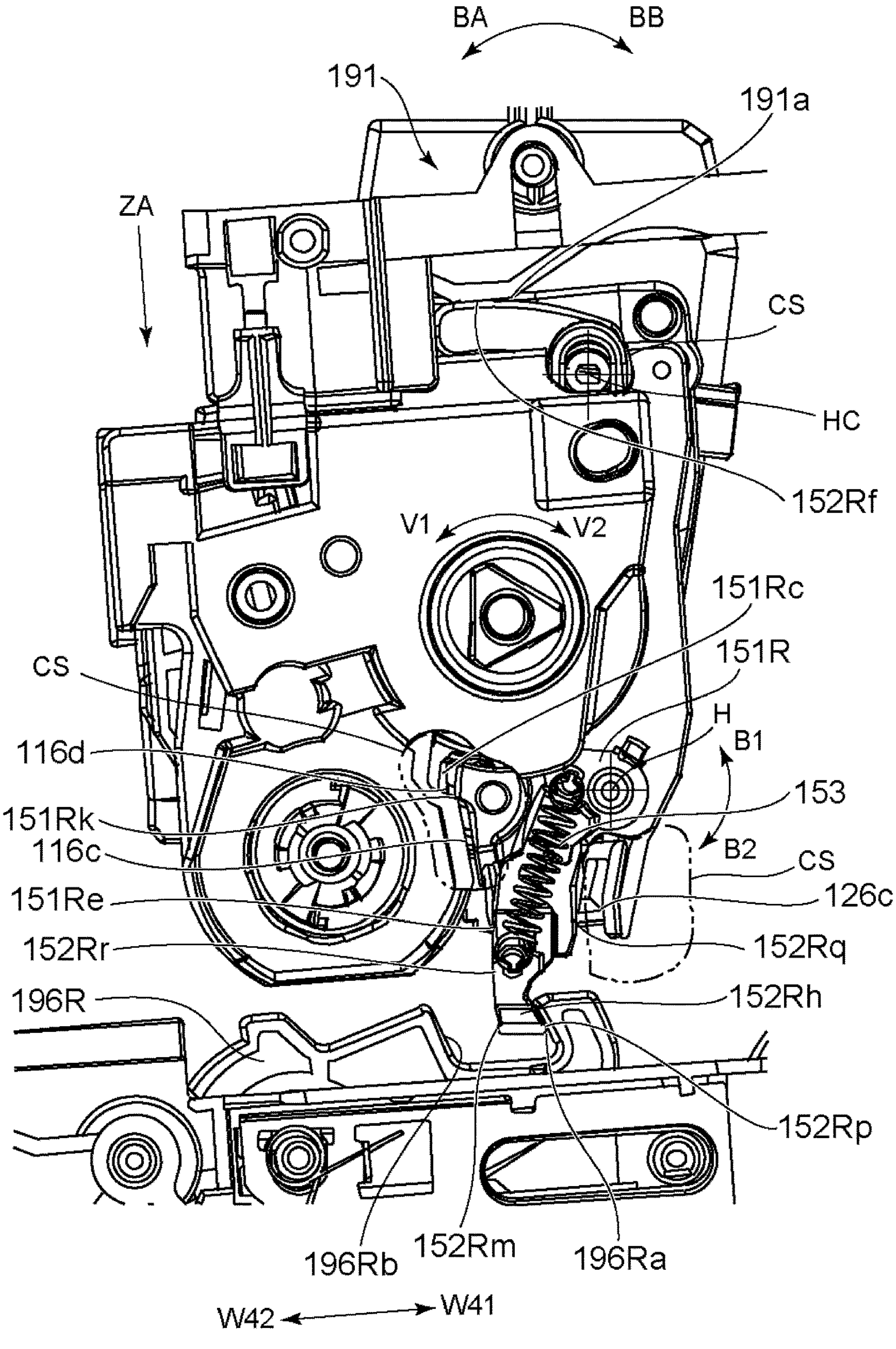
FIG. 25 is an illustration showing the operation of the developing unit in the main assembly of the image forming apparatus.

In the structure of this embodiment, the development input coupling 32 receives a driving force from the image forming apparatus main assembly 170 in the direction of arrow V2 in FIG. 24, so that the developing roller 106 rotates. That is, the developing unit 109 including the developing input coupling 32 receives torque in the arrow V2 direction about the swing axis K from the image forming apparatus main assembly 170. As shown in FIG. 24, when the developing unit 109 is in the separated position and the separation holding member 151R is in the separation holding position, the developing unit 109 receives this torque and an urging force by the development pressure spring 134 as will be described hereinafter. Even in this case, the separation holding surface 151Rc of the separation holding member 151R contacts the contact surface 116*c* of the driving side cartridge cover member 116, and therefore, the attitude of the developing unit 109 is maintained at the separation position.

The separation control member 196R of this embodiment is structured to be movable in the direction of arrow W42 in FIG. 24 from the home position. When the separation control member 196R moves in the W42 direction, the second force applying surface 196Rb of the separation control member 196R and the second force receiving surface 152Rp of the force applying member 152R come into contact with each other, so that the force applying member 152R rotates about the swing axis HC of the force applying member 152R in the BB direction. Further, as the force applying member 152R rotates further, the separation holding member 151R is rotated in the B2 direction, while the second pressing surface 152Rr of the force applying member 152R contacts the second pressed surface 151Re of the separation holding member 151R. Then, the separation holding member 151R is rotated by the force applying member 152R to the separation permission position where the separation holding surface 151Rc and the contact surface 116*c* are separated from each other. Here, the position of the separation control member 196R for moving the separation holding member 151R to the separation permission position shown in FIG. 25 is referred to as a first position.

In this manner, the separation control member 196R moves the separation holding member 151R to the separation permission position. Then, the developing unit 109 is rotated in the V2 direction by the torque received from the image forming apparatus main assembly 170 and the development pressure spring 134 which will be described hereinafter, and moves to the contact position where the developing roller 106 and the photosensitive drum 104 are in contact with each other (state shown in FIG. 25). At this time, the separation holding member 151R urged in the direction of arrow B1 by the tension spring 153 is maintained at the separation permission position by the second restricted surface 151Rk coming into contact with the second restriction surface 116*d* of the driving side cartridge cover member 116. Thereafter, the separation control member 196R moves in the direction of W41 and returns to the home position. At this time, the force applying member 152R is rotated in the BA direction by the tension spring 153, and the first pressing surface 152Rq of the force applying member 152R and the first pressing surface 126*c* of the driving side bearing 126 become in contact with each other (state shown in FIG. 26).

By this, the above-mentioned gaps T3 and T4 are formed again, and are placed at positions where the separation control member 196R does not act on the force applying member 152R. The transition from the state of FIG. 25 to the state of FIG. 26 is performed without a delay.

As described above, in the structure of this embodiment, by the separation control member 196R moving from the home position to the first position, the force applying member 152R can be rotated and the separation holding member 151R is moved from the separation holding position to the separation permission position. By this, the developing unit 109 can move from the separated position to the contacting position where the developing roller 9 and the photosensitive drum 104 are in contact with each other. The position of the separation control member 196R in FIG. 26 is the same as that in FIG. 24.

[Separation Operation of Developing Unit]

Next, referring to FIGS. 26 and 27, the operation of moving the developing unit 109 from the contact position to the distance position by the separation contact mechanism 150R will be described in detail. For the sake of better illustration, these Figures are cross-sectional views taken along the line CS, in which a part of the development cover member 128, a part of the driving side cartridge cover member 116, and a part of the driving side bearing 126 are partially omitted.

Figure 26:
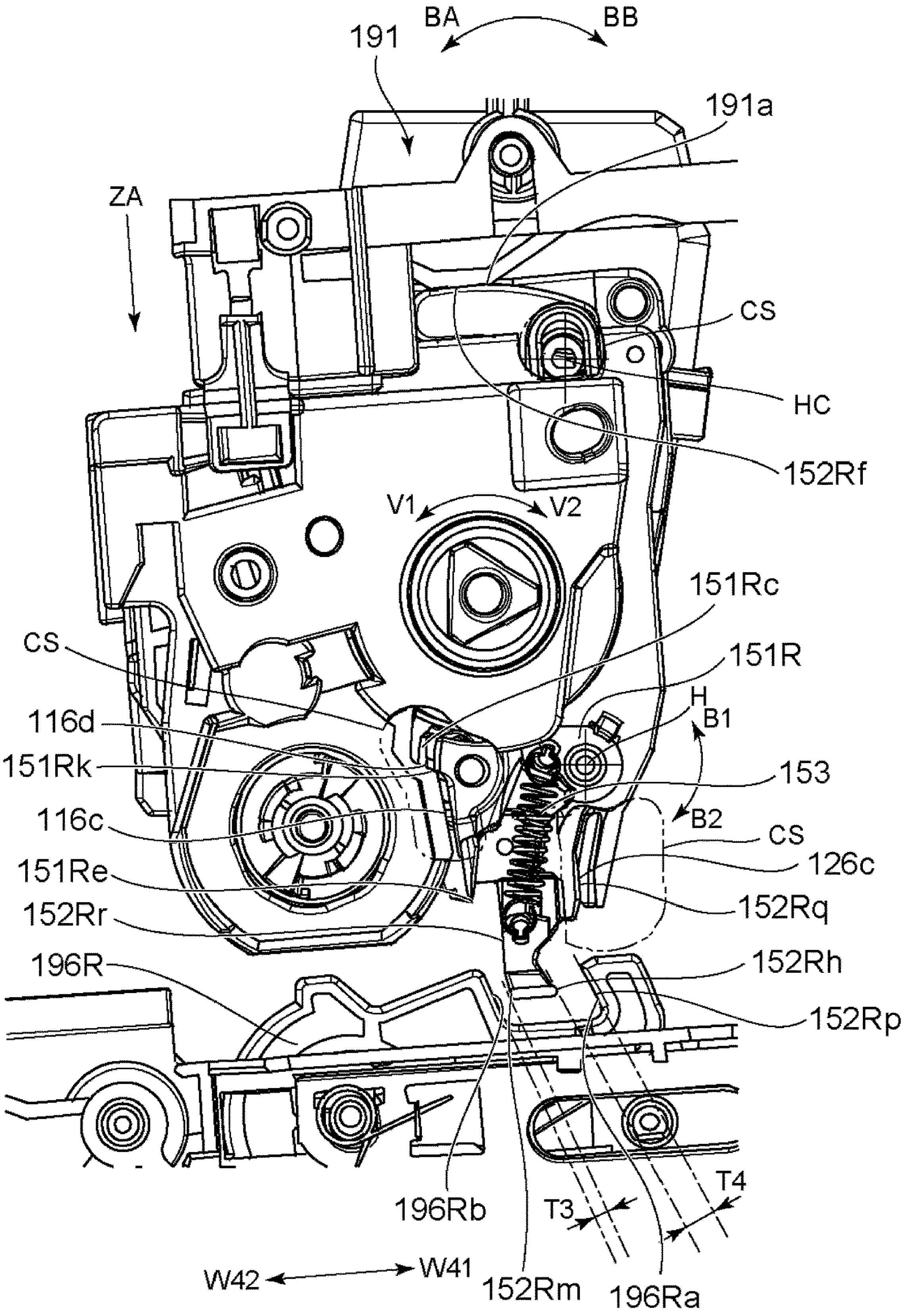
FIG. 26 is an illustration showing the operation of the developing unit in the main assembly of the image forming apparatus.
Figure 27:
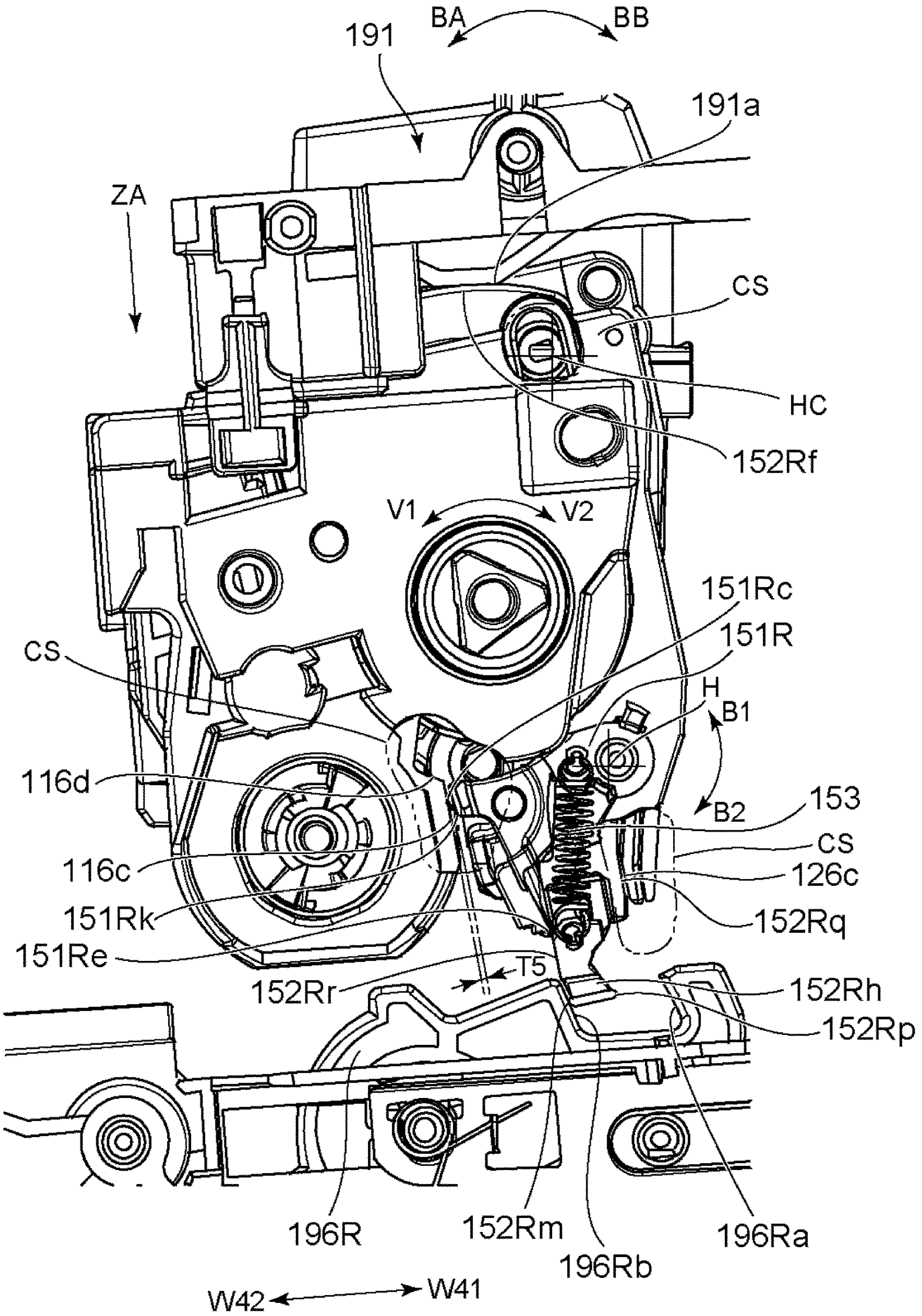
FIG. 27 is an illustration showing the operation of the developing unit in the main assembly of the image forming apparatus.

The separation control member 196R in this embodiment is structured to be movable from the home position in the direction of arrow W41 in FIG. 26. When the separation control member 196R moves in the W41 direction, the first force applying surface 196Rb and the first force receiving surface 152Rm of the force applying member 152R are brought into contact with each other, and the force applying member 152R rotates about the force applying member swing axis HC in the direction indicated by the arrow BB. Rotate in the direction. Then, the developing unit 109 rotates from the contact position in the direction of the arrow V1 about the swing axis K, by the first pressing surface 152Rq of the force applying member 152R being brought into contact with the first pressed surface 126*c* of the driving side bearing 126 (State shown in FIG. 27). Here, the pressed surface 152Rf of the force applying member 152R has the arc shape, and the center of the arc is placed so as to coincide with the swing axis K. By this, when the developing unit 109 moves from the contact position to the separated position, the force received by the pressed surface 152Rf of the force applying member 152R from the cartridge pressing unit 121 is directed in the swing axis K direction. Therefore, the developing unit 109 can be operated so as not to hinder the rotation in the arrow V1 direction. In the separation holding member 151R, the second restricted surface 151Rk of the separation holding member 151R and the second restriction surface 116*d* of the driving side cartridge cover member 116 are separated from each other, and the separation holding member 151R is rotated in the arrow B1 direction by the urging force of the tension spring 153. By this, the separation holding member 151R rotates until the second pressed surface 151Re comes into contact with the second pressing surface 152Rr of the force applying member 152R, and by the contacts, the separation holding member 151R shifts to the separation holding position. When the developing unit 109 is moved from the contact position to the separation position by the separation control member 196R and the separation holding member 151R is in the separation holding position, the gap T5 is formed between the separation holding surface 151Rc and the contact surface 116*c* as shown in FIG. 27. Here, the position shown in FIG. 27 in which the developing unit 109 is rotated from the contact position toward the separation position and the separation holding member 151 can move to the separation holding position is referred to as a second position of the separation control member 196R.

Thereafter, the separation control member 196R moves in the direction of the arrow W42 and returns from the second position to the home position. Then, while the separation holding member 151R is maintained in the separation holding position, the developing unit is rotated in the arrow V2 direction by the torque received from the image forming apparatus main assembly 170 and the development pressure spring 134 which will be described hereinafter, and the separation holding surface 151Rc is contacted to the contact surface 116*c*. That is, the developing unit 109 is in a state where the separation position is maintained by the separation holding member 151R, and the developing roller 106 and the photosensitive drum 104 are in a state where they are separated by a gap P1 (states shown in FIG. 24 and part (a) of FIG. 42. By this, the above-mentioned gaps T3 and T4 are formed again, and the separation control member 196R is placed at a position not acting on the force applying member 152R (state in FIG. 24). The transition from the state of FIG. 27 to the state of FIG. 24 is executed without a delay.

As described above, in this embodiment, the separation control member 196R moves from the home position to the second position, so that the separation holding member 151R moves from the separation permission position to the separation holding position. Then, by the separation control member 196R returning from the second position to the home position, the developing unit 109 becomes in a state of maintaining the separation position by the separation holding member 151R.

[Detailed Description of Separation Holding Member L]

Here, referring to FIG. 28, the separation holding member 151L will be described in detail.

Figure 28:
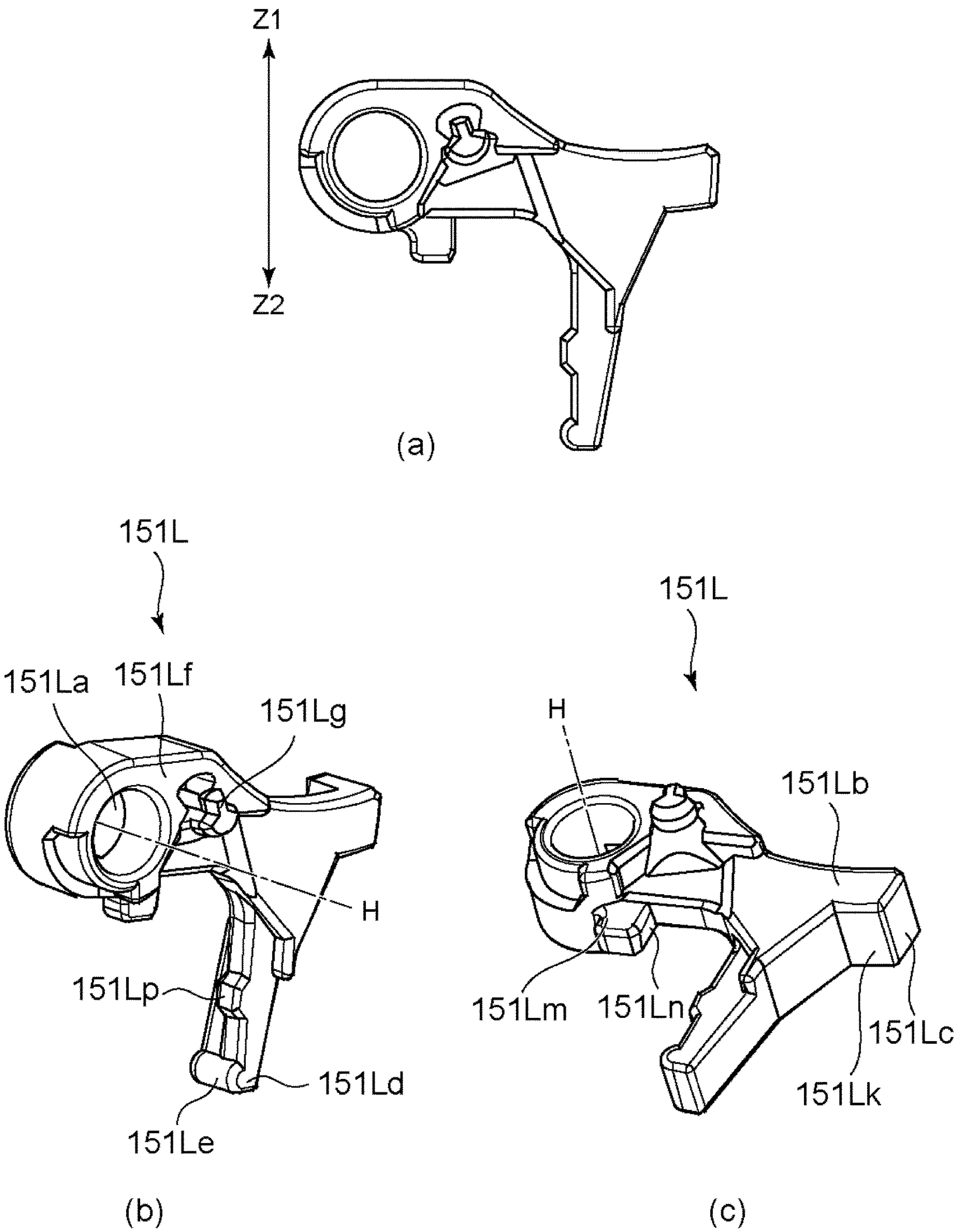
FIG. 28 is a view of the separation holding member L per se.

Part (a) of FIG. 28 is a front view of the process cartridge 100 per se of the separation holding member 151L as viewed in the longitudinal direction of the driving side, and FIGS. 28B and 28C are perspective views of the separation holding member 151L per se. The separation holding member 151L includes an annular support receiving portion 151La, and includes a separation holding portion 151Lb projecting from the support receiving portion 151La in the radial direction of the support receiving portion 151La. The free end of the separation holding portion 151Lb has an arc-shaped separation holding surface 151Lc extending about the separation holding member swing axis H.

Further, the separation holding member 151L has a second regulated surface 151Lk adjacent to the separation holding surface 151Lc. Further, the separation holding member 151L includes a second pressed portion 151Ld projecting from the support receiving portion 151La in the Z2 direction, and includes a arc-shaped second pressed surface 151Le projecting from the second pressed portion 151Ld in the direction of the separation holding member swing axis H of the support receiving portion 151La.

Further, the separation holding member 151L is provided with a main body portion 151Lf connected with the support receiving portion 151La, and the main body portion 151Lf is provided with a spring hooked portion 151Lg projecting in the direction of the separation holding member swing axis H of the support receiving portion 151La. Further, the main body portion 151Lf is provided with a rotation prevention portion 151*m* projecting in the Z2 direction, and a rotation prevention surface 151Ln is provided in a direction facing the second pressed surface 151Le.

[Detailed Description of Force Applying Member L]

Figure 29:
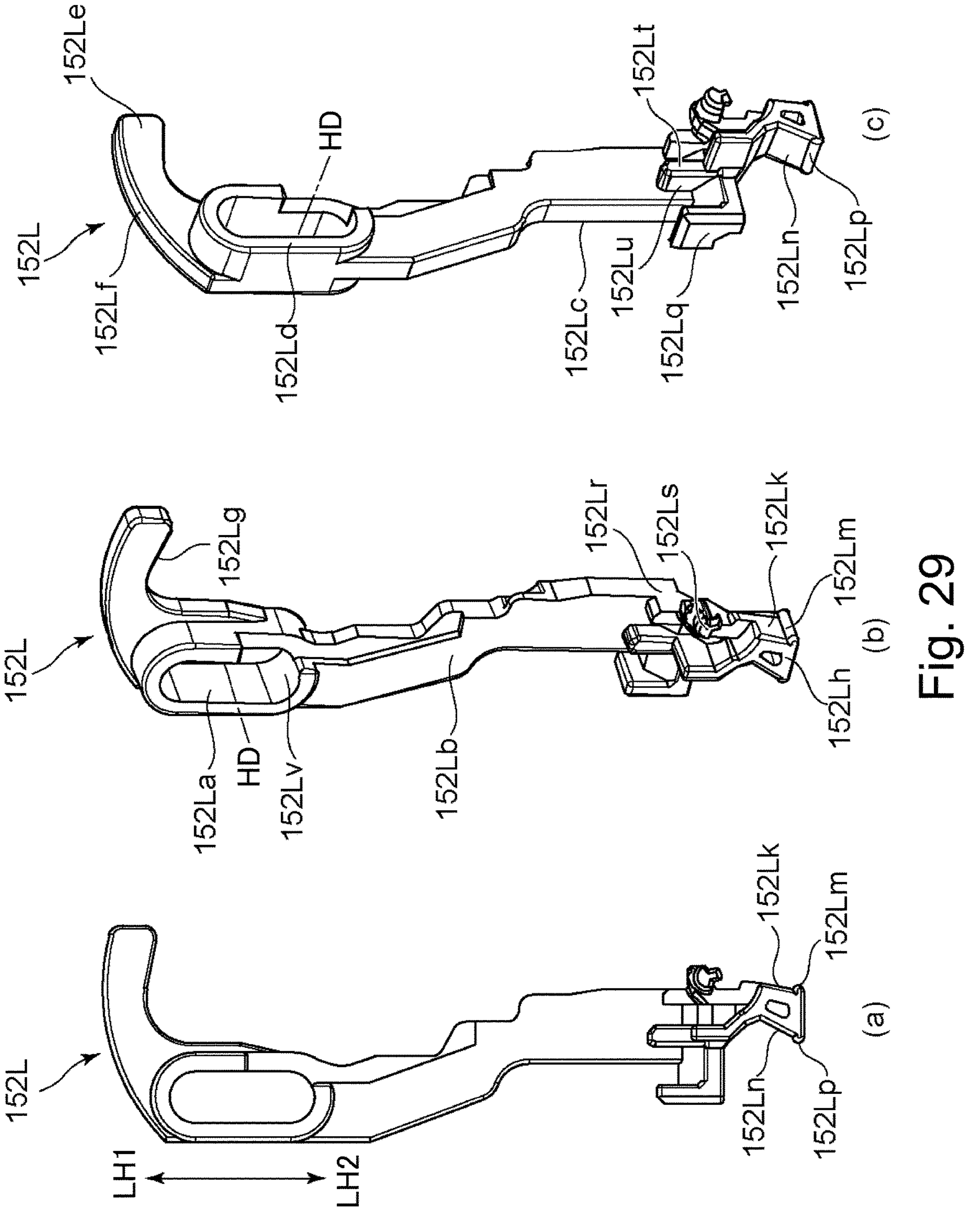
FIG. 29 is a view of the force applying member L per se.

Referring to FIG. 29, the force applying member 152L will be described in detail.

Part (a) of FIG. 29 is a front view of the force applying member 152L as viewed in the longitudinal direction of the process cartridge 100, and parts (b) and (c) of FIG. 29 are perspective views of the force applying member 152L.

The force applying member 152L is provided with an oblong-shaped oblong support receiving portion 152La. Here, the longitudinal direction of the oblong shape of the oblong support receiving portion 152La is depicted by an arrow LH, the upward direction is depicted by an arrow LH1, and the downward direction is depicted by an arrow LH2. Further, the direction in which the oblong support receiving portion 152La is extended is depicted by HD. The force applying member 152L is provided with a projecting portion 152Lh formed on the downstream side in the arrow LH2 direction of the oblong support receiving portion 152La. The oblong support receiving portion 152La and the projecting portion 152Lh are connected by a main body portion 152Lb with each other. On the other hand, the force applying member 152L includes a pushed portion 152Le projecting in the direction of arrow LH1 and in the direction substantially perpendicular to the direction of arrow LH1, and is provided with an arc-shaped pressed surface 152Lf on the downstream side in the arrow LH1 direction and is further provided with a pushing restriction surface of 152Lg on the upstream side. Further, the force applying member 152L has a first at-accommodation restriction surface 152Lv which is a part of the oblong support receiving portion 152La and which is provided on the downstream side in the arrow LH2 direction.

The projecting portion 152Lh includes a first force receiving portion 152Lk and a second force receiving portion 152Ln which are arranged so as to oppose each other in a direction substantially perpendicular to the arrow LH2 direction and a terminal portion in the arrow LH2 direction. The first force receiving portion 152Lk and the second force receiving portion 152Ln have a first force receiving surface 152Lm and a second force receiving surface 152Lp extending in the HD direction and having an arc shape, respectively. In addition, the projecting portion 152Lh is provided with a spring hooked portion 152Ls and a locking portion 152Lt projecting in the HB direction, and the locking portion 152Lt is provided with a locking surface 152Lu facing in the same direction as the second force receiving surface 152Lp.

Further, the force applying member 152L is a part of the main body portion 152Lb, is placed on the upstream side of the second force receiving portion 152Ln in the arrow LH2 direction, and has a first pressing surface 152Lq facing in the same direction as the second force receiving surface 152Lp. Further, the force applying member 152L is a part of the main body portion 152Lb, is placed on upstream side of the first force receiving portion 152Lk in the arrow LH2 direction, and has a first pressing surface 152Lr facing in the same direction as the first force receiving surface 152Lm.

In the state that the process cartridge 100 is mounted to the image forming apparatus main assembly 170, the LH1 direction is substantially the same as the Z1 direction, and the LH2 direction is substantially the same as the Z2 direction. Further, the HB direction is substantially the same as the longitudinal direction of the process cartridge 100.

[Assembling of Separation/Contact Mechanism L]

Figure 30:
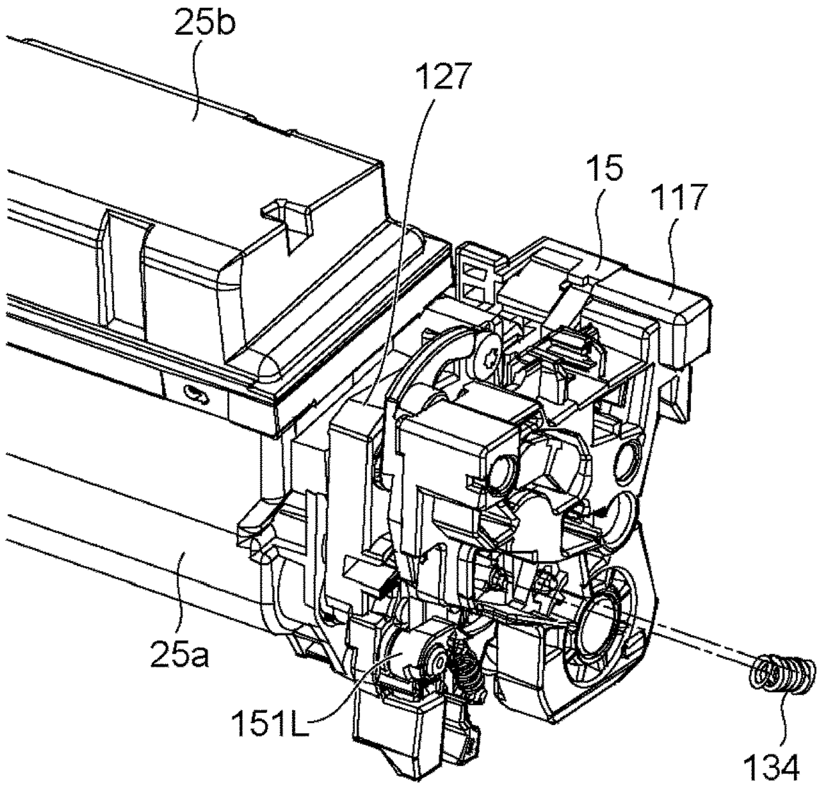
FIG. 30 is an assembly perspective view after assembling the development pressure spring and assembling the separation holding member L.
Figure 30:
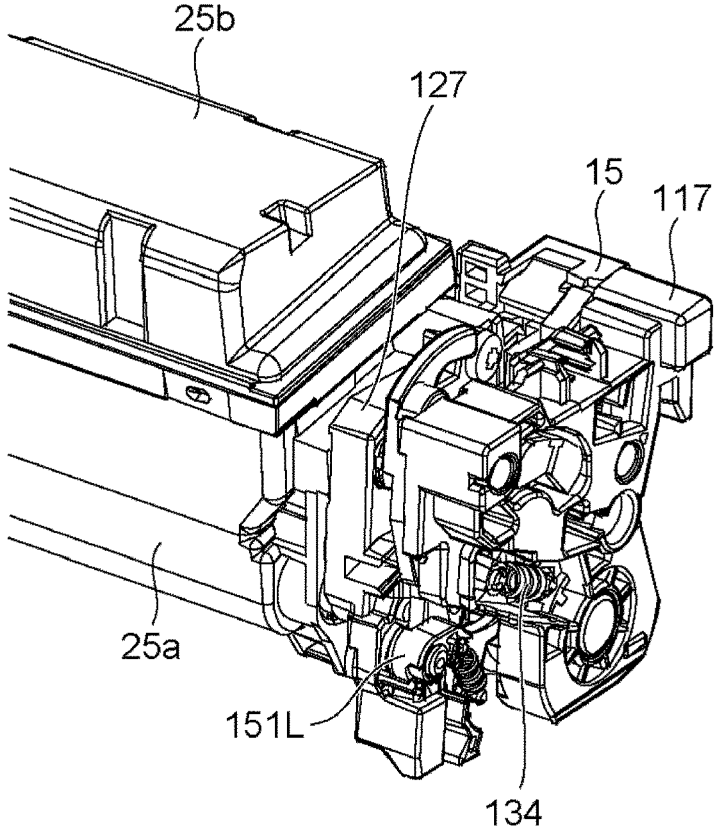

Next, referring to FIGS. 16 and 29 to 35, the assembly of the separation mechanism will be described. FIG. 30 is a perspective view of the process cartridge 100 after assembling the separation holding member therewith, as viewed from the driving side. As described above, as shown in FIG. 16, in the developing unit 109, the outer diameter portion of the cylindrical portion 127*a* of the non-driving side bearing 127 is fitted into the developing unit support hole portion 117*a* of the non-driving side cartridge cover member 117. By this, the developing unit 109 is supported so as to be rotatable relative to the photosensitive drum 104 about the swing axis K. Further, the non-driving side bearing 127 includes a cylindrical first support portion 127*b* and a second support portion 127*e* projecting in the direction of the swing axis K.

The outer diameter of the first support portion 127*b* fits with the inner diameter of the support receiving portion 151La of the separation holding member 151L, to rotatably support the separation holding member 151L. Here, the swing center of the separation holding member 151L assembled to the non-driving side bearing 127 is the separation holding member swing axis H. The non-driving side bearing 127 includes a first retaining portion 127*c* projecting in the direction of the separation holding member swing axis H. As shown in FIG. 16, the movement of the separation holding member 151L assembled to the non-driving side bearing 127 in the swing axis H direction is restricted by the first retaining portion 127*c* coming into contact with the separation holding member 151L.

Further, the outer diameter of the second support portion 127*e* fits with the inner wall of the oblong support receiving portion 152La of the force applying member 152L, to support the force applying member 152L so as to be rotatable and movable in the oblong direction. Here, the swing center of the force applying member 152L assembled to the non-driving side bearing 127 is the force applying member swing axis HC. As shown in FIG. 16, the movement of the force applying member 152L assembled to the non-driving side bearing 127 in the direction of the swing axis HE is restricted by the second retaining portion 127*f* coming into contact with the separation holding member 151L.

Figure 31:
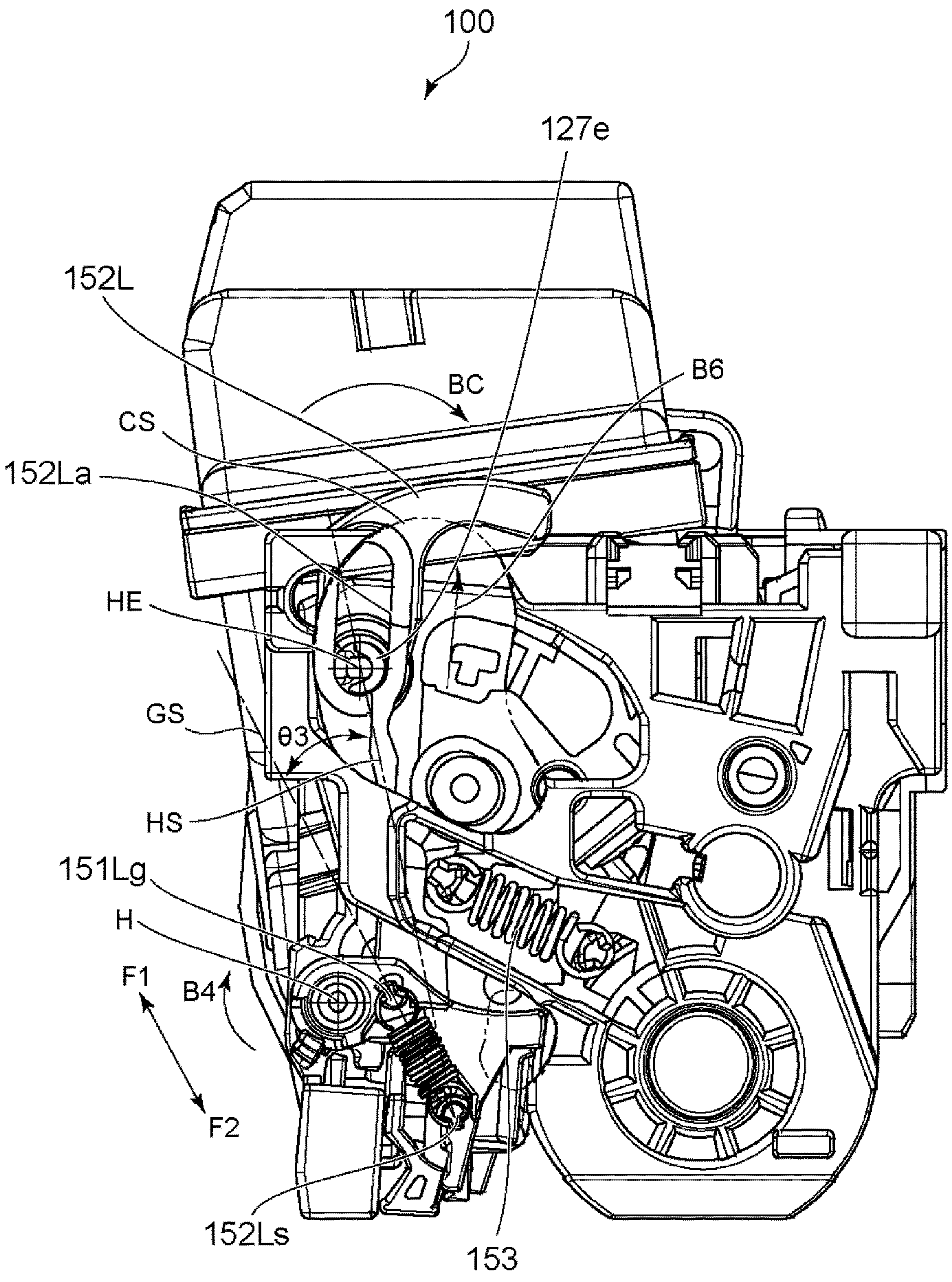
FIG. 31 is a partial sectional view of the separation holding member L after assembly.

FIG. 31 is a view of the process cartridge 100 after being assembled with the separation holding member 151L as viewed in the developing unit swing axis H direction. It is a view taken along a line CS with a part of the non-driving side cartridge cover member 117 omitted so that the fitting portion between the oblong support receiving portion 151La of the force applying member 152L and the cylindrical portion 127*e* of the non-driving side bearing 127 can be seen. Here, the separation contact mechanism 150L is provided with a tension spring 153 for urging the separation holding member 151L to rotate in the direction of arrow B1 about the separation holding member swing axis H and for urging the force applying member 152L in the direction of arrow B3. The arrow B3 direction is a direction substantially parallel to the longitudinal direction LH2 (see FIG. 29) of the oblong support receiving portion 152La of the force applying member 152L. The tension spring 153 is assembled between the spring hooked portion 151Lg provided on the separation holding member 151L and the spring hooked portion 152Ls provided on the force applying member 152L. The tension spring 153 applies a force to the spring hooked portion 151Lg of the separation holding member 151L in the direction of arrow F2 in FIG. 31 to apply an urging force for rotating the separation holding member in the direction of arrow B1. Further, the tension spring 153 applies a force to the spring hooked portion 152Ls of the force applying member 152L in the direction of the arrow F1 to apply an urging force for moving the force applying member 152L in the direction of the arrow B3.

The line connecting the spring hooked portion 151Lg of the separation holding member 151L and the spring hooked portion 152Ls of the force holding member 152L is GS. The line connecting the spring hooked portion 152Ls of the force applying member 152L and the force applying member swing axis HE is HS. A angle θ3 formed by the line GS and the line HE is selected to satisfy the following inequity (3) with the counterclockwise direction being positive about the spring hooked portion 152Ls of the force applying member 152L. By this, the force applying member 152L is urged to rotate in the BA direction in the drawing about the force applying member swing axis HE.

$$0° \leq \theta 3 \leq 90° \quad (3)$$

In this embodiment, the mounting positions of the separation holding member 151L and the force applying member 152L are as follows. As shown in FIG. 29, in the direction of the swing axis K, the separation holding member 151L and the force applying member 152L are disposed on the side (longitudinal outside) where the non-driving side cartridge cover member 117 of the non-driving side bearing 127 is placed. However, the positions to be arranged are not limited to the examples, and they may be provided on the development frame 125 side (inside in the longitudinal direction) of the non-driving side bearing 127, and the separation holding member 151L and the force applying member 152L may be provided with the non-driving side bearing 127 interposed therebetween. Further, the arrangement order of the separation holding member 151L and the force applying member 152L may be interchanged.

The non-driving side bearing 127 is fixed to the development frame 125 to form the developing unit 109. As shown in FIG. 16, in the fixing method in this embodiment, a fixing screw 145 and an adhesive (not shown), but the fixing method is not limited to this example, and welding such as welding by heating or pouring and hardening of resin can be employed.

Figure 32:
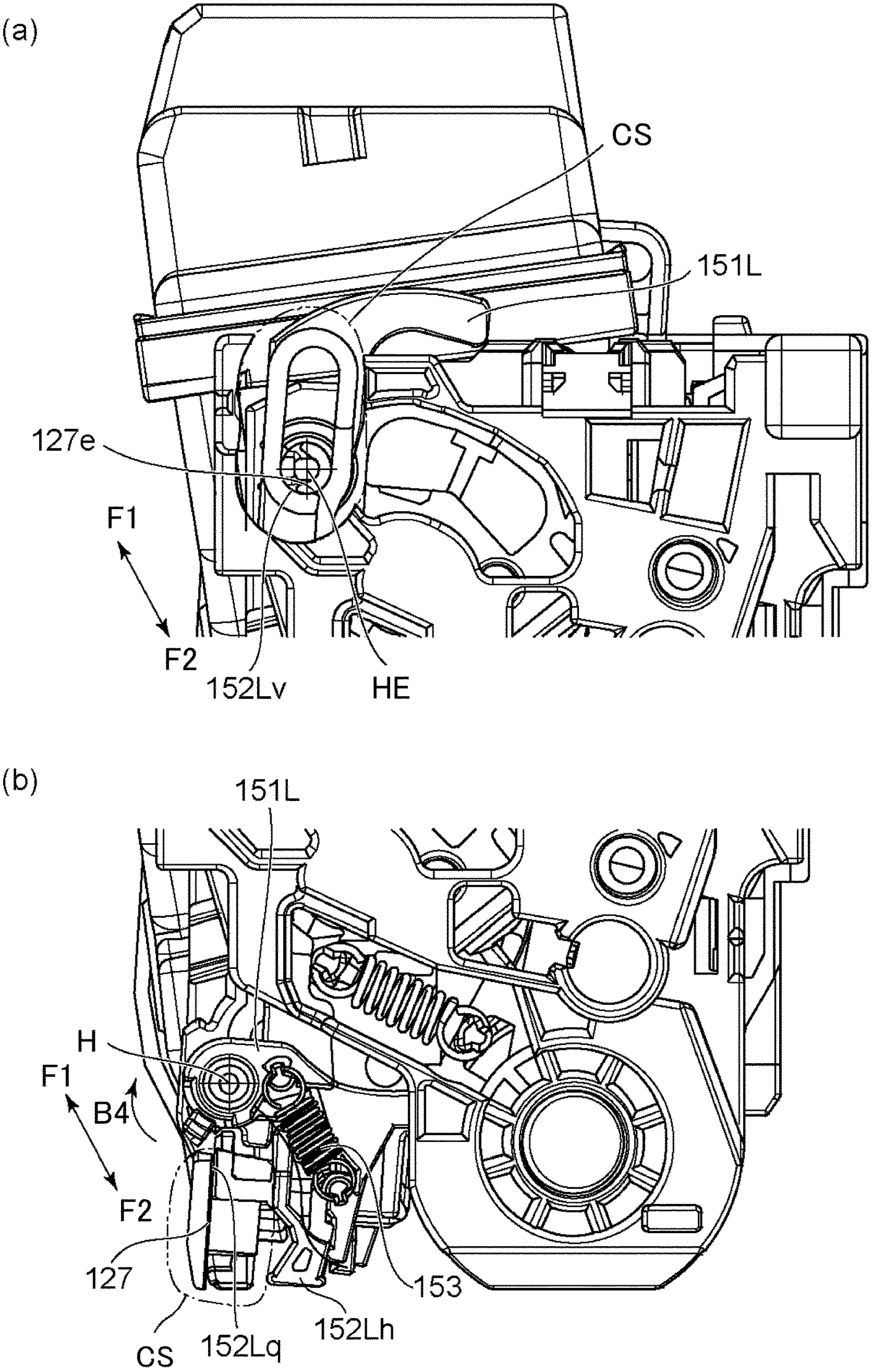
FIG. 32 is an enlarged view of the peripheries of the separation holding member L and the force applying member L.

Part (a) of FIG. 32 and part (b) of FIG. 32 are sectional views in which a portion of the non-driving side cartridge cover member 117, the tension spring 153, and the separation holding member 151L is partially omitted by the partial sectional line CS. For the sake of explanation, in part (a) of FIG. 32 and part (b) of FIG. 32 the parts around the force applying member swing axis HE and the separation holding portion 151L of the force applying member 152L shown in FIG. 31 is enlarged.

In the force applying member 152L, the first restriction surface 152Lv of the force applying member 152L comes into contact with the second support portion 127*e* of the non-driving side bearing 127 by the urging force of the tension spring 153 in the arrow F1 direction. Further, as shown in part (b) of FIG. 32, the first pressing surface 152Lq of the force applying member 152L contacts the first pressed surface 127*h* of the non-driving side bearing 127 to be positioned in place. This position is referred to as an accommodation position (reference position) of the force applying member 152L. Further, the separation holding member 151L is rotated in the direction of the arrow B1 about the swing axis H of the separation holding member by the urging force of the tension spring 153 in the arrow F2 direction, and the contact surface 151Lp of the separation holding member 151L is brought into contact with the second pressing surface 152Lr of the force applying member 152L, by which it is positioned in place. This position is referred to as a separation holding position (restricted position) of the separation holding member 151L. When the force applying member 152L moves to the projecting position which will be described hereinafter, the second pressed surface 151Le of the separation holding member 151L contacts the second pressing surface 152Lr of the force applying member 152L to be positioned at the separation holding position.

Figure 33:
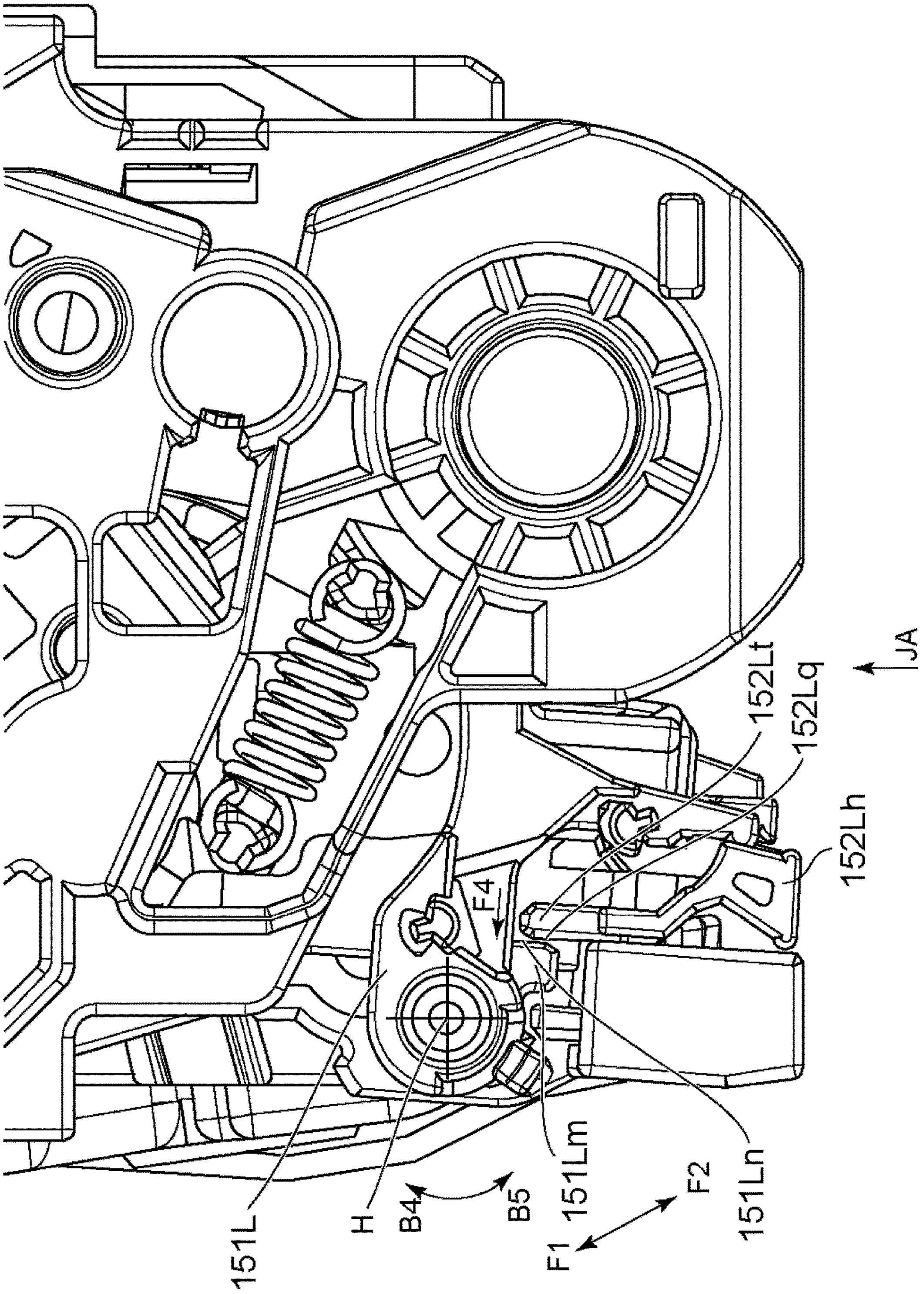
FIG. 33 is an enlarged view of the periphery of the separation holding member.
Figure 34:
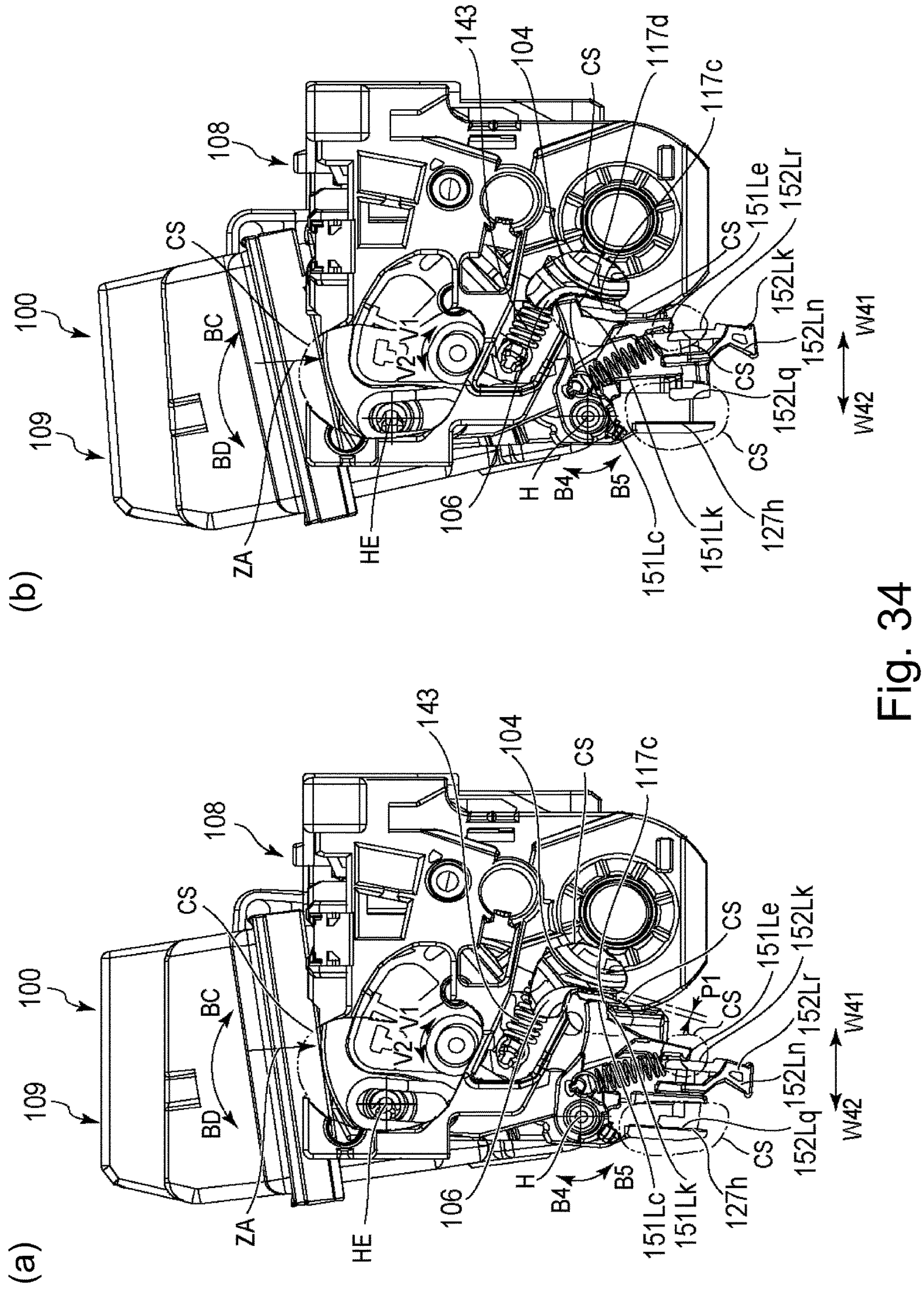
FIG. 34 is a side view as viewed from the driving side with the process cartridge mounted inside the image forming apparatus main assembly.

Further, FIG. 33 is an illustration in which the periphery of the separation holding portion 151L in FIG. 31 is enlarged for the sake of illustration, and the tension spring 153 is omitted. Here, the consideration will be made as to the case where the process cartridge 100 including the separation contact mechanism 150L is dropped in the direction of arrow JA in FIG. 33 when the process cartridge 100 is transported. At this time, the separation holding member 151L receives a force of rotating in the direction of arrow B2 due to its own weight around the separation holding swing axis H. When the separation holding member 151L starts to rotate in the arrow B2 direction, for the above reason, the rotation prevention surface 151Ln of the separation holding member 151L comes into contact with the locking surface 152Lu of the force applying member 152L, and the separation holding member 151L receives the force in the direction F4 of suppressing the rotation in the arrow B2 direction. By this, it is possible to prevent the separation holding member 151L from rotating in the direction of the arrow B2 during transportation, and it is possible to prevent impairment of the state of separation between the photosensitive drum 104 and the developing unit 109.

In this embodiment, the tension spring 153 is mentioned as an urging means for urging the separation holding member 151L to the separation holding position and the force applying member 152L to the accommodation position, but the urging means is limited to this example. For example, a torsion coil spring, a leaf spring, or the like may be used as an urging means to urge the force applying member 152L to the accommodation position and to urge the separation holding member 151L to the separation holding position. Further, the material of the urging means may be metal, a mold, or the like, which has elasticity and can urge the separation holding member 151L and the force applying member 152L.

As described above, the developing unit 109 provided with the separation contact mechanism 150L is integrally coupled with the drum holding unit 108 by the non-driving side cartridge cover member 117 as described above (state in FIG. 30). As shown in FIG. 16, the non-driving side cartridge cover 117 of this embodiment has a contact surface 117*c*. The contact surface 117*c* is a surface parallel to the swing axis K. Further, as shown in FIGS. 16 and 30 when the non-driving side cartridge cover member 117 is assembled to the developing unit 109 and the drum holding unit 108, the contact surface 117*c* faces the separation holding surface 151Lc of the separation holding member 151L placed at a separation holding position.

Here, the process cartridge 100 includes a development pressure spring 134 as an urging member for bringing the developing roller 106 into contact with the photosensitive drum 104. The development pressure spring 134 is assembled between the spring hooked portion 117*e* of the non-driving side cartridge cover member 117 and the spring hooked portion 127*k* of the non-driving side bearing 127. The urging force of the development pressure spring 134 causes the separation holding surface 151Lc of the separation holding member 151L and the contact surface 117*c* of the non-driving side cartridge cover member 117 to contact each other. Then, when the contact surface 117*cc* and the separation holding surface 151Lc contact each other, the attitude of the developing unit 109 is positioned so that the developing roller 106 of the developing unit 109 and the photosensitive drum 104 are spaced by a gap P1. The state in which the developing roller 106 is spaced from the photosensitive drum 104 by the gap P1 by the separation holding member 151L is referred to as a separation position (retracted position) of the developing unit 109 (see part (a) of FIG. 35.

Figure 35:
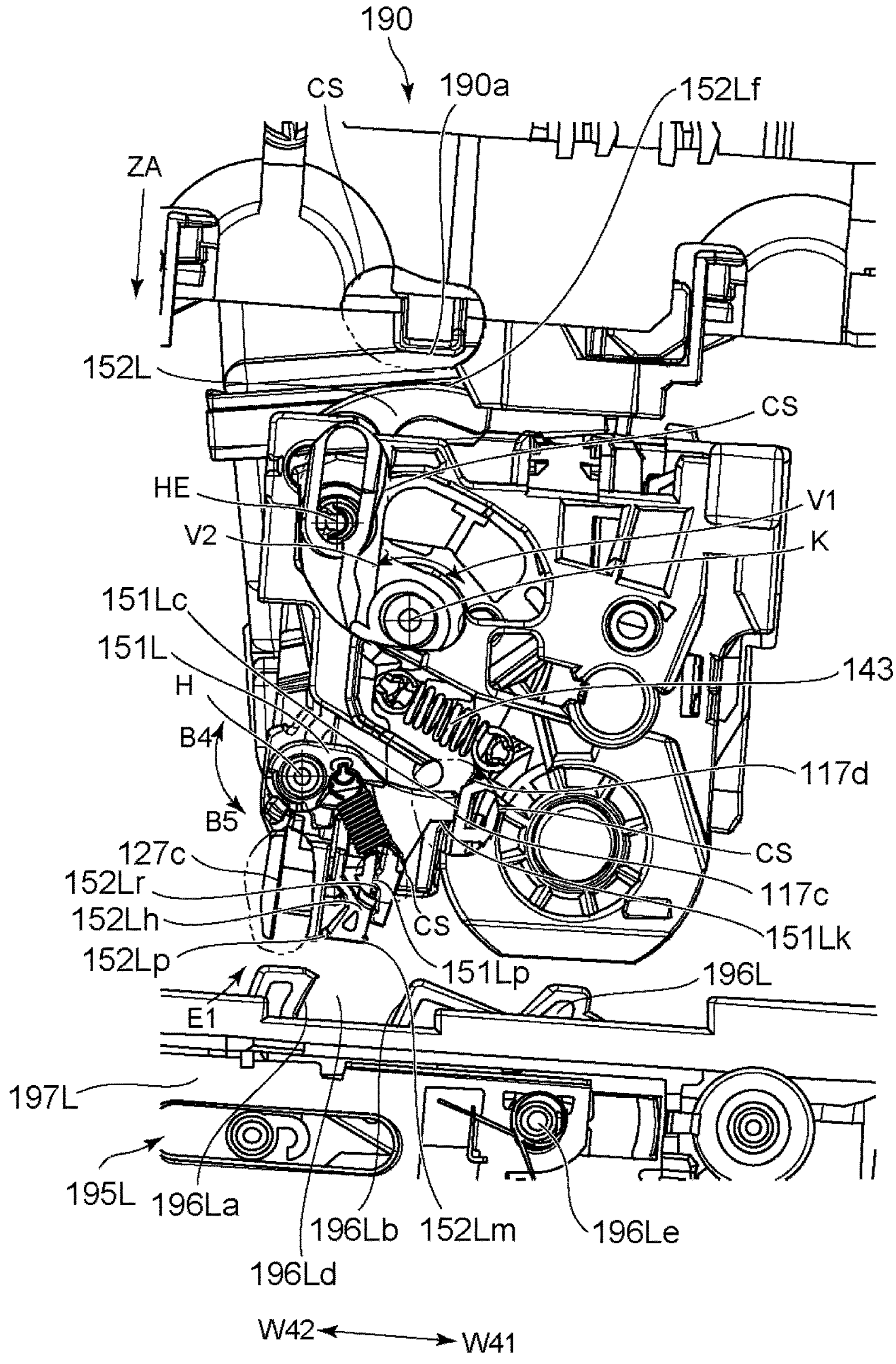
FIG. 35 is an illustration showing a process cartridge in the main assembly of the image forming apparatus.

Here, referring to FIG. 35, the separated state and the contact state of the process cartridge 100 will be described in detail. FIG. 35 is a side view of the process cartridge 100 as viewed from the non-driving side with the process cartridge 100 mounted inside the image forming apparatus main assembly 170. Part (a) of FIG. 35 shows a state in which the developing unit is separated from the photosensitive drum 104. Part (b) of FIG. 35 shows a state in which the developing unit 109 is in contact with the photosensitive drum 104.

First, in a state in which the separation holding member 151L is placed at the separation holding position and the developing unit 109 is placed at the separation position, the pushed portion 152Le of the force applying member 152L is pushed in the direction of arrow ZA. By this, the projecting portion 152Lh of the force applying member 152L projects from the process cartridge 100 (state of part (a) of FIG. 34. This position is referred to as a projecting position of the force applying member 152L. The second pressed surface 151Le of the separation holding member 151L is in contact with the second pressing surface 152Lr of the force applying member 152L by the tension spring 153 as described above. Therefore, when the second force receiving portion 152Ln is pressed in the direction of the arrow W42, the force applying member 152L rotates in the direction of the arrow BD about the force applying member swing axis HE to rotate the separation holding member 151L in the direction of the arrow B5. When the separation holding member 151L rotates in the direction of arrow B5, the separation holding surface 151Lc separates from the contact surface 117*c*, and the developing unit 109 becomes capable of rotating from the separation position in the direction of arrow V2 about the swing axis K.

That is, the developing unit 109 rotates in the V2 direction from the separated position, and the developing roller 106 of the developing unit 109 comes into contact with the photosensitive drum 104. Here, the position of the developing unit 109 in which the developing roller 106 and the photosensitive drum 104 contact each other is referred to as a contact position (development position) (state of part (b) of FIG. 34. The position where the separation holding surface 151Lc of the separation holding member 151L is separated from the contact surface 117*c* is referred to as a separation permission position (permission position). When the developing unit 109 is placed at the contact position, by the second restriction surface 151Lk of the separation holding member 151L contacting the second restriction surface 117*d* of the driving side cartridge cover 116, the separation holding member 151L is maintained at the separation permission position.

Further, the non-driving side bearing 127 of this embodiment has a first pressed surface 127*h* which is a surface perpendicular to the swing axis K. Since the non-driving side bearing is fixed to the developing unit 109, the developing unit 109 presses the first force receiving portion 152Lk of the force applying member 152L in the direction of the arrow 41 while the developing unit 109 is in the contact position. Then, by the first pressing surface 152Lq coming into contact with the first pressed surface 127*h*, the developing unit is rotated about the swing axis K in the direction of arrow V1 and moves to a separated position (state shown in part (a) of FIG. 34). Here, when the developing unit 109 moves from the contact position to the separated position, the direction in which the first pressed surface 127*h* moves is indicated by an arrow W41 in part (a) of FIG. 34 and part (b) of FIG. 34. Further, the direction opposite to the arrow W41 is indicated by the arrow W42, and the directions of the arrow W41 and the arrow W42 are substantially horizontal directions (X1, X2 directions). The second force receiving surface 152Lp of the force applying member 152L assembled to the developing unit 109 as described above is placed on the upstream side of the first pressed surface 127*h* of the non-driving side bearing 127 in the direction of the arrow W41. In addition, the first pressed surface 127*h* and the second force receiving surface 151Le of the separation holding member 151L are arranged at positions where at least parts of them overlap in the W1 and W2 directions.

The operation of the separation contact mechanism 150L in the image forming apparatus main assembly 170 will be described below.

[Mounting of Process Cartridge to the Image Forming Apparatus Main Assembly]

Next, referring to FIGS. 35 and 36, the engagement between the separation contact mechanism 150R of the process cartridge 100 and the development separation control unit of the image forming apparatus main assembly 170 at the time when the process cartridge 100 is mounted on the image forming apparatus main assembly 170 will be described. For the sake of illustration, these Figures are sectional views in which a portion of the development cover member 128 and a portion of the non-driving side cartridge cover member 117 are partially omitted by the partial sectional line CS, respectively. FIG. 35 is a view as seen from the driving side of the process cartridge 100 when the process cartridge is mounted on the cartridge tray 171 (not shown) of the image forming apparatus M and the cartridge tray 171 is inserted into the first mounting position. In this Figure, the parts are omitted except for the process cartridge 100, the cartridge pressing unit 121, and the separation control member 196L.

As described above, the image forming apparatus main assembly 170 of this embodiment has separation control members 196L corresponding to respective process cartridges 100 as described above. The separation control member 196L is disposed on the lower surface side of the image forming apparatus main assembly 170 with respect to the separation holding member 151L when the process cartridge 100 is placed at the first inner position and the second inner position. The separation control member 196L has a first force applying surface 196La and a second force applying surface 196Lb which project toward the process cartridge and face each other across the space 196Rd. The first force applying surface 196Ra and the second force applying surface 196Rb are connected with each other by a connecting portion 196Rc on the lower surface side of the image forming apparatus main assembly 170. In addition, the separation control member 196R is supported by the control sheet metal 197 rotatably about rotation center 196Re as the center. The separating member 196R is normally urged in the E1 direction by the urging spring. In addition, the control sheet metal 197 is structured to be movable in the W41 and W42 directions by a control mechanism (not shown), so that the separation control member 196R is structured to be movable in the W41 and W42 directions.

As described above, in interrelation with the transition of the front door 11 of the image forming apparatus main assembly 170 from the open state to the closed state, the cartridge pressing unit 121 lowers in the direction of arrow ZA, and the first force applying portion 121*a* is brought into contact with the pressed surface 152Lf of the pressed surface 152Lf. Thereafter, when the cartridge pressing unit 121 is lowered to a predetermined position which is the second mounting position, the part 152Lh of the force applying member 152L moves to a projecting position where the process cartridge 100 projects downward in the Z2 direction (state in FIG. 36). When this operation is completed, as shown in FIG. 36, a gap T4 is formed between the first force applying surface 196La of the separation control member 196L and the first force receiving surface 152Lp of the force applying member 152L, and a gap T3 is formed between the second force receiving surface 152Lp and the second force applying surface 196Lb. Then, it is placed at the second mounting position where the separation control member 196L does not act on the force applying member 152L. This position of the separation control member 196L is referred to as a home position. At this time, the first force receiving surface 152Lp of the force applying member 152L and the first force applying surface 196La of the separation control member 196L are arranged so as to partially overlap in the W1 and W2 directions. Similarly, the second force receiving surface 152Lp of the force applying member 152L and the second force applying surface 196Lb of the separation control member 196L are arranged so as to partially overlap in the W1 and W2 directions.

[Contacting Operation of Developing Unit]

Next, referring to FIGS. 36 to 38, the operation of contacting the photosensitive drum 104 and the developing roller with each other by the separation contact mechanism 150L will be described in detail. For the sake of illustration, a part of the development cover member 128, a part of the non-driving side cartridge cover member 117, and a part of the non-driving side bearing 127 are partially omitted in the partial sectional line CS, respectively. It is a sectional view.

As described above, the development input coupling 32 receives a driving force from the image forming apparatus main assembly 170 in the direction of arrow V2 in FIG. 24, so that the developing roller 106 rotates. That is, the developing unit 109 including the developing input coupling 32 receives the torque in the arrow V2 direction about the swing axis K from the image forming apparatus main assembly 170. Further, the developing unit 109 also receives an urging force in the arrow V2 direction due to the urging force of the development pressure spring 134 described above.

Figure 36:
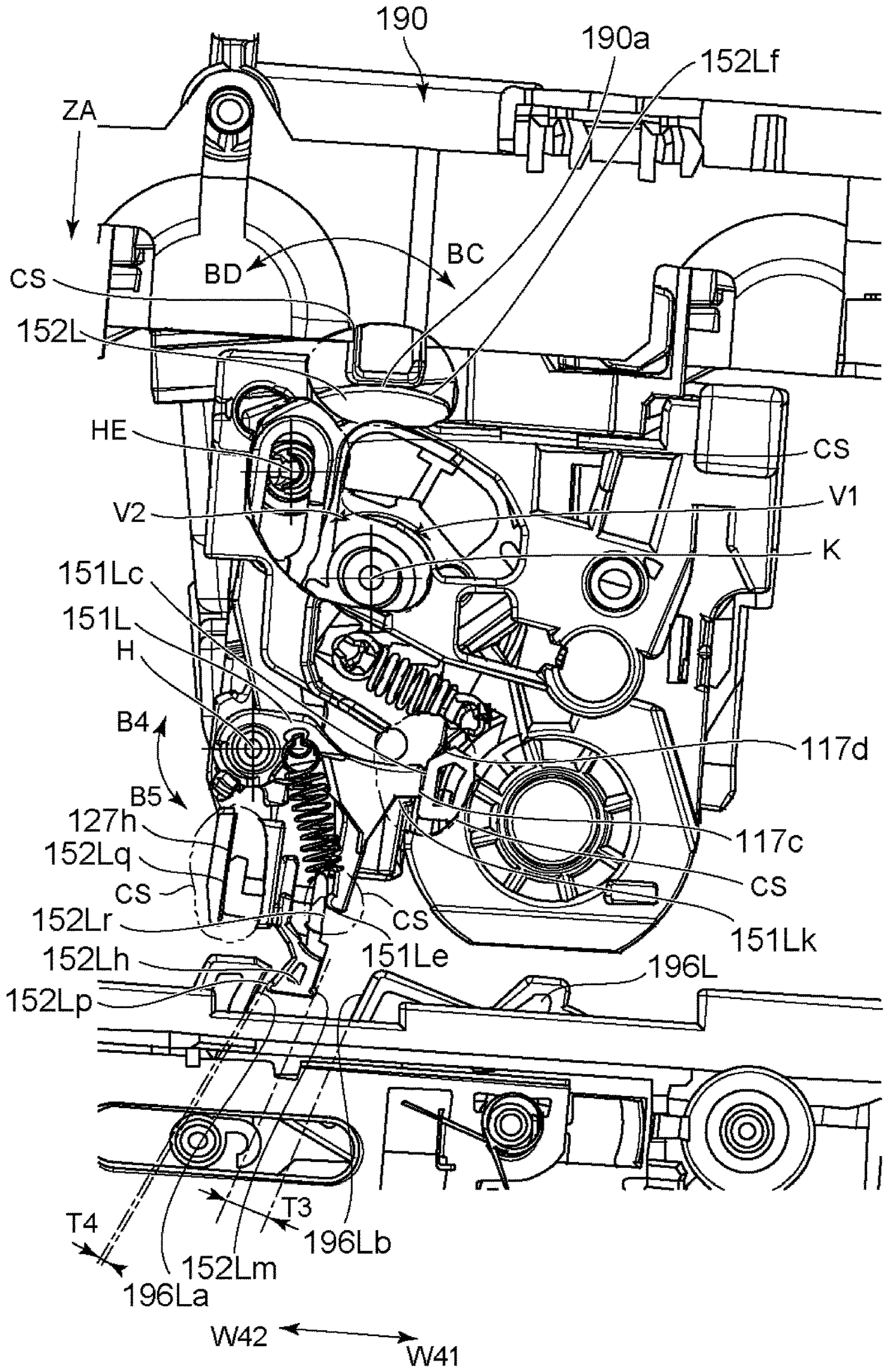
FIG. 36 is an illustration showing the operation of the developing unit in the main assembly of the image forming apparatus.
Figure 37:
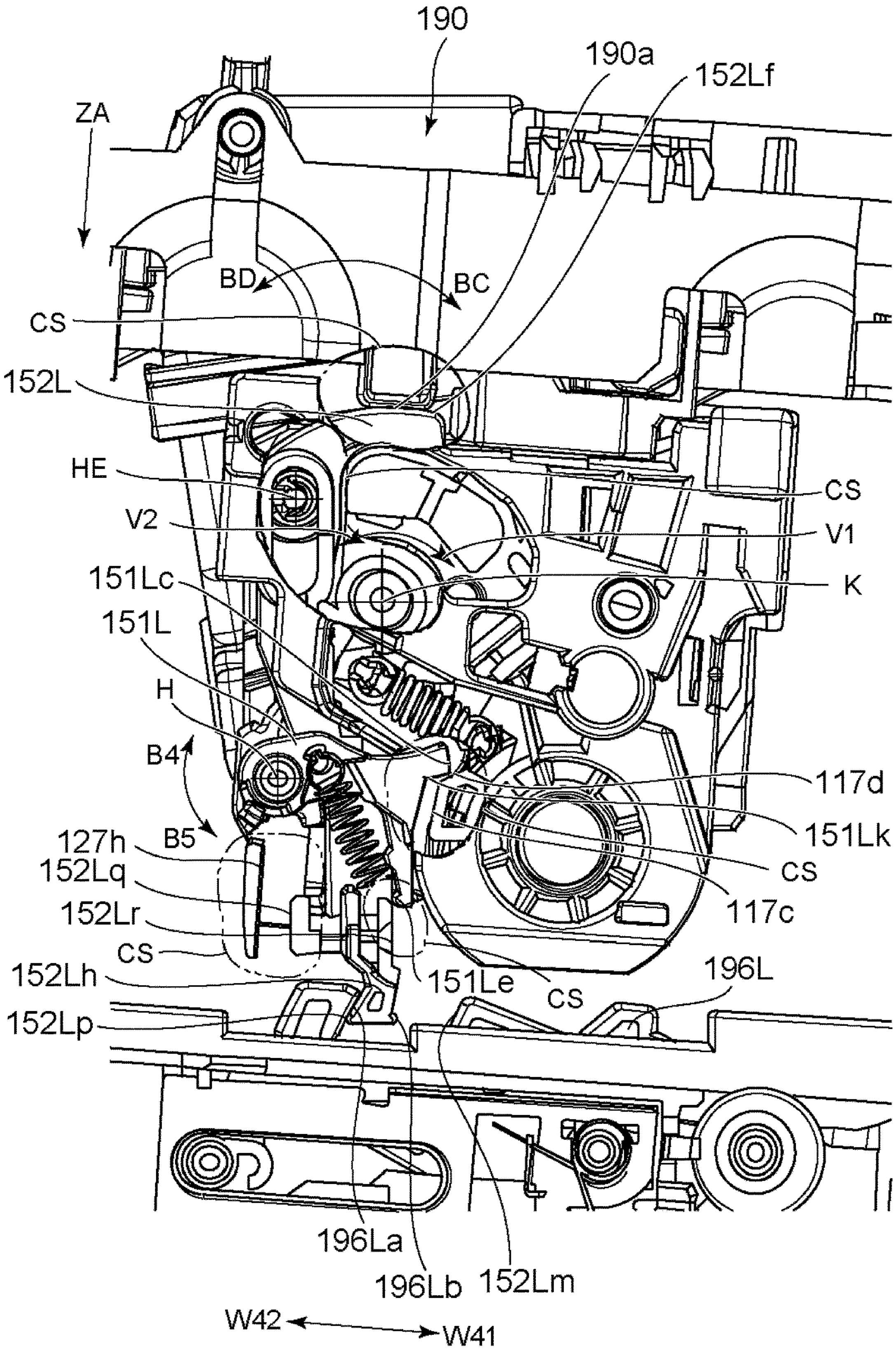
FIG. 37 is an illustration showing the operation of the developing unit in the main assembly of the image forming apparatus.

As shown in FIG. 36, when the developing unit 109 is in the separated position and the separation holding member 151L is in the separated holding position, the developing unit receives this torque and the urging force by the development pressure spring 134. Even in this case, the separation holding surface 151Lc of the separation holding member 151L contacts the contact surface 117*c* of the non-driving side cartridge cover member 117, and the attitude of the developing unit 109 is maintained at the separation position (state of FIG. 36).

The separation control member 196L of this embodiment is structured to be movable from the home position in the direction of arrow W41 in FIG. 36. When the separation control member 196L moves in the W41 direction, the second force applying surface 196Lb of the separation control member 196L and the second force receiving surface 152Lp of the force applying member 152L are brought into contact with each other, and the force applying member 152L is rotated in the BD direction about the force applying member swing axis HD. Further, with the rotation of the force applying member 152L, the separation holding member 151L is rotated in the B5 direction, while the second pressing surface 152Lr of the force applying member 152L is in contact with the second pressed surface 151Le of the separation holding member 151L. Then, the separation holding member 151L is rotated by the force applying member 152L to the separation permission position where the separation holding surface 151Lc and the contact surface 117*c* are separated from each other. Here, the position of the separation control member 196L for moving the separation holding member 151L to the separation permission position shown in FIG. 37 is referred to as a first position.

In this manner, the separation control member 196L moves the separation holding member 151L to the separation permission position. Then, the developing unit 109 rotates in the V2 direction by the torque received from the image forming apparatus main assembly 170 and the urging force of the development pressure spring 134, and moves to the contact position where the developing roller 106 and the photosensitive drum 104 are in contact with each other (state shown in FIG. 37). At this time, the separation holding member 151L urged in the direction of arrow B4 by the tension spring 153 is maintained at the separation permission position by the second regulated surface 151Lk contacting the second restriction surface 117*d* of the non-driving side cartridge cover member 117. Thereafter, the separation control member 196L moves in the direction of W42 and returns to the home position. At this time, the force applying member 152L is rotated in the BC direction by the tension spring 153, and the state changed toward the state in which the first pressing surface 152Lq of the force applying member 152L and the first pressed surface 127*h* of the non-driving side bearing 127 are in contact with each other (state shown in FIG. 38). By this, the above-mentioned gaps T3 and T4 are formed again, and the separation control member 196L is placed at a position where the force applying member 152L does not act. The transition from the state of FIG. 37 to the state of FIG. 38 is performed without a delay. The position of the separation control member 196L in FIG. 38 is the same as that in FIG. 36.

As described above, with the structure of this embodiment, by moving the separation control member 196L from the home position to the first position, the force applying member 152L is rotated to move the separation holding member 151L from the separation holding position to the separation permission position. By this, the developing unit 109 can be moved from the separated position to the contacting position where the developing roller 9 and the photosensitive drum 104 are in contact with each other.

[Separating Operation of Developing Unit]

Next, the operation of moving the developing unit 109 from the contact position to the separation position will be described in detail referring to FIGS. 38 and 39. Note that FIG. 39 is a cross-section in which a portion of the development cover member 128, a portion of the non-driving side cartridge cover member 117, and a portion of the non-driving side bearing are partially omitted by the partial cross-section line CS, respectively.

Figure 38:
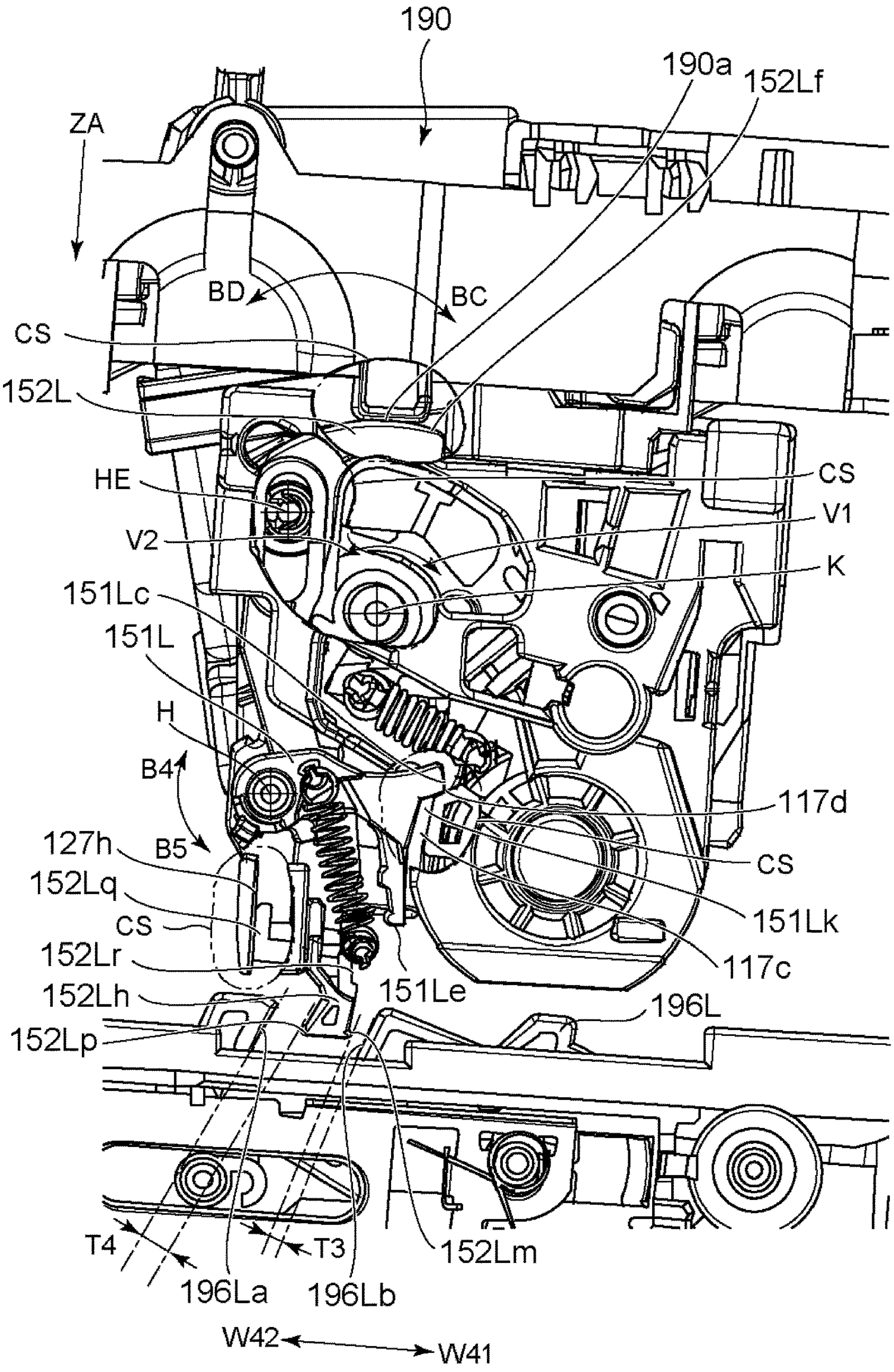
FIG. 38 is an illustration showing the operation of the developing unit in the main assembly of the image forming apparatus.
Figure 39:
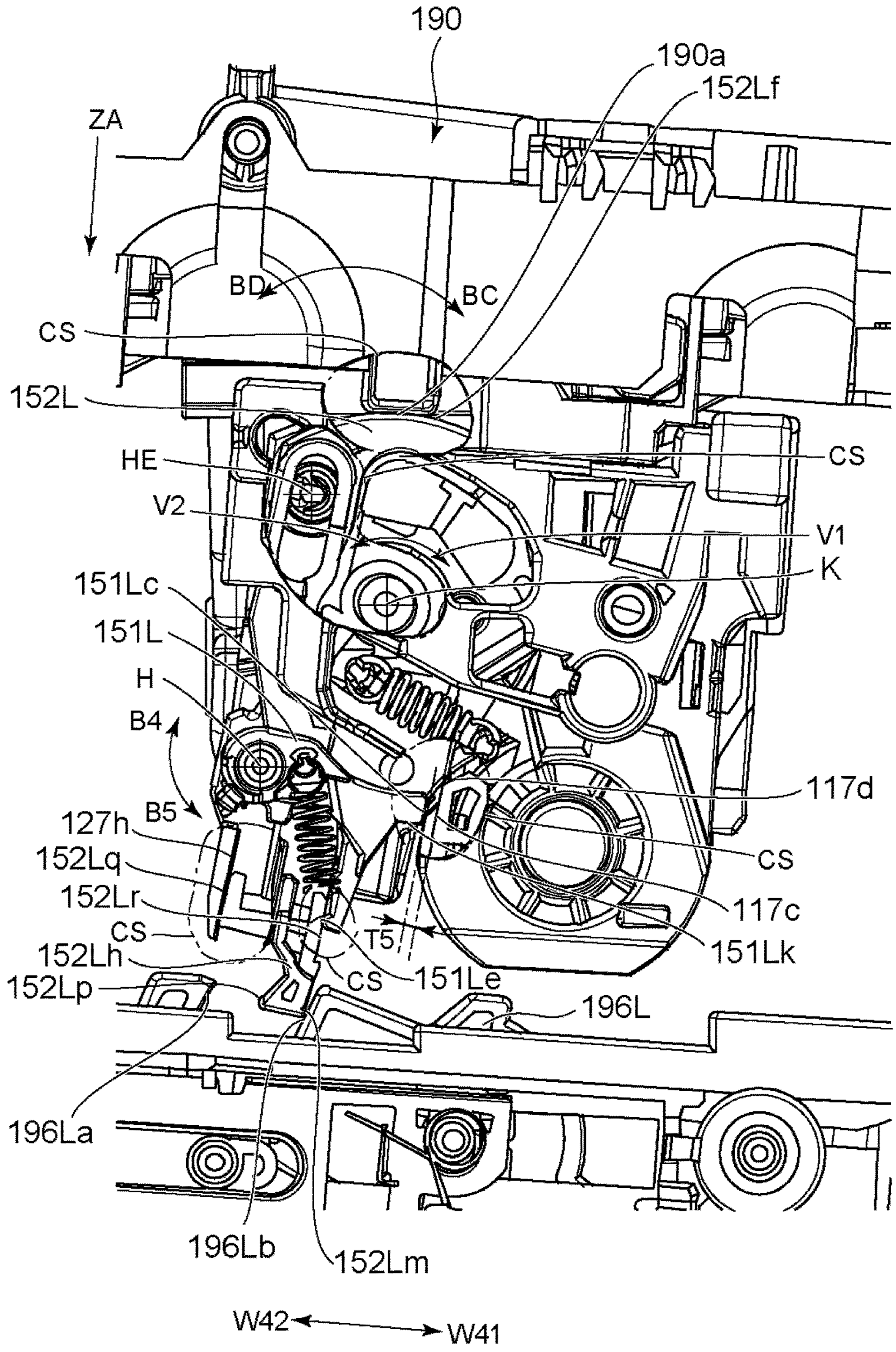
FIG. 39 is an illustration showing the operation of the developing unit in the main assembly of the image forming apparatus.

The separation control member 196L in this embodiment is structured to be movable from the home position in the direction of arrow W42 in FIG. 38. When the separation control member 196L moves in the W42 direction, the first force applying surface 196Lb and the first force receiving surface 152Lm of the force applying member 152L come into contact with each other, and the force applying member 152L is rotated in the arrow BC centering about the force applying member swing axis HD. Since the first pressing surface 152Lq of the force applying member 152L is in contact with the first pressed surface 127*h* of the non-driving side bearing 127, the developing unit 109 is rotated from the contact position in the direction of arrow V1 about the swing axis K (state in FIG. 39). Here, the pressed surface 152Lf of the force applying member 152L has an arc shape, and the center of the arc is placed so as to be aligned with the swing axis K. By this, when the developing unit 109 moves from the contact position to the separated position, the force received, from the cartridge pressing unit 121, by the pressed surface 152Lf of the force applying member 152L faces the swing axis K direction. Therefore, the developing unit 109 can be operated so as not to hinder the rotation in the arrow V1 direction. In the separation holding member 151L, the second regulated surface 151Lk of the separation holding member 151L and the second restriction surface 117*d* of the non-driving side cartridge cover member 117 are separated, and the separation holding member 151L is rotated in the arrow B4 direction by the urging force of the tension spring 153. By this, the separation holding member 151L rotates until the second pressed surface 151Le comes into contact with the second pressing surface 152LR of the force applying member 152L, and by the contact with the second pressing surface 152LR, the position shifts to the separation holding position. When the developing unit is moved from the contact position to the separation position by the separation control member 196L and the separation holding member 151L is placed at the separation holding position, A gap T5 is formed between the separation holding surface 151Lc and the contact surface 117*c* as shown in FIG. 39. Here, the position where the developing unit 109 is rotated from the contact position toward the separation position and the separation holding member 151 can be moved to the separation holding position is referred to as a second position of the separation control member 196L.

Thereafter, the separation control member 196L moves in the direction of the arrow W41 and returns from the second position to the home position. Then, while the separation holding member 151L is maintained at the separation holding position, the developing unit is rotated in the arrow V2 direction by the torque received from the image forming apparatus main assembly 170 and the urging force of the development pressure spring 134, and the separation holding surface 151Lc and the contact surface 117*c* are brought into contact with each other. That is, the developing unit 109 is in a state where the separation position is maintained by the separation holding member 151L, and the developing roller 106 and the photosensitive drum 104 are in a state where they are separated by a gap P1 (states in FIG. 36 and part (a) of FIG. 34. By this, the above-mentioned gaps T3 and T4 are formed again, and the separation control member 196L is placed at a position where the force applying member 152L does not act (state in FIG. 36). The transition from the state of FIG. 39 to the state of FIG. 36 is executed without a delay.

As described above, in the structure of this embodiment, by the movement of the separation control member 196L from the home position to the second position, the separation holding member 151L is moved from the separation permission position to the separation holding position. And, by the returning of the separation control member 196L from the second position to the home position, the developing unit 109 becomes in the state of maintaining the separation position by the separation holding member 151L.

So far, the operation of the separation mechanism placed on the driving side of the process cartridge 100 and the operation of the separation mechanism placed on the non-driving side have been described separately, but in this embodiment, they operate in interrelation with each other. That is, when the developing unit 109 is positioned at the separation position by the separation holding member R, the developing unit 109 is positioned at the separation position by the separation holding member L at substantially the same time, and the same applies to the contact position. Specifically, the movements of the separation control member 121R and the separation control member 121L described in FIGS. 23 to 27 and 35 to 39 are integrally carried out by a connecting mechanism (not shown). By this, the timing at which the separation holding member 151R provided on the driving side is placed at the separation holding position, and the timing at which the separation holding member 151L provided on the non-driving side is placed at the separation holding position are substantially the same, and the timing at which the separation holding member 151R is placed at the separation permission position, and the timing at which the separation holding member 151L is placed at the separation permission position, and the timing at which the separation holding member 151L is placed at the separation permission position are substantially the same. These timings may be different between the driving side and the non-driving side, but in order to shorten the time from the start of the print job by the user until the printed matter is discharged It is desirable that at least the timings of positioning at least the separation permission positions are the same. In this embodiment, the separation holding member swing axes H of the separation holding member 151R and the separation holding member 151L are common, but it is sufficient that the timings of the separation holding member 151L and the separation holding member 151L are substantially the same as described above, and therefore the above-described example is not restrictive. Similarly, the force applying member swinging axis HC of the force applying member 152R and the force applying member swinging axis HE of the force applying member 152L are axes that do not match, but it will suffice if the timings of being placed at the separation permission positions are substantially the same as described above, and therefore, the above-described example is not restrictive.

As described above, the driving side and the non-driving side are provided with the same separation contact mechanisms, respectively, and they operate substantially at the same time. By this, even when the process cartridge 100 is twisted or deformed in the longitudinal direction, the amount of separation between the photosensitive drum 104 and the developing roller 9 can be controlled at the respective end portions in the longitudinal direction. Therefore, it is possible to suppress variations in the amount of separation in the longitudinal direction.

Further, according to this embodiment, by moving the separation control member 196R (L) between the home position, the first position, and the second position in one direction (arrows W41 and W42 directions), it is possible to control the contact state and the separation state between the developing roller 106 and the photosensitive member. Therefore, it is possible that the developing roller 106 is brought into contact with the photosensitive drum 104 only when the image is formed, and the developing roller 4 is maintained in a state of being separated from the photosensitive drum 104 when the image is not formed. Therefore, even if the image formation is not carried out for a long term, the developing roller 106 and the photosensitive drum 104 are not deformed, and a stable image can be formed.

Further, according to this embodiment, the force applying member 152R (L) acting on the separation holding member 151R (L) to rotate and move can be positioned at the accommodation position by the urging force of the tension spring 153 or the like. Therefore, it does not project out of the outermost shape of the process cartridge 100, when the process cartridge 100 is outside the image forming apparatus main assembly 170, and the process cartridge 100 per se can be downsized.

Similarly, the force applying member 152R (L) can be positioned at the accommodation position by the urging force of the tension spring 153 or the like. Therefore, when the process cartridge 100 is to be mounted to the image forming apparatus main assembly 170, the mounting of the process cartridge 100 can be completed by moving only in one direction. For this reason, it is not necessary to move the process cartridge 100 (tray 171) in the vertical direction. Accordingly, the image forming apparatus main assembly 170 does not require an additional space, and the main assembly can be downsized.

Further, according to this embodiment, when the separation control member 196R (L) is placed at the home position, the separation control member 196R (L) is not loaded from the process cartridge 100. Therefore, the rigidity required for the mechanism for operating the separation control member 196R (L) and the separation control member 196R (L) can be reduced, and the size can be reduced. Further, since the load on the sliding portion of the mechanism for operating the separation control member 196R (L) is also reduced, wear of the sliding portion and production of abnormal noise can be suppressed.

Further, according to this embodiment, the developing unit 109 can maintain the separated position only by the separation holding member 151R (L) included in the process cartridge 100. Therefore, the component tolerance can be eased and the spacing amount can be minimized by reducing the number of parts resulting in variations in the spacing amount between the developing roller 106 and the photosensitive drum 104. Since the amount of spacing can be reduced, when the process cartridge 100 is arranged in the image forming apparatus main assembly 170, the area occupied by the developing unit 109 when the developing unit 109 moves to the contact position and to the separated position can be made smaller, so that the image forming apparatus can be downsized. In addition, the space for the developer accommodating portion 29 of the developing unit 109 which moves to the contact position and to the separation position can be increased, and therefore, the downsized and large-capacity process cartridge 100 can be placed in the image forming apparatus main assembly 170.

Further, according to this embodiment, the force applying member 152R (L) can also be positioned at the accommodation position when the process cartridge 100 is mounted, and the developing unit 109 Can maintain the separation position only by the separation holding member 151R (L) of the process cartridge 100. Therefore, when the process cartridge 100 is mounted to the image forming apparatus main assembly 170, the process cartridge 100 can be mounted by moving only in one direction. For this reason, it is not necessary to move the process cartridge 100 (tray 171) in the vertical direction. Accordingly, the image forming apparatus main assembly 170 does not require a space, and the main assembly can be downsized. Further, since the separation amount can be reduced, when the process cartridge 100 is placed in the image forming apparatus main assembly 170, the area occupied by the developing unit 109 when the developing unit 109 moves to the contact position and to the separation position can be made small, and therefore, the image forming apparatus can be downsized. In addition, since the space for the developer accommodating portion 29 of the developing unit 109 which moves to the contact position and to the separation position can be increased, the downsized and large-capacity process cartridge 100 can be placed in the image forming apparatus main assembly 170.

[Details of Arrangement of Separation Contact Mechanism]

Subsequently referring to FIGS. 40 and 41, the arrangement of the separation contact mechanisms R and L in this embodiment will be described in detail.

Figure 40:
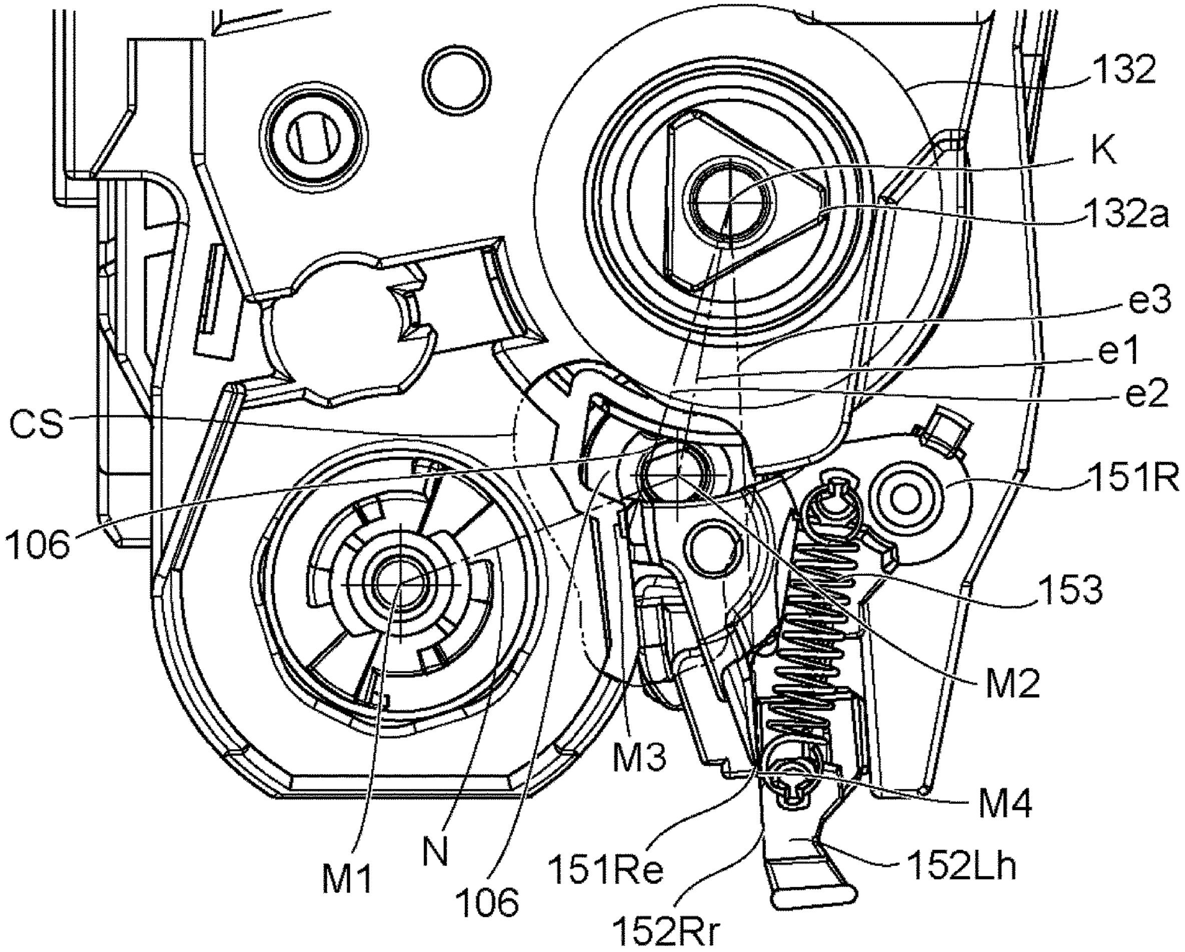
FIG. 40 is an illustration showing the arrangement of the separation holding member R and the force applying member.
Figure 41:
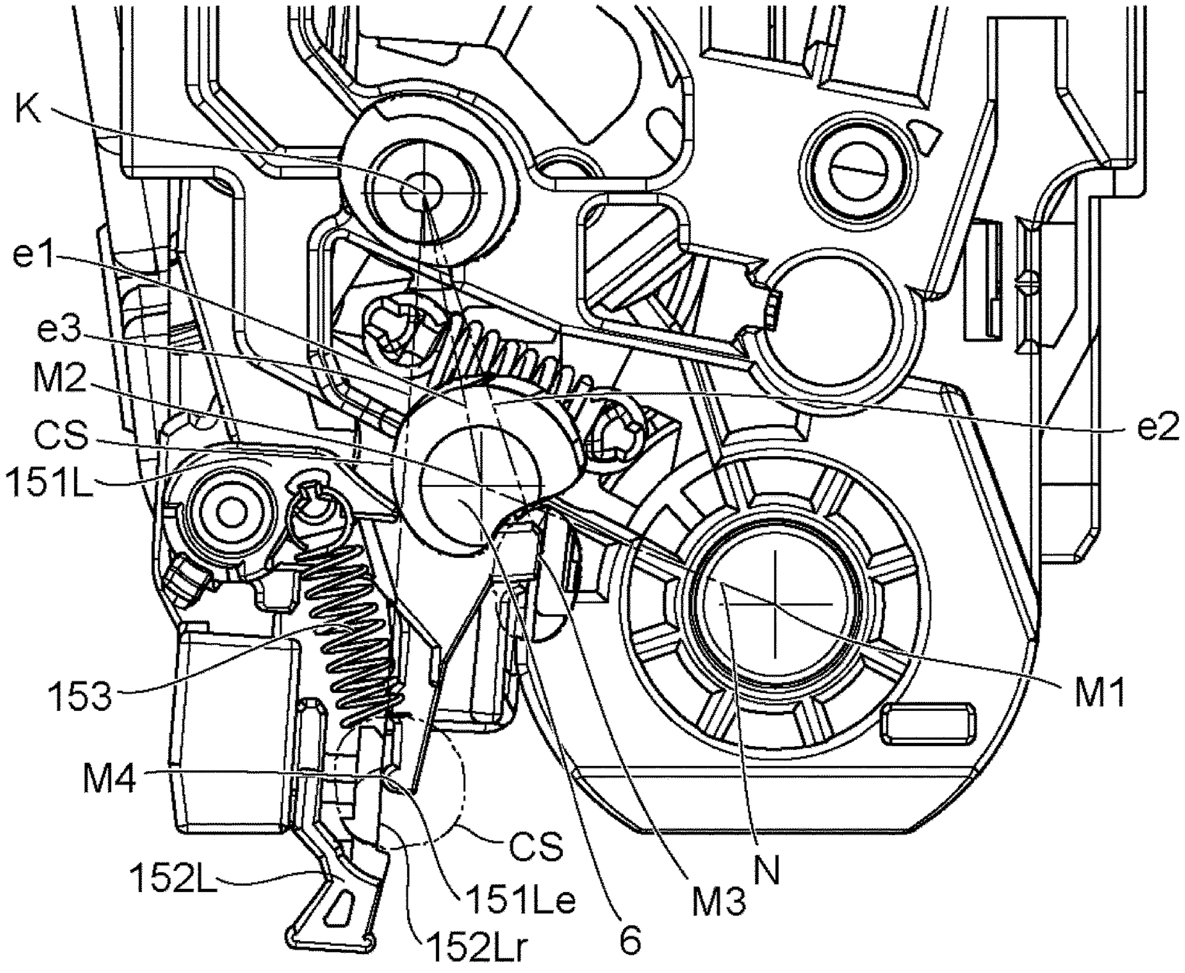
FIG. 41 is an illustration showing the arrangement of the separation holding member and the force applying member.

FIG. 40 is an enlarged view of the periphery of the separation holding member 151R as the process cartridge 100 is viewed from the driving side along the swing axis K (photosensitive drum axis direction) of the developing unit 109. In addition, for the sake of illustration, it is a sectional view in which a portion of the development cover member and a portion of the driving side cartridge cover member 116 are partially omitted by the partial sectional line CS. FIG. 41 is an enlarged view of the periphery of the separation holding member 151R as the process cartridge 100 is viewed from the non-driving side along the swing axis K of the developing unit 109 (along the axis in the photosensitive drum axis direction). In addition, for the sake of illustration, it is a sectional view in which a portion of the development cover member 128 and a portion of the driving side cartridge cover member 116 are partially omitted by the partial sectional line CS. Regarding the arrangement of the separation holding member and the force applying member described below, there is no distinction between the driving side and the non-driving side except for the part which will be described in detail hereinafter, and they are common, and therefore, the description will be made only for the driving side, the same applies to the non-driving side.

As shown in FIG. 40, the rotation center of the photosensitive drum 104 is a point M1, the rotation center of the developing roller 106 is a point M2, and the line passing through the points M1 and M2 is a line N. In addition, the contact region between the separation holding surface 151Rc of the separation holding member 151R and the contact surface 116*c* of the driving side cartridge cover member 116 is M3, and the contact region between the second pressed surface 151Re of the separation holding member 151R and the second pressing surface 152Rr of the second force applying member 152R is M4. Further, the distance between the swing axis K and the point M2 of the developing unit 109 is a distance e1, the distance between the swing axis K and the region M3 is e2, and the distance between the swing axis K and the point M4 is e3.

In the structure of this embodiment, the following positional is a relationship when the developing unit 109 is in the separated position and the force applying member 152R (L) is in the projecting position. As viewed along the axial direction of the swing axis K shown in FIG. 40 (the axial direction of the photosensitive drum), at least a part of the contact region M3 between the separation holding member 151R and the driving side cartridge cover member is placed on a side opposite from the side in which the development coupling 32 center (swing axis K) exists, with respect to the line N passing through the center of the photosensitive drum 104 and the center of the developing roller. That is, the separation holding surface 151Rc of the separation holding member 151R is arranged such that the distance e2 is longer than the distance e1.

By arranging the separation holding member 151R and the separation holding surface 151Rc in this manner, it is possible to suppress variations in the attitude of the spaced position of the developing unit 109 when the positions of the separation holding surface 151Rc vary due to component tolerances and the like. That is, the influence of the variation of the separation holding surface 151Rc on the separation amount (gap) P1 (see part (a) of FIG. 42) between the developing roller 106 and the photosensitive drum 104 can be minimized, and the developing roller 106 can be accurately spaced from the photosensitive member 104. Further, it is not necessary to provide an additional space for permitting retraction when the developing unit 109 is separated, which leads to the downsizing of the image forming apparatus main assembly 170.

Further, the first force receiving portion 152Rk (Lk) and the second force receiving portion 152Rn (Ln), which are the force receiving portions of the force applying member 152R (L), are placed on a side opposite from the rotation centers of the development coupling 32 with respect to the extension line of the line N.

As described above, the force receiving portions 152Rk (Lk) and 152Rn (Ln) are provided at the end portions in the longitudinal direction. Further, as shown in FIG. 15 (FIG. 16), a cylindrical portion 128*b* (127*a*), which is a support portion of the developing unit 109, is provided at the end portion in the longitudinal direction. Therefore, by disposing the force receiving portions 152Rk (Lk) and 152Rn (Ln) at positions opposite from the cylindrical portion 128*b* (127*a*) (that is, the swing axis K) of the developing unit 109 with respect to the line N the functional elements can be arranged efficiently. That is, it leads to downsizing of the process cartridge 100 and the image forming apparatus M.

In addition, the force receiving portions 152Rk and 152Rn are placed at the longitudinal driving side end portions. Further, as shown in FIG. 15, a development drive input gear 132 that receives a drive from the image forming apparatus main assembly 170 and drives the developing roller 106 is provided at the end portion on the driving side in the longitudinal direction. As shown in FIG. 40, the force applying members 152Rk and 152Rn are placed on the side opposite from the rotation center K of the development drive input gear 132 (development coupling portion 132*a*) shown by the broken lines with respect to the extension line of the line N. With this arrangement, the functional elements can be efficiently arranged. That is, it leads to downsizing of the process cartridge 100 and the image forming apparatus M.

Further, the contact portion between the separation holding member 151R and the force applying member 152R is arranged such that the distance e3 is longer than the distance e1. By this, the separation holding member 151R and the driving side cartridge cover member 116 can be brought into contact with each other with a lighter force. That is, the developing roller 106 and the photosensitive drum 104 can be stably separated from each other.

[Detailed Description of Drive Transmission Mechanism for Photosensitive Drum]

A structure for transmitting a driving force from the image forming apparatus main assembly to the drum unit 103 of the cartridge 100 (see part (a) of FIG. 1 to drive (rotate) the drum unit will be described.

The drum unit 103 shown in FIGS. 1, 13 and 55 to 58 is a unit including a photosensitive drum, a drum coupling (cartridge side coupling, coupling member) 143, and a drum flange 142 (see FIG. 13). The drum unit 103 is mountable to and dismountable from the image forming apparatus main assembly as a part of the cartridge 100. By mounting the drum unit 103 to the main assembly of the apparatus, it can be connected with a drive transmission unit 203 (see FIGS. 43 and 44, details will be described hereinafter) of the main assembly of the apparatus. The drum unit rotates in the direction of arrow A during image formation (see FIGS. 1, 55 to 57). In this embodiment, as the driving side of the drum unit 103 (the side where the drum coupling 143 is located) is viewed, that is, when the drum unit 103 is viewed along the arrow M1B direction, the rotational direction of the drum unit 103 corresponds to the clockwise direction (See FIG. 1). In other words, when the front surface of the drum coupling 143 is viewed, the rotational direction A of the drum coupling 143 corresponds to the clockwise direction.

The rotational direction A of the drum unit (drum coupling 143 and the photosensitive drum 104) will be described below using the movement of the surface of the photosensitive drum 104 (see FIGS. 2 and 3). In FIGS. 2 and 3, unlike FIG. 1, the cartridge is viewed from the non-driving side, and therefore, the rotational direction A of the drum unit 103 is counterclockwise.

As shown in FIG. 3, the surface of the photosensitive drum 104 is charged inside the cartridge at a position near the charging roller 105 (around the position where it contacts the charging roller). Thereafter, the surface of the photosensitive drum 104 moves to a position where it receives the laser beam U, by which an electrostatic latent image is formed on the surface. Then, the surface of the photosensitive drum 104 moves to a position near the developing roller 106 (a position in contact with the developing roller in this embodiment), and a latent image formed on the surface of the photosensitive drum 104 developed into a toner image. After that, the surface of the photosensitive drum moves to a position exposed below the cartridge and outside the casing of the cartridge. Then, as shown in FIG. 2, the surface of the photosensitive drum 104 exposed from the casing of the cartridge contacts the intermediary transfer belt 12*a* provided in the image forming apparatus main assembly. By this, the toner image is transferred from the surface of the photosensitive drum 104 to the transfer belt 12*a*. Thereafter, the surface of the photosensitive drum 104 returns, inside of the cartridge, to a position near the charging roller 105.

In summary, when the photosensitive drum 104 rotates due to the driving force of the coupling 143, a part of the surface of the photosensitive drum 104 moves from a position close to the charging roller 105 to a position close to the developing roller 106. Thereafter, the part of the surface of the photosensitive drum 104 is exposed to the outside of the casing of the cartridge, and then returns to the inside of the casing of the cartridge and approaches the charging roller 105 again.

As described above, the cartridge 100 of this embodiment does not have a cleaning means for contacting the photosensitive drum 104 and removing the toner on the surface of the photosensitive drum 104 (see FIG. 3). Therefore, the torque required to rotate the drum unit 103 (photosensitive drum 104) inside the cartridge 100 is relatively small. In the case of such a structure, the drum unit 103 is easily affected by the surroundings when it is driven, and as a result, the drum unit 103 may be externally affected by the outside with the result of unstable rotation speed. For example, in this embodiment, the developing roller 106, the charging roller 105, and the transfer belt 12*a* are in contact with the photosensitive drum 104. If the magnitude of the frictional force generated between these means and the photosensitive drum 104 fluctuates, the speed of the drum unit 103 may fluctuate.

Therefore, in this embodiment, the structure is such that a torque a predetermined level or higher is required, when the drum drive coupling 180 of the drive transmission unit 203 (see FIG. 43) provided in the main assembly of the apparatus rotates the drum unit (photosensitive drum 104) of the cartridge. By this, the rotation of the drum unit 103 is relatively less influenced by the external factors, and its rotation speed is stable.

First, referring to part (a) of FIG. 1, the drum coupling 143 of the process cartridge 100 will be described. Part (a) of FIG. 1 is a perspective view of the drum coupling.

The drum coupling 143 of this embodiment is manufactured by injection molding a polyacetal resin. As the material, a resin material such as a polycarbonate resin or polybutylene terephthalate resin, or a resin material provided by blending these with glass fiber, carbon fiber or the like may be used. Alternatively, a processing method such as die casting or cutting may be used with a metal material such as aluminum, iron, or stainless steel.

Next, referring to FIGS. 1, 55 to 58, the shape of the drum coupling 143 will be described.

In the following description of the drum coupling 143, the direction (direction of arrow M1A) from the photosensitive drum 104 toward the drive transmission unit 230 (drum drive coupling 180) along the axial direction is called outward (outward) in the axial direction. In addition, the direction opposite to the outward direction (the direction of the arrow M1B) is called inward direction in the axial direction.

In other words, in the drum coupling, the outward direction (M1A direction) in the axial direction is the direction from the non-driving side end portion 104*b* of the photosensitive drum toward the driving side end portion 104*a* (leftward in FIG. 80). Alternatively, the outward direction (M1A direction) in the axial direction is the direction from the non-driving side cartridge cover 117 of the cartridge 100 toward the driving side cartridge cover 116 in FIG. 14.

The inward direction in the axial direction (M1B direction) is the direction from the driving side end portion 104*a* of the photosensitive drum 104 toward the non-driving side end portion 104*b* (rightward in FIG. 80). Alternatively, the inward direction (M1B direction) in the axial direction is the direction from the driving side cartridge cover 116 of the cartridge 100 toward the non-driving side cartridge cover 117 in Figure.

Figure 1:
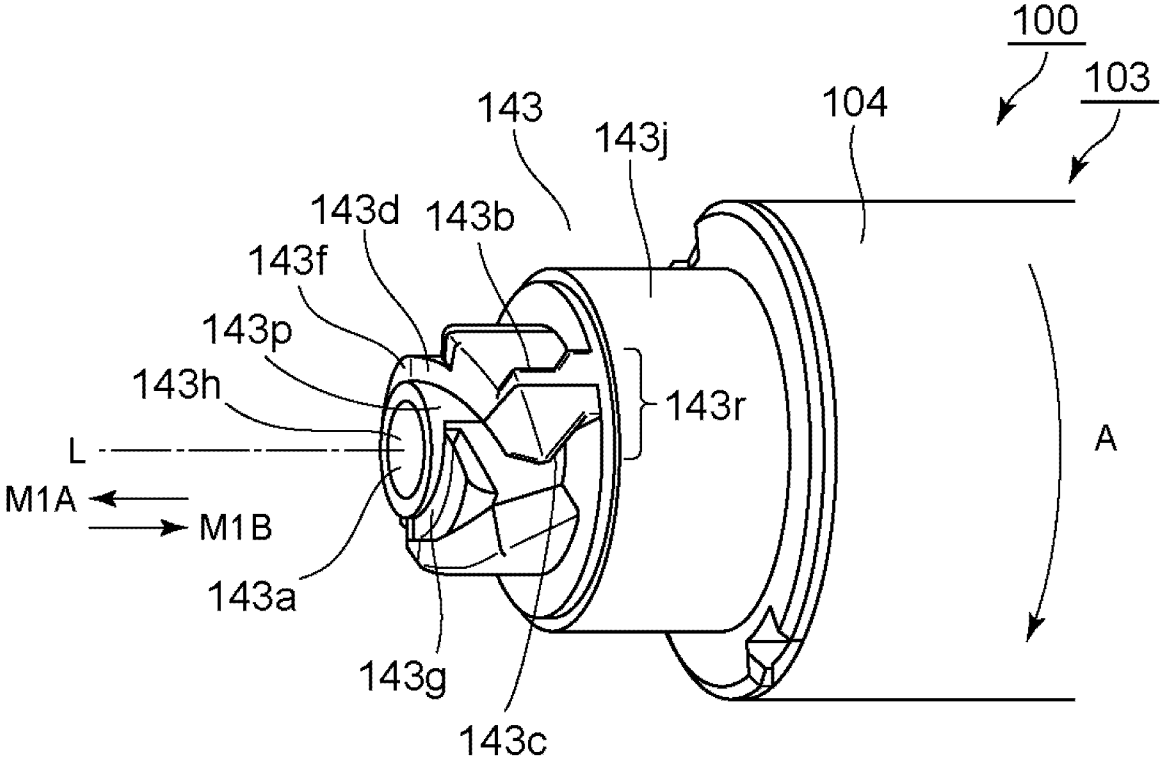
FIG. 1 is a perspective view of a drum coupling 143.
Figure 1:
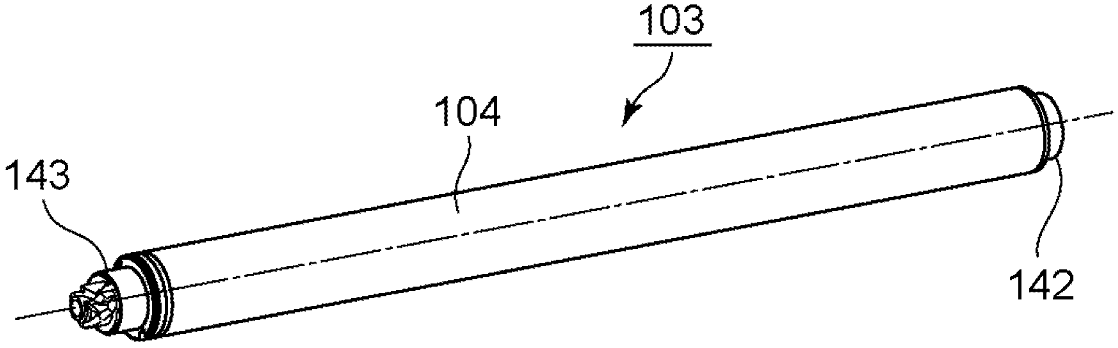

As shown in part (b) of FIG. 1, the drum coupling 143 is mounted to one longitudinal end (driving side end) of the photosensitive drum 104. As described above, the shaft portion 143*j* shown in FIG. 1 is rotatably supported by the driving side cartridge cover member 116 (see FIG. 15) which supports the photosensitive drum unit 103. The drum unit 103 is structured to be rotatable in a predetermined rotational direction (direction of arrow A) during the image forming operation in which the latent image on the surface of the photosensitive drum is developed.

The drum coupling 143 receives a driving force for rotating the photosensitive drum 104 from the main assembly drive transmission unit 203 of the main assembly of the apparatus, and also receives a braking force for applying a load against the rotation of the photosensitive drum 104, as well.

The drum coupling 143 is provided with a projections projecting outward in the axial direction from the surface of the end portion of the shaft portion 143*j* (see FIGS. 1, 52 to 57). This projection has a driving force receiving portion 143*b* as a first side surface (first side portion) for receiving the driving force from the driving transmission unit 203. Further, the projection of the drum coupling 143 includes a braking force receiving portion 143*c* as a second side surface (second side portion) for receiving the braking force from the drive transmission unit 203.

The driving force receiving portion 143*b* is a side surface (side portion) facing the upstream side in the rotational direction A of the drum unit. Further, the braking force receiving portion 143*c* is a side surface (side portion) facing the downstream side in the rotational direction A.

In other words, one of the driving force receiving portion 143*b* and the braking force receiving portion 143*c* faces one side in the circumferential direction of the drum unit, and the other faces the other side in the circumferential direction. That is, the driving force receiving portion 143*b* and the braking force receiving portion 143*c* are side surfaces (side portions) facing opposite to each other in the rotational direction and the circumferential direction.

Further, the projection of the drum coupling 143 has a helical slope (inclined portion, slope) 143*d* as a top surface (upper surface, upper portion, upper portion). The slope (top surface) 143*d* is a portion facing outward (arrow MA1 direction) in the axial direction. That is, the slope 143*d* is a portion facing toward the side opposite to the non-driving side end portion of the drum unit (that is, the end portion on the side where the drum flange 142 (FIG. 13) is arranged). In other words, the helical slope (top surface) 143*d* of the coupling 143 is a portion facing the side opposite to the side on which the photosensitive drum 104 exist.

The helical slope 143*d* is inclined so as to be outward in the axial direction (arrow MA1 direction) toward the upstream side in the rotational direction (upstream side in the arrow A direction). That is, the slope 143*d* goes away from the non-driving side of the drum unit 103 as goes toward the upstream side in the rotational direction. In other words, the slope 143*d* is inclined so as to go away from the photosensitive drum as goes toward the upstream side in the rotational direction.

In other words, the helical slope 143*d* extends toward the non-driving end of the drum unit and the cartridge from upstream to downstream in the rotational direction. Namely, when the distance of the helical slope 143*d* from the non-driving end of the cartridge is measured along the axial direction, the distance becomes shorter toward the downstream in the rotational direction.

The helical slope 143*d* includes a downstream portion (downstream top surface, downstream inclined slope, downstream inclined portion, downstream guide) 143*d*1 sandwiched between the driving force receiving portion 143*b* and the braking force receiving portion 143*c* in the rotational direction of the drum unit. Further, the slope 143*d* has an upstream portion (upstream side top surface, upstream side slope, upstream side inclined portion, upstream guide) 143*d*2. The upstream portion 143*d*2 of the helical slope 143*d* is provided upstream of the driving force receiving portion 143*b* and the downstream portion 143*d*1 of the helical slope 143*d* in the rotational direction (see FIGS. 55 to 58).

Further, as the length of the slope 143*d* is measured along the rotational direction of the drum unit, the length of the upstream side slope 143*d*2 is larger than the length of the downstream side slope 143*d*1.

The upstream side portion (upstream side slope) 143*d*2 of the slope 143*d* is provided inside (the side closer to the axis L) of the driving force receiving portion 143*b* in the radial direction. That is, the upstream side portion (upstream side top surface, upstream side slope) 143*d*2 of the slope 143*d* is provided closer to the axis L (part (a) of FIG. 1 than the driving force receiving portion 143*b*. The axis L (part (a) of FIG. 1) is the axis (rotation axis) which is the center of rotation of the coupling 143 and the photosensitive drum 104.

Further, the projection of the drum coupling 143 is provided with a circular hole portion 143*a* as an opening for engaging with the positioning boss (positioning portion) 180*i* of the drum drive coupling 180 and positioning each other's axes. The circular hole portion 143*a* has a circular opening having a cross-section perpendicular to the axis L of the drum coupling 143, and is extended along the axis L.

The projection of the drum coupling 143 includes a shaft portion 143*p* (see FIG. 1) formed along the axis L (see part (a) of FIG. 1, and the circular hole portion 143*a* is formed inside the shaft portion 143*p*. The shaft portion 143*p* is a portion for forming the circular hole portion 143*a*.

The shaft portion 143*p* and the circular hole portion 143*a* are extended aligned with the axis L. By forming the circular hole portion 143*a*, the space from the rotation axis L of the drum unit (see part (a) of FIG. 1 to the inner surface of the drum coupling 143 is an open space. The shaft portion 143*p* has a diameter smaller than the shaft portion 143*j* described above.

The drum coupling 143 described above has an axisymmetric shape (axisymmetric shape) with respect to the axis L (see part (a) of FIG. 1. The driving force receiving portion 143*b*, the braking force receiving portion 143*c*, and the helical slope 143*d* are arranged at two locations so as to be separated by 180° in the circumferential direction, respectively, thus providing a first coupling portion 143*r* and a second coupling portion 143*s* (see FIG. 58).

Each coupling portion includes one driving force receiving portion 143*b*, one braking force receiving portion 143*c*, and one helical slope 143*d*, and the first coupling portion 143*r* and the second coupling portion 143*s* are placed in position symmetrical with respect to the axis.

The driving force receiving portion 143*b*, the braking force receiving portion 143*c*, and the helical slope 143*d* are arranged around the above-mentioned circular hole portion 143*a* and the shaft portion 143*p*. The driving force receiving portion 143*b*, the braking force receiving portion 143*c*, and the helical slope 143*d* are located more remote than the circular hole portion 143*a* and the shaft portion 143*p* from the axis L of the drum unit.

Figure 59:
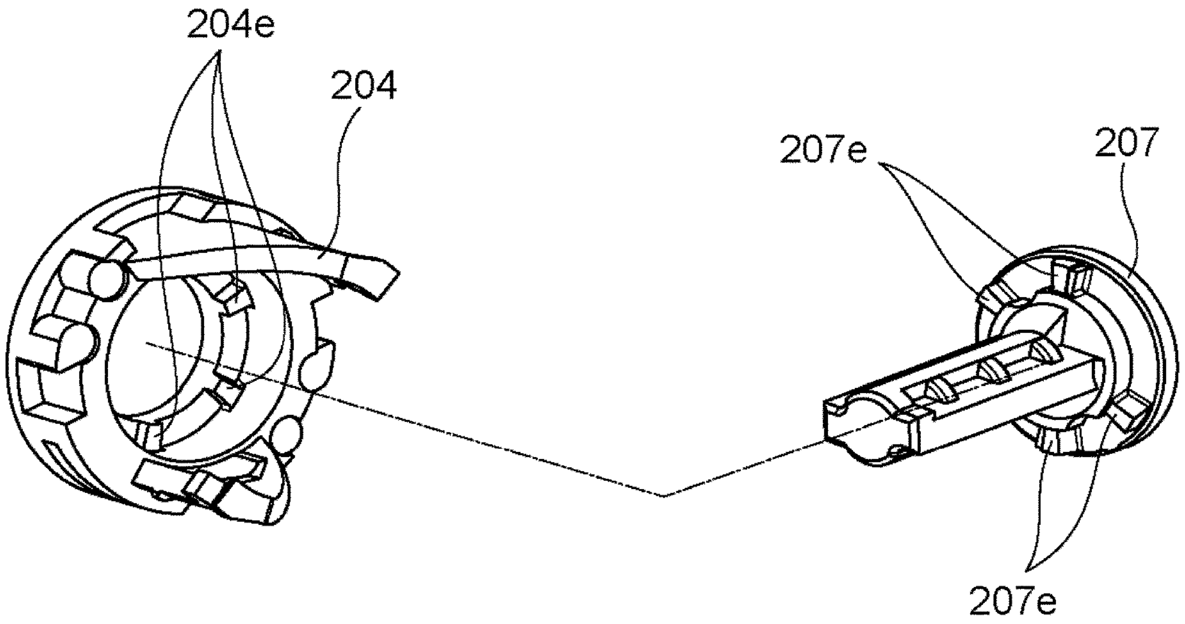
FIG. 59 is a perspective view illustrating parts of the drive transmission unit.

Next, referring to FIGS. 43, 44, and 59, the structure of the main assembly side drive transmission unit 203 provided on the main assembly side of the apparatus will be described. The drive transmission unit 203 is a unit for rotationally driving the drum coupling 143 by connecting (engaging) with the drum coupling 143.

Figure 43:
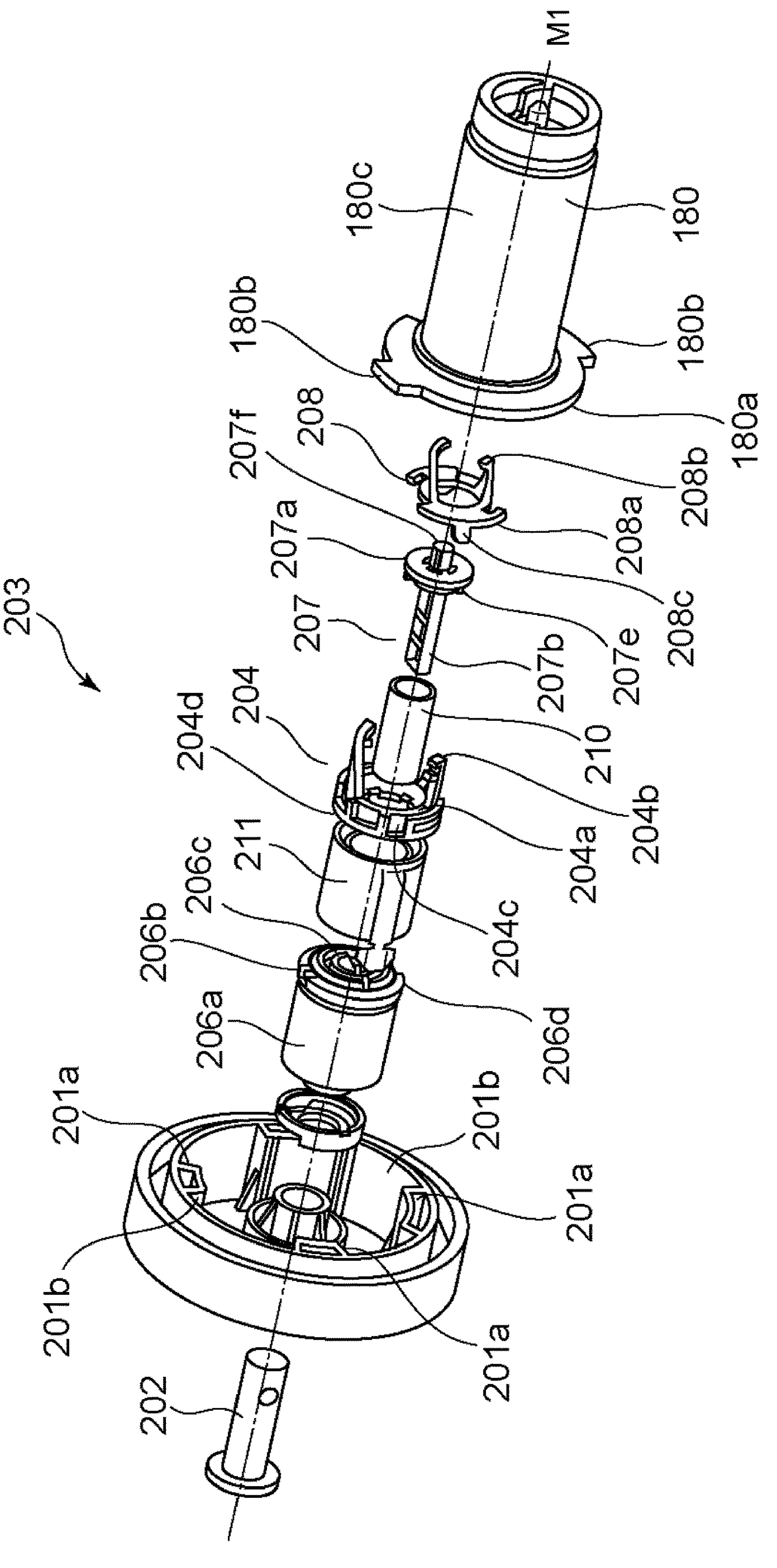
FIG. 43 is an exploded perspective view of the drive transmission unit 203.

FIG. 43 is an exploded perspective view of the main assembly side drive transmission unit 203. FIG. 59 is an enlarged perspective view of a portion shown in FIG. 43. FIG. 44 is a sectional view of the main assembly side drive transmission unit 203.

A drive gear 201 is rotatably supported by a support shaft 202 fixed to a frame (not shown) of the apparatus main assembly 170, and a driving force is transmitted from a motor (not shown) to rotate the drive gear 201. The drum drive coupling 180 includes a cylindrical portion 180*c* and a flange portion 180*a* provided at the end thereof, and the flange is fitted and supported by a fitting portion 201*a* of the drive gear 201. Further, the drum drive coupling 180 is provided with a rotation stop portion 180*b* projecting from the flange portion 180*a*, which receives a driving force when rotating in contact with the rotation stop portion 201*b* of the drive gear 201. The drive transmission unit 203 includes a plurality of components inside the cylindrical portion 180*c* of the drum drive coupling 180.

The parts arranged inside the cylindrical portion 180*c* are as follows. There are a brake members 206 which is supported and stopped by the support shaft 202, a brake transmission member 207 which is connected with the brake member 206 to transmit the braking force, and first and second braking engagement members 204 and 208 engaged with the braking force receiving surface 143*c* of the drum coupling 143, and, a brake engagement spring 211 and a drum drive coupling spring 210 which are arranged along the axis M1 and which generate an urging force in the direction of the axis M1 (axis direction). The axis M1 is a rotation axis of the main assembly side drive transmission unit 203.

The shape of each of the parts arranged inside the main assembly drive transmission unit 203 will be described. The first braking engagement member 204 comprises a cylindrical portion 204*d*, a flange portion 204*a*, and a coupling engaging portion 204*b* which projects like a claw and engages with the drum coupling 143. A part of the cylindrical portion includes a rotation stop recess 204*c* which engages with the rotation stop projection 208*c* of the second braking engagement member 208, which will be described hereinafter.

The second braking engagement member 208 includes a flange portion 208*a*, a coupling engaging portion 208*b* projecting in the form of a claw and engaging with the drum coupling 143, and the rotation stop projection 208*c* engaged with the rotation stop recess 204*c* of the first braking engagement member 204. Since the second braking engagement member 208 is stopped from rotating relative to the first braking engagement member 204, the first and second braking engagement members 204 and 208 rotate integrally with each other. Further, the first and second braking engagement members 204 and 208 are connected so as to move integrally also in the axial direction.

Therefore, the first and second braking engagement members 204 and 208 may be collectively referred to simply as braking engagement members (204, 208).

The first braking engagement member 204 is an outer braking engagement member disposed on the outer side in the radial direction, and the second braking engagement member 208 is an inner braking engagement member disposed on the inner side in the radial direction.

The brake transmission member 207 includes a flange portion 207*a* and a shaft portion 207*b*. The flange portion 207*a* is provided with a projection 207*e* which engages with the projection 204*e* provided on the flange portion 204*a* of the first braking engagement member 204. The flange portion 207*a* of the brake transmission member 207 is disposed between the flange portion 204*a* of the first braking engagement member 204 and the flange portion 208*a* of the second braking engagement member 208, with a play (gap) G therebetween in the axial direction (FIG. 44). In the axial direction M1A, when the brake transmission member 207 is in a position relative to the first brake engagement member 204 in which the projection 207*e* of the brake transmission member 207 (see FIGS. 43 and 59) is engaged with the projection 204*e* of the first brake engagement member 204, the first brake transmission member and the first and second braking engagement members 204 and 208 rotate integrally. On the other hand, when the brake transmission member 207 is in a position relative to the first braking engagement member 204 in the axial direction in which the projection 207*e* does not engage with the projection 204*e*, the brake transmission member 207 does not limit the rotation of the first and second engagement members 204, 208. That is, the first and second braking engagement members 204 and 208 are rotatable relative to the brake transmission member 207. The shaft portion 207*b* has a non-circular cross-section, and engages with the engagement hole 206*c* of the brake member 206 which will be described hereinafter so that the brake transmission member 207 and the brake member 206 are integrally rotated.

The brake member 206 is divided into two portions, namely, a fixed side 206*a* and a rotating side 206*b*, but they are integrated in the axial direction by a retainer (not shown). The fixed side 206*a* is supported by the support shaft 202, and the rotation about the shaft is also fixed. On the other hand, the rotating side 206*b* can rotate around the support shaft 202, but rotates while receiving a braking force (load) in the rotational direction from the fixed side 206*a*. The method of producing the braking force can be appropriately selected from those using friction and viscosity.

The braking engagement members (204, 208) are connected to the brake member 206 by way of the brake transmission member 207 as described above. Therefore, the rotational torque of the braking engagement members (204, 208) increases due to the influence of the load (braking force) generated by the brake member 206. The brake engagement spring 211 is a compression coil spring, and is provided so as to be sandwiched and compressed between the end surface 206*d* of the brake member 206 and the flange portion 204*a* of the first braking engagement member 204. As a result, the spring 211 applies a repulsive force (urging force, elastic force) to each of the end surface 206*d* of the brake member 206 and the flange portion 204*a* of the first braking engagement member 204.

The drum drive coupling spring 210 is a compression coil spring, and is provided so as to be sandwiched and compressed between the end surface 206*d* of the brake member 206 and the flange portion 207*a* of the brake transmission member 207. As a result, the spring 210 applies a repulsive force (urging force, elastic force) to each of the end surface 206*d* of the brake member 206 and the flange portion 207*a* of the brake transmission member 207.

The brake transmission member 207 directly receives the repulsive force of the drum drive coupling spring 210 while receiving the repulsive force of the brake engagement spring 211 by way of the flange portion 204*a* of the first braking engagement member 204. The projection 207*f* at the end of the brake transmission member 207 in the axial direction MIA abuts against the contact surface 180*f* of the drum drive coupling 180 (see FIG. 44).

By this, the drum drive coupling 180 also receives the force of the drum drive coupling spring 210 and the brake engagement spring 211 by way of the brake transmission member 207. The drum drive coupling 180 tends to move due to the force of the springs 210 and 211. Therefore, the movement of the drum drive coupling 180 in the arrow M1B direction is regulated (restricted) by the axial direction restricting portion 212 (see FIG. 44) so that the drum drive coupling 180 does not drop off the main assembly side drive transmission unit 203. Specifically, when the drum drive coupling 180 moves to the arrow M1B by a certain distance, the flange portion 180*a* (see FIG. 43) of the drum drive coupling 180 comes into contact with the restriction portion 212 (see FIG. 44). By this, the movement and drop-off of the drum drive coupling 180 can be suppressed.

When the drum drive coupling 180 receives a force in the arrow M1A direction from the outside in this state, the drum drive coupling 180 can move in the arrow M1A direction while compressing the springs 210 and 211.

Further, when the braking engagement members (204, 208) engage with the coupling 143, the coupling engaging portions 204*b*, 208*b* may interfere with the coupling 143 (see FIG. 60, details will be described hereinafter). In such a case, the braking engagement members (204, 208) can enter (retract) into the depth of the drive transmission unit 203 while compressing the springs 210 and 211 in the direction of the arrow M1A (see FIG. 61).

The braking engagement members (204, 208) are disposed with a gap G from the brake transmission member 207 as described above (see FIG. 44). Within a range of the width of the gap G, the braking engagement members (204, 208) can move and retract in the M1A direction relative to the brake transmission member 207. Similarly, the braking engagement members (204, 208) can move in the direction of the arrow M1A within the range of the width of the gap G relative to the drum drive coupling 180. When the braking engagement member (204, 208) moves in the direction of the arrow M1A relative to the brake transmitting member 207 and the drum drive coupling 180, the brake engagement spring 211 is compressed.

The brake transmitting member 207 is also moved in the direction of arrow M1A together with the braking engagement member (204, 208), by the braking engagement member (204, 208) contacting the brake transmitting member 207 which tends to move in the direction of the arrow M1A beyond the width of the gap G.

Figure 62:
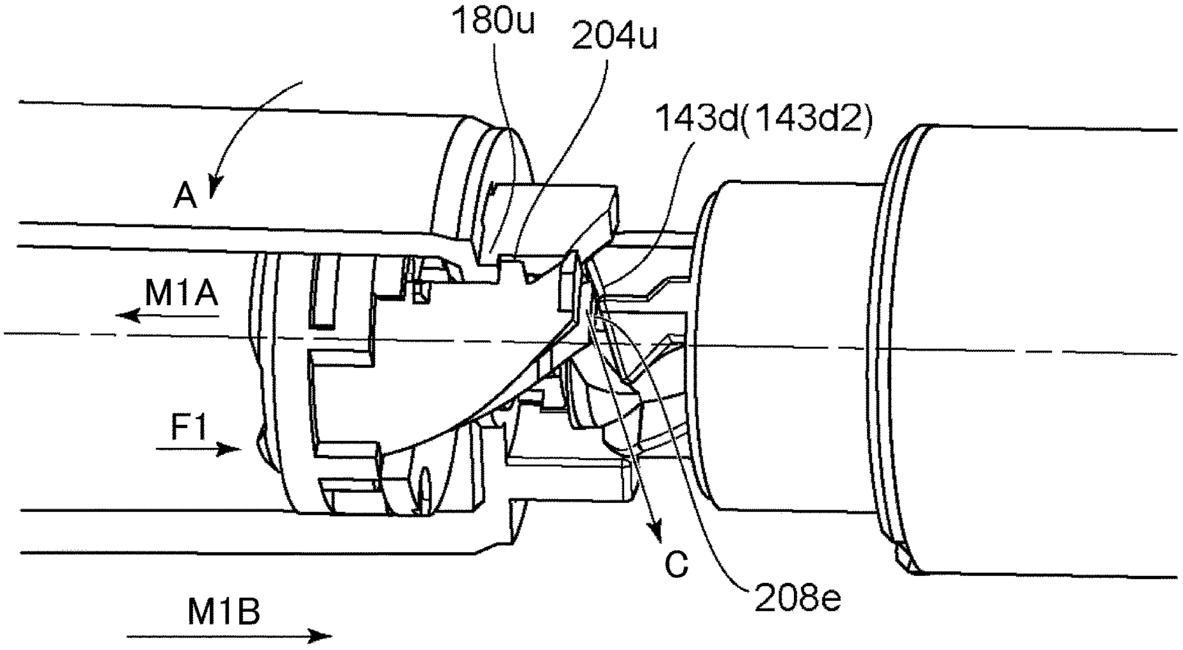
FIG. 62 is a perspective view of the drive transmission unit and the drum unit.

Together with the braking engagement members (204, 208), the drum drive coupling 180 also moves in the direction of arrow M1A. As shown in FIG. 62, the drum drive coupling 180 and the first braking engagement member 204 are provided with a projecting engaging portion 180*u* and an engaging portion 204*u*, respectively. Therefore, when the braking engagement member 204 moves in the direction of the arrow M1A relative to the drum drive coupling 180 for a predetermined distance or more, the engaging portion 204*u* pushes the engaging portion 180*u* to retract the drive coupling 180 in the M1A direction. At this time, not only the spring 211 but also the spring 210 is compressed.

When the braking engagement member (204, 208) moves in the direction of the arrow M1A relative to the brake transmission member 207, the projection 207*e* of the brake transmission member 207 and the projection 204*e* of the first braking engagement member are disengaged. That is, the braking engagement members (204, 208) are disconnected from the brake transmission member 207, and the braking force is not transmitted from the brake transmission member 207. The brake members (204, 208) can rotate relative to the brake transmission member 207 without receiving the rotational load produced by the brake member 206.

That is, by retracting the braking engagement members (204, 208) in the direction of arrow M1A, the braking engagement members are movable from the position in which the brake member 206 receives the rotational load (braking force) during rotation to the position in which the rotational load is not received during rotation. The braking engagement members (204, 208) are structured to reduce the own required torque by moving in the MIA direction relative to the brake transmission member 207 and to the drum drive coupling 180.

Figure 45:
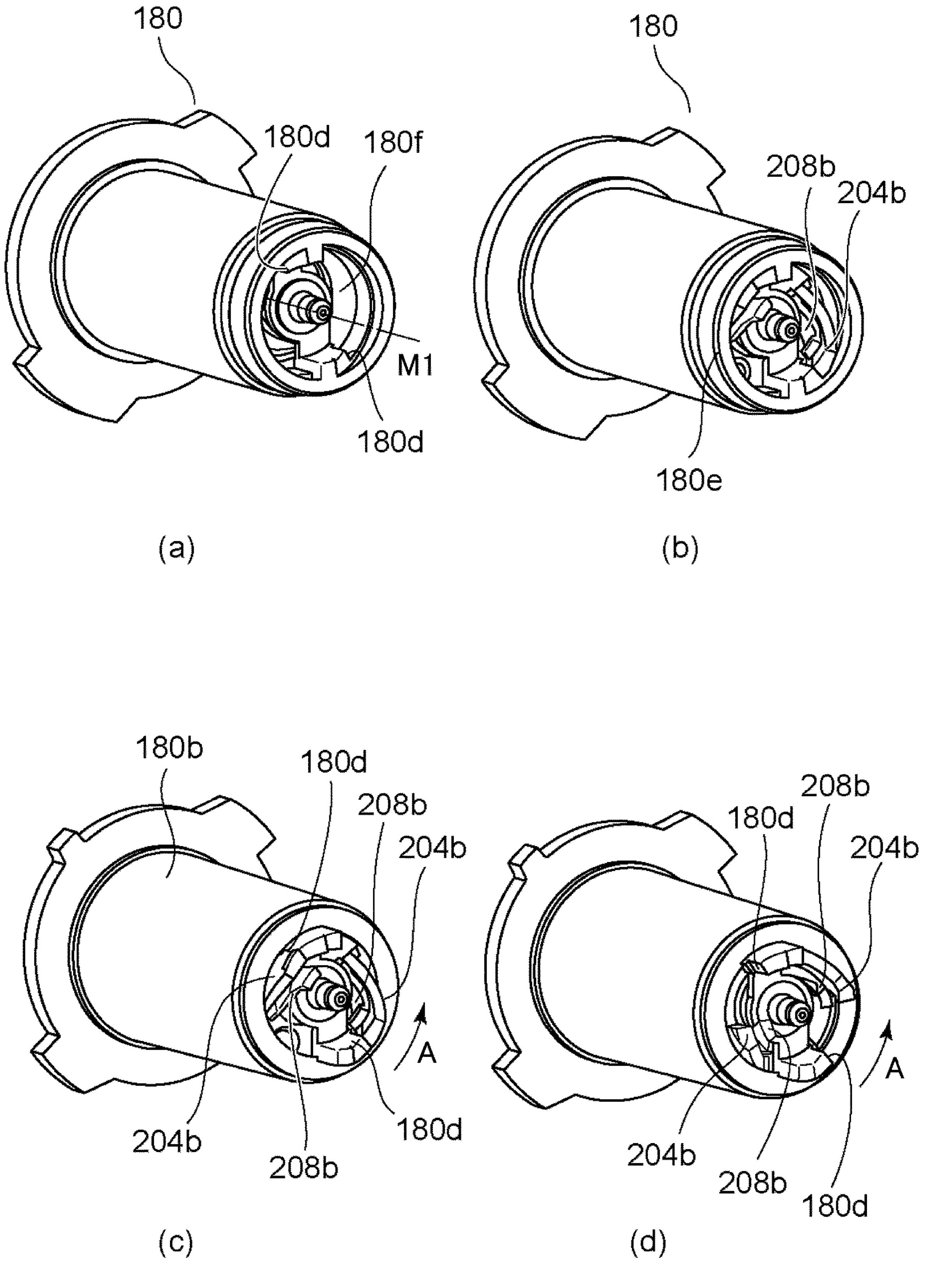
FIG. 45 is a perspective view of the drive transmission unit 203.

FIG. 45 is a perspective view illustrating the positional relationship between the drum drive coupling 180 and the braking engagement members (204, 208). Part (a) of FIG. 45 is a perspective view of only the drum drive coupling 180, and part (b) of FIG. 45 shows a perspective view in which both the drum drive coupling 180 and the braking engagement member (204, 208) are included. Parts (c) and (d) of FIG. 45 are illustrations in which the reinforcing cylindrical portion 180*e* of the drum drive coupling 180 is not shown (invisible) for the sake of better illustration. The phases of the braking engagement members (204, 208) differ between parts (c) and (d) of FIG. 45.

As shown in part (a) of FIG. 45, the drum drive coupling (driving force applying member) 180 includes a driving transmission surface 180*d* provided at each of two positions which are away from each other by 180 degrees in the circumferential direction as a surface (driving force applying portion) which engages with the coupling 143 to transmit the driving force. The drum drive coupling has an axisymmetric shape.

A through hole 180*f* communicating in the direction of the axis M1 is provided in a portion other than the drive transmission surface 180*d*. Through the through hole 180*f*, the coupling engaging portions 204*b* and 208*b* of the first braking engagement member 204 and the second braking engagement member 208 are exposed in the direction facing the coupling 143 (see FIG. 60).

Part (b) of FIG. 45 shows a state in which the coupling engaging portions 204*b* and 208*b* of the first braking engagement member 204 and the second braking engagement member 208 are exposed. The drum drive coupling 180 is provided with a reinforcing cylindrical portion 180*e* in order to increase the rigidity of the drive transmission surface 180*d*. Part (c) of FIG. 45 is an illustration in which the reinforcing cylindrical portion 180*e* is not shown for the sake of better illustration. Part (c) of FIG. 45 shows a state in which the coupling engaging portions 204*b* and 208*b* and the drive transmission surface 180*d* are in a close phase relationship in the rotational direction A. The size of the through hole 180*f* is selected to be wider than the widths of the coupling engaging portions 204*b* and 208*b* in the circumferential direction. Therefore, the coupling engaging portions 204*b* and 208*b* can move within a predetermined range in the rotational direction in the drum drive coupling 180.

Part (d) of FIG. 45 shows a state in which the coupling engaging portions 204*b* and 208*b* and the drive transmission surface 180*d* are in a distant phase relationship in the rotational direction A.

Next, referring to FIGS. 1 and 43 to 51, a method of connecting the main assembly side drive transmission unit 203 of the drive transmission mechanism and the photosensitive member coupling 143 on the process cartridge 100 side will be described.

[Coupling Engagement Operation]

Next, the process of coupling between the main assembly side drum drive coupling 180 of the image forming apparatus main assembly 170 and the drum coupling 143 of the process cartridge 100 will be described.

Figure 46:
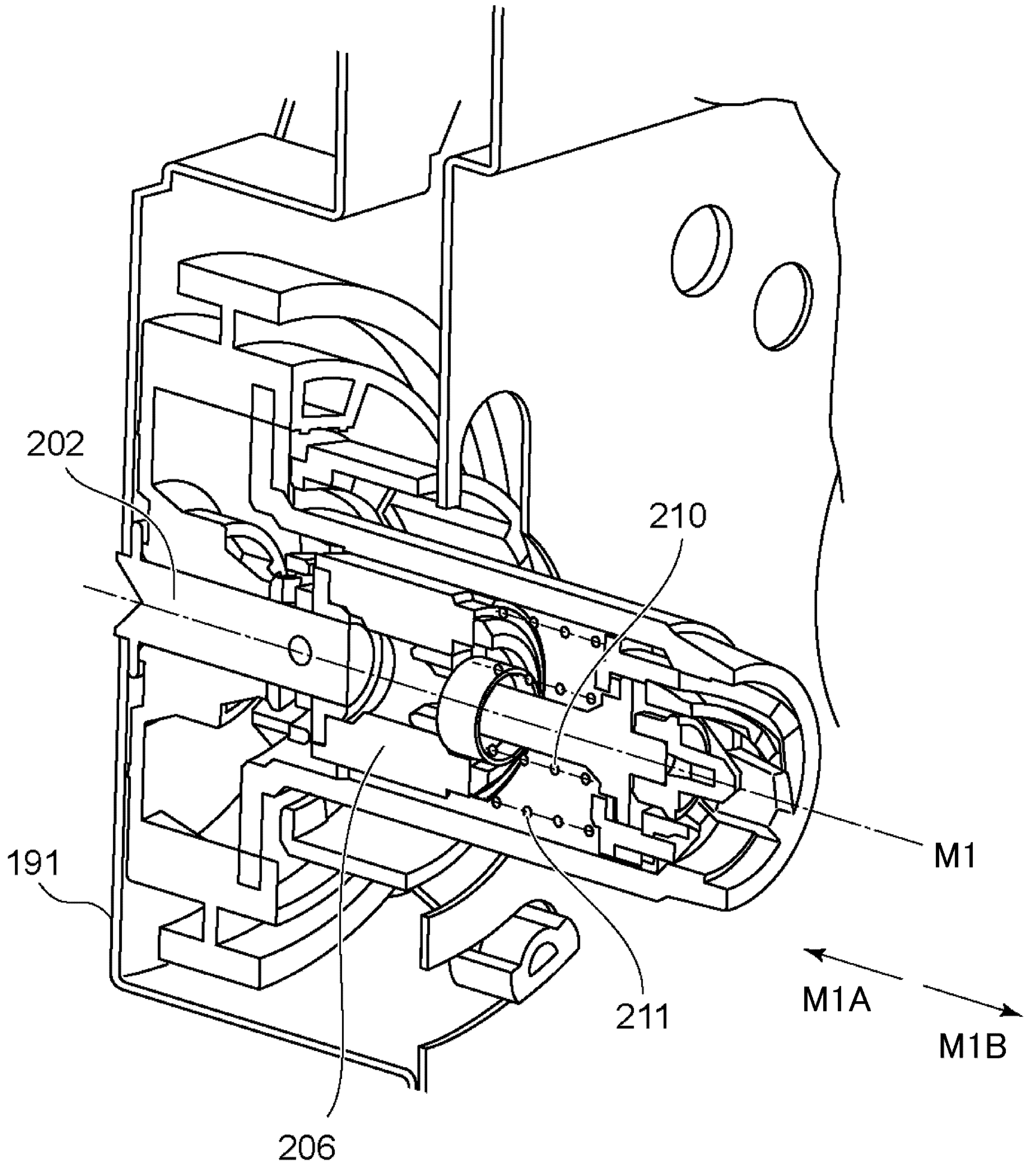
FIG. 46 is a sectional perspective view of the main assembly of the device including the drive transmission unit 203.

FIG. 46 shows a sectional view of the image forming apparatus main assembly 170 around the main assembly side drum drive coupling 180. Referring to FIG. 46, the outline of the movement of the drum drive coupling 180 on the main assembly side will be described.

When the user opens the front door 111 (FIG. 4) of the image forming apparatus main assembly to replace the process cartridge 100, the drive transmission unit 203 is moved in the direction of the arrow MIA along the axis M1 by a link mechanism (not shown) connected to the front door 111. That is, the drive transmission unit 203 is in a state of being moved away from the process cartridge 100 and the drum coupling 143 (see FIG. 60).

When the user mounts the process cartridge 100 and closes the front door 111, the action of the link described above disappears. Therefore, the drum drive coupling 180, the brake engagement members 204, 208, and the brake transmission member 207 tends to move again in the direction of arrow M1B by the urging forces of the drum drive coupling spring and the brake engagement spring 211. At this time, the drum coupling 143 of the process cartridge 100 stands by in the direction of the arrow M1B and interferes with the approaching drive transmission unit 203 (states shown in FIGS. 61, 65, and 69). The drum coupling 143 and the drive transmission unit 203 are pressed against each other.

In these states, the drum coupling 143 and the drum drive coupling 180 of the drive transmission unit 203 are normally not engaged.

In order for the drum coupling 143 and the main assembly side drum drive coupling 180 to be in a normal engaged state, the drive transmission unit 203 is required to be further rotated from the above-mentioned pressing state. That is, it is necessary to advance the drive process of the drive transmission unit 203 until the drum drive coupling 180 on the main assembly side engages with the drum coupling 143.

Further, the process until the engagement is completed may be carried out in different patterns, and therefore, the description will be made, dividing into a plurality of cases depending on the phase of the drum coupling 143 and the main assembly side drum drive coupling 180.

Figure 47:
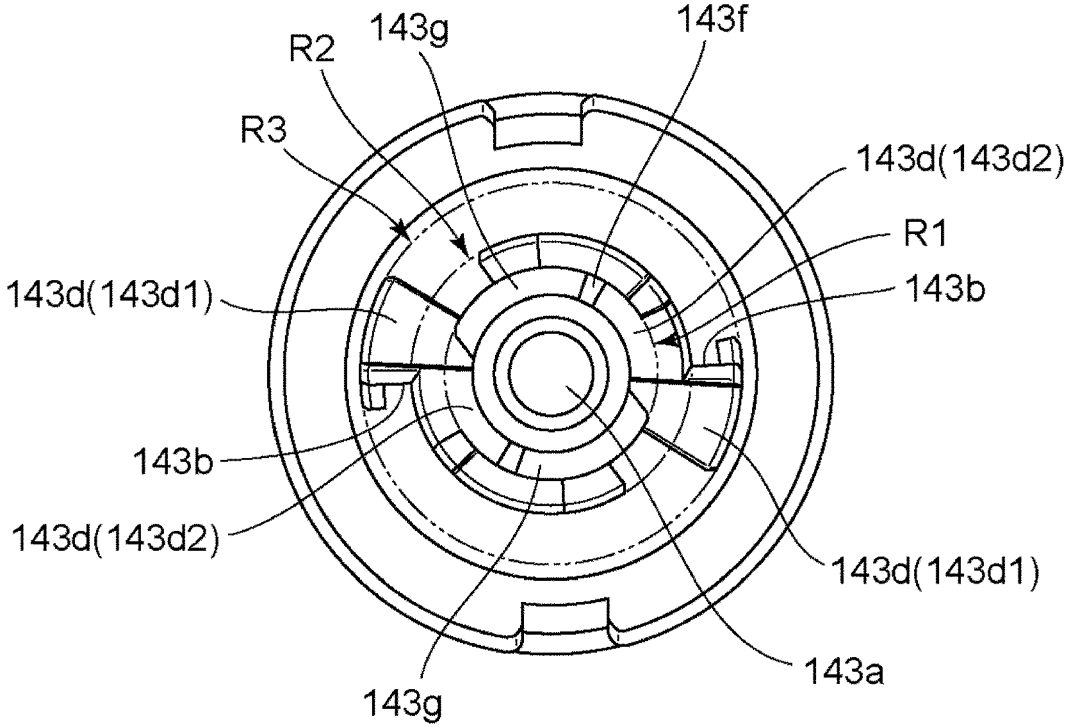
FIG. 47 is a front view of the drive transmission unit 203 and the drum coupling 143.
Figure 47:
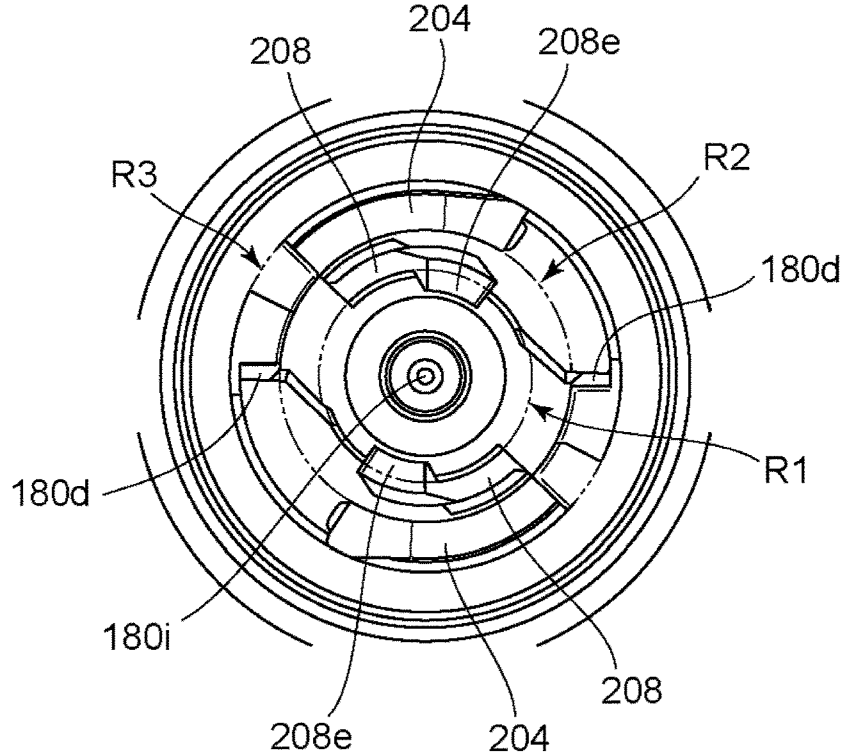

Part (a) of FIG. 47 shows the drum coupling 143, and part (b) of FIG. 47 shows the drive transmission unit, both as viewed in the axial direction. Referring to part (a) of FIG. 47, The shape of the coupling 143 will be further described. As for the profile of the coupling, the shape differs in the radial direction, depending on the functions to perform. The following structures are provided within the range of the radius indicated by R1 in the Figure.

That is, the positioning hole (opening) 143*a* which engages with the positioning boss (positioning portion) 180*i* of the drive coupling 180, a visor (visor portion) 143*g* (see part (a) of FIG. 47 and FIG. 1) as a overhang portion for preventing the drive transmission unit 203 from entering in the axial direction and a part of the helical slope 143*d* are provided. A part of the helical slope 143*d* and a part of the braking force receiving surface 143*c* are provided in the range between R1 to R2. The braking force receiving surface 143*c* is not visible in the line-of-sight direction of part (a) of FIG. 47 and is shown in FIG. 1. In the range between R2 to R3, a part of the driving force receiving portion 143*b*, a part of the helical slope 143*d*, and a part of the braking force receiving surface 143*c* are provided.

On the other hand, since the shape of the drive transmission unit 203 is also arranged in a shape including a different role in the radial direction, the same range as the coupling 143 is shown in part (b) of FIG. 47 using the same symbols R1 to R3.

Within the range of the radius indicated by R1 in part (b) of FIG. 47, the positioning boss 180*i* that engages with the positioning hole 143*a* of the drum coupling 143 and the second brake that comes into contact with the visor portion 143*g* depending on the phase of the drum coupling 143. An inward projection 208*e*, which is a portion of the coupling engaging portion 208*b* of the engaging member 208, is arranged. Within the range indicated by R1 to R2, the coupling engaging portion 208*b* of the second braking engagement member 208 is arranged. The drive transmission surface 180*d* and the first braking engagement member 204 are arranged within the range indicated by R2 to R3.

Figure 48:
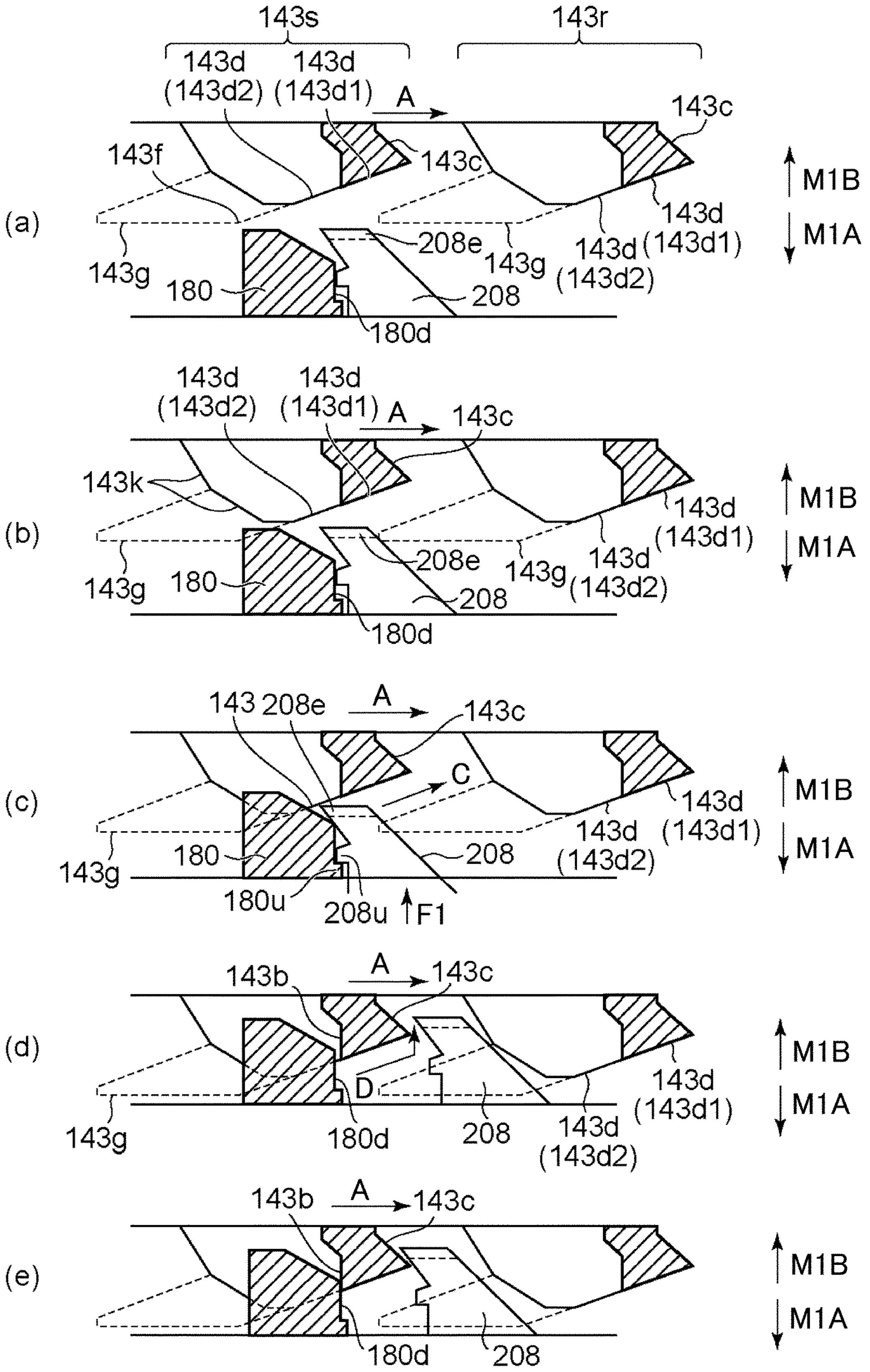
FIG. 48 is a developed view illustrating engagement of the drum coupling.

FIG. 48 is a developed view of these portions developed around the rotation axis M1. FIG. 48 The process until the drum coupling 143 and the drive transmission unit 203 are engaged with each other will be described.

FIG. 48 shows the drive transmission unit 203 on the lower side and shows the process of approaching the drum coupling 143 while moving in the direction of the arrow M1B until the engagement is established. In this Figure, the structures provided within the radius R1 shown in FIG. 47 are shown by broken lines, the structures provided within the range between the radius R1 and the radius R2 are shown by solid lines, and further, the structures provided in the range between the radius R2 to radius R3 are shown by solid lines and hatching lines.

The drum coupling 143 includes two coupling portions 143*s* and 143*r* arranged 180° apart from each other, but only the coupling portion 143*s* will be described below for the sake of simplicity. The description of the coupling portion 143*s* also applies to the coupling portion 143*r*.

Part (a) of FIG. 48 shows a state in which the drive transmission surface 180*d* of the drive transmission unit 203 and the second braking engagement member 208 are in close to each other. As shown in part (a) of FIG. 48, the phases of the inclination start portion 143*f* of the drum coupling 143 and the inward projection 208*e* of the second braking engagement member 208 have the following relationship. That is, the inclination start portion 143*f* of the drum coupling 143 is on the upstream side of the projection 208*e* in the rotational direction (arrow A).

Part (b) of FIG. 48 shows a state in which the drive transmission unit 203 is further moved in the direction of arrow M1B from the position shown in part (a) of FIG. 48. The helical slope 143*d* is opposed to and is in contact with the inward projection 208*e* of the approaching first braking engagement member 204.

Part (c) of FIG. 48 shows a state in which the drive transmission unit 203 is further moved in the direction of the arrow M1B. The helical slope 143*d* stops the approaching second braking engagement member 208. By this, the movement of the second braking engagement member 208 in the M1B direction is suppressed. On the other hand, the portion excluding the second braking engagement member 208 (that is, the drum drive coupling 180 of the drive transmission unit 203, and so on) is moving in the direction of arrow M1B. In the drive transmission unit 203, the second braking engagement member 208 is in a state of being relatively pushed in the direction of the arrow M1A.

Figure 44:
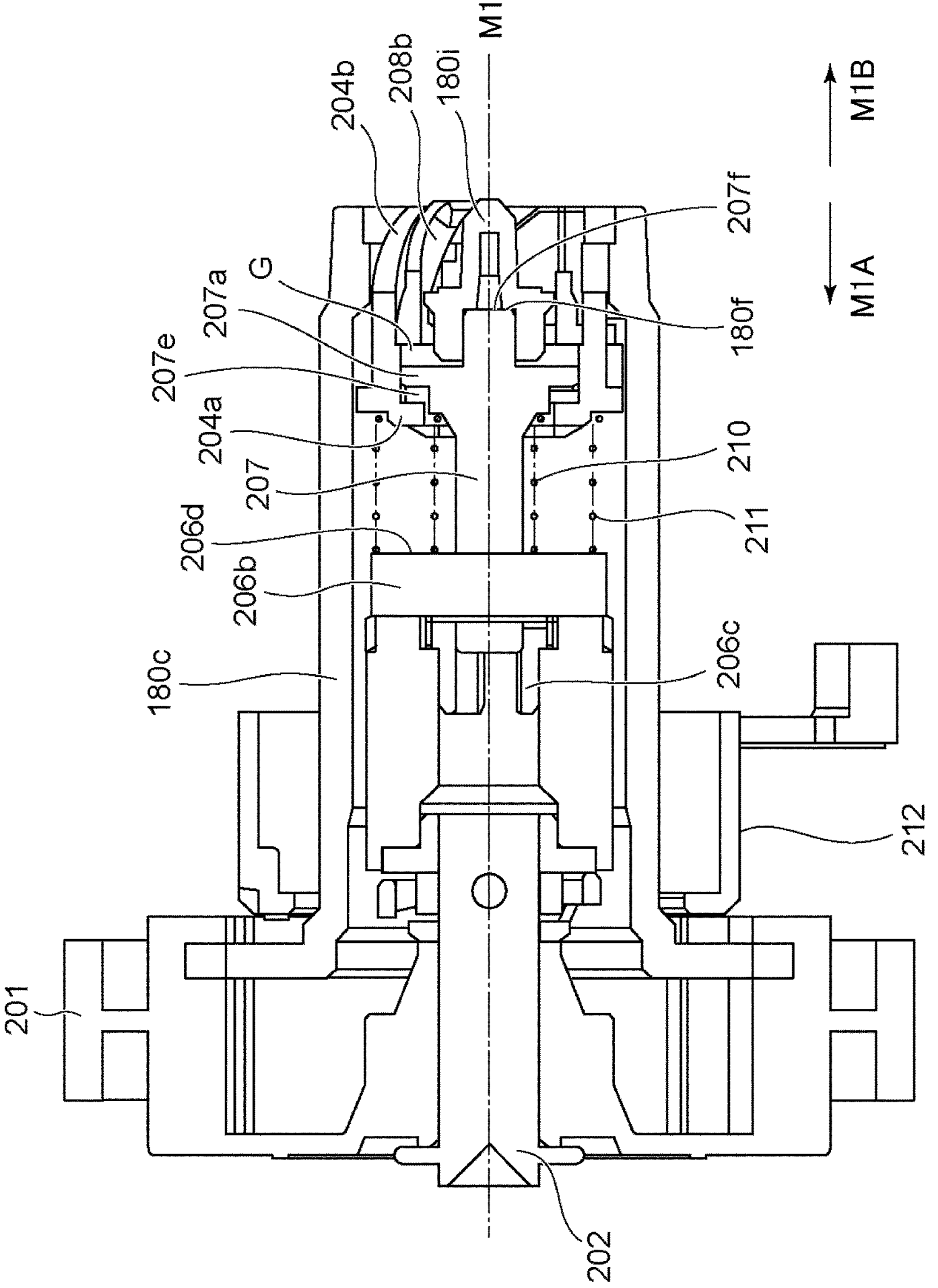
FIG. 44 is a sectional view of the drive transmission unit 203.

In this state reached, as described referring to FIG. 44, the second braking engagement member 208 can rotate without receiving a rotational load because of being disconnected from the brake member 206. At this time, the brake member 206 receives an elastic force F1 in the direction of the rotation axis M1 by the drum drive coupling spring 210 and the brake engagement spring 211 provided inside the drive transmission unit 203. The helical slope 143*d* moves the second braking engagement member 208, which becomes free of rotational load, in the direction of arrow C by the component force of the elastic force F1. That is, the second braking engagement member 208 moves to the downstream side in the rotational direction A along the helical slope 143*d*.

Part (d) of FIG. 48 shows a state immediately after the second braking engagement member 208 is moved to the downstream side in the rotational direction (direction of arrow A). The second braking engagement member 208 moves along the helical slope 143*d* of the drum coupling 143, and further moves in the M1B direction by the amount of the entire drive transmission unit 203 moving in the axial direction M1B, so that movement trace is as depicted by the arrow D. As a result, the second braking engagement member 208 moves away from the drive coupling 180 toward the downstream side in the rotational direction A to the position in which it is engageable with the braking force receiving portion 143*c* (second side surface, second side portion) of the drum coupling 143. That is, the helical slope 143*d* is a guide for guiding the braking engagement member toward the braking force receiving portion 143*c*. In this embodiment, the helical slope (top surface) 143*d*, which is a guide, has a downstream portion 143*d*1 and an upstream portion 143*d*2. The downstream portion (downstream side slope, downstream side top surface, downstream side inclined portion) 143*d*1 is placed between the braking force receiving portion 143*c* and the driving force receiving portion 143*b*. The upstream side portion (upstream side slope, upstream side top surface, upstream side inclined portion) 143*d*2 is on the upstream side in the rotational direction (A direction) with respect to the driving force receiving portion 143*b*. Therefore, the second braking engagement member 208 can be smoothly guided from the upstream side portion 143*d*2 of the slope 143*d* to the braking force receiving portion 143*c* by way of the downstream side portion 143*d*1.

Part (e) of FIG. 48 shows a state in which the drum coupling 143 moves (rotates) in the direction of arrow A by the rotating drive transmission surface 180*d*, and as a result, the braking force receiving portion 143*c* contacts the second braking engagement member 208.

When the drive transmission unit 203 rotates in the direction of arrow A, the drive transmission surface 180*d* comes into contact with the drive force receiving portion 143*b* to transmit the drive force. The drive transmission surface 180*d* is a drive force applying portion which applies a drive force to the drum coupling 143.

The drum coupling 143 being rotated by receiving the driving force from the driving transmission surface 180*d* also receives the braking force by the braking force receiving portion 143*c* contacting (engaging) the second braking engagement member 208.

Parts (a) to (e) of FIG. 48 show only the second braking engagement member 208 out of the first and second braking engagement members 204 and 208 which are the braking engagement members. However, the first braking engagement member 204 (see FIG. 43) is connected to the second brake member 208 so as to move integrally with the second brake member 208. Therefore, in the process shown in part (a) of FIG. 48 to part (e) of FIG. 48, the first braking engagement member 204 also moves along the same line as the second brake member 208. In the state shown in part (e) of FIG. 48, the first braking engagement member 204 also engages with the braking force receiving portion 143*c* together with the second braking engagement member 208.

In part (a) to (e) of FIG. 48, only the engagement process of the braking engagement member (204, 208) and the drum drive coupling 180 with the coupling portion 143*s* are shown for simplicity of the description. Similarly to the coupling portion 143*s*, the coupling 143*r* also engages with the braking engagement member (204, 208) and the drum drive coupling 180. The engagement state of the braking engagement members (204, 208) and the drum drive coupling with respect to the coupling 143*r* is shown in part (a) of FIG. 76.

Here, in order to help the recognition of the process described so far, the description will be made again using the perspective views of FIGS. 60 to 64. In FIGS. 60 to 64, a part of the drum drive coupling 180 is not shown for better illustration, and the internal shapes are uncovered.

Figure 60:
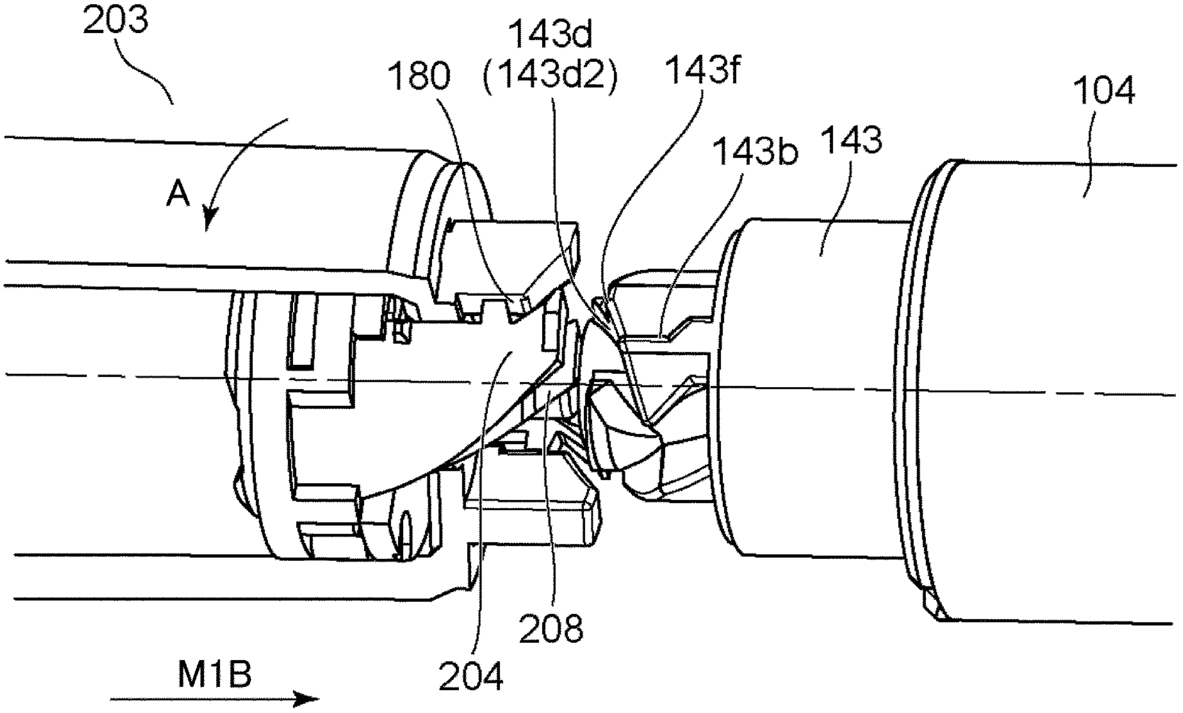
FIG. 60 is a perspective view of the drive transmission unit and the drum unit.
Figure 61:
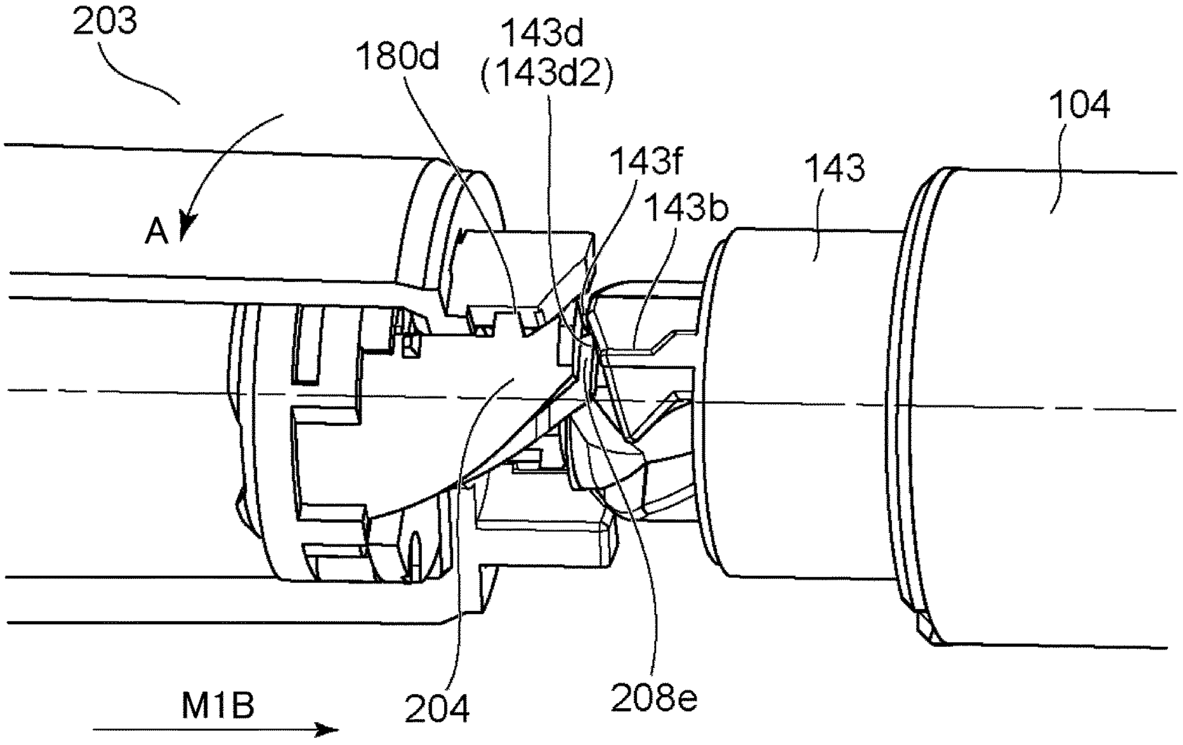
FIG. 61 is a perspective view of the drive transmission unit and the drum unit.

FIG. 60 is a perspective view illustrating the same state as in part (a) of FIG. 48 described above. That is, the inclination start portion 143*f* of the drum coupling 143 is on the upstream side of the projection 208*e* in the rotational direction (arrow A), and the drive transmission surface 180*d* of the drive transmission unit 203 and the second braking engagement member 208 are close to each other. FIG. 61 shows a state in which the drive transmission unit 203 has moved in the direction of arrow M1B from this state.

FIG. 61 shows a state corresponding to part (b) of FIG. 48, and the helical slope 143*d* is opposed to and is in contact with the inward projection 208*e* of the approaching second braking engagement member 208. The drive transmission unit 203 and the drum coupling 143 are relatively close to each other until they come into contact with each other, but the state inside the drive transmission unit 203 has not changed. FIG. 62 shows a state in which the drive transmission unit 203 is further moved in the direction of arrow M1B from this state.

FIG. 62 shows a state corresponding to part (c) of FIG. 48, in which the helical slope 143*d* stops the approaching second braking engagement member 208. By this, in the drive transmission unit 203, the second braking engagement member 208 is pushed in the direction of the arrow MIA relative to the drum drive coupling 180.

In this state, as described referring to FIG. 44, the second braking engagement member 208 can rotate without receiving a rotational load because of being disconnected from the brake member 206. At this time, the brake member 206 receives an elastic force F1 in the direction of the rotation axis M1 by the drum drive coupling spring 210 and the brake engagement spring 211 arranged inside the drive transmission unit 203. The helical slope 143*d* moves the second braking engagement member 208, which becomes free of rotational load, in the direction of arrow C by the component force of the elastic force F1. That is, the second braking engagement member 208 rotationally moves to the downstream side in the rotational direction A along the helical slope 143*d*.

Figure 63:
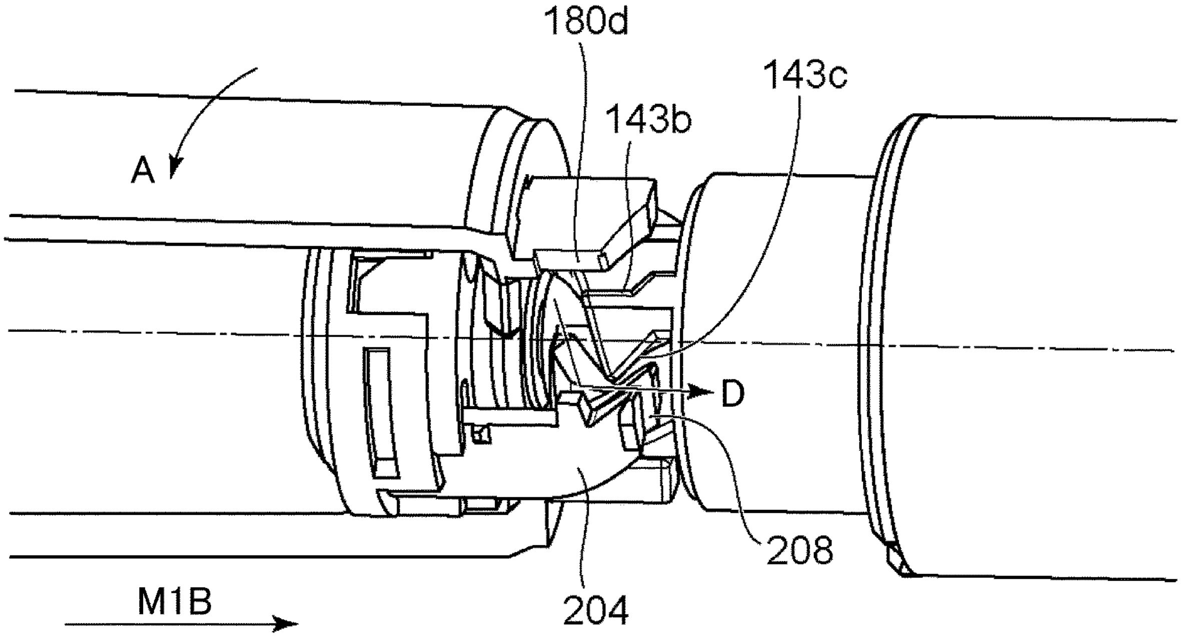
FIG. 63 is a perspective view of the drive transmission unit and the drum unit.

FIG. 63 shows a state immediately after the second braking engagement member 208 moves to the downstream side in the rotational direction (direction of arrow A), and corresponds to part (c) of FIG. 48. The second braking engagement member 208 moves along the helical slope 143*d* of the drum coupling 143, and further moves in the M1B direction by the amount of movement of the entire drive transmission unit 203 in the axial direction M1B direction, the trace of the movement is as indicated by the arrow D. As a result, the braking engagement members (204, 208) move away from the drive coupling 180 toward the downstream side in the rotational direction A to the position in which they can engage with the second side surface (braking force receiving portion 143*c*) of the drum coupling 143. At this position reached, the braking engagement members (204, 208) return to a state where braking force can be produced.

Figure 64:
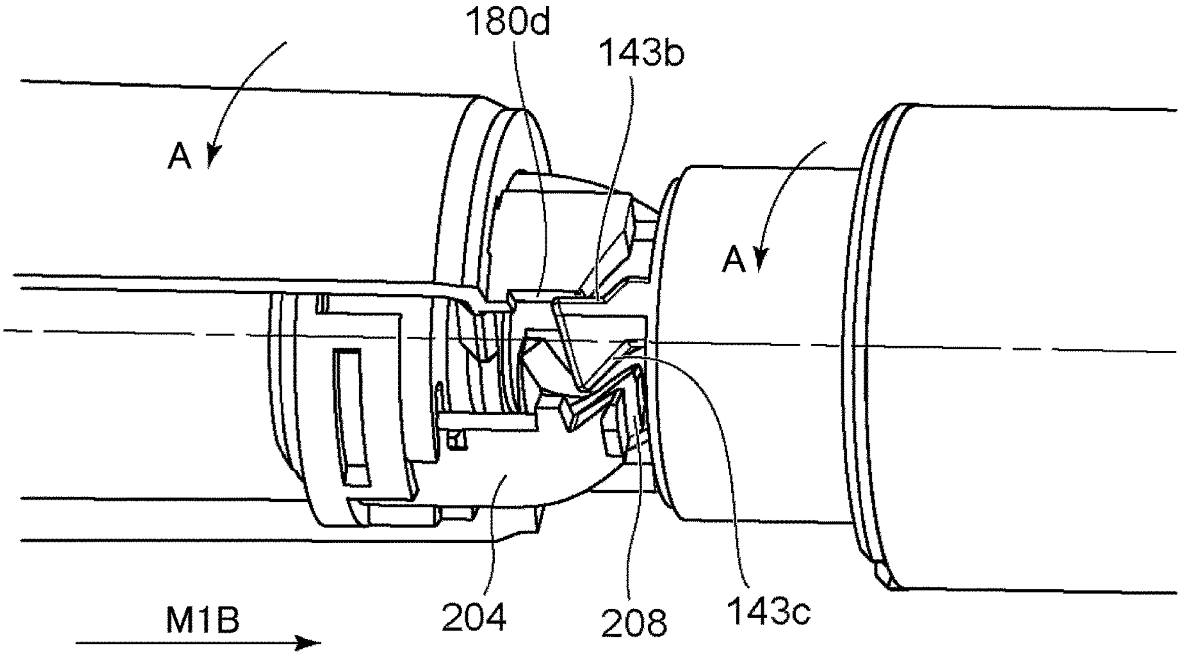
FIG. 64 is a perspective view of the drive transmission unit and the drum unit.

FIG. 64 shows a state in which the drum coupling 143 is moved (rotated) in the direction of arrow A by the rotating drive transmission surface 180*d*, and as a result, the braking force receiving portion 143*c* contacts the second braking engagement member 208. FIG. 64 corresponds to part (d) of FIG. 48.

When the drum drive coupling 180 of the drive transmission unit 203 rotates in the direction of arrow A from the state of FIG. 64, the drive transmission surface 180*d* comes into contact with the drive force receiving portion 143*b* to transmit the drive force. The drum coupling 143 being rotated by receiving the driving force from the driving transmission surface 180*d* also receives the braking force by the braking force receiving portion 143*c* contacting (engaging with) the second braking engagement member 208 (see part (e) of FIG. 48).

In summary, through the processes shown in parts (a) to (e) of FIG. 48 and FIGS. 60 to 64, the braking engagement members (204, 208) are moved relative to the drum drive coupling 180 and the drum coupling 143 as follows.

The braking engagement member (204, 208) is moved from the position (part (a) of FIGS. 48 and 60 in which it is close to the drive transmission surface 180*d* to the position (part (d) of FIGS. 48 and 64) in which the drum coupling 143 is sandwiched between the drive transmission surface 180*d* and the braking engagement member (204, 208).

When the drive transmission surface 180*d* rotates from the state shown in part (d) of FIG. 48 and FIG. 64, the drum coupling 143 also rotates together with the drive transmission surface 180*d* to reach the state shown in part (e) of FIG. 48. Then, the drum coupling 143 rotates in the direction of arrow A by the driving force received from the drum driving side coupling 180 while receiving an appropriate load (braking force) from the braking engagement member (204, 208). As a result, the torque required for the drum drive coupling 180 to rotate the drum unit is not too light and is appropriate, so that the rotational drive of the drum unit is stabilized.

Next, referring to part (a) to (e) of FIG. 49, another pattern of the engagement process of the drum drive coupling 180 and the braking engagement member (204, 208) with the drum coupling 143 will be described. The drum coupling 143 has two coupling portions 143*s* and 143*r*, but for the sake of simplicity, only the coupling portion 143*s* will be described.

As shown in part (a) of FIG. 49, a case where the phases of the inclination start portion 143*f* of the drum coupling 143 and the inward projection 208*e* of the second braking engagement member satisfy the following relationship will be described. That is, the case where the inclination start portion 143*f* of the drum coupling 143 is on the downstream side in the rotational direction (arrow A) with respect to the inward projection 208*e*.

Figure 49:
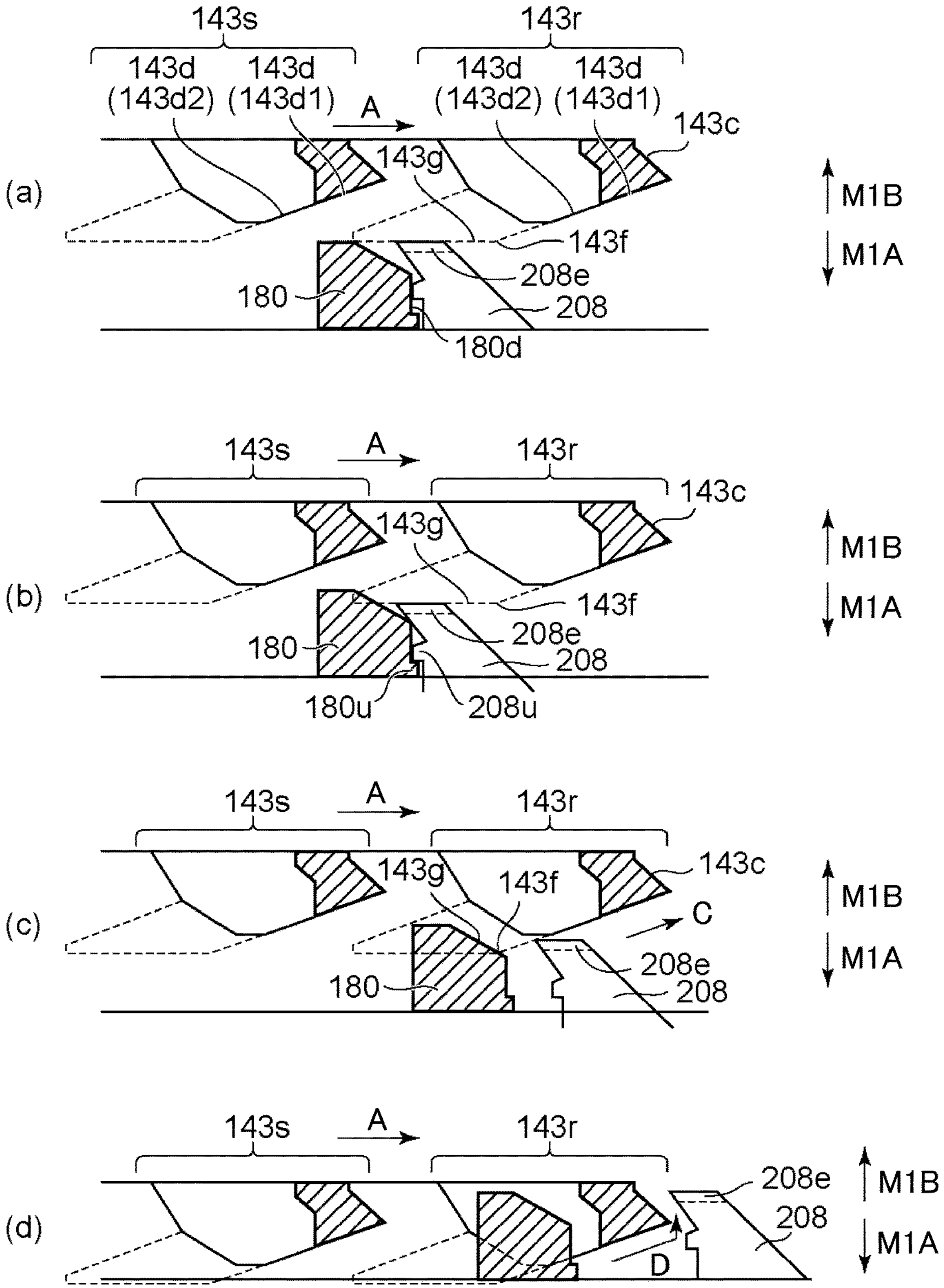
FIG. 49 is a developed view illustrating the engagement of the drum coupling.

Part (a) of FIG. 49 shows a state in which the drive transmission surface 180*d* of the drive transmission unit 203 and the second braking engagement member 208 are close to each other.

The visor portion 143*g* of the drum coupling 143 is in contact with the inward projection 208*e* of the second braking engagement member 208 approaching in the M1B direction.

Next, part (b) of FIG. 49 shows a state in which the visor portion 143*g* stops (blocks) the advancement of the approaching second braking engagement member 208. Here, the drum drive coupling 180, which is a component of the drive transmission unit 203, does not contact the visor portion 143*g*, and therefore, the advancement in the M1B direction cannot be stopped. That is, the visor portion 143*g* does not interfere with the shape of the drum drive coupling 180 because the position thereof is different in the radial direction. On the other hand, the second braking engagement member 208 has an inward projection 208*e* at the free end in the M1B direction. Since the inward projection 208*e* projects inward in the radial direction, it is in contact with the visor portion 143*g* of the drum coupling 143.

By the movement of only the drum drive coupling 180 in the M1B direction, the second braking engagement member 208 moves relative to the drum drive coupling 180 in the MIA direction. As described above, by this relative movement, the second braking engagement member 208 shifted to a state in which it can rotate without receiving a rotational load.

Then, part (c) of FIG. 49 shows a state in which the drive transmission unit 203 has started to rotate in the rotational direction A. First, when the drum drive coupling 180 starts rotating in the A direction, it is pushed by the drum drive coupling 180, and the second braking engagement member 208 also starts rotating in the A direction.

The helical slope 143*d* of the drum coupling 143 moves the second braking engagement member in the direction of arrow C from the point where the inward projection 208*e* of the second braking engagement member 208 passes the inclination start portion 143*f*. That is, the second braking engagement member 208 moves toward downstream side in the rotational direction A and in the M1B direction.

Part (d) of FIG. 49 shows a state after the second braking engagement member 208 moves along the helical slope 143*d* of the drum coupling 143 and passes the inclined surface 143*d* as in part (d) of FIG. 48. At this time, the entire drive transmission unit 203 further moves in the axial direction M1B. As a result, the second braking engagement member also moves in the M1B direction. The first braking engagement member 204 moves along the line of arrow D.

Subsequent engagement operation is the same as in the description of part (d) of FIG. 48, and the subsequent engagement completion state is as shown in part (e) of FIG. 48. In this embodiment, visor portion 143*g* is continuous with on the upstream side (upstream side slope, upstream side top surface) 143*d*2 of the helical slope 143*d*. The inclination start portion 143*f* is a boundary portion between the visor portion 143*g* and the helical slope 143*d*. Therefore, the second braking engagement member 208, the movement of which has been blocked by the visor portion 143*g*, can smoothly shift to a state of being in contact with the helical slope 143*d*, as the drive transmission unit 203 rotates. However, the structure is not necessarily limited to this example structure, and a space may be provided between the visor portion 143*g* and the slope 143*d*.

Also in part (a) of FIG. 49 to part (d) of FIG. 49, only the second braking engagement member 208 of the braking engagement members (204, 208) is shown. However, as described above, also in the process of part (a) of FIG. 49 to part (d) of FIG. 49, the first braking engagement member 204 (see FIG. 43) moves integrally with the second braking engagement member 208.

Here, in order to help the recognition of the process described referring to part (a) of FIG. 49 to part (d) of FIG. 49, the description will be made again with reference to the perspective views of FIGS. 65 to 68. In FIGS. 65 to 68, a part of the drum drive coupling 180 is not shown for better illustration, and the internal shape is uncovered.

Figure 65:
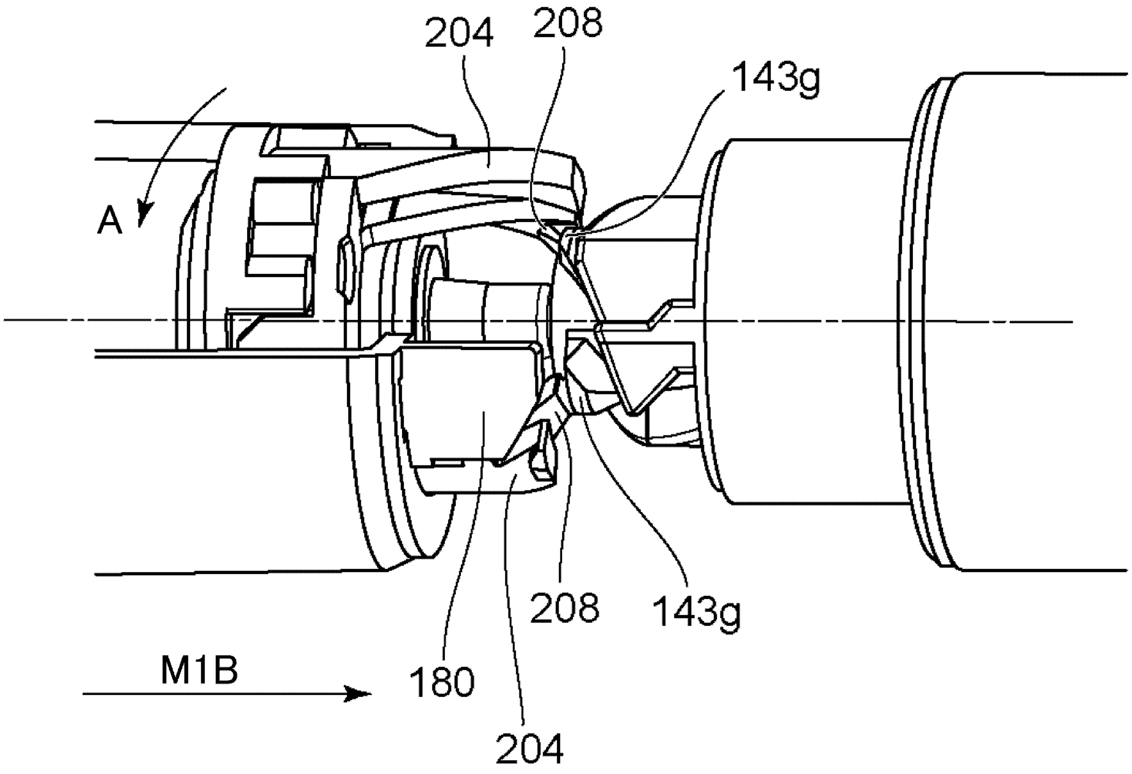
FIG. 65 is a perspective view of the drive transmission unit and the drum unit.

FIG. 65 shows a state in which the drive transmission surface 180*d* of the drive transmission unit 203 and the second braking engagement member 208 are close to each other. At this time, the visor 143*g* of the drum coupling 143 is in contact with the second braking engagement member 208 approaching in the M1B direction. FIG. 65 corresponds to part (a) of FIG. 49.

Figure 66:
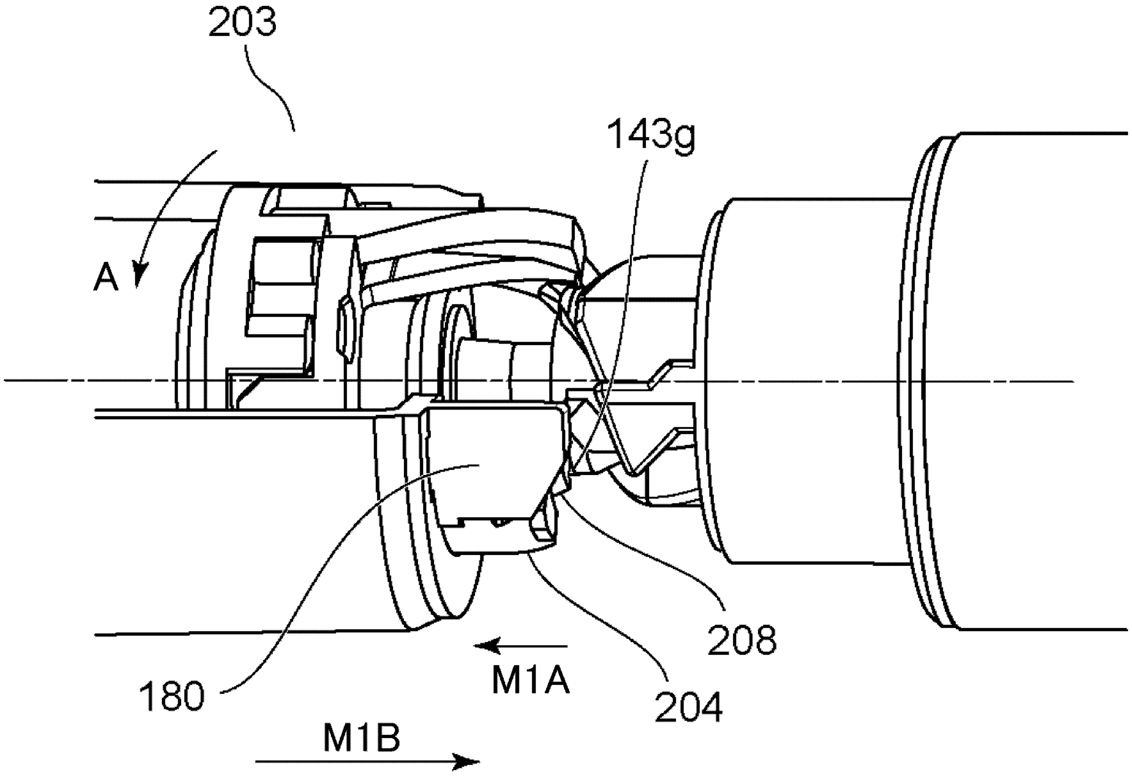
FIG. 66 is a perspective view of the drive transmission unit and the drum unit.

Next, FIG. 66 shows a state in which the drum drive coupling 180 has moved to the right side (M1B direction) along the axial direction relative to the second braking engagement member 208. In FIG. 66, the visor portion 143*g* is in a state of stopping (blocking) the advancement of the approaching second braking engagement member 208.

FIG. 66 corresponds to part (b) of FIG. 49. The second braking engagement member 208 moves relative to the drum drive coupling 180 to the left side (M1A direction) in the axial direction. As described above, by this relative movement, the second braking engagement member 208 is shifted to a state in which it can rotate without receiving a rotational load.

Figure 67:
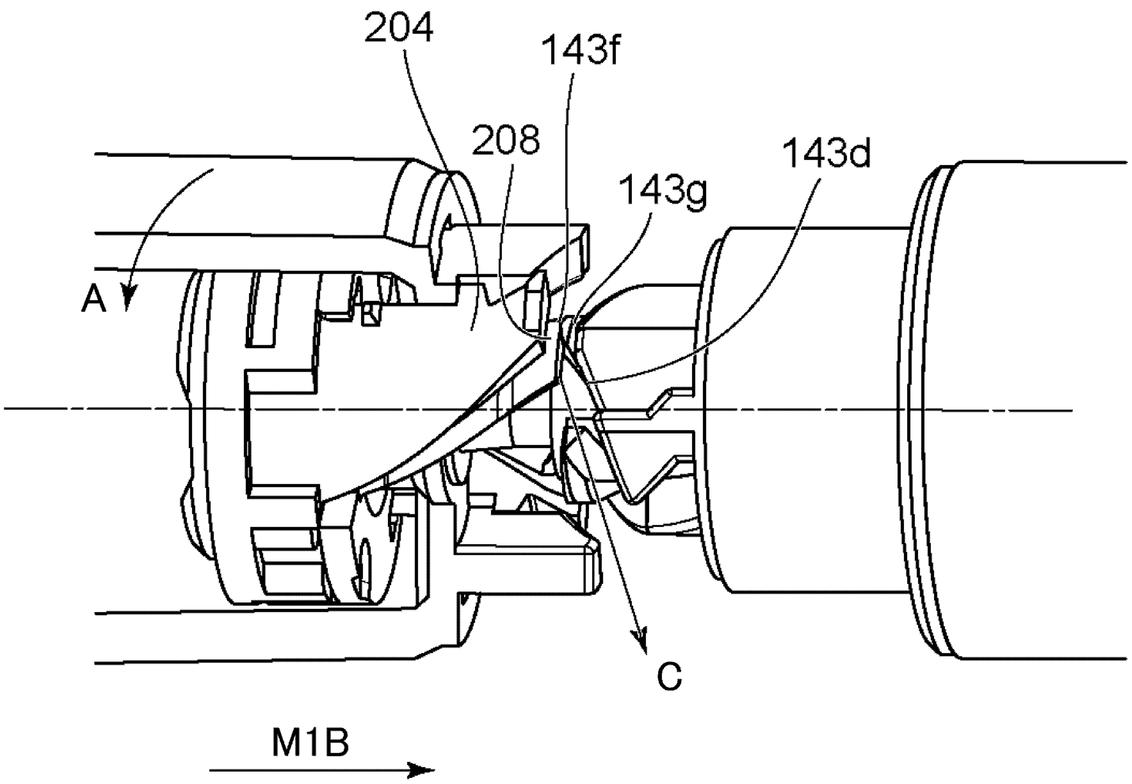
FIG. 67 is a perspective view of the drive transmission unit and the drum unit.
Figure 68:
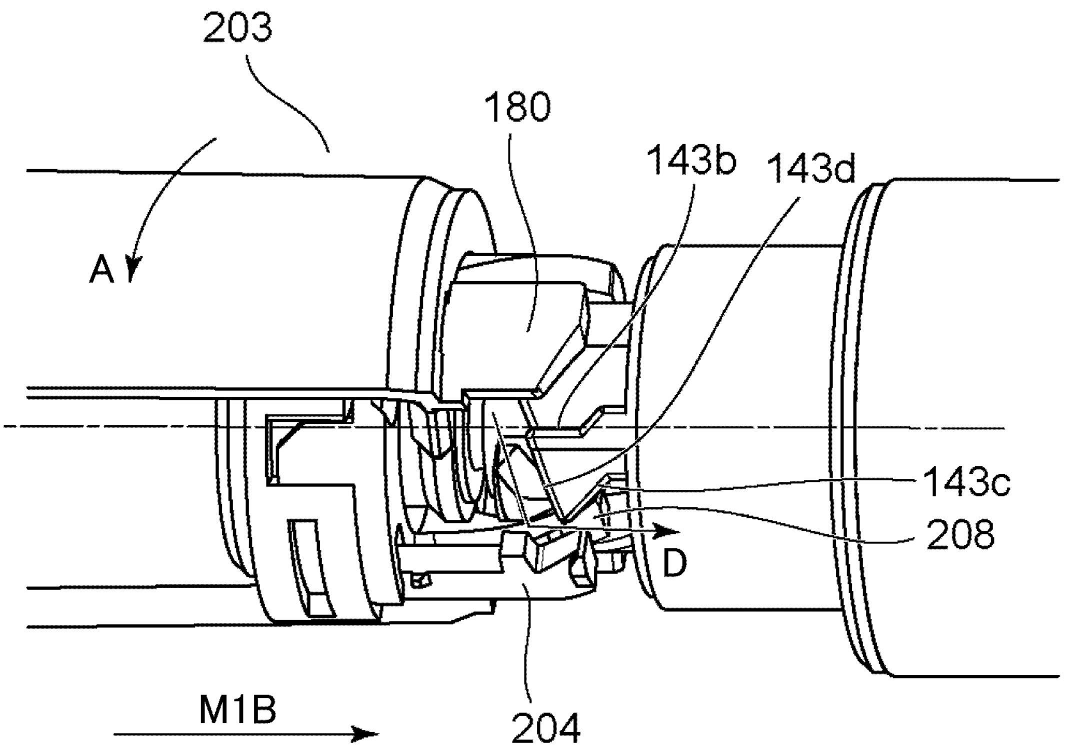
FIG. 68 is a perspective view of the drive transmission unit and the drum unit.

Subsequently, FIG. 67 shows a state in which the drive transmission unit 203 has started to rotate in the rotational direction A. FIG. 67 corresponds to part (c) of FIG. 49. The helical slope 143*d* of the drum coupling 143 moves the second braking engagement member 208 in the direction of arrow C from the point where the second braking engagement member 208 passes the inclination start portion 143*f*. FIG. 68 corresponds to part (d) of FIG. 49. In the state shown in FIG. 68, the first braking engagement member 204 moves along the helical slope 143*d* of the drum coupling 143, as in the state shown in part (d) of FIGS. 48 and 63. Further, the first braking engagement member 204 also moves in the M1B direction by the amount of the movement of the entire drive transmission unit 203 in the axial direction M1B direction. As a result, the first braking engagement member 204 moves along the trace of arrow D.

Then, as described above, the entire drive transmission unit 203 continues to rotate to complete the connection, resulting in the same state as in part (e) of FIG. 48.

Next, referring to part (a) of FIG. 50 to part (d) of FIG. 50, further pattern of the engagement process of the drum drive coupling 180 and the braking engagement member (204, 208) with the drum coupling 143 will be described. The drum coupling 143 includes two coupling portions 143*s* and 143*r*, but for the sake of simplicity, only the coupling portion 143*s* will be described.

As shown in part (a) of FIG. 50, a case where the phase of the inclination start portion 143*f* of the drum coupling 143 and the inward projection 208*e* of the second braking engagement member satisfy the following relationship will be described. That is, a case where the inclination start portion 143*f* of the drum coupling 143 is on the downstream side in the rotational direction (arrow A) will be described.

Figure 50:
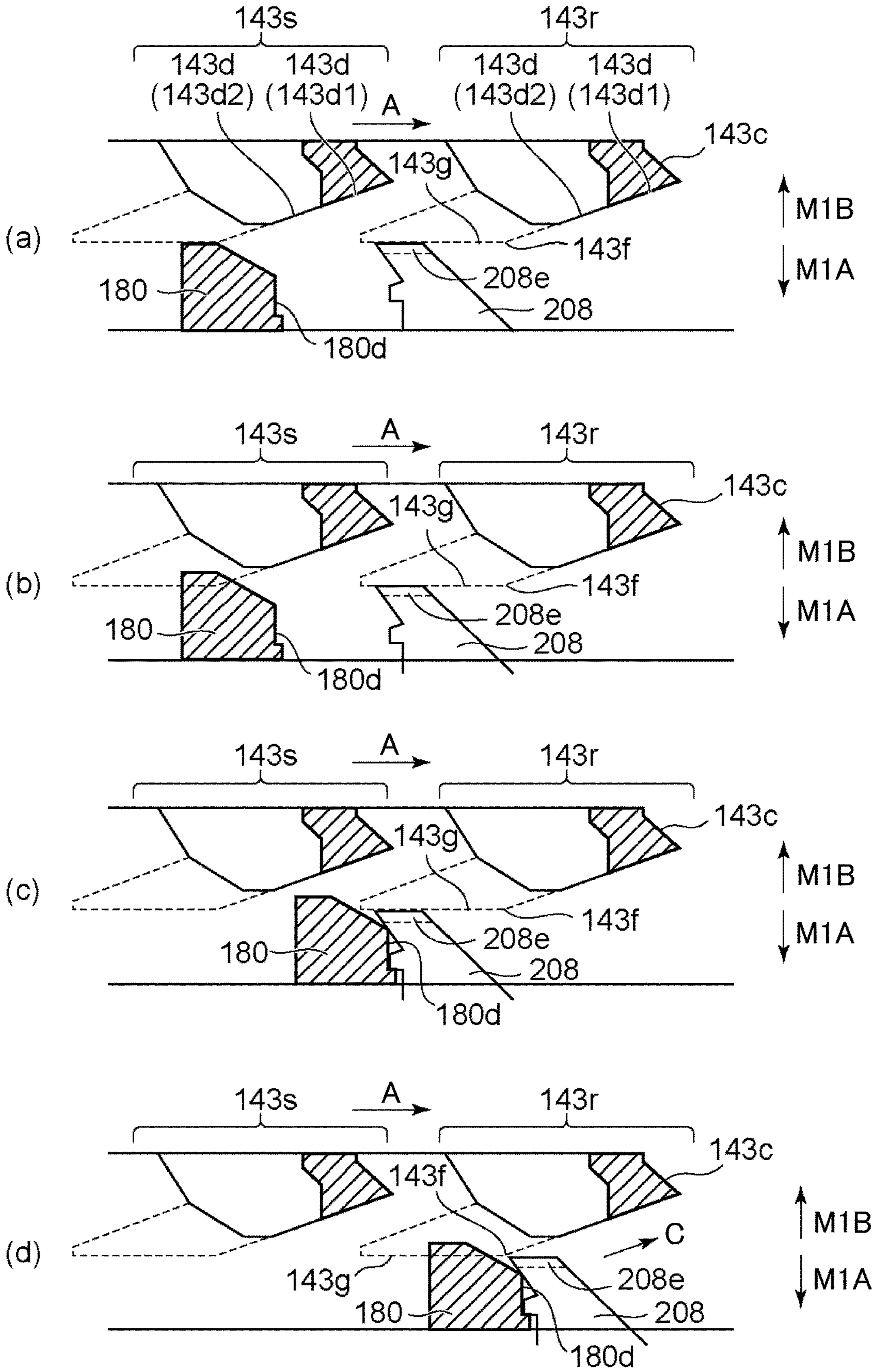
FIG. 50 is a developed view illustrating the engagement of the drum coupling.

Part (a) of FIG. 50 shows a state in which the drive transmission surface 180*d* of the drive transmission unit 203 and the second braking engagement member 208 are separated from each other.

Next, part (b) of FIG. 50 shows a state in which the visor portion 143*g* stops the advancement of the approaching second braking engagement member 208. Here, the drum drive coupling 180, which is a component of the drive transmission unit 203, does not contact the visor portion 143*g*, and therefore, the advancement cannot be stopped. By this, the second braking engagement member 208 moves relative to the drum drive coupling 180 in the M1A direction. As described above, by this relative movement, the second braking engagement member 208 is shifted to a state in which it can rotate without receiving a rotational load. Here, the visor portion 143*g* does not interfere with the shape of the drum drive coupling 180 because the position is different in the radial direction.

Then, part (c) of FIG. 50 shows a state in which the drive transmission unit 203 rotates in the rotational direction A and contacts the second braking engagement member. That is the state in which the second braking engagement member 208 does not start rotating by itself, so that it stops at that position, and the drum drive coupling 180 rotates and comes into contact with the second braking engagement member 208. Thereafter, by further rotation, the second braking engagement member 208 and the drum drive coupling 180 rotate integrally.

Part (d) of FIG. 50 shows a state in which the second braking engagement member 208 is further rotated and has passed the inclination start portion 143*f* of the drum coupling 143. In this state reached, the second braking engagement member 208 moves in the direction of arrow C as described referring to part (c) of FIG. 48. The operation after this is the same as described above, and therefore, the description is omitted.

Also in part (a) of FIG. 50 to part (d) of FIG. 50, only the second braking engagement member 208 of the braking engagement members (204, 208) is shown. However, as described above, also in the process of part (a) of FIG. 50 to part (d) of FIG. 50, the first braking engagement member 204 (see FIG. 43) moves integrally with the second braking engagement member 208.

Here, in order to help the recognition of the process described referring to part (a) of FIG. 50 to part (d) of FIG. 50, the description will be made again with reference to the perspective views of FIGS. 69 to 72. In FIGS. 69 to 72, a part of the drum drive coupling 180 is not shown for better illustration, and the internal shape is uncovered.

Figure 69:
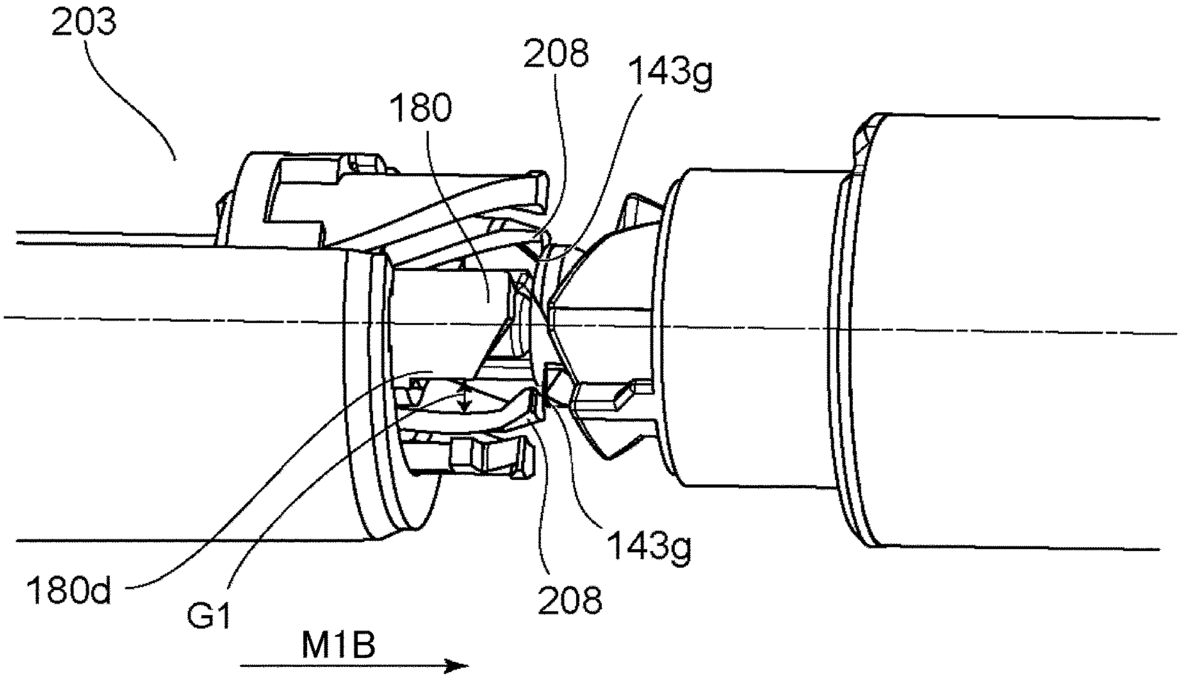
FIG. 69 is a perspective view of the drive transmission unit and the drum unit.

FIG. 69 corresponds to part (a) of FIG. 50, and shows a state in which the drive transmission surface 180*d* of the drive transmission unit 203 and the second braking engagement member 208 are separated by a gap Gl.

Figure 70:
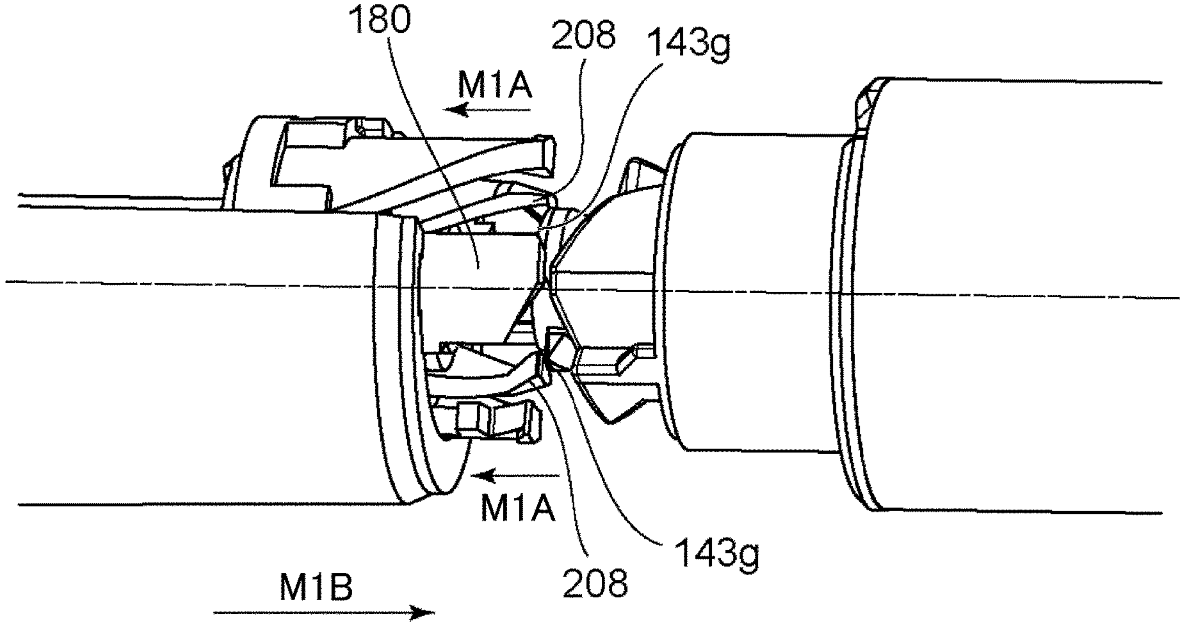
FIG. 70 is a perspective view of the drive transmission unit and the drum unit.

Next, FIG. 70 corresponds to part (b) of FIG. 50 and shows a state in which the entire drive transmission unit 203 has moved in the M1B direction. That is the state in which the visor portion 143*g* stops the advancement of the approaching second braking engagement member 208, and the drum drive coupling 180 has moved to the right side (M1B direction) in the axial direction beyond the second braking engagement member 208. At this time, the second braking engagement member 208 moves to the left side (MIA direction) relative to the drum drive coupling 180. As described above, by this relative movement, the second braking engagement member 208 is shifted to a state in which it can rotate without receiving a rotational load.

Figure 71:
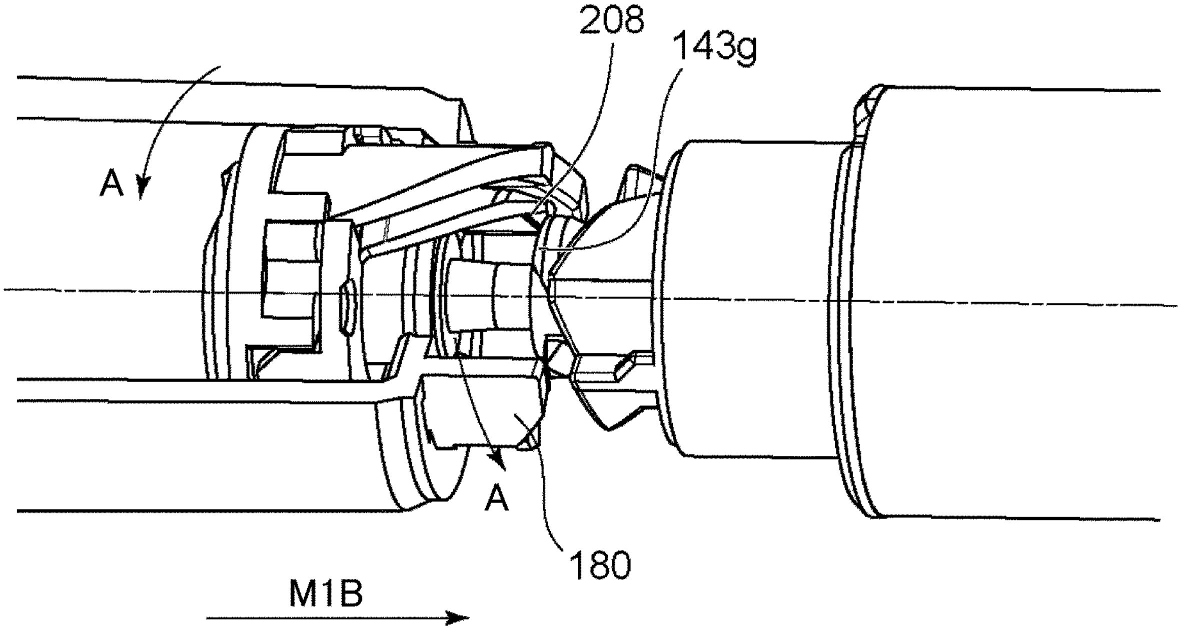
FIG. 71 is a perspective view of the drive transmission unit and the drum unit.

Then, FIG. 71 corresponds to part (c) of FIG. 50, and shows a state in which the drum drive coupling 180 of the drive transmission unit 203 is in contact with the second braking engagement member 208 by rotating in the rotational direction A.

Since the second braking engagement member 208 cannot rotate without receiving the rotational force from the drum drive coupling 180, the second braking engagement member 208 does not rotate immediately after the start of driving of the drive transmission unit 203 and remains at the initial position. That is, only the drum drive coupling 180 starts rotating in the A direction in advance. As a result, a state shown in FIG. 71 is reached in which the drum drive coupling 180 is in contact with the second braking engagement member 208.

Figure 72:
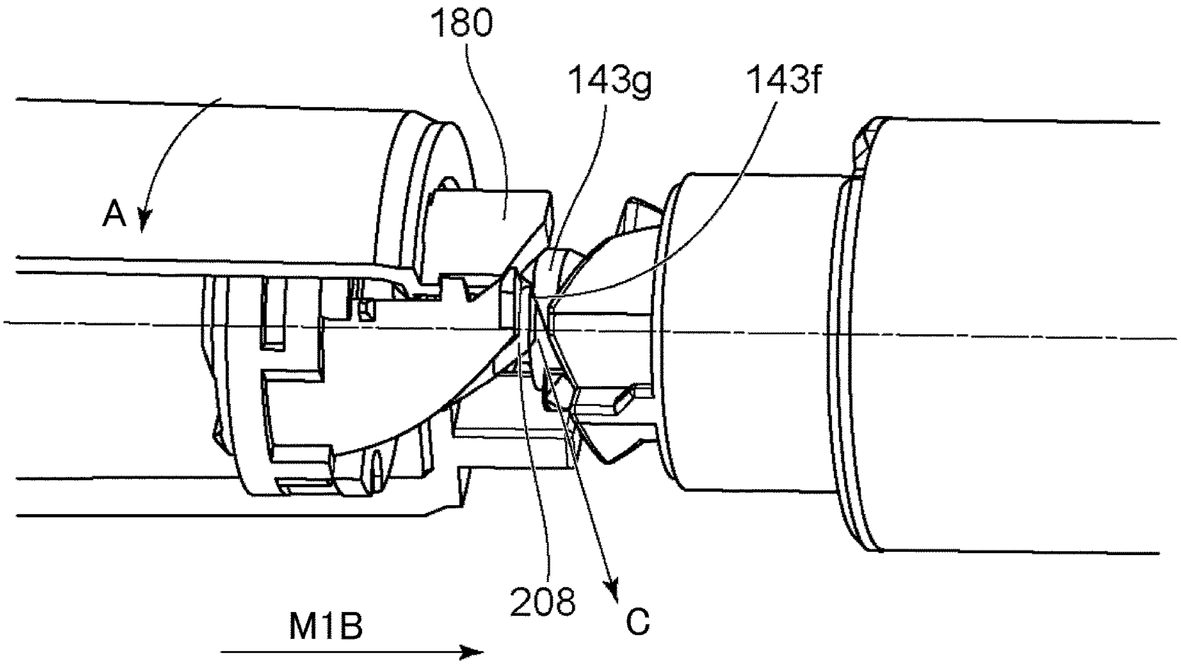
FIG. 72 is a perspective view of the drive transmission unit and the drum unit.

FIG. 72 corresponds to part (d) of FIG. 50, and shows a state in which by the engagement between the drum drive coupling 180 and the second braking engagement member 208, not only the drum drive coupling 180 but also the second braking engagement member 208 start to rotate in the direction A. More specifically, that is the state in which by the second braking engagement member 208 being pushed by the drum drive coupling 180 to rotate in the A direction, the second braking engagement member 208 passes the inclination start portion 143*f* of the drum coupling 143. In this state reached, the second braking engagement member 208 is guided by the slope 143*d* and moves in the direction along the slope 143*d* (direction of arrow C), as described in part (c) of FIG. 48 and FIG. 62.

Subsequent operations are the same as those described above referring to part (c) of FIG. 48 to part (e) of FIG. 48 and FIGS. 62 to 64, and therefore, the description thereof are omitted here.

As described above, when the cartridge 100 is mounted on the image forming apparatus main assembly, the phase (arrangement) of the drive transmission unit 203 with respect to the drum coupling 143 is not predetermined (part (a) of FIG. 48, FIG. 49 (*a*), part (a) of FIG. 50, FIG. 60, FIG. 65, FIG. 69). However, in any case, the drum coupling 143 can be connected to the drive transmission unit 203. The drive transmission unit 203 includes not only the drum drive coupling 180 but also the braking engagement members (204, 208), both of which the drum coupling 143 can be engaged with.

Figure 51:
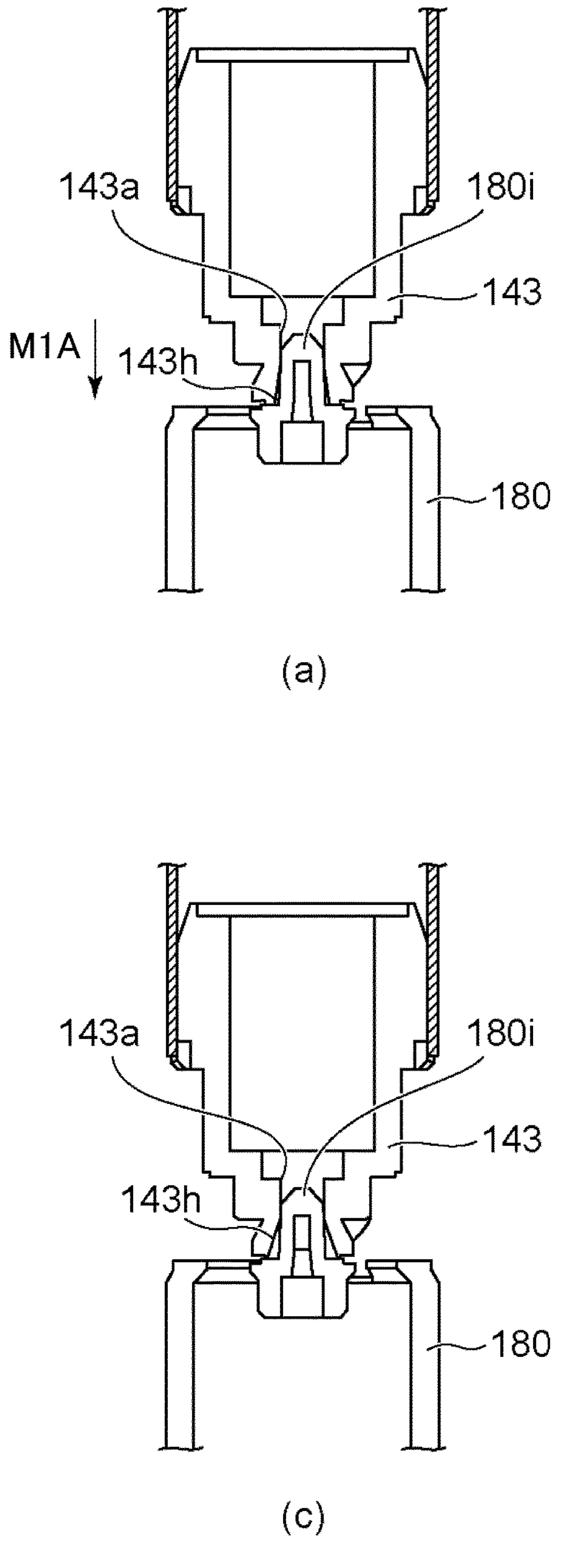
FIG. 51 is a sectional view illustrating the engagement of the drum coupling.

Next, referring to FIG. 51, the description will be made as to the structures for aligning the axes of the drive transmission unit 203 and the drum coupling 143, in the process of connecting them. FIG. 51 is a sectional view of the drive transmission unit 203 and the drum coupling 143, and part (a) of FIG. 51 shows the shapes in the connected state in this embodiment. The circular hole portion 143*a* of the drum coupling engages with the positioning boss 180*i* of the drum drive coupling 180 to align the axes with each other. Further, a conical guide surface 143*h* is provided at one end of the circular hole portion 143*a*. That is, the guide surface 143*h* has a conical shape as a part of the inner surface of the coupling 143. The guide surface 143*h* is provided so that when the drive transmission unit 203 is still separated in the axial direction M1B direction, the deviations from each other are eliminated upon starting engagement to align the axes with each other.

In addition to this embodiment, the circular hole portion 143*a* of the drum coupling 143 may be engaged with the positioning boss 180*i* without providing a guide surface, as shown in part (b) of FIG. 51. Further, as shown in part (c) of FIG. 6, the guide surface 143*h* can be enlarged to reduce the fitting between the circular hole portion 143*a* and the positioning boss 180*i*. Further, as shown in part (d) of FIG. 51, the diameter of the circular hole portion 143*a* can be increased. These arrangements can be selected depending on how to determine the relative position between the drive transmission unit 203 and the process cartridge 100 and the accuracy.

Figure 95:
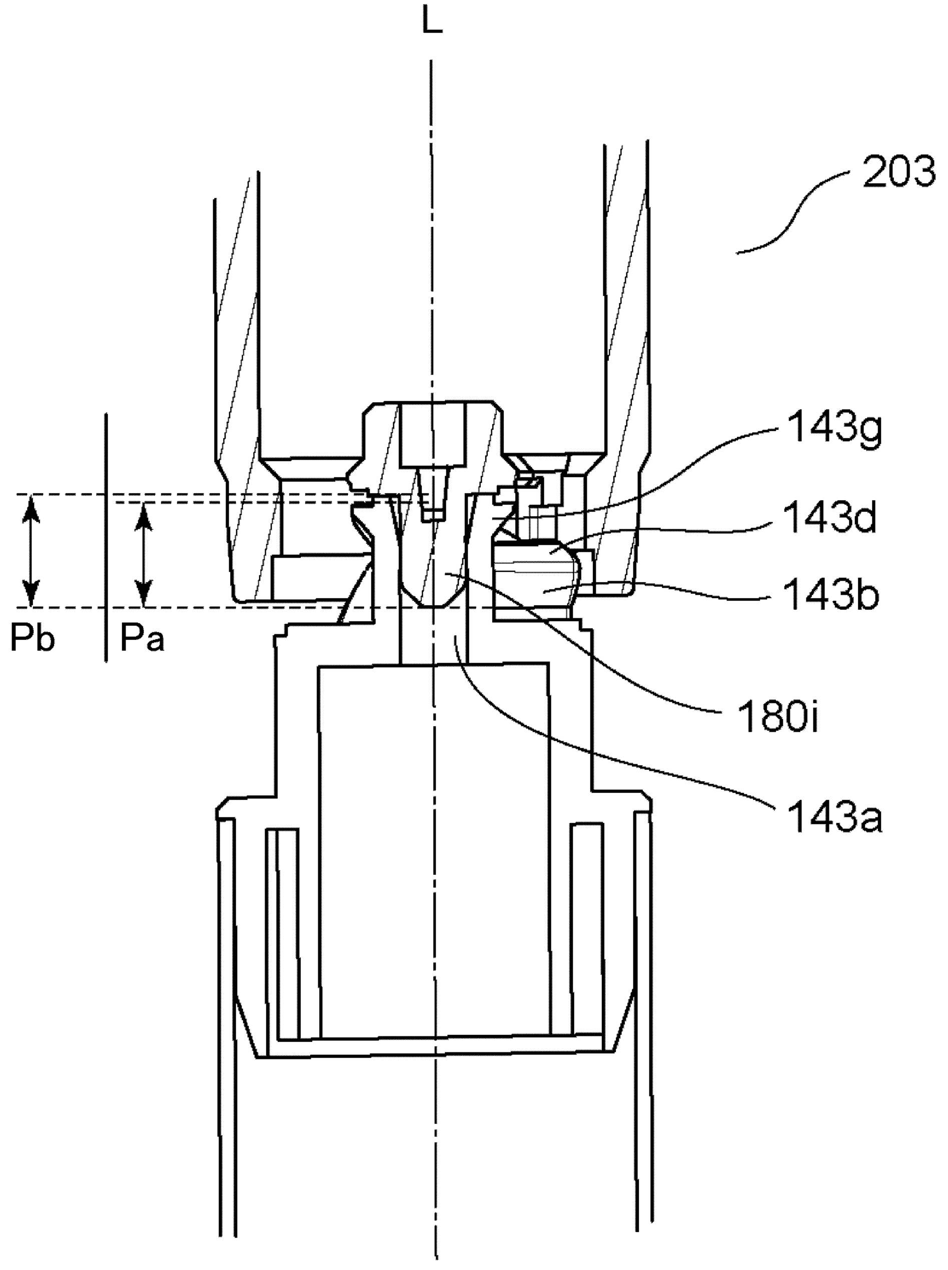
FIG. 95 is a sectional view of the drum unit.

It is desirable that the circular hole portion 143*a* has a sufficient length to accommodate the positioning boss 180*i*. That is, as shown in FIG. 95, the positioning boss 180*i* enters at least the range of the region Pb on the axis L of the drum unit. The circular hole portion 143*a* is formed so as to include the entire region Pb. That is, the periphery of the axis L is open in the region Pb.

In FIG. 95, in this embodiment, on the axis L, the range occupied by the braking force receiving portion 143*c*, the helical slope (top surface) 143*d*, the visor portion 143*g*, and the driving force receiving portion 143*b* (not shown) is Pa which is included inside the region Pb.

The structure is such that projection area Pa when the braking force receiving portion 143*c*, the slope 143*d*, the visor portion 143*g*, and the driving force receiving portion 143*b* are projected onto the axis L at least partially overlap the projection region Pb of the circular hole portion 143*a*.

As described above, according to this embodiment, the coupling 143 of the cartridge receives the driving force from the drive transmission unit 203 of the image forming apparatus main assembly. Further, the coupling 143 operates the brake mechanism (brake member 206) inside the drive transmission unit 203 in accordance with receiving the driving force from the drive transmission unit 203. The drum coupling 143 can receive the braking force by way of the braking engagement member (204, 208).

With this brake mechanism, the load required to drive the cartridge can be set in an appropriate range. As a result, the cartridge 100 can be driven stably.

It is also possible to use the drum coupling 104 and the drive transmission unit 203 of this embodiment to rotate members other than the photosensitive drum 104, such as a developing roller and a toner feeding roller. However, the drum coupling 104 and the drive transmission unit 203 of this embodiment are particularly suitable for rotation of the photosensitive drum 104, for the following reasons.

While the cartridge 100 of this embodiment includes the photosensitive drum 104, it is not provided with a cleaning means contacting the photosensitive drum 104. Therefore, the torque of the photosensitive drum 104 is relatively small, and the speed of the photosensitive drum 104 tends to fluctuate when it is affected by the surroundings during rotational driving thereof. For this reason, the drive transmission unit 203 rotates the photosensitive drum 104 with a constant load applied to the drum 104. That is, the coupling 143 not only receives the driving force for rotating the photosensitive drum, but also receives the braking force for suppressing the rotation of the photosensitive drum from the drive transmission unit 203. By simultaneously receiving two forces acting on the coupling in different rotational directions, the speed fluctuation of the photosensitive drum 104 (drum unit 103) is suppressed, and the rotation is stabilized.

The driving force can be inputted from the drive transmission unit 203 of this embodiment to the cartridge provided with the cleaning means by way of the coupling 143. When the cartridge 100 is provided with a cleaning means (for example, a cleaning blade) which contacts the surface of the photosensitive drum to remove toner from the photosensitive drum, a frictional force is produced between the photosensitive drum and the cleaning means. This frictional force increases the torque required to rotate the photosensitive drum 104. However, even so, the torque required to rotate the photosensitive drum 104 may not be sufficiently large. At this time, as in this embodiment, if the coupling 143 can receive the driving force and the braking force from the drive transmission unit 203 at the same time, the torque required to rotate the photosensitive drum 104 increases, and therefore, the rotation of the photosensitive drum is stabilized. A cartridge provided with a cleaning means will be described in Embodiment 2 described hereinafter.

In this embodiment, the brake mechanism for applying an appropriate rotational load to the photosensitive drum is arranged not on the cartridge side but on the main assembly side of the image forming apparatus, more particularly, in the drive transmission unit 203. Therefore, it is not necessary to provide the brake mechanism on the process cartridge which is the object (dismountably mountable unit) to be replaced after use. It can contribute to the downsizing and cost reduction of the process cartridge.

Further, the coupling 143 has such a shape that it can smoothly engage with both the driving force applying member (drum drive coupling 180) and the braking force applying member (braking engagement member (204, 208)) provided in the drive transmission unit 203. For example, the coupling 143 is provided with a helical slope **143*d* (inclined portion, guide, upper surface, upper portion) and a visor portion 143*f*, so that it can be easily connected to the drive transmission unit 203** smoothly.

Hereinafter, the shape of the coupling 143 of this embodiment will be described in detail again referring to FIG. 79.

The coupling 143 includes two coupling portions **143*s* and 143*r*, and each coupling portion includes an engaging portion 143*i* and a guide forming portion 143*j*. The engaging portion 143*i* is a shaped portion for engaging with the driving force applying member (drum drive coupling 180) or the braking force applying member (braking engagement member (204, 208)). The engaging portion 143*i* forms a driving force receiving portion 143*b*, a braking force receiving portion 143*c*, and a downstream slope 143*d*1**.

The driving force receiving portion **143*b* and the braking force receiving portion 143*c* engage with the drum drive coupling 180 and the brake members (204, 208), respectively. The driving force receiving portion (first side surface, first side portion) 143*b* and the braking force receiving portion (second side surface, second side portion) 143*c* are formed in a planar shape, but they are not limited to such a structure. They may be a curved surface-shaped portion or a portion having a small area, as long as they can receive a driving force and a braking force, respectively. For example, the edge (ridge line) formed by the engaging portion 143*i* may form the driving force receiving portion (first side surface, first side portion) 143*b* or the braking force receiving portion (second side surface, second side portion) 143*c***.

Alternatively, the driving force receiving portion **143*b* and the braking force receiving portion 143*c* may be a portion formed by a plurality of separate regions. That is, the engaging portion 143*i*** may be a set of a plurality of shaped portions.

The driving force receiving portion **143*b* and the braking force receiving portion 143*c* are an upstream side portion and a downstream side portion of the engaging portion 143*i*, respectively. That is, the driving force receiving portion 143*b* is a side portion directed upstream in the rotational direction, and the braking force receiving portion 143*c*** is a side portion directed downstream in the rotational direction.

Further, the guide forming portion **143*n* is a projection (extending portion) extending in the rotational direction toward the engaging portion 143*i*. The top surface (upper part) of the guide forming portion 143*n* is an upstream side slope (upstream side top surface, upstream side inclined portion) 143*d*2. The upstream slope 143*d*2 is a guide (upstream guide, upstream guide) and an inclined portion for guiding the braking force applying member (braking engagement member (204, 208)) toward the engaging portion 143*i***.

That is, the guide forming portion **143*n* is a projection for forming the upstream side slope 143*d*2** which is a guide (upstream side guide).

The guide forming portion **143*n* is adjacent to the engaging portion 143*i* and extends from the upstream to the downstream in the rotational direction toward the engaging portion 143*i*. Further, the upstream slope 143*d*2 of the guide forming portion 143*n* is inclined so as to approach the non-driving end of the photosensitive drum from the upstream to the downstream in the rotational direction (see FIG. 80**).

In FIG. 80, the drum coupling 143 is placed in the neighborhood of the first end portion (driving side end portion) **104*a* of the photosensitive drum 104. That is, the first end portion 104*a* of the photosensitive drum 104 is the end portion on the side for receiving the driving force from the drum coupling 143**.

The end on the opposite side of the photosensitive drum 104 with respect to the first end portion **104*a* is the non-driving side end (second end) 104*b*. The distances from the non-driving side end portion 104***b* to the upstream side slope 143*d*2 are indicated by D1 and D2. The distance D1 is a distance measured from the non-driving side end portion 104*b* of the photosensitive drum to the downstream end of the slope 143*d*2 along the axial direction parallel to the axis L. The distance D2 is a distance measured along the axial direction from the non-driving side end portion 104*b* of the photosensitive drum to the upstream side end portion of the upstream side slope 143*d*2.

Here, the distance D1 is shorter than the distance D2. That is, when the distance from the non-driving end portion 104*b* of the photosensitive drum to the upstream slope 143*d*2 is measured along the axial direction, the distance becomes shorter toward the downstream in the rotational direction.

That is, the upstream side slope 143*d*2 is inclined so as to approach the non-driving side end portion 104*b* of the photosensitive drum toward the downstream side in the rotational direction A. Not only the upstream slope 143*d*2 but also the downstream slope 143*d*1 is inclined in the same direction.

The distances D1 and D2 can also be regarded as the distances measured along the axial direction from the non-driving side end of the cartridge casing (that is, the non-driving side cartridge cover 117: see FIG. 14) to the upstream slope 143*d*2.

One of the guide forming portion 143*n* and the engaging portion 143*i* may be referred to as a first shape portion, and the other may be referred to as a second shape portion or the like.

In this embodiment, the first shape portion and the second shape portion (that is, the guide forming portion 143*n* and the engaging portion 143*i*) are adjacent to each other and are connected to each other. More specifically, the downstream side of the guide forming portion 143*n* in the rotational direction is connected to the engaging portion 143*i*. However, although the engaging portion 143*i* and the guide forming portion 143*n* are adjacent to each other, they may not be connected with a gap provided therebetween.

Further, in this embodiment, the top surface (downstream side slope) 143*d*1 of the engaging portion 143*i* is smoothly connected to the top surface (upstream side slope) 143*d*2 of the guide forming portion 143*n* to provide a one slope (top surface) 143*d*.

That is, the top surface (downstream side slope) 143*d*2 of the engaging portion 143*i* is a part of the guides having a function of guiding the braking engagement member (204, 208) to a position where it can engage with the braking force receiving portion 143*c*, similarly to the upstream side slope 143*d*1.

Figure 81:
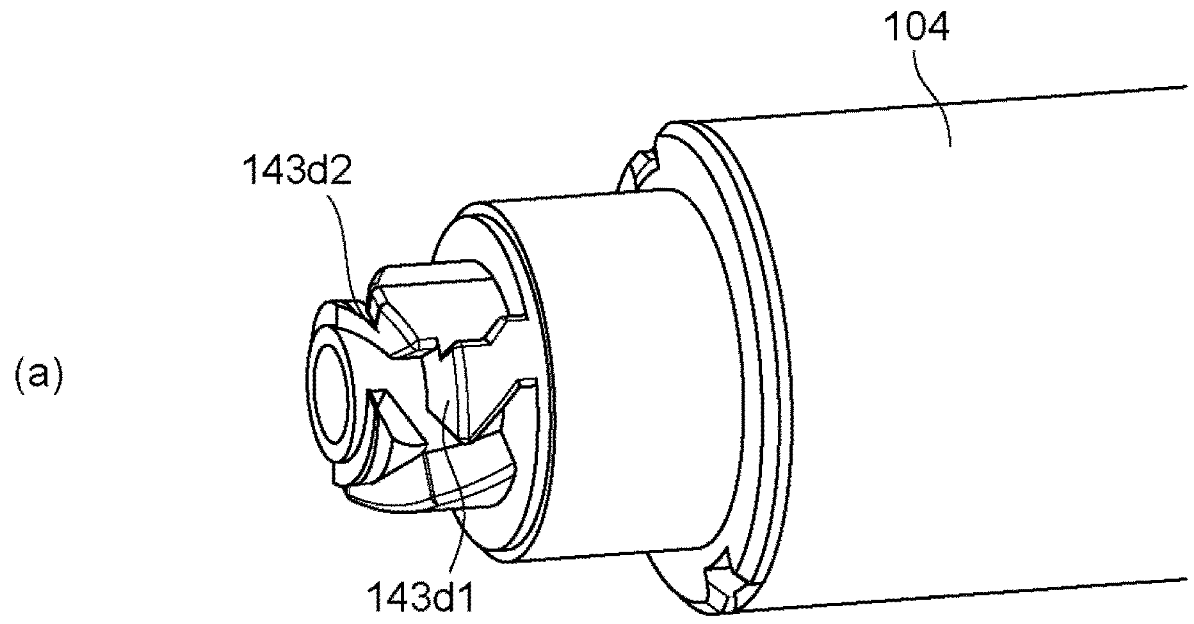
FIG. 81 is a side view and a perspective view of the coupling.
Figure 81:
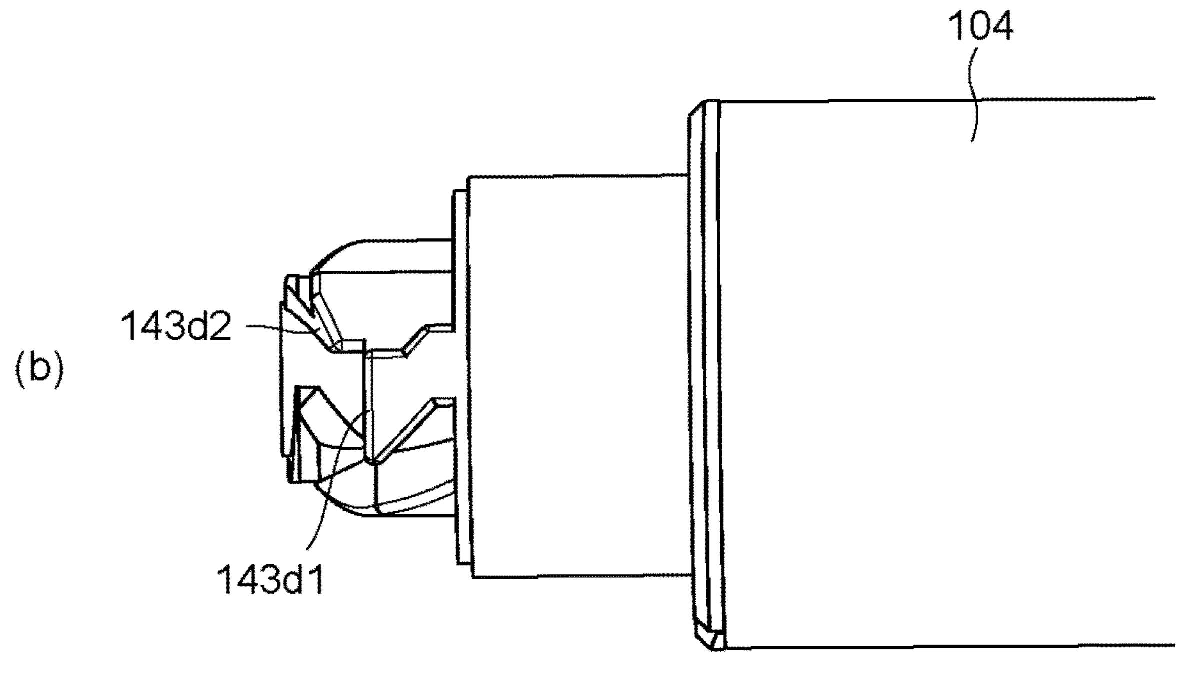

The downstream slope (downstream top surface) 143*d*2 does not necessarily have to be continuous with the upstream slope (upstream top surface) 143*d*1. Examples of the non-continuous form of the upstream slope 143*d*2 and the downstream slope 143*d*1 are as shown in part (a) of FIG. 81 and part (b) of FIG. 81. In part (a) of FIG. 81 and part (b) of FIG. 81, a modified example is shown in which the upstream slope 143*d*2 and the downstream slope 143*d*1 are provided with a step, and are separated in the axial direction, and the downstream slope 143*d*1 is changed to a flat surface. As described above, a part of the helical slope 143*d* which is a guide may be flat or may have a step.

As shown in part (c) of FIG. 48, part (c) of FIG. 49, part (d) of FIG. 50, FIG. 62, FIG. 67, and FIG. 72, the braking engagement members (204, 208) are brought into contact with the slope 143*d* to be guided in the direction of arrow C along the inclination direction of the slope 143. That is, the braking engagement member (204, 208) moves in the direction downstream in the rotational direction toward the non-driving side of the photosensitive drum (M1B direction).

After being guided by the slope 143*d*, the braking engagement member (204, 208) is further advanced in the axial direction (M1B) toward the space placed downstream of the braking force receiving portion (second side surface) 143*c* of the drum coupling 143 (See part (d) of FIG. 48, part (d) of FIG. 49, FIG. 63, FIG. 68). As a result, the braking engagement members (204, 208) are enabled to engage with the braking force receiving portion 143*c*.

The braking engagement member (204, 208) being guided by the slope 143*d*, the braking engagement member (204, 208) moves to the downstream side in the rotational direction A so as to be away from the drum drive coupling 180. As a result, the gap is produced between the drum drive coupling 180 and the braking engagement members (204, 208). The engaging portion 143*i* of the drum coupling 143 enters the gap, so that the driving force receiving portion (side surface) 143*b* is enabled to engage with the drum drive coupling 180 (see part (d) of FIG. 48, part (e) of FIG. 48, part (d) of FIG. 49, FIG. 63, FIG. 64, FIG. 68).

The helical slope 143*d* also has a function of keeping the braking engagement members (204, 208) away from the drum drive coupling 180 so that the drum drive coupling 180 and the drive force receiving portion 143*b* can engage with each other.

Figure 56:
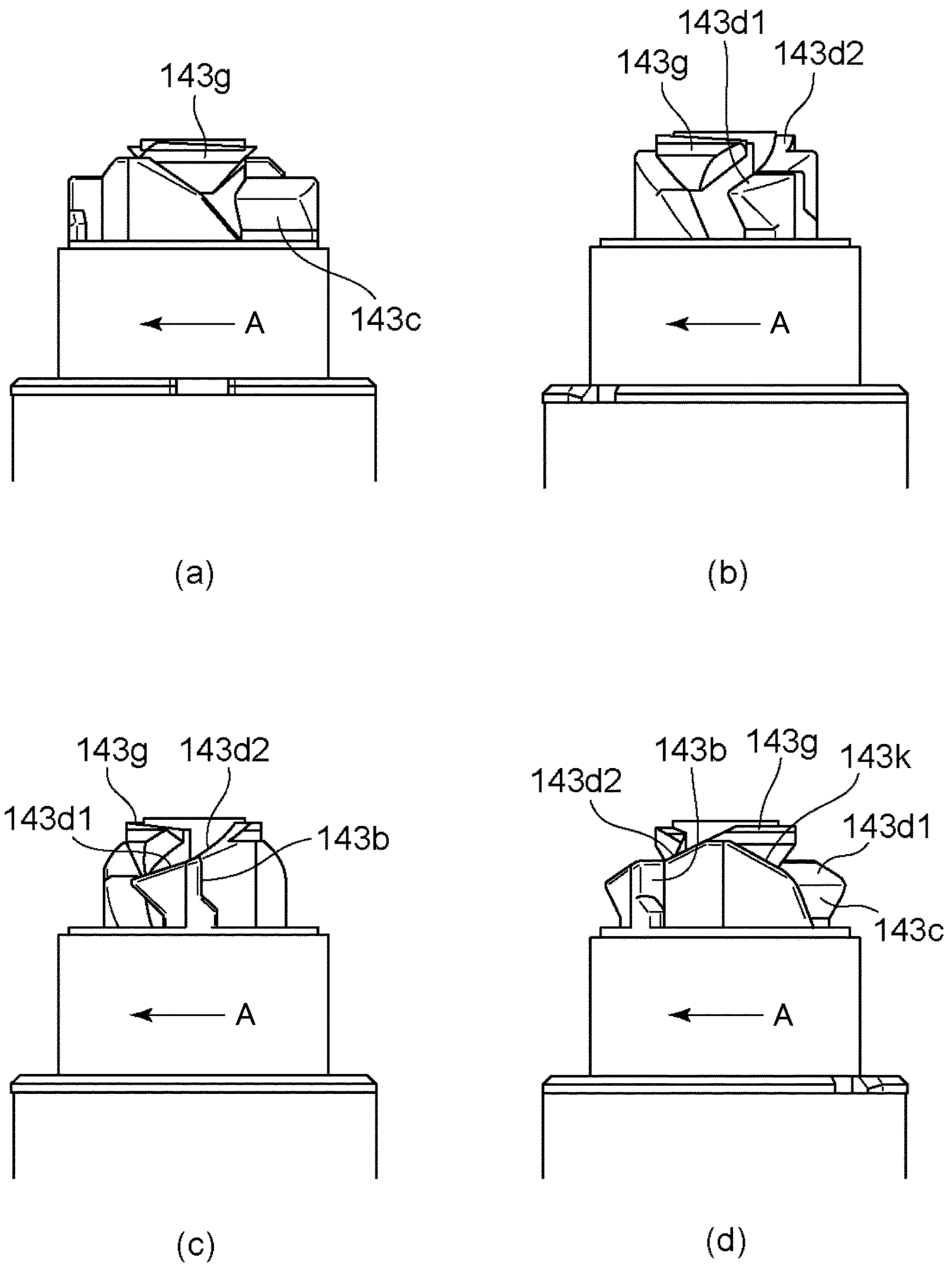
FIG. 56 is an illustration of a drum unit showing a drum coupling.

The helical slope (top surface) 143*d* has not only the portion (downstream side guide, downstream guide, downstream side top surface, downstream side inclined portion) 143*d*1 arranged between the braking force receiving portion 143*c* and the driving force receiving portion 143*b* but also has the portion (upstream guide, upstream top surface, upstream inclined portion) 143*d*2 on the upstream side of the driving force receiving portion 143*b* (see part (a) of FIG. 48, FIG. 47, FIG. 56, and so on). By enlarging the area where the slope 143*d* is provided, the top surface 143*d* can reliably guide the braking engagement members (204, 208).

That is, even when the braking engagement member (204, 208) is placed on the upstream side of the driving force receiving portion 143*b* (see part (a) of FIG. 49) the braking engagement members (204, 208) can be moved to the space on the downstream side of the braking force receiving portion 143*c* (see part (c) of FIGS. 49 and 49 (*d*)), by passing the upstream slope 143*d*2.

In this embodiment, the entire slope 143*d* is the inclined portion. The downstream top surface 143*d*1 and the upstream side top surface 143*d*2 are both descending slopes which descend toward the downstream in the rotational direction.

However, it is also possible to incline only a part of the slope 143*d* which is the top surface. For example A structure is also conceivable (see part (a) of FIG. 81 and part (b) of FIG. 81) in which, the upstream side of the top surface is inclined as the upstream side slope 143*d*2, as described above, whereas the downstream side of the top surface (downstream side top surface 143*d*2) is not inclined and is a surface perpendicular to the axis of the drum unit. In the modified example of the drum coupling shown in part (a) of FIG. 81 and part (b) of FIG. 81, the braking engagement member (204, 208) is vigorously moved by the inclination of the upstream slope (upstream top surface) 143*d*2, and by utilizing the inertia (momentum) of the movement, it passes the flat downstream top surface 143*d*1.

Further, as a guide for guiding the braking engagement members (204, 208), it is conceivable that only the upstream side top surface (upstream side slope 143*d*2) is used and the downstream side top surface (downstream side slope 143*d*1) is not used. That is, it is conceivable that there is almost no portion corresponding to the downstream top surface, or that the portion is very short as compared with the upstream top surface. Such a structure will be described hereinafter referring to FIG. 74.

It is also conceivable that there is provided a partial ascending portion in the downhill helical slope 143*d*. Even in such a case, if the braking engagement member (204, 208) can be sufficiently guided downstream in the rotational direction by the slope 143*d*, the slope 143*d* can be deemed as a downhill slope. That is, even if the slope is partially ascending, the helical slope 143*d* can be regarded as a descending slope as a whole. In other words, the distance from the non-driving end of the cartridge to the helical slope 143*d* can be considered as decreasing as the helical slope 143*d* moves downstream in the rotational direction.

As an example of such, a structure is conceivable in which the ascending portion partially provided in the helical slope 143*d* is sufficiently shorter than the other descending portions, or the ascending slope is less steep, and therefore, the ascending portion has a small influence on the descending portion.

Further, there is a case in which the helical slope 143*d* has a curved surface shape or is divided into a plurality of sections. Furthermore, there is a case in which the width of at least a part of the slope 143*d* is so small that the helical slope 143*d* may be regarded as a ridge line (edge) rather than a surface. The helical slope 143*d* has had a sector shape (helical shape) as the drum coupling 143 is viewed from the front side. However, the shape of the guide (top surface, inclined portion) to be provided on the drum coupling 143 is not limited to such a shape. For example, instead of using a sector-shaped (helical) slope 143*d*, a linearly extending rectangular slope may be used. That is, as the inclined portion (guide, top surface) corresponding to the helical slope 143*d*, it is possible to use a structure having a changed shape, size, extending direction, and the like. Some of such examples will be described hereinafter referring to FIG. 54 and so on.

The upstream slope (upstream top surface) 143*d*2 is structured to have a region narrower than the downstream slope (downstream top surface) 143*d*1 (see FIGS. 47 and 56). Conversely, the downstream slope 143*d*1 has a region wider than the upstream slope 143*d*2.

Figure 79:
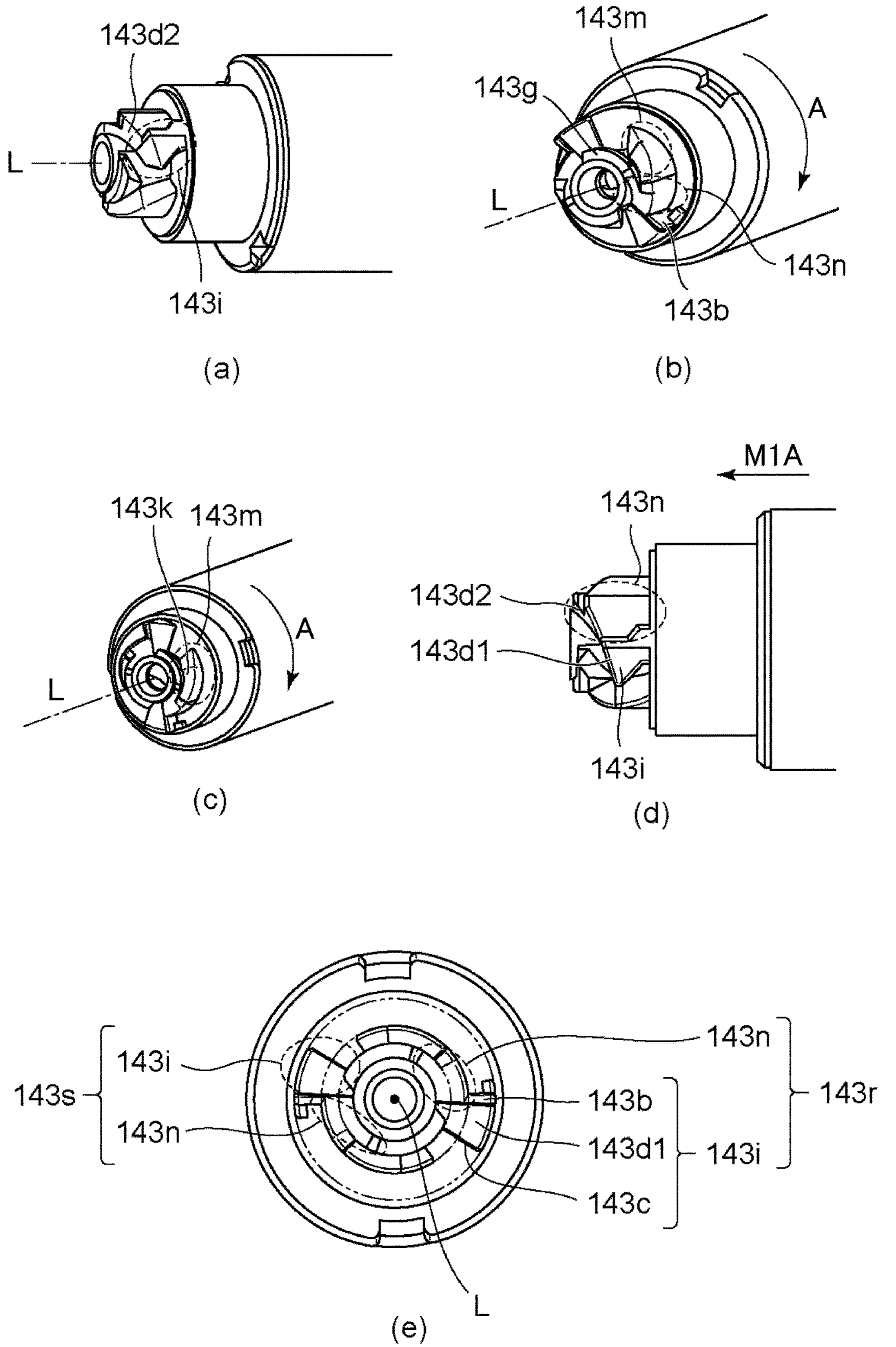
FIG. 79 is a side view, a perspective view, and a front view of the coupling.

Here, the width of each slope is a length measured along the radial direction. Further, as shown in FIG. 79, at least a part of the engaging portion 143*i* is placed more remote than the guide forming portion 143*n* with respect to the axis L of the drum unit in the radial direction of the drum unit. In other words, at least a part of the engaging portion 143*i* is placed radially outside the guide forming portion 143*n*.

The reason for such a dimensional relationship and such an arrangement relationship is that the driving force receiving portion 143*b* of the engaging portion 143*i* is disposed near the boundary between the guide forming portion 143*n* and the engaging portion 143*i*. That is, a part of the engaging portion 143*i* overhangs outward in the radial direction from the guide forming portion 143*n* so that the driving force receiving portion 143*b* is formed. By this, the width of the downstream portion 143*d*1 of the slope (top surface) 143*d* is larger than that of the upstream portion 143*d*2.

The driving force receiving portion 143*b* has a region placed radially outside (a position far from the axis L) with respect to the upstream slope 143*d*2. Further, in the axial direction of the drum unit, the driving force receiving portion 143*b* is disposed closer to the non-driving side end portion of the photosensitive drum than the upstream side slope 143*d*2. In FIG. 80, a state is shown in which the distance D3 measured along the axial direction from the non-driving side end portion 104*b* of the photosensitive drum to the driving force receiving portion 143*b* is shorter than the distance D1 measured along the same direction to the upstream top surface 143*d*2 from the non-driving side end portion 104*b* of the photosensitive drum.

Conversely, at least a part of the upstream slope 143*d*2 is placed at a distance from the driving force receiving portion 143*b* than the non-driving side end portion 104*b* of the photosensitive drum in the axial direction. The upstream slope 143*d*2 is a free end portion placed closer to the free end of the drum coupling 143 than the driving force receiving portion 143*b*.

The distances D1 and D3 can be regarded as being the distances measured from the non-driving side end of the cartridge (that is, the non-driving side cartridge cover 117: see FIG. 14) to the upstream slope 143*d*2 and the driving force receiving portion 143*b*, in the axial direction.

The visor portion 143*d* is a block portion (stopper) which suppresses (blocks) the movement of the braking engagement member (204, 208) in the axial direction. That is, the visor portion 143*d* blocks the braking engagement member (204, 208) from approaching the drum coupling 143 and entering the region where it cannot engage with the braking force receiving portion 143*c*. FIG. 66, part (b) of FIG. 49, FIG. 69, part (a) of FIG. 50 show the blocked state.

In this embodiment, the visor portion (block portion) 143*d* is further upstream in the rotational direction than the upstream slope 143*d*2, and the visor portion 143*d* is continuous with the top surface (upstream slope 143*d*2) of the guide forming portion 143*n* (See part (d) of FIG. 56).

When the braking engagement member (204, 208) enters the space upstream of the driving force receiving portion 143*b* or the space downstream of the braking force receiving portion 143*c* together with the drum drive coupling 180, the braking engagement member (204, 208) 208) cannot engage with the braking force receiving portion 143*c*. The visor portion 143*g* blocks the movement of the braking engagement members (204, 208) so as to prevent the occurrence of such a state.

In this embodiment, as the drum unit is viewed from the driving side along the axial direction (see part (a) of FIG. 47), the visor portion 143*g* of the first coupling portion 143*s* is disposed such that it covers the space upstream of the drive force receiving portion 143*b*. Further, the visor portion 143*g* is provided so as to cover the space downstream of the braking force receiving portion 143*c*.

Further, the visor portion 143*d* has a width sufficient to cover at least a part of the downstream side portion (downstream side slope 143*d*1) of the helical slope (top surface) 143*d*. By this, the visor portion 143*d* constrains the braking engagement member (204, 208) from non-preferably entering the space on the upstream side of the driving force receiving portion 143*b* and the space downstream of the braking force receiving portion 143*c* together with the drum drive coupling 180.

On the other hand, the visor portion 143*g* is disposed so as to permit the braking engagement member (204, 208) to enter the space on the downstream side of the braking force receiving portion independently of the drum drive coupling 180 (See part (d) of FIG. 50, part (c) of FIG. 49, part (c) of FIG. 48).

That is, the braking engagement member (204, 208) contacts the upstream slope 143*d*2 after passing the visor portion 143*g*, and is guided along the slope 143*d* toward the space on the downstream side of the braking force receiving portion 143*c* (See part (c) of FIG. 49 and part (d) of FIG. 50).

That is, when the braking engagement member (204, 208) is enabled to contact u portion (upstream side top surface) 143*d2* of the slope (top surface) 143*d*, the visor portion 143*g* releases the braking engagement member (204, 208) from the blocked state.

The visor portion 143*g* is adjacent to the upstream slope 143*d2* and is upstream of the upstream slope 143*d2*. In this embodiment, the top surface of the visor portion 143*g* and the upstream slope 143*d2* are continuous, but there may be a case in which the visor portion 143*g* and the upstream slope 143*d2* are adjacent to each other and a gap is formed between them.

Further, the top surface of the visor portion 143*g* has a plane perpendicular to the axis L of the drum unit, but the shape is not limited to this example. For example, it is conceivable that the top surface of the visor portion 143*g* is inclined in the same direction as with the upstream slope 143*d2*. In such case, it can be considered that the visor portion 143*g* forms a part of the upstream slope 143*d2*. Alternatively, it can be considered that a part of the guide forming portion 143*n* forms the visor portion 143*g*.

Further, in this embodiment, the coupling 143 comprises two of the helical slopes 143*d*, two of the visor portions 143*g*, two of the driving force receiving portions 143*b*, and two of the braking force receiving portions 143*c*. That is, the coupling 143 has a shape symmetrical with respect to its axis, and comprises two coupling portions 143*s* and 143*r* (see FIG. 58). The coupling portion 143*s* and the coupling portion 143*r* each have the helical slope (inclined portion) 143*d* or the like as the top surfaces. Then, the braking engagement member (204, 208) and the drum driving member 180 engage with the coupling portion 143*s* and the coupling portion 143*r* as shown in part (a) of FIG. 76.

An example (modified example) of another shape of the coupling 143 will be described hereinafter.

The drive transmission unit 203 includes the first braking engagement member 204 and the second brake engagement member 208 as the braking force applying members (braking engagement members) which apply a braking force for imparting a load to the rotation of the photosensitive drum to the coupling 143. There is a gap between the first braking engagement member and the second braking engagement member 208, and the second braking engagement member provided radially inward is flexible slightly to move outward so as to approach to the first braking engagement member 204. When the coupling and the drive transmission unit 203 are disengaged from each other, the second braking engagement member 208 can smoothly break the engagement with the coupling 143 by the flexing of the second braking engagement member 208. For example, the second braking engagement member 208 can move over the visor portion 143*g* by flexing and can be separated from the coupling 143.

[Various Modifications of Coupling and Cartridge Shown in Embodiment 1]

Modified examples (modified shape) in which the drum coupling 143 of the Embodiment 1 described above is partially modified will be described. Even when the above-described the visor portion 143*g* is not provided on the drum coupling 143, it can function properly, depending on the conditions.

Figure 52:
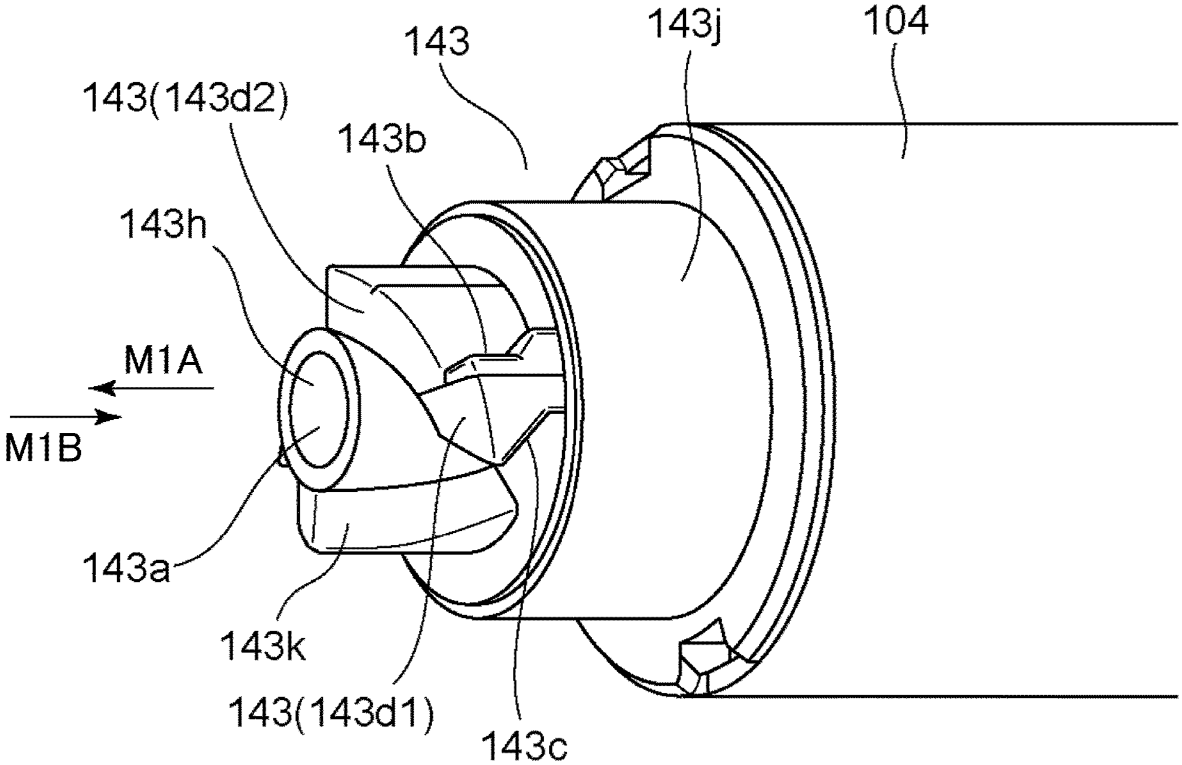
FIG. 52 is a perspective view illustrating a modified example of the drum coupling.
Figure 53:
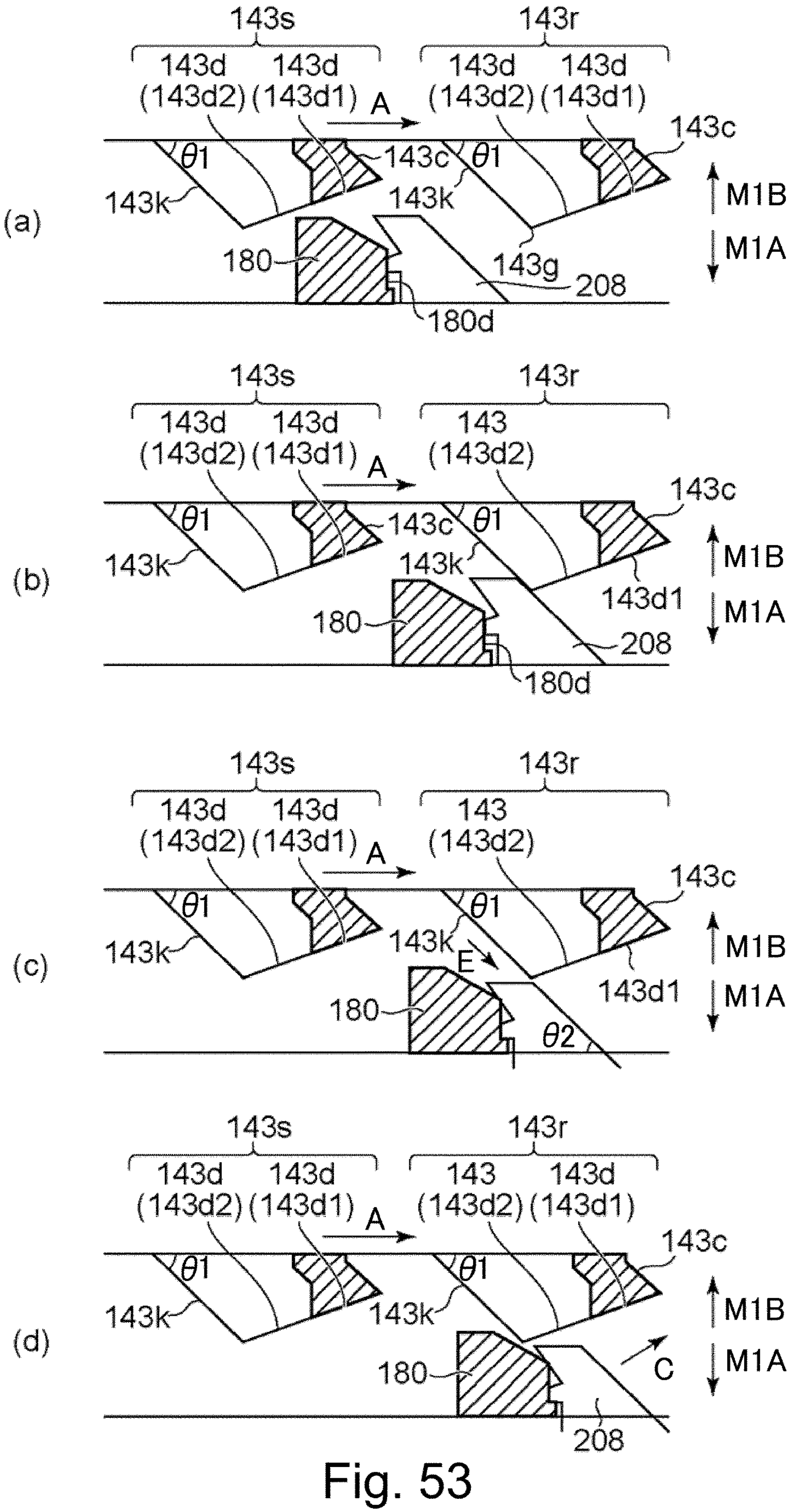
FIG. 53 is a developed view illustrating the engagement of the drum coupling.

FIG. 52 shows a perspective view of the drum coupling 143 in which the visor portion 143*g* is not provided, and FIG. 53 shows a developed view illustrating the process of engagement.

The shape will be described referring to FIG. 52. FIG. 52 is a view illustrating one end of the drum unit, and shows a state in which the coupling member (drum coupling) 143 is mounted to the end portion of the photosensitive drum 104. The drum coupling 143 includes the helical slope 143*d* and a push-back surface 143*k*, which will be described hereinafter, but does not have a visor shape.

Subsequently, the process of engaging with the drive transmission unit 203 will be described referring to FIG. 53.

The representation of the development view of FIG. 53 is the same as with the development view of FIG. 48. The drum coupling 143 comprises two coupling portions 143*s* and 143*r*, but only the coupling portion 143*s* will be described for the sake of simplicity of explanation. The description of the coupling portion 143*s* also applies to the coupling portion 143*r*.

The case where the phases of the inclination start portion 143*f* of the drum coupling 143 shown in part (a) of FIG. 53 and the inward projection 208*e* of the second braking engagement member satisfy the following relationship will be described. That is, a case where the inclination start portion 146*f* of the drum coupling 143 is on the downstream side in the rotational direction (arrow A) will be described.

Part (a) of FIG. 53 shows a state in which the drive transmission surface 180*d* of the drive transmission unit 203 and the second braking engagement member 208 are close to each other.

Next, in part (b) of FIG. 53, since there is no such visor portion as described in embodiment 1, in the drum coupling 143, the drum drive coupling and the second braking engagement member 208 advance into the space between the push-back surface 143*k* and the helical slope 143*d3*.

Part (c) of FIG. 53 shows a state in which the drive transmission unit 203 has started to rotate in the rotational direction A. When the drum drive coupling 180 and the second braking engagement member 208 rotate, the second braking engagement member 208 moves in the direction of arrow E along the slope by the function of the inclination θ1 of the push-back surface 143*k* or the function of the inclination θ2 of the second braking engagement member 208. As described referring to FIG. 48, the second braking engagement member 208 can rotate without receiving a rotational load.

As described above, when the braking engagement member (204, 208) enters the region where it cannot engage with the braking force receiving portion, the push-back surface (push-back portion) 143*k* applies a force to the second braking engagement member 208. By this, the push-back surface 143*k* pushes back the braking engagement members (204, 208) toward the inside of the drive transmission unit 203 and moves it in the direction of arrow E.

However, the second braking engagement member 208 is urged by the spring 211 shown in FIG. 43 in the M1B direction in the Figure, and if the component force of the inclination θ2 of the second braking engagement member 208 is smaller than the spring force F1, the second braking engagement member 208 cannot be moved in the direction of arrow E. The component force changes depending on the load torque of the drum holding unit 108 and the angle of each slope (θ1 or θ2). It is preferable to set the magnitude relation of the force within the range in which the above function is performed in consideration of the component force and the frictional force.

Part (d) of FIG. 53 shows the movement of the second braking engagement member 208 which is no longer subjected to the rotational load. The drive transmission unit 203 has further rotated, and the second braking engagement member 208 is in a state of passing the inclination start portion 146*f* of the drum coupling 146. In this state reached, the second braking engagement member 208 moves in the direction of arrow C as described referring to part (c) of FIG. 48. The operation after this is the same as described above, and therefore, the description thereof will be omitted.

Although not shown in part (a) of FIG. 50 to part (d) of FIG. 50, the first braking engagement member 204 also moves together with the second braking engagement member 208 in these processes.

In the drum coupling 143 shown in the Embodiment 1 (see part (a) of FIG. 1, the braking engagement member (204, 208) is blocked by the visor portion 143*g* from entering the region in which it cannot engage with the braking force receiving portion. On the other hand, in the drum coupling 143 of this modified example, when the braking engagement member (204, 208) enters the region where the braking force receiving portion 143*c* cannot be engaged with the drum drive coupling 180, the braking engagement member (204, 208) is pushed back by the push-back surface (push-back) 143*k*. The push-back surface 143*k* is an inclined portion inclined in a direction different from that of the helical slope 143. More particularly, the helical slope 143 is a portion which inclines toward the non-driving side of the drum unit as it goes downstream in the rotational direction, whereas the push-back surface 143*k* is a portion of the drum unit which inclines toward the outside, that is, away from the non-driving side end portion 104*b* (see FIG. 80) of the photosensitive drum, as it goes downstream in the rotational direction A. If the helical slope 143 is regarded as a descending slope, the push-back surface 143*k* is an ascending slope. The push-back surface 143*k* is placed on the upstream side in the rotational direction with respect to the helical slope 143*d*, and is adjacent to the helical slope 43*k*.

The push-back surface 143*k* is also a guide (second guide) for guiding the braking engagement member (204, 208) toward the helical slope 143*d*. Further, the push-back surface 134*k* is a helical slope (second helical slope, second inclined portion) having a direction of inclination opposite to that of the helical slope 143*d*.

Further, another modified shape of the drum coupling 143 will be described. The inclined portion and the top surface (helical slope 143*d*) as the guide described in the Embodiment 1 are formed as smooth slopes, and guide the braking engagement members (204, 208) along such slope surfaces (See FIG. 56 and the like). However, the drum coupling 143 can also function even if the inclined portion has other shapes. An example thereof is shown in FIG. 54 in a perspective view.

Figure 54:
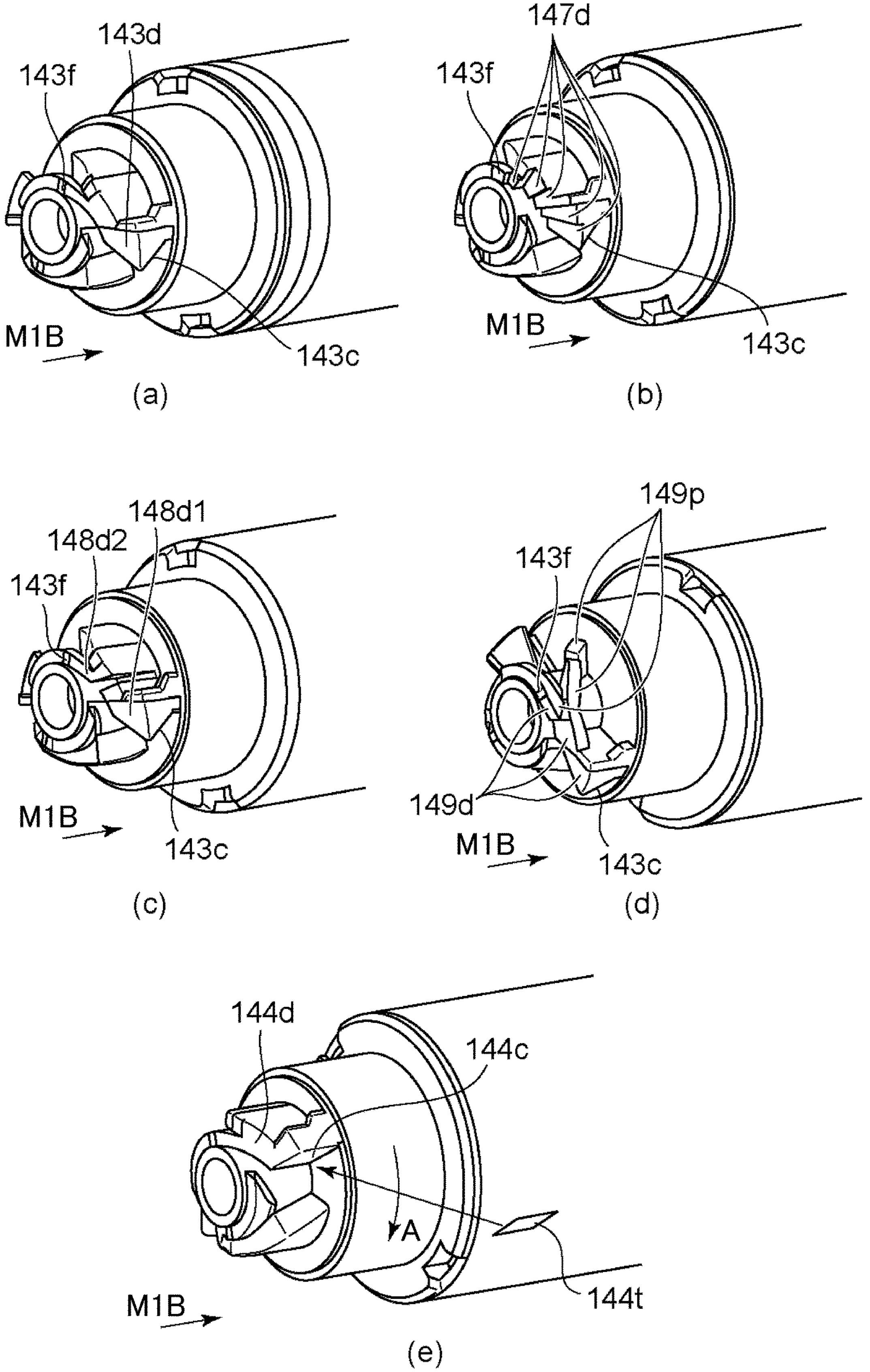
FIG. 54 is a development view illustrating the engagement of the drum coupling.
Figure 55:
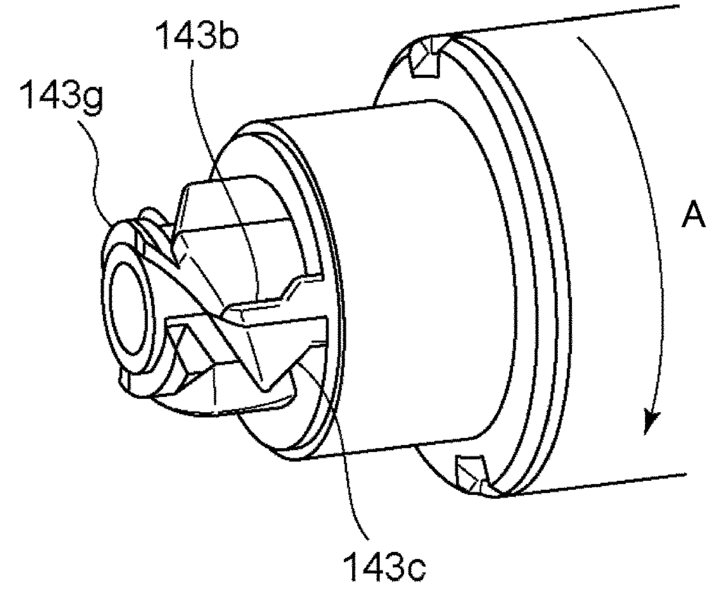
FIG. 55 is a perspective view of the drum unit showing the drum coupling.
Figure 55:
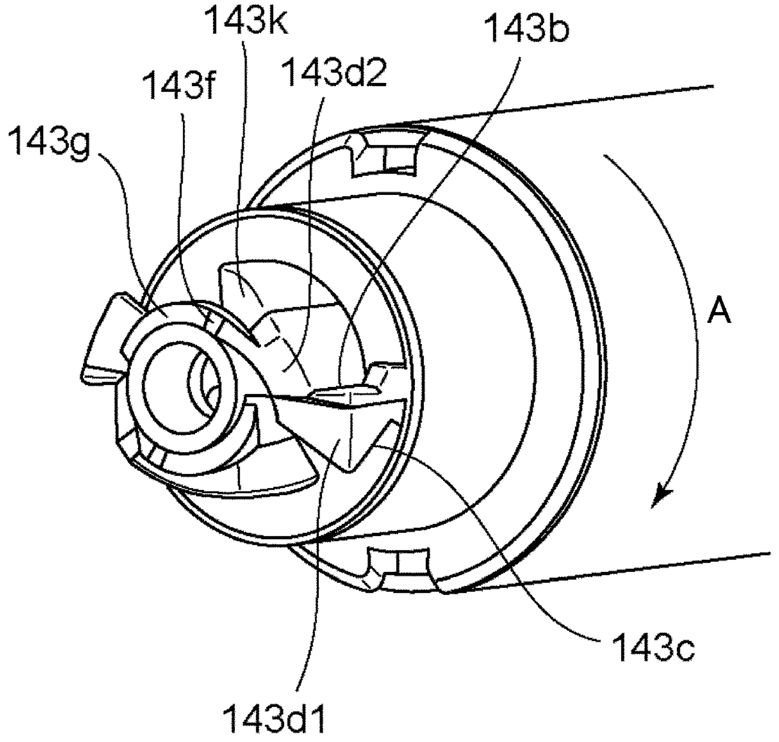

First, the shape shown in part (a) of FIG. 54 is a reproduction of the shape described in the Embodiment 1. A gentle helical slope 143*d* is formed from the inclined starting portion 143*f* toward the braking force receiving portion 143*c*.

Figure 73:
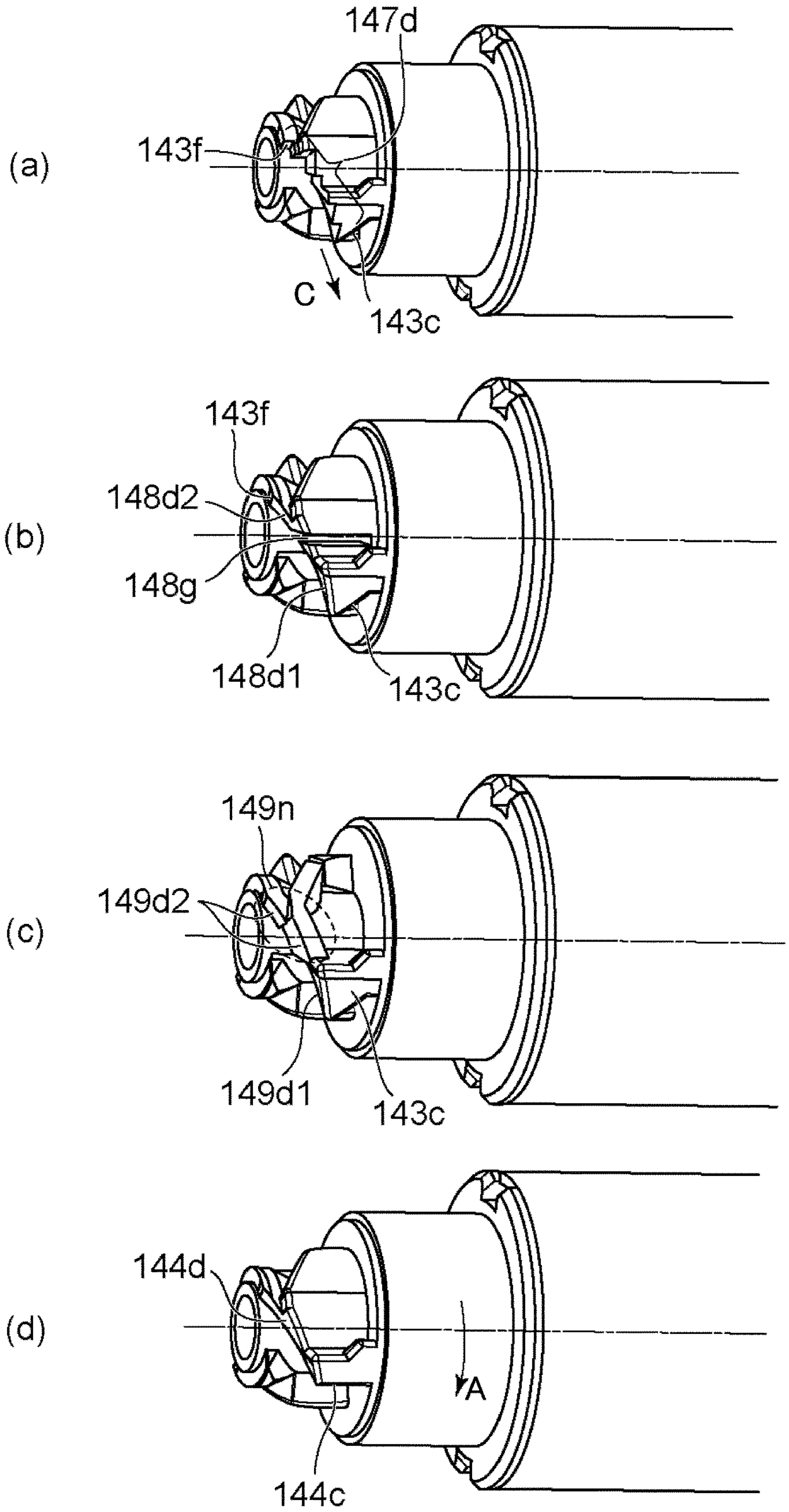
FIG. 73 is a perspective view illustrating a modified example of the drum coupling.

On the other hand, the shapes of part (b) of FIG. 54 and part (a) of FIG. 73 show modified examples. The height changes stepwise between the inclination start portion 147*f* and the braking force receiving portion 147*c*. That is, the top surface (inclined portion) has a stepped portion 147*d*, and the inclined portion is formed by the plurality of steps. Thus, the inclined portion (top surface) may not be a helical slope but may be a helical step shape providing an inclination which lowers in the direction of advancement of the second braking engagement member 208.

The stepped step portion 147*d* moves the second braking engagement member 208 by moving the stepped step portion 147*d* in the direction of the arrow C in part (a) of FIG. 73, whereby the same function as that of the helical slope 143*d* in part (a) of FIG. 54 is performed. While the inclined surface 143*d* is an inclined portion comprising continuously inclined surfaces, the stepped portion 147*d* can be regarded as an inclined portion provided by stepwise structure of a plurality of surfaces.

If it is difficult to form a helical slope 143*d* on the coupling 143 due to restrictions on the structure of the mold for manufacturing the coupling 143, a stepped portion 147*d* may be used instead of the inclined surface 143*d*.

At this time, it is preferable that when the stepped portion 147*d*, which is the top surface, and the second braking engagement member 208 come into contact with each other, the second braking engagement member 208 is structured to be smoothly guided without being caught by the stepped portion 147*d*. For example, it is conceivable to sufficiently narrow the width of each surface of the stepped portion 147*d*. Further, in part (a) of FIG. 73, the top surface (inclined portion, guide) is formed in a stepped shape by combining a plurality of surfaces, but the top surface (inclined portion, guide) may be formed by combining a plurality of curved surfaces, and a similar function can be performed with such a structure. Similarly to the inclined surface 143*d*, the stepped portion 147*d* is a guide (inclined portion) for guiding the braking engagement member (204, 208) toward the braking force receiving portion by its own inclination.

Further, as shown in part (c) of FIG. 54 and part (b) of FIG. 73, the top surface is divided into an inclined surface (upstream side top surface, downstream side top surface) 148*d*1 and an inclined surface (downstream side top surface, downstream side guide, downstream side) 148*d*2 with a gap 148*g* therebetween. Also in this case, if the second braking engagement member 208 has such a shape that does not cause catching when it comes into contact with the top surface (148*d*1, 148*d*2), the top surface (148*d*1, 148*d*2) can function as a guide. Such a coupling can be used when there is a restriction in the structure of the mold for molding the coupling.

Further, part (d) of FIG. 54 and part (c) of FIG. 73 show a modified example in which the shape of each portion of the coupling 143 is formed by ribs. The top surface (inclined surface 149*d*) comprises the surfaces of a plurality of ribs 149*p*, and the top surface is divided into a plurality of ribs, and in such a case, the same function can be provided as well. That is, as shown in part (c) of FIG. 73, the guide forming portion 149*n* forming the upstream side top surface (upstream side guide, upstream side inclined portion) 149*d*2 is a projection (rib) projecting in the radial direction. Depending on the characteristics of the material used, it can be used when it is necessary to produce ribs without producing thick portions.

That is, with each structure of part (a) of FIG. 54 to part (d) of FIG. 54, each top surface (143*d*, 147*f*, 148*d*1, 148*d*2, 149*d*) guides the braking force of the braking engagement member (204, 208) toward the braking force receiving portion 143*c* regardless of its shape. In other words, each top surface is a guide (inclined portion) for guiding the braking engagement member (204, 208) toward the braking force receiving portion 143*c* regardless of its shape. At least a part of such a top surface (guide) is formed by the guide forming portion 143*n*.

Similar to the top surface, the push-back surface (push-back portion) 143*k* shown in FIG. 52 may have various shapes. For example, the push-back portion (push-back surface) 143*k* of this modification is a smoothly continuous helical slope, but the push-back portion may be inclined by a plurality of surfaces or steps. For example, the push-back portion 143_k_ may be two surfaces including different inclinations, as in the push-back portion 143_k_ of the Embodiment 1 shown in part (b) of FIG. 48 and part (d) of FIG. 56. Further, although the push-back surface 143_k_ is ascending, a descending portion may be locally provided.

The drum coupling 143 may have either the visor portion 143_g_ or the push-back surface (push-back portion) 143_k_, or may have both of them. As described above, the drum coupling 143 of the Embodiment 1 shown in part (b) of FIG. 48, part (b) of FIG. 55 and part (d) of FIG. 56 has a structure in which not only the visor portion 143_g_ but also the push-back portion 143_k_ is provided. Normally, the drum coupling 143 can block improper entry and access of the braking engagement member (204, 208) by the visor portion 143_g_, but in the unlikely event that it cannot be blocked, the push-back surface 143_k_ can function to push back the braking engagement members (204, 208) away from the coupling 143.

The drum coupling 143 has a projection shape (push-back portion forming portion, second guide forming portion) 143_m_ that constitutes the push-back surface 143_k_ (see part (b) of FIG. 79 and part (c) of FIG. 79).

The engaging portion 143_i_, the guide forming portion 143_n_, the projection shape 143_m_, and the visor portion 143_g_ (see FIG. 79) may be referred to as the first, second, third, and fourth shape portions in no particular order correspondence.

Referring to part (e) of FIG. 54 and part (d) of FIG. 73, a modified example of the braking force receiving portion (second side surface) will be shown.

The braking force receiving portion 143_c_ described in Embodiment 1 shown in part (a) of FIG. 54 and part (a) of FIG. 1 and FIGS. 55 to 57, and the other modified examples shown in FIG. 52 and part (b) of FIG. 54 to part (d) of FIG. 54 has a shape overhanging downstream in the rotational direction. This is because by the braking force receiving portion 143_c_ having a shape overhanging toward the downstream side in the rotational direction, the stability of engagement is increased when it is engaged with the braking engagement members (204, 208).

That is, because of this shape, when the braking force receiving portion 143_c_ engages with the braking engagement member (204, 208), a force is generated so as to attract then toward each other. The braking force receiving portion 143_c_ overhangs toward the downstream side in the rotational direction. Therefore, when the braking force engaging member (204, 208) contacts the braking force receiving portion 143_ca_ force is produced so that the braking force engaging member (204, 208) is attracted inward in the axial direction toward the drum coupling 143 or the photosensitive drum 104. By this, the engaging state between the braking force receiving portion 143_c_ and the braking force engaging member (204, 208) is stabilized, and the engagement is not easily broken.

As described above, the braking engagement member (204, 208) is structured to be movable in the axial direction relative to the drum drive coupling 180 (see FIGS. 67 and 68). However, if the braking engagement member (204, 208) moves in the axial direction while the drive transmission unit 203 is driving the drum coupling 143 there is a possibility that the engaged state with the braking force receiving portion 143_c_ is broken or becomes unstable. Therefore, it is preferable that the braking force receiving portion 143_c_ has a shape for stabilizing the engagement state with the braking engagement member (204, 208) to suppress the movement of the braking engagement member (204, 208) in the axial direction when the drum coupling 143 is driven.

However, when the braking force required to be applied to the braking force receiving portion is small, or when the friction coefficient of the braking force receiving portion is high, the engagement between the braking force receiving portion and the braking engagement member (204, 208) tends to be stable. Therefore, it is possible to eliminate the overhang portion of the braking force receiving portion. Such a braking force receiving portion 144_t_ is shown in part (e) of FIG. 54 and part (d) of FIG. 73. In the modified drum coupling shown in part (e) of FIGS. 54 and 73 (_d_), the braking force receiving portion 144_c_ does not overhang toward the downstream side in the rotational direction (arrow A).

On the other hand, it is also conceivable to devise a device for stabilizing the engagement state with the braking engagement member (204, 208) even for the braking force receiving portion 144_c_ including such a shape.

In order to stabilize the engagement between the braking force receiving portion 144_c_ and the braking engagement member, It is also conceivable that an elastic member (elastic portion) 144_t_, for example such as rubber is attached to the braking force receiving portion 144_c_, or the elastic portion is integrally molded with to the braking force receiving portion 144_c_. By increasing the friction coefficient of the braking force receiving portion 144_t_ or causing the braking engagement member (204, 208) to bite into the elastic portion of the braking force receiving portion 144_t_, the engagement with the braking engagement member (204, 208) is less likely to break so that the engagement can be stabilized.

As a method of increasing the frictional force of the braking force receiving portion 144_c_, it is conceivable to use an adhesive member (adhesive member) instead of using the elastic member 144_t_. For example, if a double-sided tape (adhesive member) is attached to the surface of the braking force receiving portion 144_c_, the frictional force between the braking force receiving portion 144_c_ and the braking engagement member (204, 208) increases due to the viscosity of the double-sided tape (adhesive member). In addition, it is conceivable to increase the friction coefficient of the braking force receiving portion 144_c_ by surface-treatment of braking force receiving portion 144_c_ without using the elastic member 144_t_.

It is desirable that the helical slope 143_d_ (see FIG. 67) for guiding the braking engagement member (204, 208) has a small friction coefficient in order to achieve smooth guiding. Therefore, even when a material having a high coefficient of friction is selected or surface treatment is applied to the braking force receiving portion 144_c_, it is desirable that such a means is not used for the entire coupling, but the use of such material or such surface treatment is not applied to the helical slope 143_d_. That is, it is desirable that the friction coefficient of the braking force receiving portion 144_c_ is higher than the friction coefficient of the helical slope 143_d_.

The elastic portion 144_t_ may be provided on the braking force receiving portion 143_c_ of the drum coupling 143 as shown in part (a) of FIG. 54 to part (d) of FIG. 54.

Figure 101:
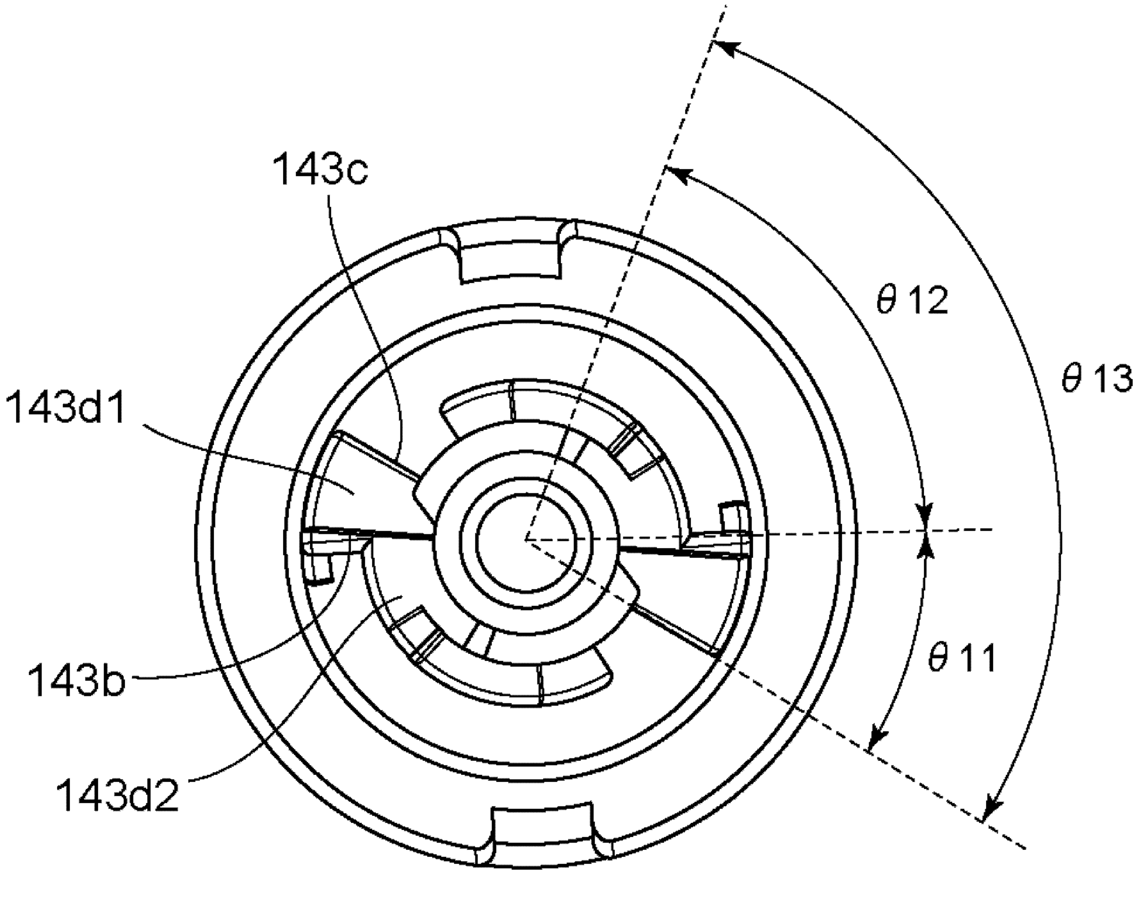
FIG. 101 is a front view of the coupling.

Next, referring to FIG. 101, a preferable arrangement relationship and dimensional relationship of the drum coupling 143 will be described. FIG. 101 is a front view of the drum coupling 143 of the Embodiment 1, in which θ (theta) 11 is a value indicating the dimension of the engaging portion 143_i_ from the driving force receiving portion 143_b_ to the braking force receiving portion 143_c_ by an angle from the axis of the drum coupling. In other words, it is the angle of the region of the downstream inclined portion 143*d*1.

Regarding the upper limit of θ11, it is desirable that θ11 is 90° or less, more preferably 80° or less. The angle θ11 corresponds to the gap created between the drum drive coupling 180 and the braking engagement members (204, 208) when the drum coupling engages the drive transmission unit 203 (see FIG. 64). In order to securely sandwich the driving force receiving portion 143*b* and the braking force receiving portion 143*c* between the braking engagement members (204, 208) and the drum drive coupling 180 of the apparatus main assembly, It is desirable that θ11 is 90° or less, more preferably 80° or less.

On the other hand, regarding the lower limit of θ11, if the strength of the engaging portion 143*i* is increased by using metal as for the material of the engaging portion 143*i* constituting the driving force receiving portion 143*b* and the braking force receiving portion 143*c*, the θ11 can be reduced. Although the details will be described hereinafter, in the modified example of the drum coupling shown in FIG. 74, the thickness of the engaging portion 145*i* corresponding to the engaging portion 143*i* is made smaller then that in this embodiment, by forming the drum coupling 143 with metal. Considering such a structure, the preferable condition for the lower limit of θ11 (FIG. 101) is that θ11 is 1°, more preferably 2° or still more preferably 8° or more. In this embodiment, θ11 is set to 30° or more, and θ11 is set to about 35°.

In order to increase the strength of the driving force receiving portion 143*b* and the braking force receiving portion 143*c* so that the force can be stably received, the angle θ11 corresponding to the thickness of the engaging portion 143*i* is desirably in a certain range.

When θ11 is converted into a length, it becomes the thickness of the engaging portion 143*i*, that is, the distance measured from the driving force receiving portion 143*b* to the braking force receiving portion 143*c* along the rotational direction. The desired range of this distance is 0.3 mm or more, more preferably 1 mm or more.

Further, in FIG. 101, θ12 indicates a region occupied by the upstream slope (upstream guide, upstream slope) 143*d*2 by an angle. Regarding the lower limit of θ12, it is desirable that the value of θ12 is at least half the value of θ11, and more preferably the value of θ12 is not less than the value of θ11. This is because the upstream slope 143*d*2 needs to have a length in the rotational direction to the extent necessary for guiding the braking engagement member (204, 208) to the braking force receiving portion 143*c* by the upstream slope 143*d*2.

As θ11 is smaller and the inclination angle of the upstream slope 143*d*2 is larger, the lower limit of θ12 can be made smaller.

As described above, the lower limit of θ12 depends on the value of θ11 and the angle of the upstream slope 143*d*2, but when expressed numerically, θ12 is ° or more, more preferably 2° or still more preferably 8° or more, even more preferably 30° or more. In this embodiment, θ12 is set to be 60° or more.

The upper limit of θ12 can be relatively large and can exceed 360°. However, preferably, θ12 is 360° or less, more preferably 270° or less, and it is 180° or less in this example. Specifically, θ12 is set to be approximately 67°.

Figure 102:
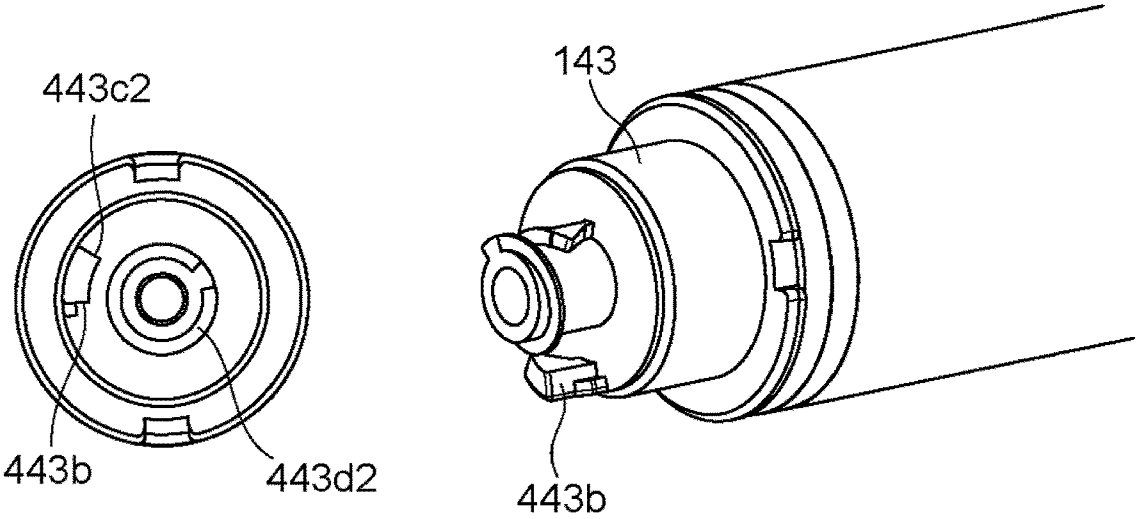
FIG. 102 is a front view, a perspective view, and a side view of the coupling.
Figure 102:
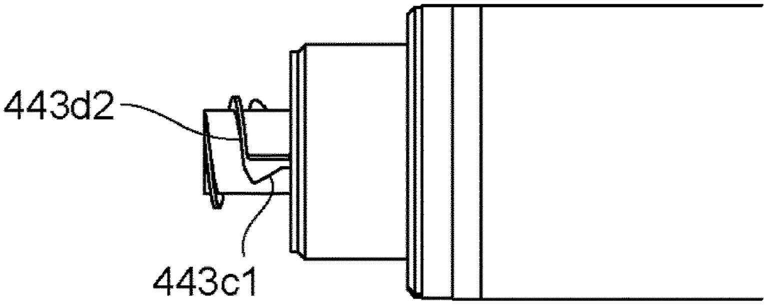
Figure 102:
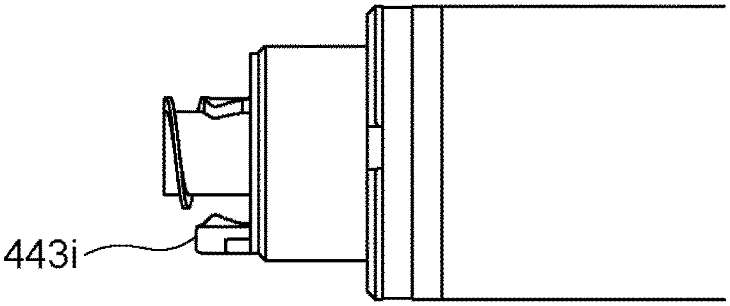

A structure in which θ12 is larger than that of this embodiment will be described hereinafter referring to FIGS. 102 and 103.

Angle θ13 is the sum of θ11 and θ12, and corresponds to the angle occupied by the entire helical slope 143*d*. When θ13 is expressed numerically, it is desirable that θ13 is 2° or more, and more preferably 8° or more. Further, θ13 is preferably 360° or less, and more preferably 270° or less. In this embodiment, θ13 is set to 180° or less. Specifically, θ13 set to be approximately 102°.

Figure 74:
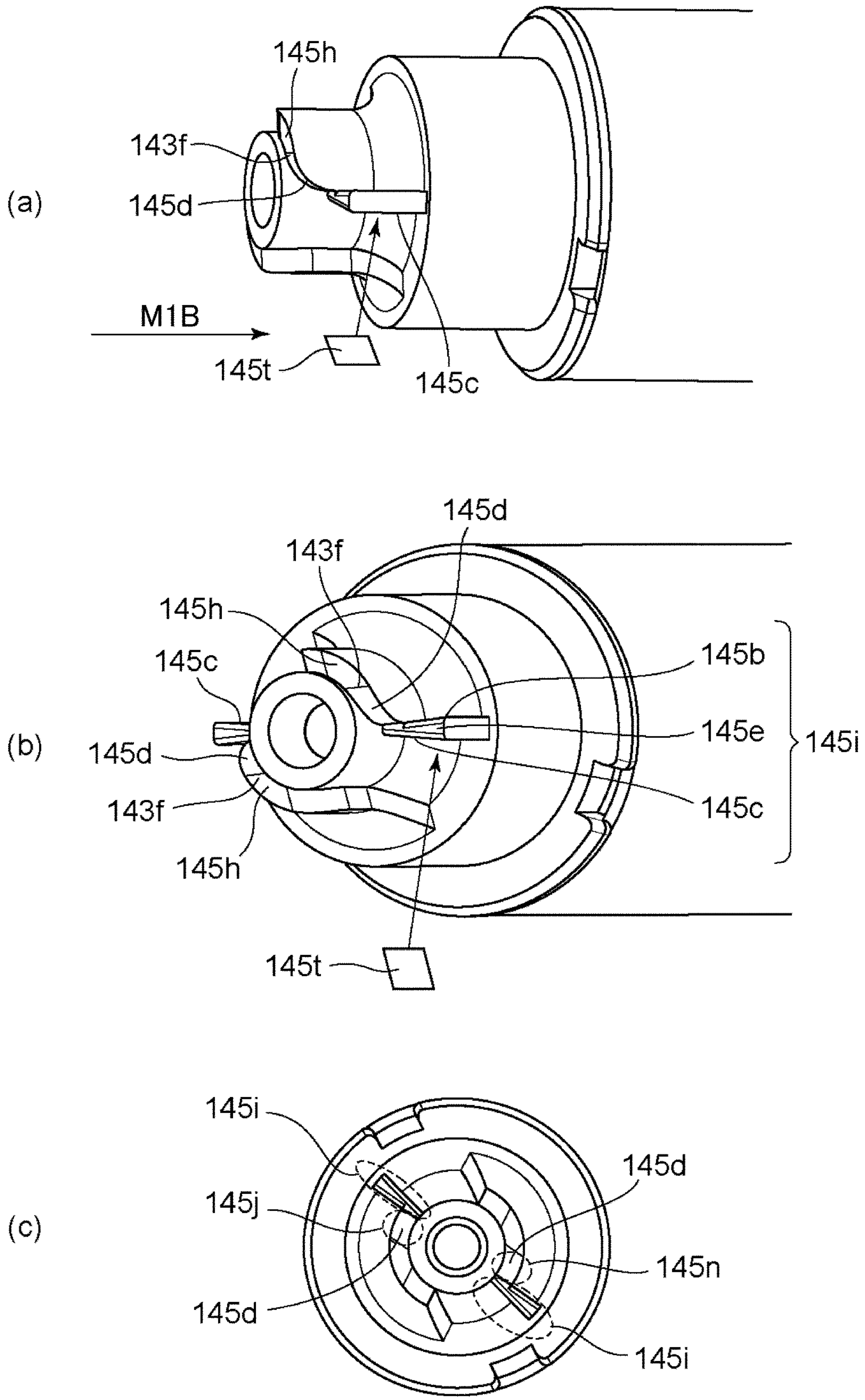
FIG. 74 is a perspective view and a front view illustrating a modified example of the drum coupling.

Referring to FIG. 74, the shape of another modification of the coupling 143 will be described.

FIG. 74 is a perspective view and a front view as seen in two line-of-sight directions of the coupling in the modified example.

The coupling 143 of this modification includes an engaging portion 145*i* including a driving force receiving portion 143*b* and a braking force receiving portion 145*b*, and a guide forming portion 145*n* having a helical slope 145*d*. The engaging portion 145*i* and the guide forming portion 145*n* correspond to the engaging portion 143*i* and the guide forming portion 143*n* of the coupling 143 shown in the Embodiment 1 (see FIG. 79), but their shapes are partially different.

The coupling 143 of this modification includes the visor portion 143*g* contacting the second braking engagement member 208 (not shown), and the helical slope 145*d* is formed by a curved surface. This curved surface has a substantially arc shape, and is shaped so as to connect the braking force receiving portion 145*c* from the inclination start point 143*f*. In this modified example, since the braking force receiving portion 145*c* does not have a shape overhanging to the downstream side in the rotational direction, the elastic member (elastic portion) 145*t* may be attached to the braking force receiving portion 145*c* as in the case of part (e) of FIG. 54.

Figure 57:
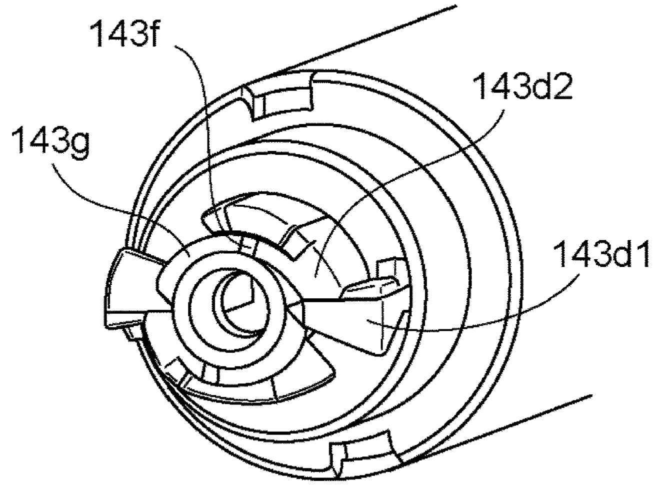
FIG. 57 is a perspective view of the drum unit showing the drum coupling.
Figure 57:
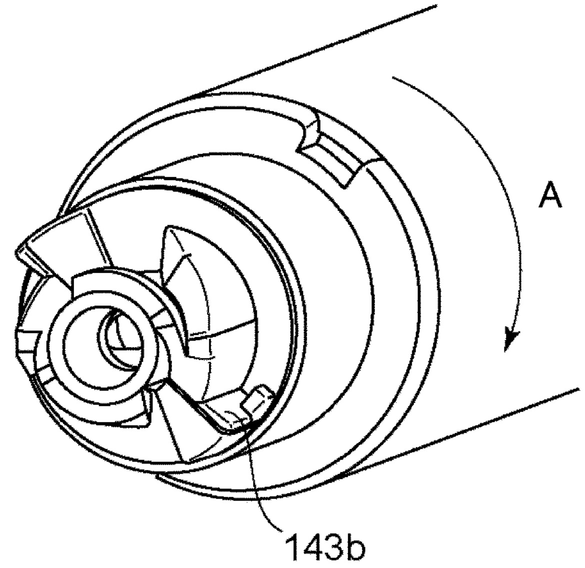
Figure 57:
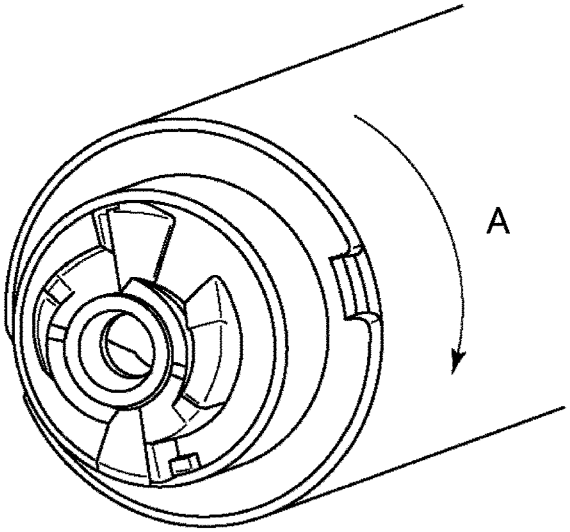

The helical slope 145*d* in this modification (FIG. 74) is a top surface corresponding to the upstream slope 143*d*2 of Embodiment 1 (FIG. 57).

On the other hand, in this modification (FIG. 74), the top surface (upper part) 145*e* (part (b) of FIG. 74) of the engaging portion 145*i* corresponds to the downstream slope 143*d*1 of the Embodiment 1 (FIG. 57), but it is not inclined unlike the downstream side slope 143*d*1.

That is, the top surface 145*e* provided downstream is connected to the top surface (helical slope 145*d*) provided upstream, but the inclination angles of the surfaces thereof are different at the boundary. The top surface 145*e* and the helical slope 145*d* are not smoothly connected.

Further, since the distance between the driving force receiving portion 143*b* and the braking force receiving portion 145*c* is short, the length of the top surface 145*e* measured along the rotational direction is smaller (shorter) than the length of the downstream slope 143*d*1 in FIG. 57. Further, as described above, the top surface 145*e* is not inclined. In this modification, it can be considered that the top surface 145*e* is not used as a guide.

However, even with such a structure, the helical slope 145*d*, which is a guide (inclined portion), can guide the braking engagement member (204, 208) toward the braking force receiving portion 145*c*.

A plane 145*h* is adjacent to the upstream of the helical slope 145*d*, and the helical slope 145*d* and the plane 145*h* are connected to each other. The plane 145*h* can be inclined in the same direction as the helical slope 145*d* to form a part of the helical slope 145*d*. Further, the drum coupling of this modification may have the visor portion 143*g* of the push-back surface 143*k* described in embodiment 1 or another modification of the Embodiment 1 (see FIGS. 1, 52, and so on).

Figure 75:
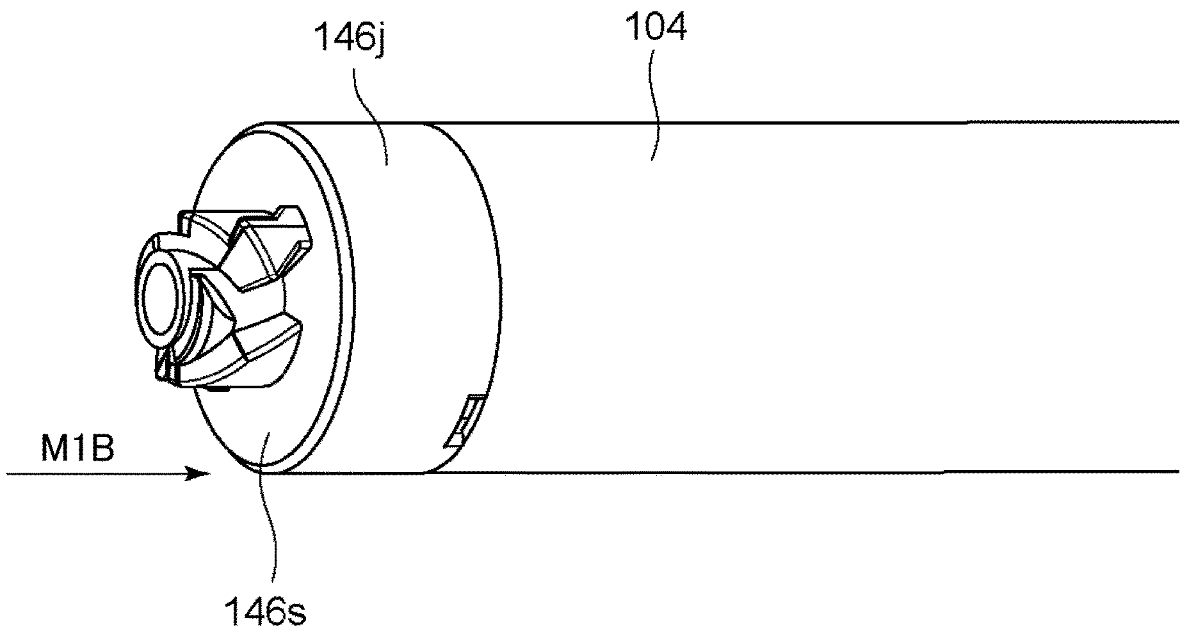
FIG. 75 is a perspective view of the drum unit.

Further, regarding the shape of the drum coupling, the shape of the shaft portion 143*j* shown in FIG. 1 can also be selected in view of design reasons. For example, FIG. 75 shows a shape of a modified example of the drum coupling. In the example of FIG. 75, the diameter of the shaft portion 146*j* is the same as the diameter of the photosensitive drum 104. The shaft portion 146*j* is rotatably supported by a driving side cartridge cover member 116 (see FIG. 15). The position restriction in the direction of the arrow MB 1 can be performed using the shaft end surface 146*s*, for example. In this manner, the shape of the shaft portion 146*j* can be appropriately selected depending on the relationship with the peripheral portions and the manufacturing method.

Figure 76:
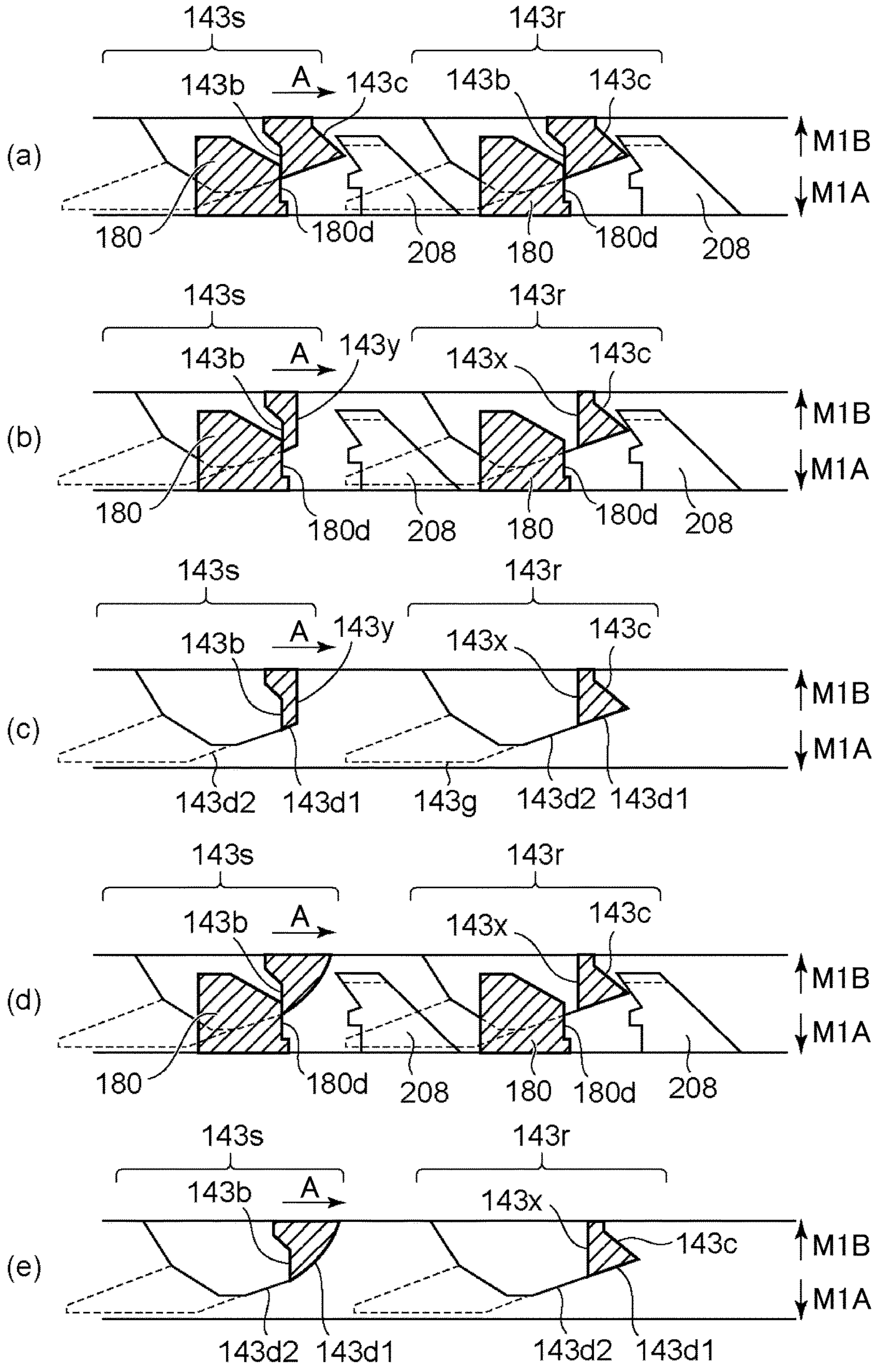
FIG. 76 is a developed view illustrating the engagement of the drum coupling.
Figure 78:
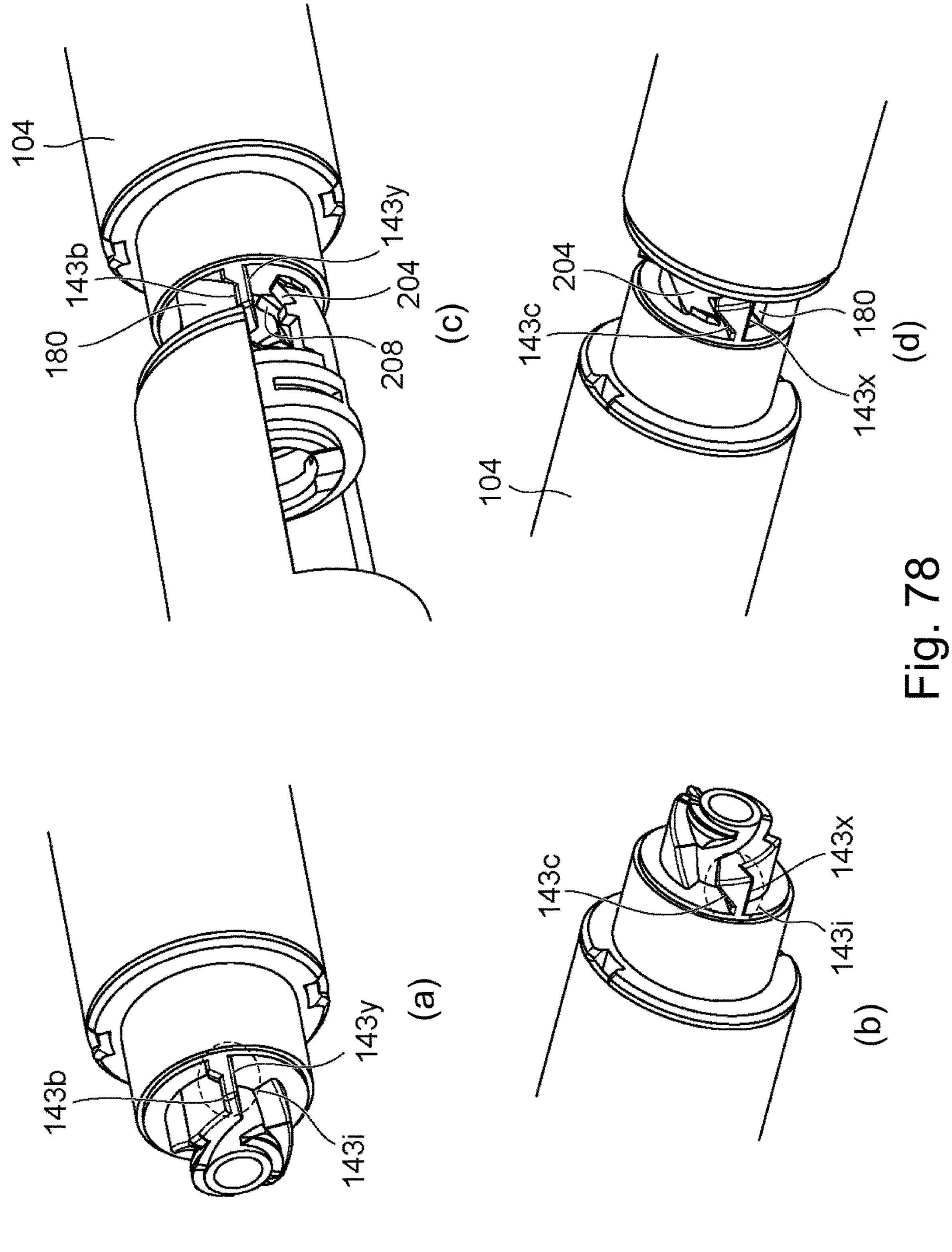
FIG. 78 is a perspective view of the drum unit and the drive transmission unit.

Another modification of the drum coupling 143 is shown in part (b) of FIG. 76, part (c) of FIG. 76, part (a) of FIG. 78, part (b) of FIG. 78, part (c) of FIG. 78, and part (d) of FIG. 78. These Figures show drum couplings in which two coupling portions 143*s* and 143*r* have different shapes. Part (b) and (c) FIG. 76 are development views of the coupling 143, and in part (c) of FIG. 76, the drum drive coupling 180 and the braking engagement member 208 provided in the device main assembly side are also shown in the development view. Part (a) of FIG. 78 and part (b) of FIG. 78 are perspective views of the drum coupling 143. Further, part (c) of FIG. 78 and part (d) of FIG. 78 show the engagement state of the braking engagement member (204, 208) and the drum drive coupling with respect to the drum coupling 143.

In the coupling 143 shown in these Figures, the engaging portion 143*i* of one coupling portion 143*s* is not provided with the braking force receiving portion 143*c*, but includes only the driving force receiving portion 143*b*. That is, the side surface 143*y* provided on the engaging portion 143*i* of the coupling portion 143*s* does not engage with the braking engagement member (204, 208). On the other hand, the engaging portion 143*i* of the other coupling portion 143*r* is provided only the braking force receiving portion 143*c* and is not provided with the driving force receiving portion 143*b*. The side surface 143*x* of the engaging portion 143*i* of the coupling portion 143*r* does not engage with the drum drive coupling 180.

An example of another asymmetrical coupling 143 is shown in part (d) of FIG. 76. This coupling portion 143*s* is an example in which the coupling portion 143*s* does not have any side surface corresponding to the driving force receiving portion 143*c*.

The modified example of the coupling 143 shown in part (b) of FIG. 76, part (c) of FIG. 76, part (a) of FIG. 78, part (b) of FIG. 78, part (c) of FIG. 78, and FIG. 7 is a (d) receives a driving force at only one place and receives the braking force at only one place. Therefore, in order for the drum coupling to stably receive the driving force and the braking force, it is preferable to improve the fitting accuracy between the circular hole portion 143*a* and the positioning boss 180*i* of the drum drive coupling 180 (see FIG. 51). That is, it is preferable to reduce the gap produced between them, thus improving, the positional accuracy of the drum coupling 143 relative to the drive transmission unit 203, to stably and surely engage the drive transmission unit 203 and the drum coupling 143.

Figure 77:
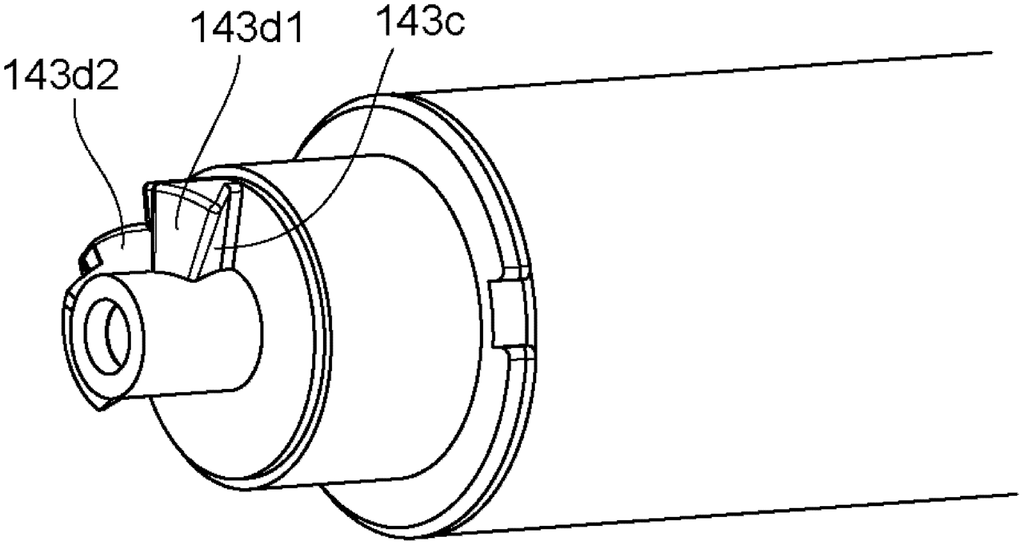
FIG. 77 is a perspective view of the drum unit and a front view of the coupling.
Figure 77:
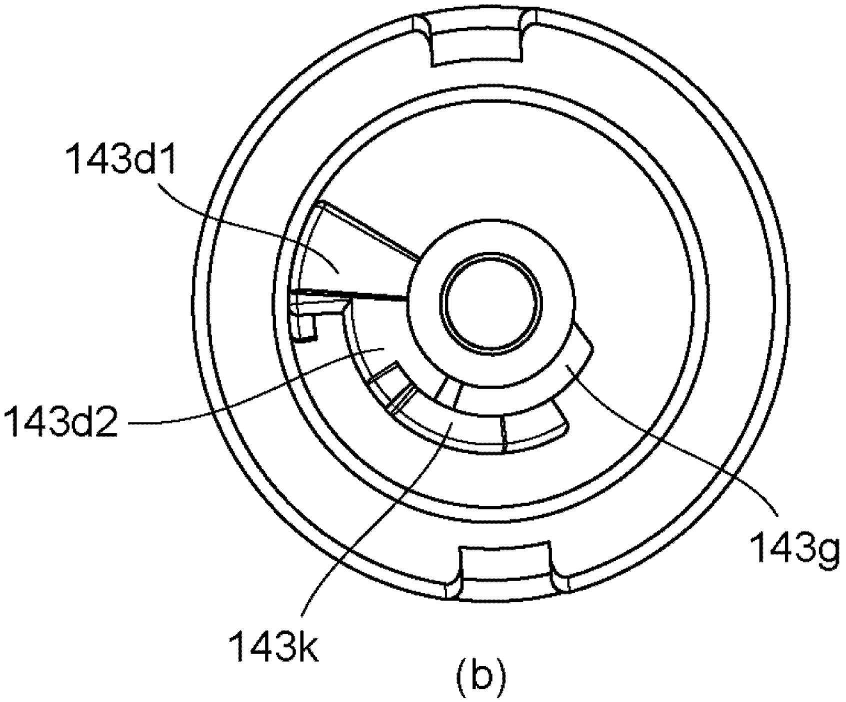

Further, FIG. 77 shows another modification of the drum coupling including one driving force receiving portion and one braking force receiving portion. The drum coupling 143 shown in FIG. 77 has only one upstream side slope 143*d*2, only one downstream side slope 143*d*1, only one visor portion 143*g*, only one driving force receiving portion 143*b*, only one braking force receiving portion 143*c*, and only one extrusion surface 143*k*. Part (a) of FIG. 77 is a perspective view of the drum coupling, and part (b) of FIG. 77 is a front view thereof.

In the modified example of the drum coupling 143 as shown in FIG. 77, arbitrary portions of the slope 143*d*, the visor portion 143*g*, the driving force receiving portion 143*b*, the braking force receiving portion 143*c*, and the extrusion surface 143*k* may be placed at a 180° position or positions (axisymmetric).

Figure 96:
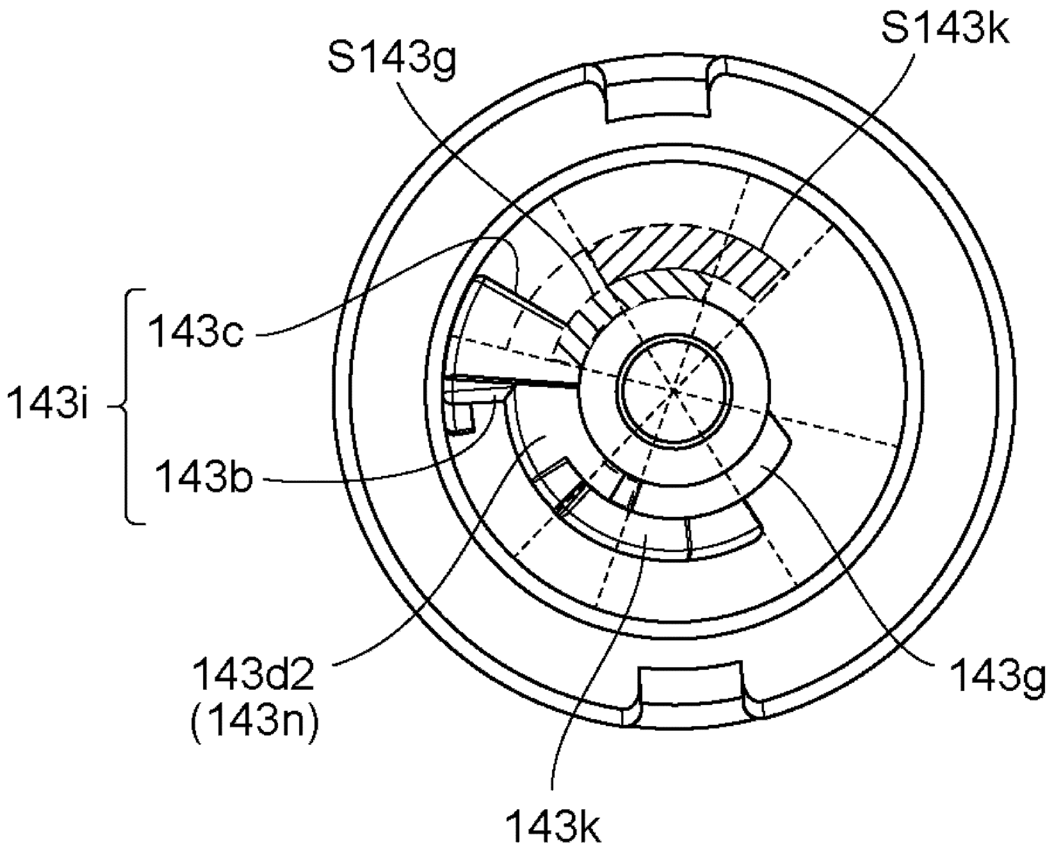
FIG. 96 is a front view of the coupling.

For example, as shown in FIG. 96, the drum coupling 143 visor portion 143*g* shown in FIG. 77 may be moved to the 180° symmetric region S143*g*, or the extrusion surface 143*k* may be moved to the symmetric region S143*k*.

This is because the drum drive coupling 180 and the braking engagement members (204, 208) both have 180° symmetrical shape.

Therefore, regardless of which one of the two 180° symmetrical places is the place where one helical slope 143*d* is disposed, the slope 143*d* can act on the entire braking engagement member (204, 208). Similarly, the extrusion surface 143*k* may be placed at either of the two places which are ° symmetrical with respect to each other. The same applies not only to the visor portion 143*g* and the extrusion surface 143 *k*, but also to the braking force receiving portion 143 *c*.

Further, the drum drive coupling 180 can engage with the drive force receiving portion 143*b* regardless of whether the drive force receiving portion 143*b* is placed at either of two 180° symmetrical positions.

The drum drive coupling 180 has two drive transmission surfaces 180*d*, but the two drive transmission surfaces 180*d* move integrally (part (a) of FIG. 45). Further, the braking engagement members (204, 208) have two coupling engaging portions 204*b* and two each, and all of these coupling engaging portions move integrally (see part (b) of FIG. 45).

Figure 97:
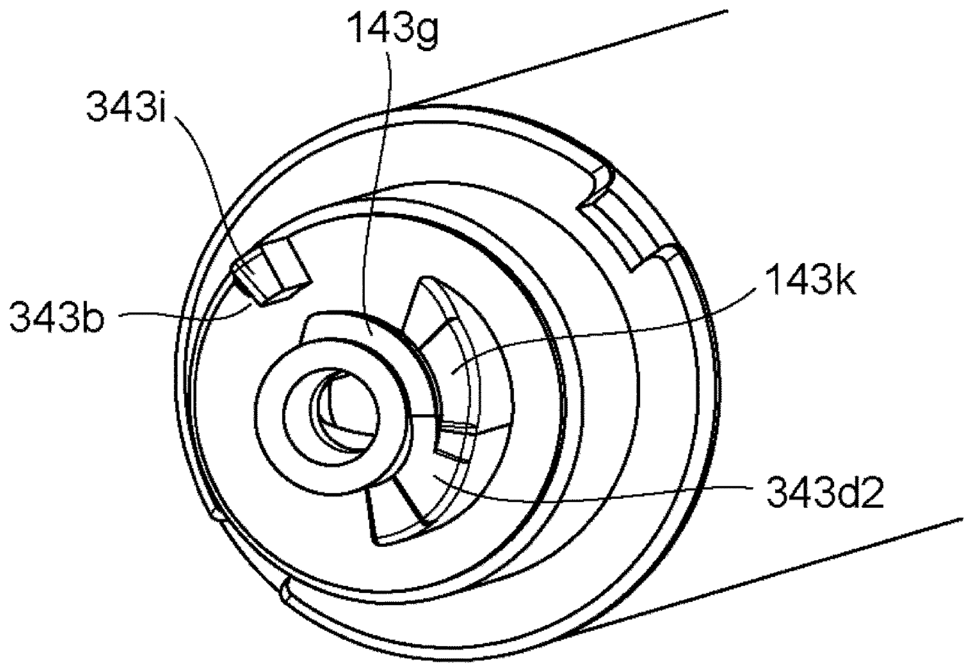
In FIG. 97, part (a) is a perspective view of the coupling, and part (b) is a front view.
Figure 97:
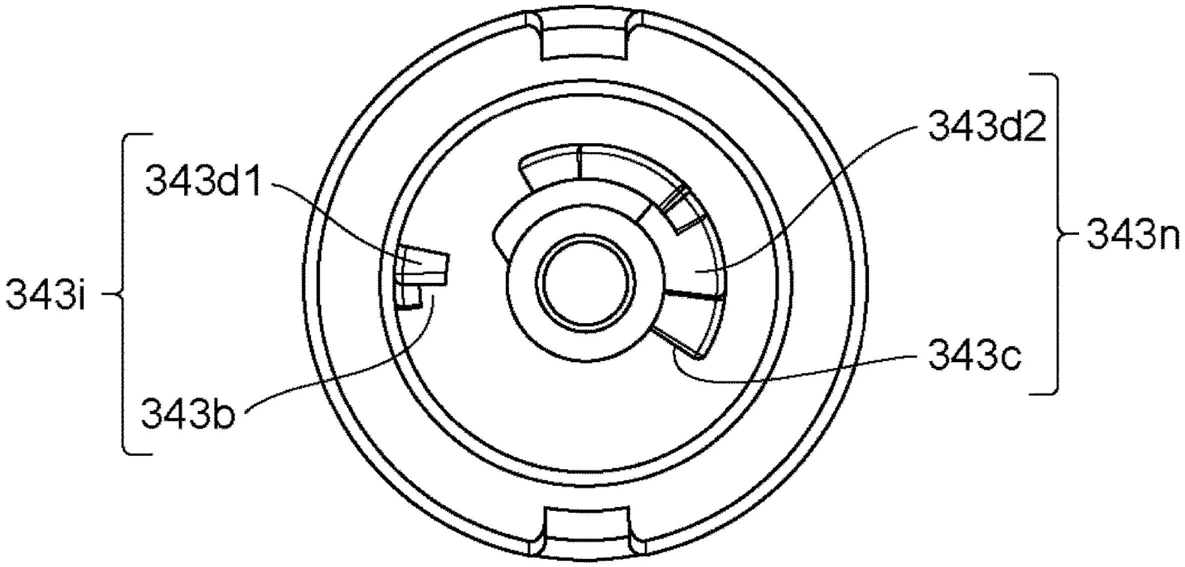

As another modification in which the shape of the drum coupling 143 is made asymmetrical as described above, there is also a follow structure. That is, one coupling portion 143*s* has an engaging portion 143*i* but does not have a guide forming portion 143*n*, and the other coupling portion 143*r* has a guide forming portion 143*n* but does not have an engaging portion 143*i*. Such a structure is conceivable. Examples of such a structure are shown in parts (a) and (b) of FIG. 97. Part (a) of FIG. 97 is a perspective view of a modified example of the drum coupling, and part (b) of FIG. 97 is a front view thereof.

In the modified example of the drum coupling shown in these Figures, the guide forming portion 343*n* and the engaging portion 343*i* have one. The guide forming portion 343*n* forms a helical slope (guide, top surface, inclined portion) 343*d*2. The engaging portion 343*i* forms a driving force receiving portion 343*b* and a helical slope (guide, top surface, inclined portion) 343*d*1. The guide forming portion 343*n* and the engaging portion 343*i* are located on opposite sides of the axis L. Further, in this modification, the braking force receiving portion 343*b* is not arranged at the engaging portion 343*i*, but is arranged at the end portion downstream of the guide forming portion 343*n* in the rotational direction. That is, the engaging portion 343*i* engages with the driving force applying member (drum drive coupling) 180, but does not engage with the braking force applying member (braking engagement members 204, 208).

Figure 99:
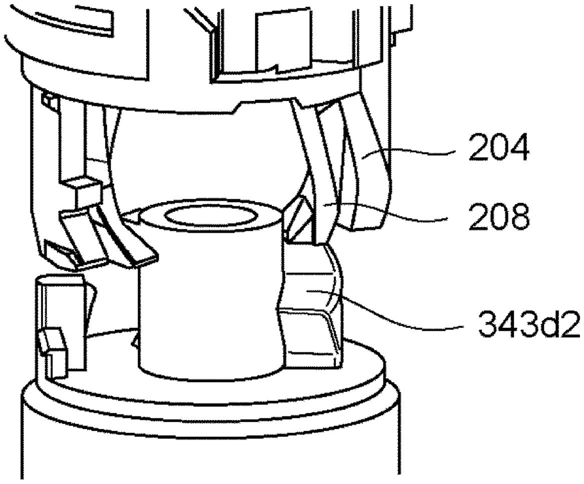
FIG. 99 is a perspective view illustrating an engaged state of the coupling and the braking engagement member.
Figure 99:
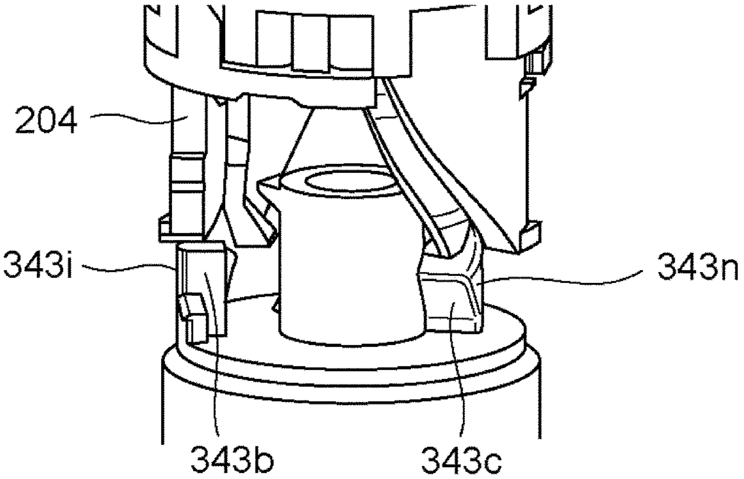
Figure 99:
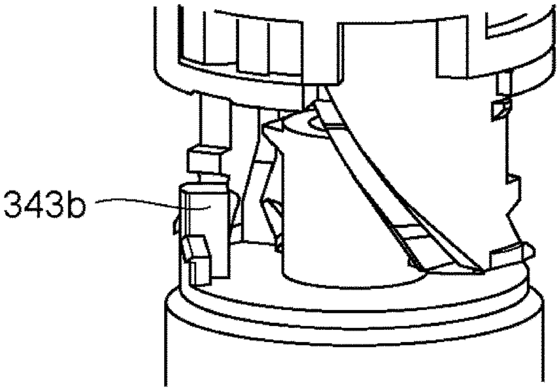

Part (a) of FIGS. 99, (b), and (c) show the engagement process of the drum coupling and the braking engagement member (204, 208) of this modified example in this order. For the sake of explanation, the drum drive coupling 180 of the drive transmission unit 203 is not shown.

As shown in part (a) of FIG. 99, when the second braking engagement member 208 comes into contact with the slope 343*d*2 of the guide forming portion 343*n*, the second braking engagement member 208 is on the downstream side in the rotational direction and in the axial direction. The movement is started so as to approach the photosensitive drum 104.

As shown in part (b) of FIG. 99, when the second braking engagement member 208 reaches the neighborhood of the end of the upstream slope **343*d*2, the first braking engagement member 204 is brought into contact with the slope 343*d*1 which is the top surface of the engaging portion 343*i*. Thereafter, the braking engagement members (204, 208) continue to rotate, and, the free end of the first braking engagement member 204 enters the space downstream of the engaging portion 343*i*, as shown in part (c) of FIG. 99. The first braking engagement member 204 reaches a position where it can engage with the braking force receiving portion 343*c* (see part (b) of FIG. 97**.

As described above, also in the drum coupling of the present modification shown in FIGS. 97 and 99, any portion thereof can be shifted to a 180° symmetrical position. For example, as shown in part (a) of FIG. 98, the engaging portion **343*i* and the driving force receiving portion 343*b* can be shifted to the positions S343*i* and S343*b* which are 180° symmetrical positions, respectively. The coupling in which the engaging portion 343*i* is shifted to S343*i*, is similar to the modified example of the drum coupling shown in FIG. 77. Conversely, when a portion of the drum coupling portion shown in FIG. 77 is shifted to a position symmetrical by 180°, the shape is similar to that of the drum coupling of this modification shown in FIG. 97**.

Figure 98:
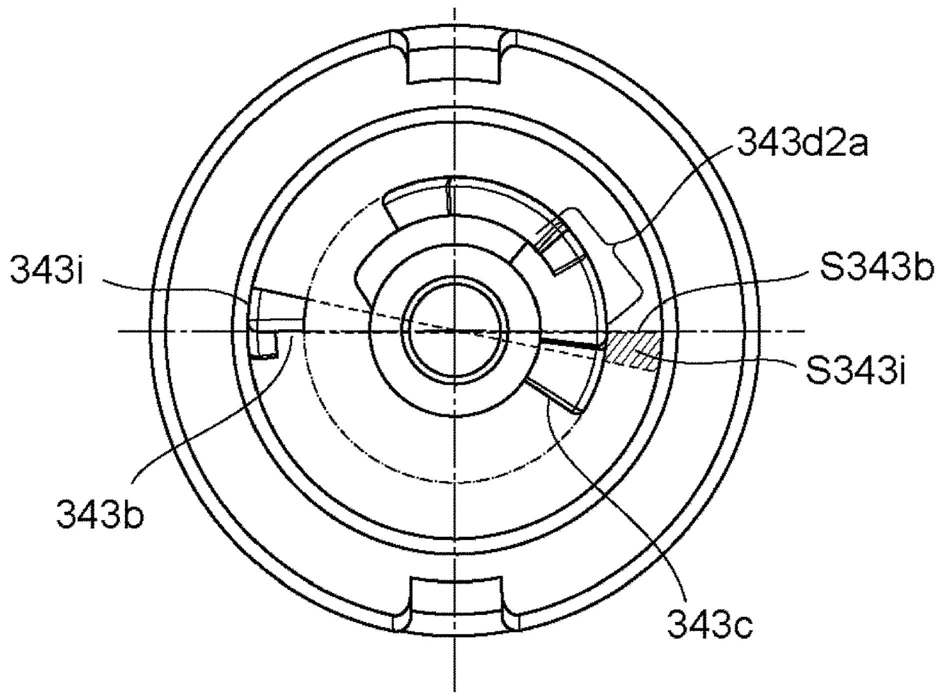
FIG. 98 is a front view of the coupling.
Figure 98:
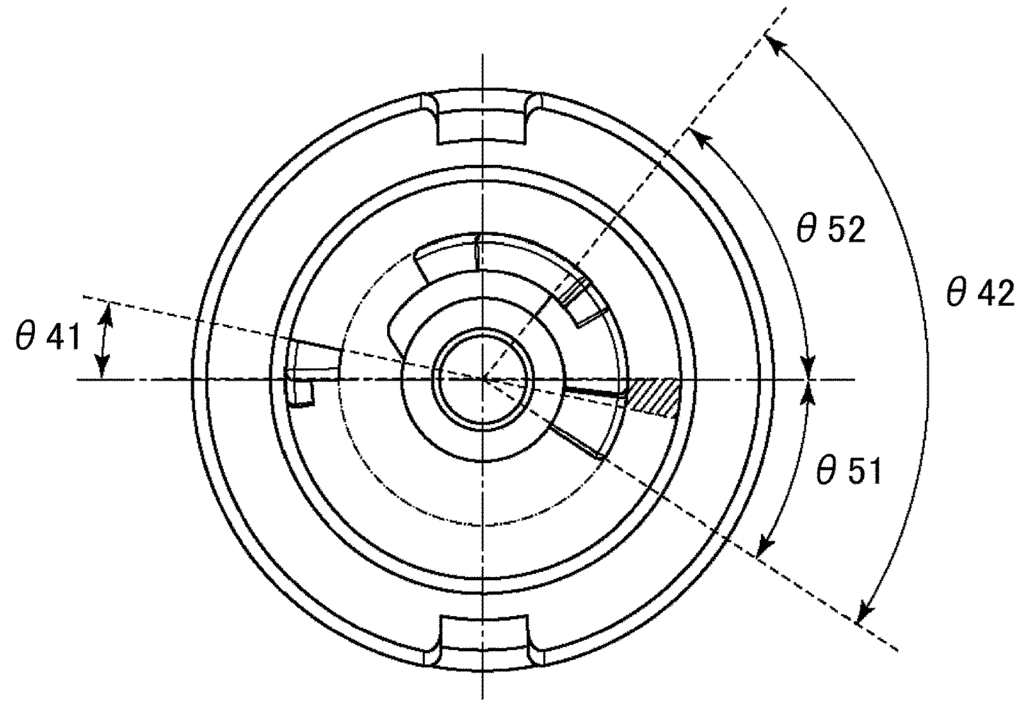

As shown in part (a) of FIG. 98, in this modification, when the engaging portion **343*i* is imaginarily placed at the 180° symmetrical position S343*i*, the slope 343*d*2 is adjacent to the imaginarily arranged engaging portion S343*i*. The upstream side portion 343*d*2*a* of the slope 343*d*2 extends from the upstream to the downstream in the rotational direction toward the imaginarily arranged engaging portion S343*i* and the imaginarily arranged driving force receiving portion S343*b***.

Part (b) of FIG. 98 shows the angles θ41, θ42, θ51, and θ52 regarding the dimensions of each portion in this modification.

Angle θ41 is the angle of the region where the engaging portion **343*i* is arranged. θ42 is the angle of the region occupied by the helical slope 343*d*2 of the guide forming portion 343*n*. θ51 is an angle indicating a region from S343*b* in which the driving force receiving portion 343*b* is imaginarily arranged at 180° symmetrical positions to the braking force receiving portion 343*c*. θ52 is the angle of the region occupied by the portion 343*d*2*a* located on the helical slope 343*d*2 on the upstream side in the rotational direction from the position S343*b*** of the imaginarily arranged driving force receiving portion.

Angle θ41 is preferably not less than 1°, further preferably not less than 2°, and even further preferably not less than 8°, from the stand point of assuring the strength of the driving force receiving portion **343*b***.

Angle θ51 corresponds to the angle of the gap between the braking engagement member (204, 208) and the drum drive coupling 180. Therefore, it is desirably not more than 80° as described above.

Further, since θ51 is larger than θ41, θ51 is preferably 1° or more, further preferably 2° or more, and even further preferably 8° or more. Furthermore, it is desirable that θ41 is 80° or less.

Angle θ52 is an angle corresponding to θ12 in FIG. 101, and the preferred range of θ52 is the same as that of θ12. Further, since θ42 is an angle corresponding to θ13 in FIG. 101, the preferable range of θ42 is the same as that of θ13.

Figure 100:
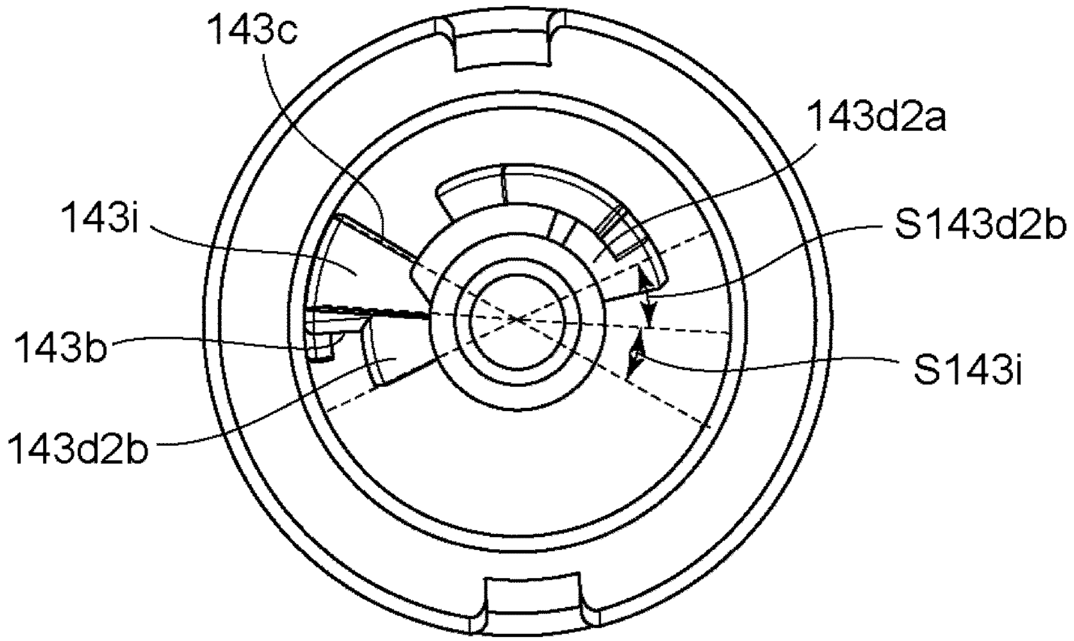
FIG. 100 is a front view of the coupling.
Figure 100:
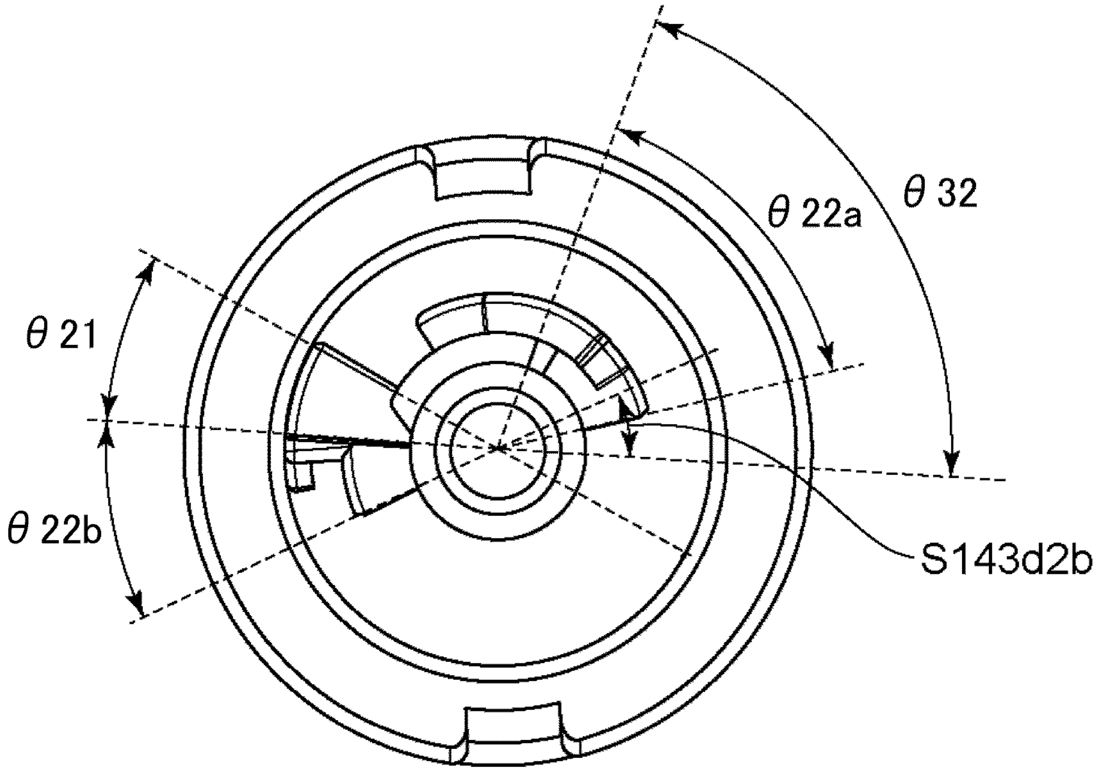

Further, another modification of the asymmetrically shaped drum coupling is shown in part (a) of FIG. 100 and part (b) of FIG. 100. The structure is such that the upstream slope **143*d*2 of the Embodiment 1 (see FIG. 58 and the like) is divided and arranged at two places. That is, the upstream slope 143*d*2 is divided into an upstream portion 143*d*2*a* and a downstream portion 143*d*2*b*. The engaging portion 143*i* is adjacent to the downstream portion 143*d*2*b* of the upstream side slope 143*d*2**.

The dimensional relationship in this modified example is shown in part (b) of FIG. 100. The angle θ21 is the angle of the engaging portion **143*i* and corresponds to the angle θ11 in FIG. 101. The preferred angle of θ21 is the same as the angle θ11. θ22*b* is an angle of the range occupied by the downstream portion 143*d*2*b* of the upstream side slope 143*d*2, and θ22*b* is an angle occupied by the upstream portion 143*d*2*a* of the upstream side slope 143*d*2**.

The region in which the downstream portion **143*d*2*b* of the upstream slope 143*d*2 is imaginarily moved to a position 180° symmetrical is the region S143*d*2*b*. At this time, the angle of the region occupied by the virtual region S143*d*2*b* and the upstream portion 143*d*2*a* is θ32. Since θ32 corresponds to the angle θ12 in FIG. 101, the preferred angle range of θ32 is equivalent to the preferred angle range of θ12**.

The range of suitable angles of **022*a* and θ22*b* is also based on θ12**.

Further, a further modification of the drum coupling will be described. The helical slope **143*d* and the upstream slope 143*d*2 as the guide and the upstream guide can be changed to be longer than those the drum coupling of the Embodiment 1 (FIG. 1 and so on). Such an example is shown in FIGS. 102 and 103. In the drum couplings shown in these Figures, the helical slope 443*d*2 corresponding to the upstream slope 143*d*2 is extended to exceed 360°. That is, the helical slope 443*d*2** is extended more than one full circumference.

The engaging portion **443*i* corresponding to the engaging portion 143*i* of the Embodiment 1 is provided separately from the slope 443*d*2. The engaging portion 443*i* includes a braking force receiving portion 443*c*1 and a driving force receiving portion 443*b*. The braking force receiving portion 443*c*2 is also provided in the neighborhood of the end of the helical slope 443*d*2. The braking force receiving portion 443*c*1 and the braking force receiving portion 443*c*2** are arranged at positions 180° symmetrical.

Figure 103:
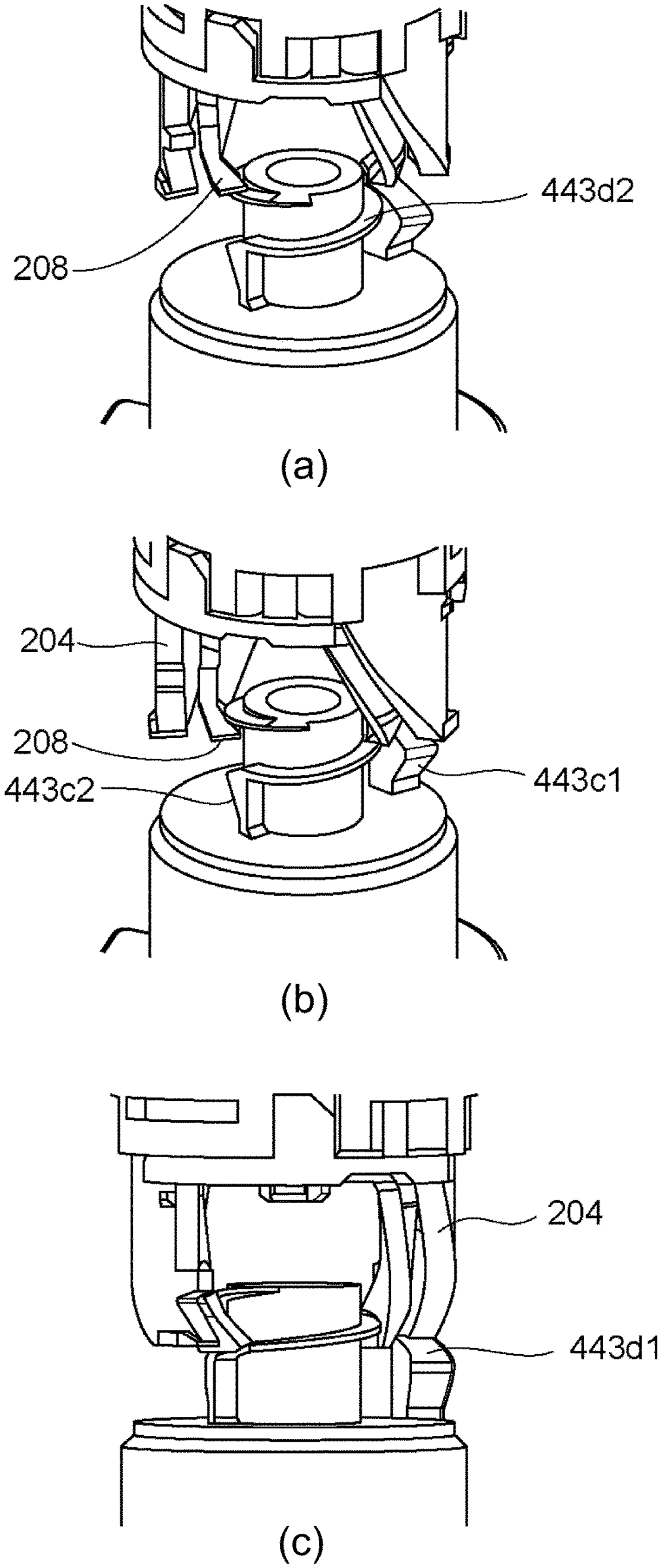
FIG. 103 is a perspective view illustrating an engaged state of the coupling and the braking engagement member.

In part (a) of FIG. 103, part (b) of FIG. 103, and part (c) of FIG. 103, the engagement process of the drum coupling and the braking engagement member in this modified example are shown in chronological order. The drum drive coupling 180 is not shown for the sake of illustration.

As illustrated in FIG. 103, the braking engagement members (204, 208) rotate one or more turns by being guided by the helical slope **443*d*2. In this manner, it is possible to increase the length of the helical slope 443*d*2, which is the guide and the inclined portion, beyond 360°. However, if the helical slope 443*d*2 is long, the time required for the braking engagement member (204, 208) to pass through the helical slope 443*d*2 is long, or the speed of the braking engagement member (204, 208) on the helical slope 443*d*2 is slow, as the case may be. In order to deal with this, when the drive transmission unit 203 and the coupling 143 are engaged with each other it may be necessary to take measures to secure sufficient time for the braking engagement member (204, 208) to pass the helical slope 443*d*2, by decreasing the rotation speed of the drive transmission 203**, for example.

In order to smoothly engage the drive transmission unit 203 and the drum coupling 143 with each other while rotating the drive transmission unit 203 at high speed It is desirable to shorten the time required for the braking engagement members (204, 208) to pass in the helical slope 443*d*2. From that standpoint, it is further preferable that the length of the helical slope (inclined portion, guide) 443*d*2 is 360° or less, and it is further preferable that the length is 270° or less.

As described above, it is also possible to use a modified example in which the drum coupling of the Embodiment 1 is changed to an asymmetrical shape.

Figure 58:
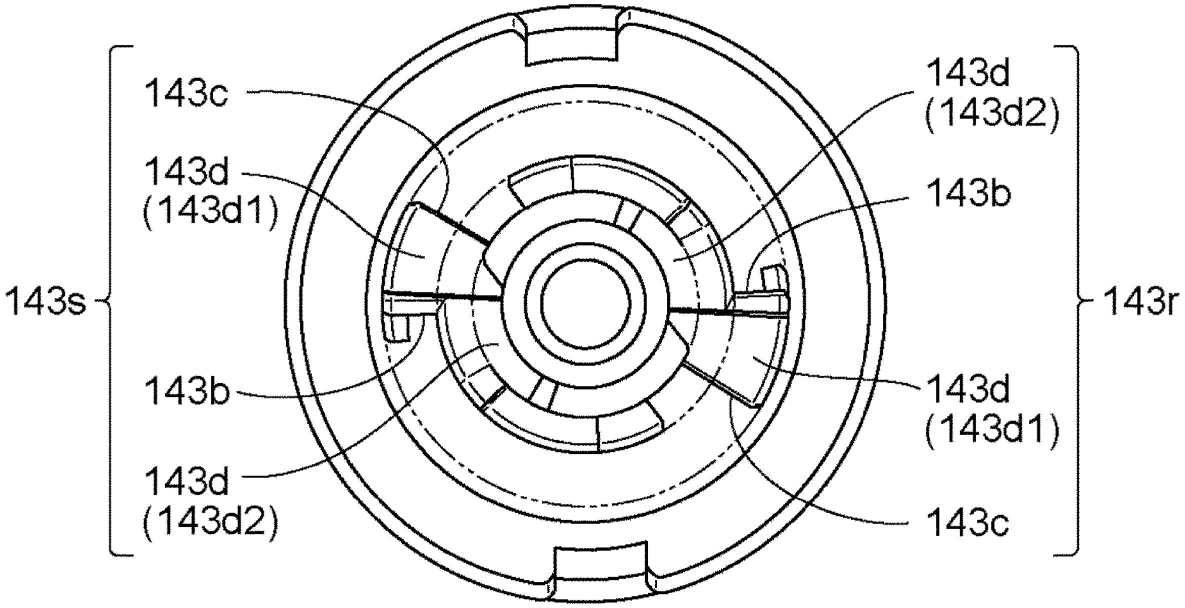
FIG. 58 is a top view of the drum coupling.

However, as in the drum coupling 143 of the Embodiment 1 shown in FIGS. 1 and 58, It is further preferable that the coupling 143 includes the driving force receiving portion 143*b* and the braking force receiving portion 183*c* at 180° apart two positions, because then the engagement state of the drive transmission unit 203 with the coupling 143 and the transmission state of the drive force are stabilized. The coupling 143 receives the driving force at two symmetrically arranged points, and the braking force is also received at two symmetrically arranged points. Therefore, it becomes easy to maintain the balance of the force applied to the coupling 143.

Further, in the drum coupling 143 (see FIG. 1) of the Embodiment 1 described above, each shaped portion (engagement portion, guide forming portion, visor portion, and so on) of the coupling has a specific arrangement relationship. However, it is also conceivable to change these arrangement relationships by making any portion of the coupling 143 movable.

Figure 104:
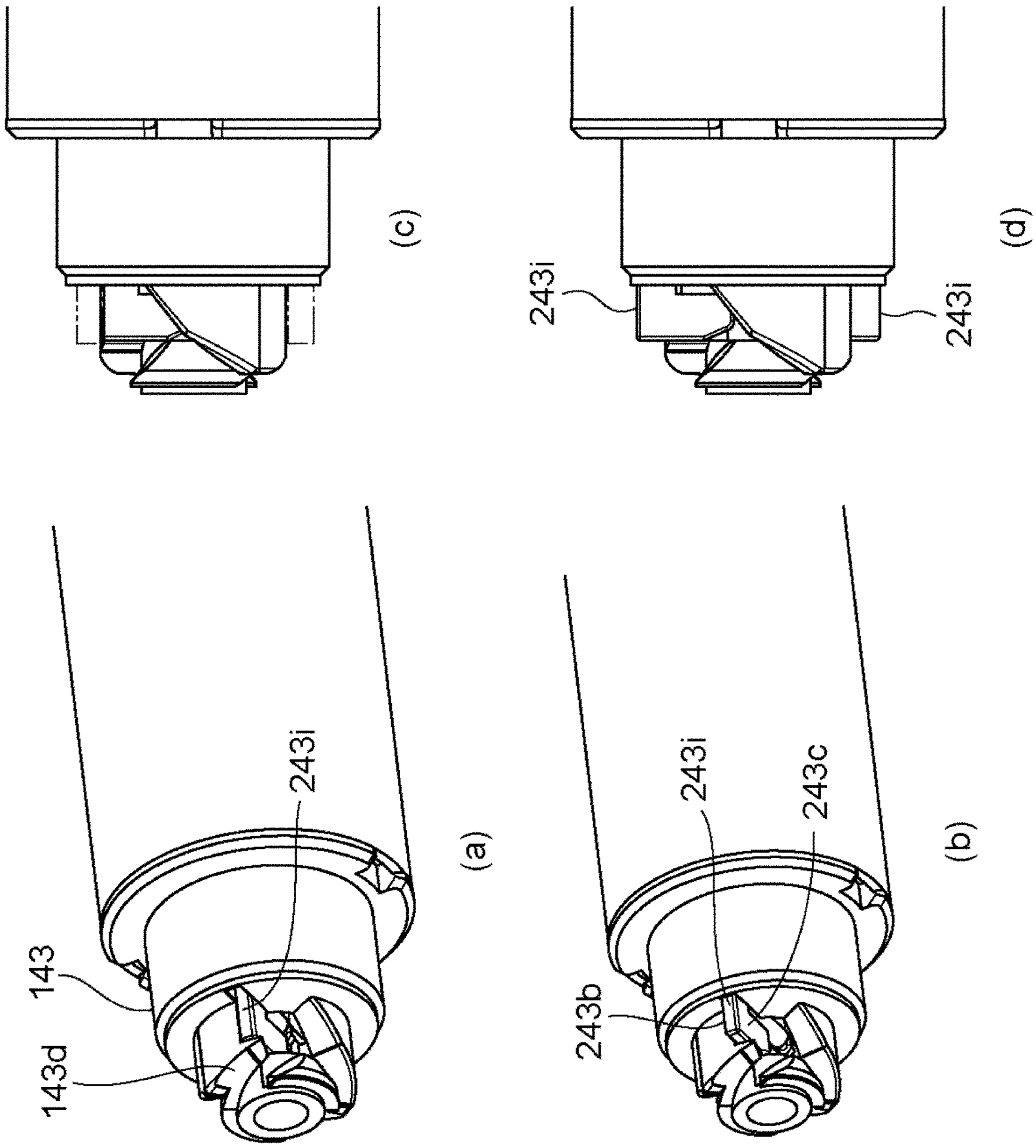
FIG. 104 is a perspective view and a side view of the drum unit.
Figure 105:
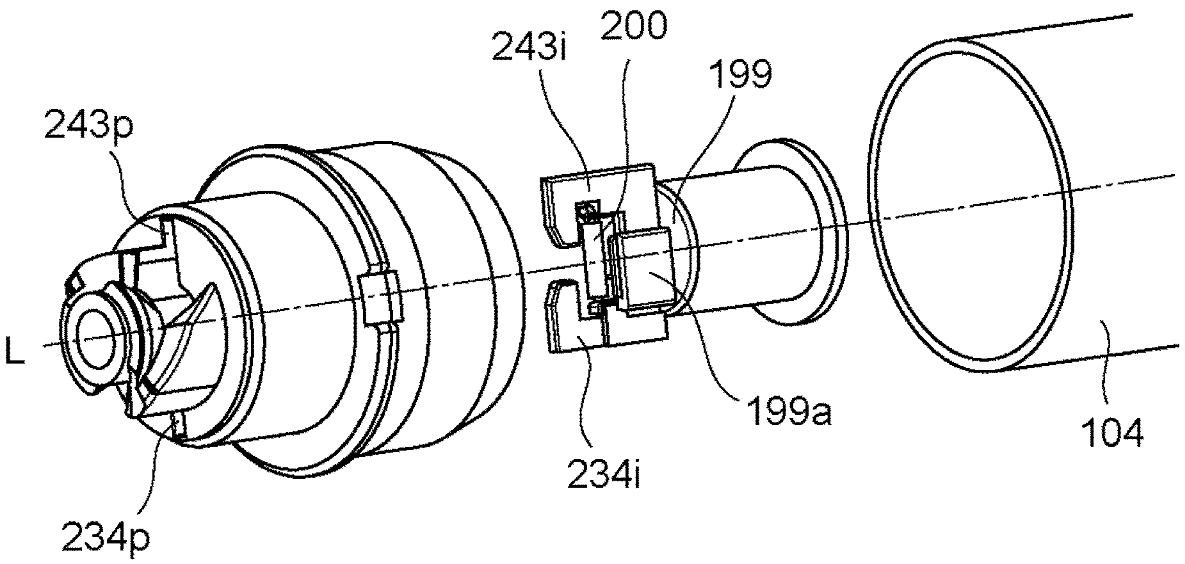
FIG. 105 is a perspective view of the drum unit and a front view of the coupling.
Figure 105:
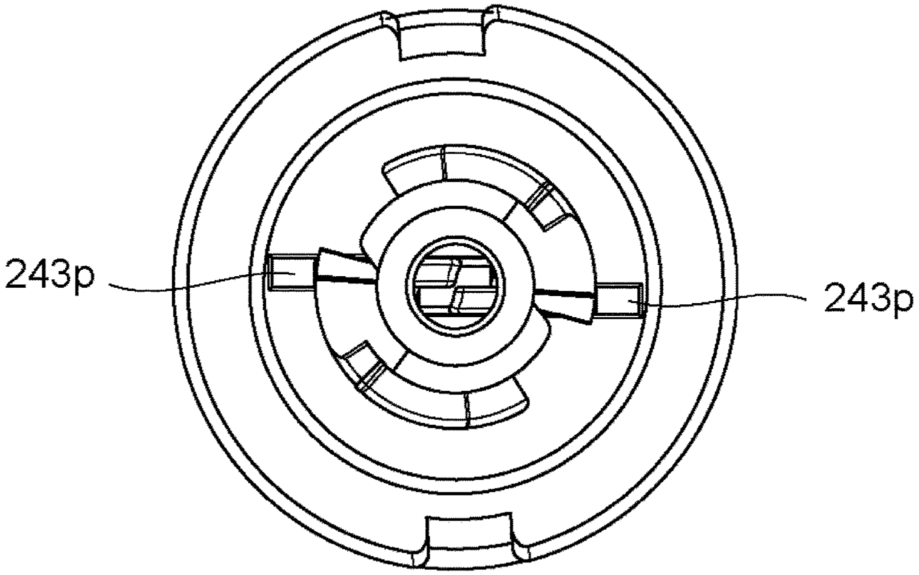
Figure 106:
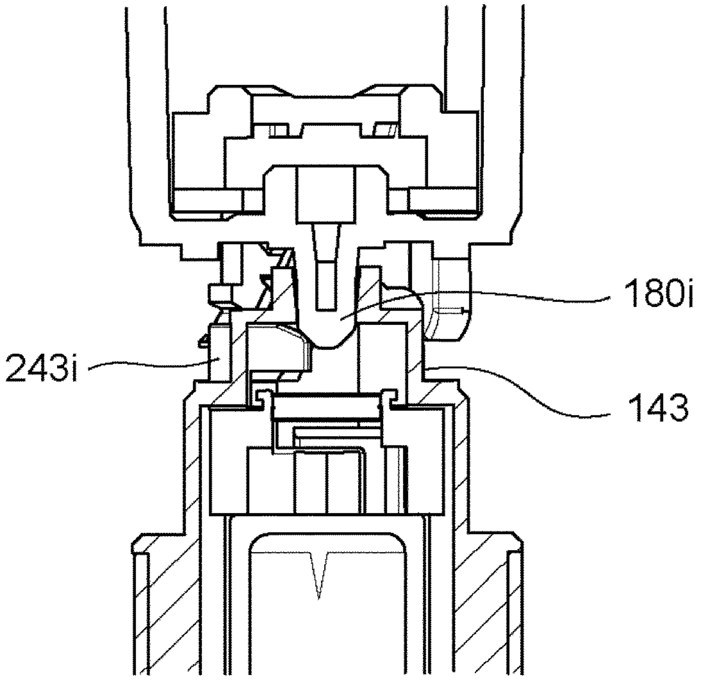
FIG. 106 is a sectional view of the drum unit.
Figure 106:
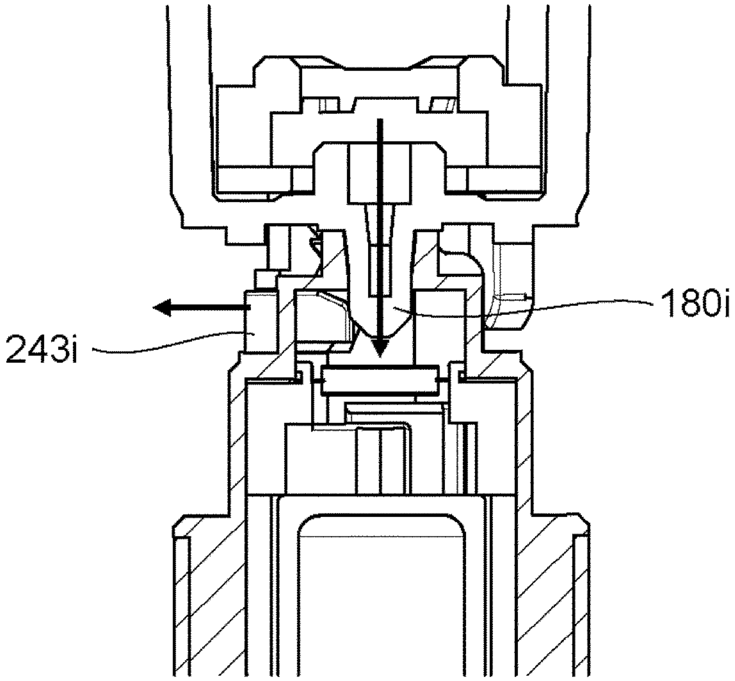

As an example of such a structure, FIGS. 104 to 106 show a structure in which the engaging portion 243*i* is movable relative to other portions of the drum coupling 143, And specifically, a structure in which the engaging portion 243*i* can advance and retract in the radial direction. As shown in FIG. 105, the drum coupling 143 is provided with two openings 243*p*, and the engaging portion 243*i* is partially exposed from the inside of the drum coupling through these openings 243*p*.

As shown in part (a) of FIG. 105, the two engaging portions 243*i* are supported by a guide 199*a* of a support member 199 provided inside the drum coupling Further, In addition, the engaging portion 243*i* is structured to be movable in the radial direction along the guide 199*a*, but is urged inward in the radial direction by the tension spring 200.

Therefore, when the cartridge is not used, the two engaging portions 243*i* are retracted inside the drum coupling as shown in part (a) of FIG. 104 and part (c) of FIG. 104. On the other hand, when the cartridge is to be mounted to the image forming apparatus main assembly, the positioning boss 180*i* enters the inside of the drum coupling and comes into contact with the engaging portion 243*i* as shown in part (a) of FIG. 106. Further, when the positioning boss 180*i* enters the inside of the drum coupling 143, the engaging portion 243*i* is pushed outward in the radial direction by the positioning boss 180*i*. By this, as shown in part (b) of FIG. 104 and part (d) of FIG. 104, a part of the engaging portion 243*i* advances toward the outside of the drum coupling 143.

In this state, both side portions of the engaging portion 243*i*, that is, the driving force receiving portion 243*b* and the braking force receiving portion 243*c* are exposed, and the driving force and the braking force can be received from the image forming apparatus main assembly, respectively.

As described above, the arrangement relationship and shape of the coupling 143 are not constant and may vary or change. For example, it is conceivable the when the cartridge is not in use, the drum coupling portion which is vulnerable to external impact is retracted to be protected.

When a portion of the coupling 143 is movable, the state in which in which the coupling is actually used, that is, The state of the coupling 143 when the cartridge and the drum unit are mounted to the image forming apparatus main assembly and the coupling 143 engages with the drive transmission unit 203 may be regarded as a reference state, the shape of the coupling 143 and the arrangement relationship of each portion may be structured to satisfy the desired conditions as described above, in such a reference state.

Figure 107:
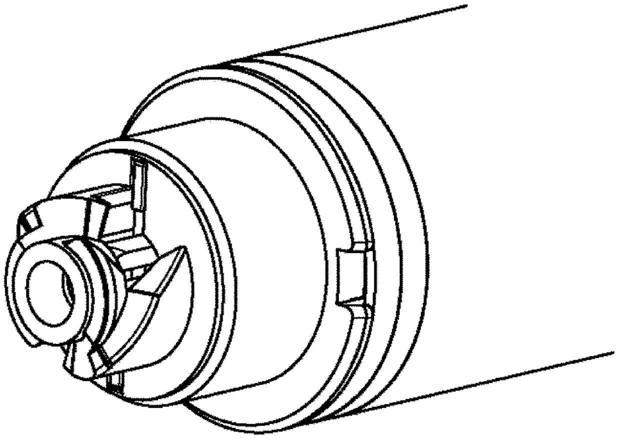
FIG. 107 is a perspective view of the drum unit.
Figure 107:
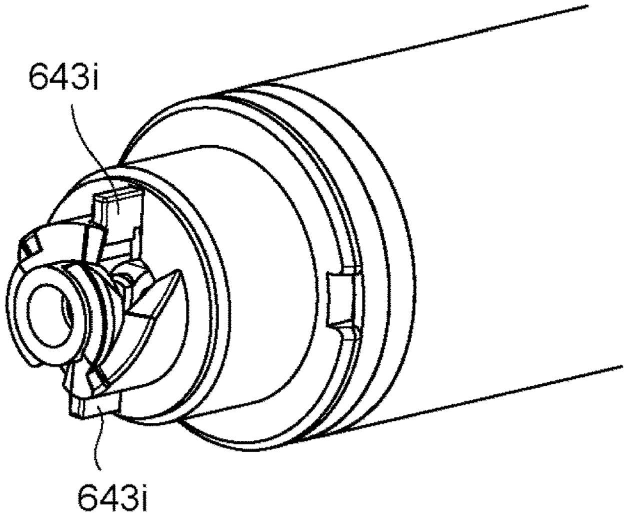
Figure 107:
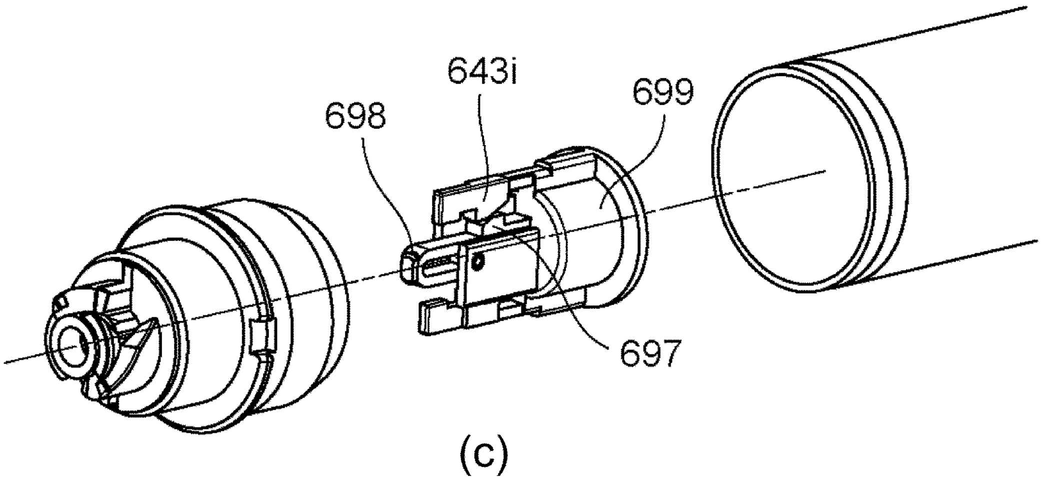
Figure 108:
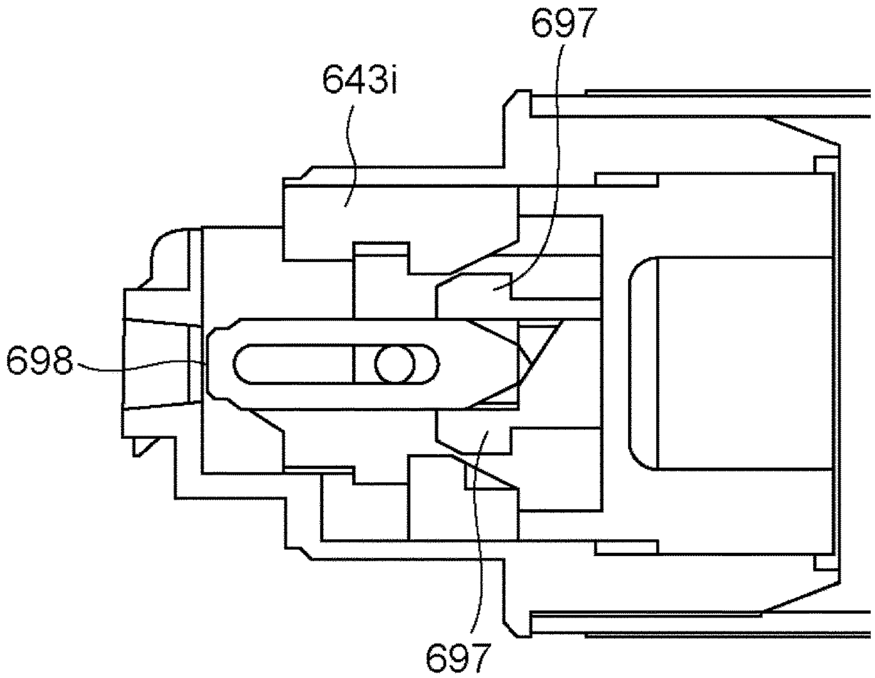
FIG. 108 is a sectional view of the coupling.
Figure 108:
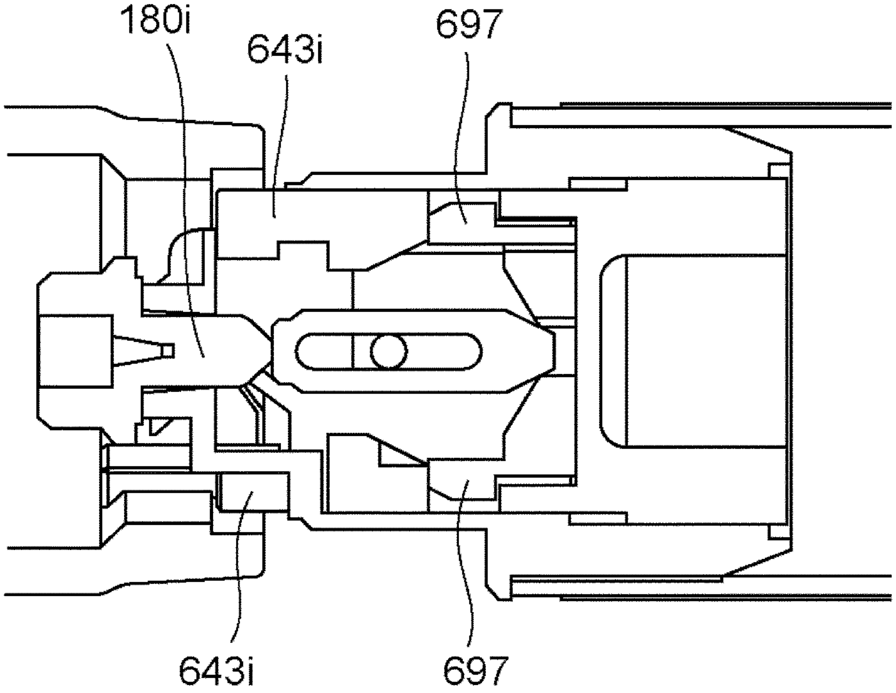

Further, FIGS. 107 and 108 show another modified example of the drum coupling 143 structured so that a part of the drum coupling 143 is deformed and moved. In the above described modified example (see FIG. 105), the engaging portion 243*i* is structured to move in the radial direction, but in this modified example, the engaging portion 643*i* is structured to move in the axial direction. Part (a) of FIG. 107 shows a state in which the engaging portion 643*i* is retracted inside the drum coupling, and part (b) of FIG. 107 shows the engaging portion 643*i* moving toward the outside of the drum coupling and away from the photosensitive drum. Part (c) of FIG. 107 is an exploded perspective view of the drum unit in this modified example.

Part (a) of FIGS. 108 and 108 (*b*) show sectional views of the drum unit. Part (a) of FIG. 108 shows a state before the drum unit is mounted to the apparatus main assembly, and part (b) of FIG. 108 shows a state after the drum unit is mounted thereto.

When the drum unit is mounted to the main assembly of the apparatus, the positioning boss 180*i* provided on the drive transmission unit comes into contact with the working member of the drum coupling Then, as shown in part (b) of FIG. 108, the operating member 698 moves inward in the axial direction (on the right side in the drawing). As the operating member 698 moves, the interlocking member 698 is pushed outward in the radial direction inside the drum coupling. As the interlocking member 698 moves outward in the radial direction, the engaging portion 643*i* is pressed outward in the radial direction by the interlocking member 698. As a result, the state is changed to the engaging portion 643*i* being partly exposed to the outside (part (b) of FIGS. 107 and 108 (*b*)) from the state of being retracted inside the drum unit (part (a) of FIG. 107 and part (a) of FIG. 108).

When a part of the drum coupling is movably provided in this manner, the moving direction may be the radial direction or the axial direction. A part of the drum coupling may move in both the radial direction and the axial direction, or may move in the rotational direction.

Next, referring to Figures and 110 another modification of the drum coupling will be described. Similarly to the above two modifications, the drum coupling 1043 of this modification is also structured so that a part thereof is deformed and moved.

Figure 109:
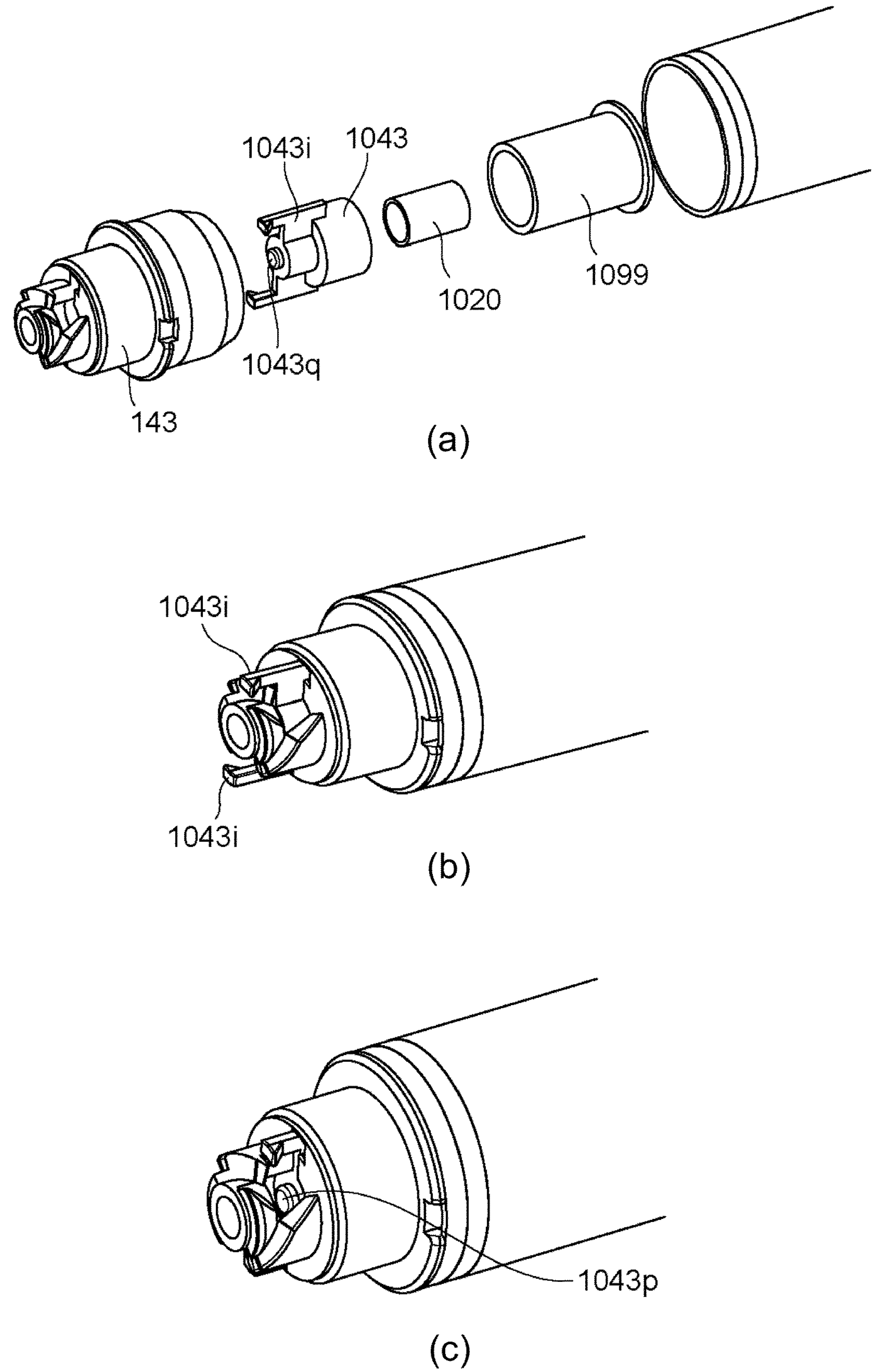
FIG. 109 is a perspective view of the drum unit.

Part (a) of FIG. 109 is an exploded perspective view of the drum unit of this modified example. Part (b) of FIG. 109 shows a state in which the engaging portion 1043*i* of the drum coupling has advanced toward the outside of the drum unit, and part (c) shows a state in which the engaging portion 1043*i* is partially retracted toward the inside.

In this modification, the engaging portion 1043*i* is in a projected (advanced) state as shown in part (b) of FIG. 109 before the drum unit is mounted on the apparatus main assembly. On the other hand, after the drum unit is mounted to the main assembly of the apparatus, the engaging portion 1043*i* changes to the retracted state as shown in part (c) of FIG. 109.

Figure 110:
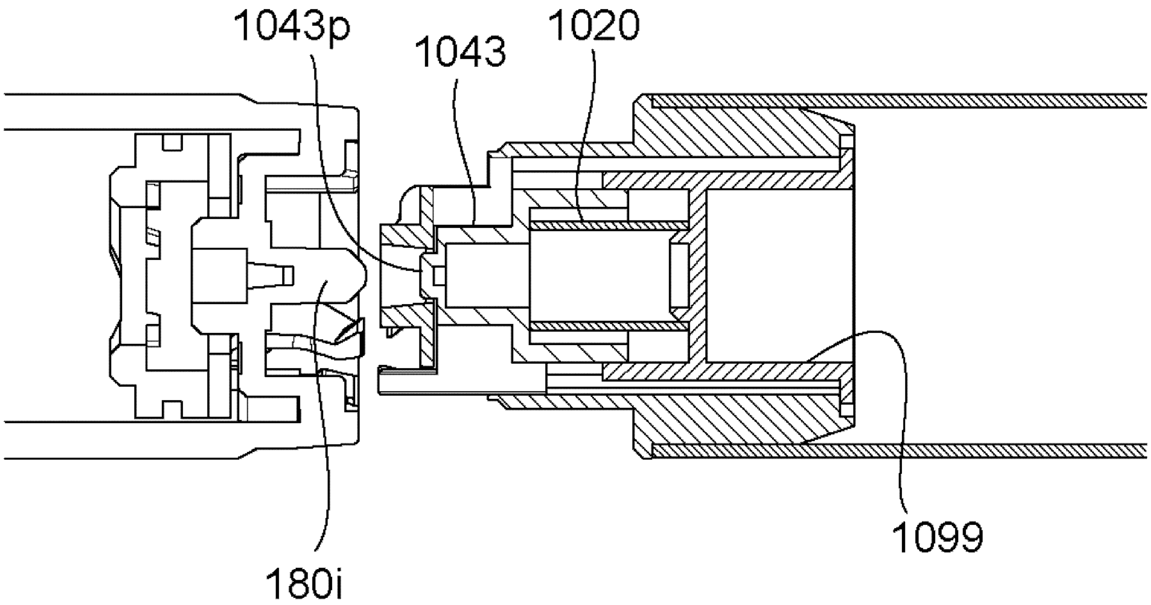
FIG. 110 is a sectional view of the drum unit and the drive transmission unit.
Figure 110:
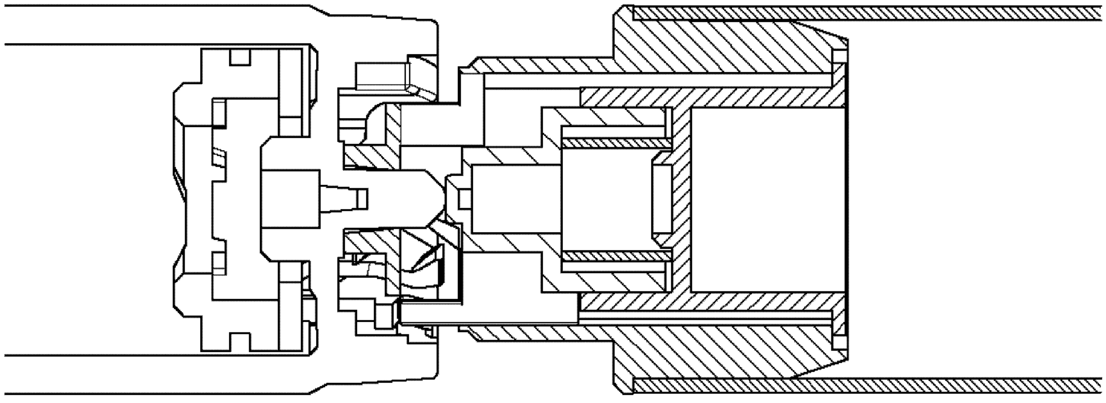

Part (a) of FIG. 110 and part (b) of FIG. 110 show sectional views of the drum unit. FIG. 110 (A) shows the state before the drum unit is completely mounted on the apparatus main assembly, and part (b) shows the state after the mounting is completed.

As shown in part (a) of FIG. 109, the engaging member 1043 is provided inside the drum coupling so as to be movable in the axial direction. The engaging member 1043 is urged (pressed) to the outside in the axial direction by the pressing coil spring 1020 provided inside the drum coupling 143, and the engaging portion 1043*i*, which is a part of the engaging member 1043, is exposed to the outside of the drum coupling 143.

Then, the engaging member 1043 has an acting portion 1043*p* on its rotation axis. When the drum unit is mounted to the main assembly of the apparatus as shown in part (b) of FIG. 110, the engaging member 1043 and the engaging portion 1043*i* are retracted inward in the axial direction by the acting portion 1043*p* being pushed by the positioning boss 180*i*.

In the above three modified examples, an acting portion capable of receiving an action from the outside of the cartridge is provided inside the coupling 143, and this acting portion is operated by the positioning boss 180*i* to change the shape of the coupling 143. However, it is also conceivable to dispose an acting portion for changing the shape of the coupling 143 at a place other than the inside of the coupling 143.

As described above, the shape and pattern of the coupling can be selected depending on the design reason for arrangement, the manufacturing reason considering the mold for coupling production, and the purpose of protecting the coupling.

Further, in each of the three modified examples of the drum coupling described above, the engaging portion provided with the driving force receiving portion and the braking force receiving portion move relative to other portions. However, a portion such as a helical slope or a visor portion may be movable relative to the other portions.

Further, the cartridge 100 described above includes a photosensitive drum and a developing roller, but the structure of the cartridge 100 is not limited to such a structure. For example, the cartridge 100 may includes a photosensitive drum but no developing roller. As an example of such a structure, a structure in which the cartridge 100 includes only the drum holding unit 108 (see FIG. 19) can be considered.

Further, in the Embodiment 1 and various modified examples thereof, the drum coupling 143 is placed in the neighborhood of one end (the end on the driving side) of the photosensitive drum 104, and it is press-fitted into the photosensitive drum 104. As a result, the driving force can be transmitted from the drum coupling 143 to the end of the photosensitive drum 104. However, the method of connecting the drum coupling 143 and the photosensitive drum 104 is not limited to press-fitting. Further, in the above described example, the drum coupling 143 and the photosensitive drum 104 are integrated to form the drum unit 103, but the drum coupling 143 and the photosensitive drum 104 may be separated from each other without constituting a drum unit.

That is, if the drum coupling 143 is operatively connected to the photosensitive drum 104, that is, if it is connected in a drive-transmittable manner, another connection method can be employed, and the coupling 143 and the photosensitive drum 104 may not constitute the same unit.

For example, one or more relay members may be interposed between the coupling 143 and the photosensitive drum 104. In such a case, it can be deemed that the drum coupling is indirectly connected to the driving side end of the photosensitive drum 104 by way of the relay member. The drum coupling 143 operates the photosensitive drum 104 by way of the relay member by rotating itself.

For example, it is conceivable to mount a gear to the end of the photosensitive drum 104 and to form a gear portion on the outer peripheral surface of the drum coupling 143 as well. In this manner, the gear of the coupling 143 and the gear of the photosensitive drum 104 can be directly meshed with each other, or another idler gear can be interposed between the two gears to transmit the driving force to the photosensitive drum 104 from the drum coupling 143.

In addition to using the gear as a relay member, a method of connecting a drive transmission belt to the drum coupling 143 and the photosensitive drum 104 to use it as the relay member is also conceivable.

It is also conceivable to connect the end of the photosensitive drum 104 on the driving side and the drum coupling 143 by using an old dam coupling as a relay member. In this case, the drum unit 103 can be regarded as a unit including the photosensitive drum 104, the Oldham coupling (relay member), and the drum coupling 143.

As described above, the connection method between the photosensitive drum 104 and the drum coupling 143 may be a direct connection or an indirect connection. Further, the photosensitive drum 104 and the drum coupling 143 may be unitized to form the drum unit 103, or the photosensitive drum 104 and the drum coupling 143 may be provided apart from each other in the cartridge and may not constitute a unit.

However, if the coupling 143 and the photosensitive drum 104 form a drum unit 103 that can rotate integrally, or if the coupling 143 is directly connected to the end of the photosensitive drum 104, The driving (rotating) of the coupling 143 can be more accurately transmitted to the photosensitive drum 104, And therefore, doing so is further preferable.

In this embodiment, the axes of the drum coupling 143 and the photosensitive drum 104 are aligned. That is, the drum coupling 143 and the photosensitive drum 104 are aligned along the same rotation axis L (see FIG. 1). However, when the drum coupling 143 and the photosensitive drum 104 are indirectly connected, the positions of the axes may be different from each other. In any case, the cartridge can be stably driven by engaging the coupling 143 with the drive transmission unit 203 provided in the main assembly of the apparatus.

An example in which the structure of the cartridge or the like is changed will be further described with reference to the Embodiment 2 in the following.

Embodiment 2

<Overall Structure of Image Forming Apparatus 800>

Figure 82:
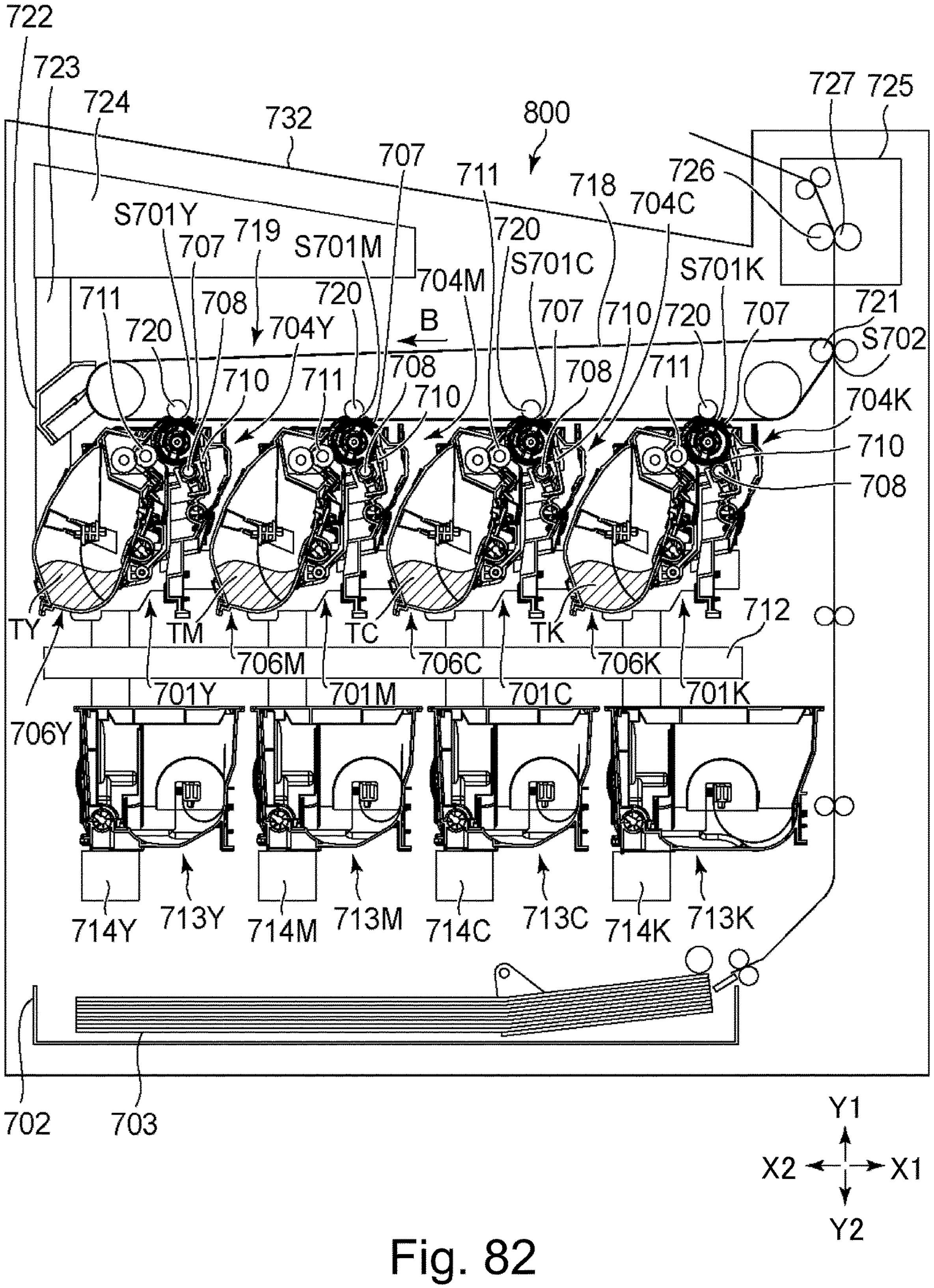
FIG. 82 is a schematic sectional view of the image forming apparatus.

Referring to FIG. 82, the overall structure of the electrophotographic image forming apparatus 800 (hereinafter, image forming apparatus 800) according to this embodiment will be described. FIG. 82 is a schematic view of the image forming apparatus 800 according to this embodiment. In this embodiment, the process cartridge 701 and the toner cartridge 713 are mountable to and dismountable from the main assembly of the image forming apparatus 800.

In this embodiment, the structures and operations of the first to fourth image forming portions are substantially the same except that the colors of the formed images are different. Therefore, in the following, if no particular distinction is required, the subscripts Y to K will be omitted for general explanation.

The first to fourth process cartridges 701 are arranged side by side in the horizontal direction. Each process cartridge 701 includes a cleaning unit 704 and a developing unit 706. The cleaning unit 704 includes a photosensitive drum 707 as an image bearing member, a charging roller 708 as a charging means for uniformly charging the surface of the photosensitive drum 707, and a cleaning blade 710 as a cleaning means. The developing unit 706 includes a developing roller 711 and accommodates a developer T (hereinafter, toner), and includes a developing means for developing an electrostatic latent image on the photosensitive drum 707. The cleaning unit 704 and the developing unit 706 are supported so as to be swingable relative to each other. The first process cartridge 701Y contains yellow (Y) toner in the developing unit 706. Similarly, the second process cartridge 701M contains magenta (M) toner, the third process cartridge 701C contains cyan (C) toner, and the fourth process cartridge 701K contains black (K) toner.

The process cartridge 701 can be mounted to and dismounted from the image forming apparatus 800 by way of mounting means such as a mounting guide and a positioning member provided on the image forming apparatus 800. Further, a scanner unit 712 for forming an electrostatic latent image is provided below the process cartridge 701. Further, in the image forming apparatus 800, the waste toner feeding unit 723 is provided behind the process cartridge 701 (downstream in the mounting/dismounting direction of the process cartridge 701).

The first to fourth toner cartridges 713 are arranged horizontally below the process cartridge 701 in an order corresponding to the color of the toner contained in the respective process cartridges 701. That is, the first toner cartridge 713Y contains the yellow (Y) toner, similarly, the second toner cartridge 713M contains the magenta (M) toner, the third toner cartridge 713C contains the cyan (C) to the, and the fourth Toner cartridge 713K contains the black (K) toner. Each toner cartridge 713 replenishes the process cartridge 701 containing the toner of the same color.

The replenishment operation of the toner cartridge 713 is carried out when a remaining amount detecting portion provided in the main assembly of the image forming apparatus 800 detects insufficient remaining amount of toner in the process cartridge 701. The toner cartridge 713 can be mounted to and dismounted from the image forming apparatus 800 by way of mounting means such as a mounting guide and a positioning member provided in the image forming apparatus 800. A detailed description of the process cartridge 701 and the toner cartridge 713 will be described hereinafter.

Below the toner cartridge 713, first to fourth toner feeding devices 714 are arranged corresponding to each toner cartridge 713. Each toner feeding device 714 transports the toner received from each toner cartridge 713 upward, and supplies the toner to each developing unit 706.

An intermediary transfer unit 719 as an intermediary transfer member is provided above the process cartridge 701. The intermediary transfer unit 719 is arranged substantially horizontally with the primary transfer unit (S1) side facing down. The intermediary transfer belt 718 facing each photosensitive drum 707 is a rotatable endless belt, which is stretched on a plurality of tension rollers. On the inner surface of the intermediary transfer belt 718, a primary transfer roller 720 is provided as a primary transfer member at a position where the corresponding photosensitive drum 707 and primary transfer portion S1 are provided by way of the intermediary transfer belt 718. Further, the secondary transfer roller 721, which is a secondary transfer member, contacts with the intermediary transfer belt 718, and forms a secondary transfer portion S2 in cooperation with a roller on the opposite side by way of the intermediary transfer belt 718. Further, in the left-right direction (the direction in which the secondary transfer portion S2 and the intermediary transfer belt are extended), the intermediary transfer belt cleaning unit 722 is provided on the side opposite to the secondary transfer portion S2.

A fixing unit 725 is provided above the intermediary transfer unit 719. The fixing unit comprises a heating unit 726 and a pressure roller 727 which is press-contacted with the heating unit 726. A discharge tray 732 is provided on the upper surface of the main assembly of the apparatus, and a waste toner collection container 724 is provided between the discharge tray 732 and the intermediary transfer unit 719. Further, a sheet feed tray 702 for accommodating the recording material 703 is provided at the lowermost portion of the main assembly of the apparatus.

The recording material 703 is for receiving and being subjected to a toner image fixing operation on the surface thereof by the apparatus main assembly, and an example of the recording material 703 is paper.

<Image Forming Process>

Next, referring to FIGS. 82 and 83, the image forming operation in the image forming apparatus 800 will be described.

Figure 83:
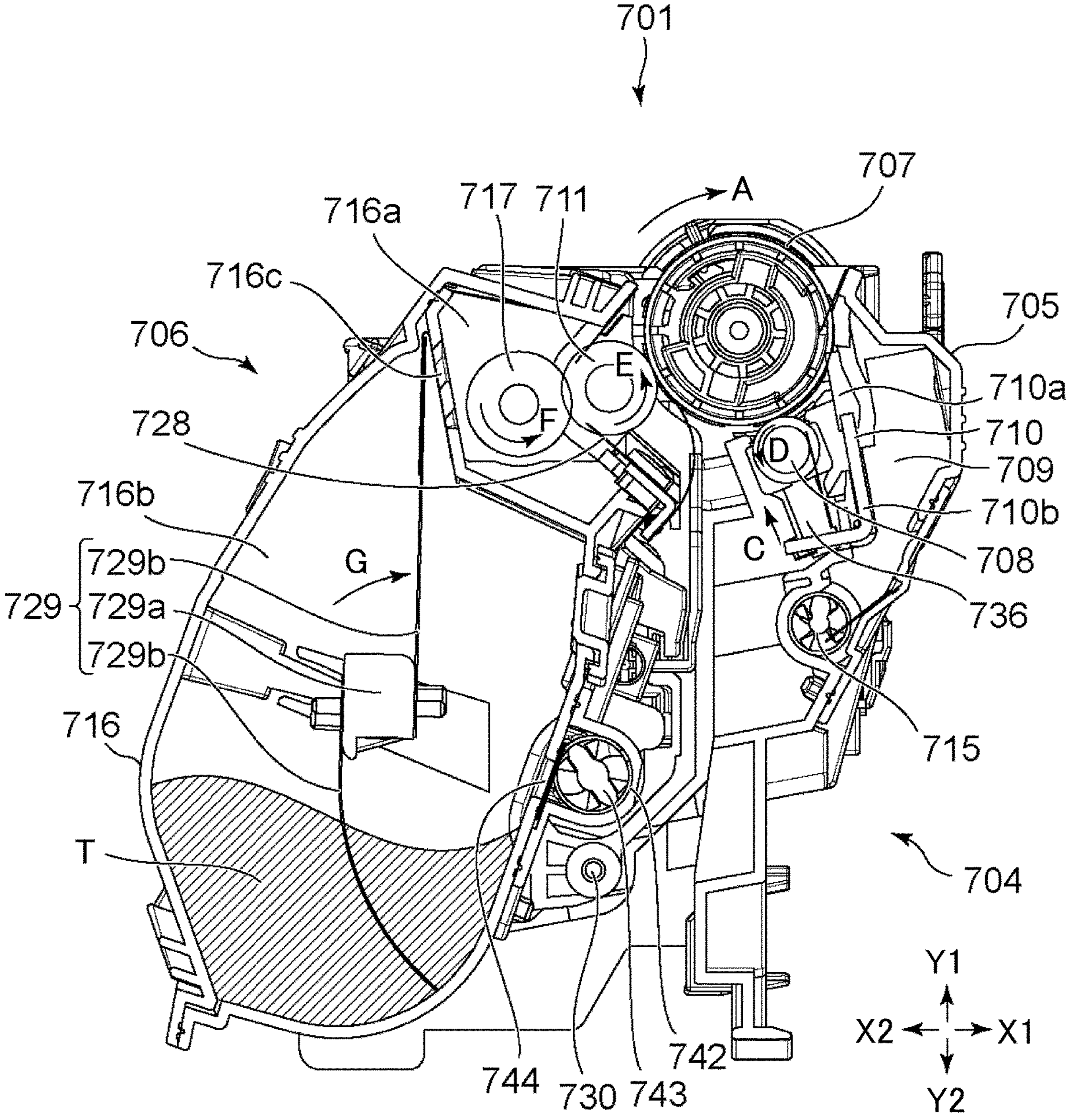
FIG. 83 is a schematic sectional view of the process cartridge.

During the image forming operation, the photosensitive drum 707 is rotationally driven at a predetermined speed in the direction of arrow A in FIG. 83. The intermediary transfer belt 718 is rotationally driven in the direction of arrow B in FIG. 82 (forward with respect to the direction of rotation of the photosensitive drum 707).

First, the surface of the photosensitive drum 707 is uniformly charged by the charging roller 708. Then, the surface of the photosensitive drum 707 is scanned while being exposed to the laser beam emitted from the scanner unit 712, so that an electrostatic latent image based on the image information is formed on the photosensitive drum 707. The electrostatic latent image formed on the photosensitive drum 707 is developed into a toner image by the developing unit 706. At this time, the developing unit 706 is pressed by a development pressure unit (not shown) provided in the main assembly of the image forming apparatus 800. Then, the toner image formed on the photosensitive drum 707 is primarily transferred onto the intermediary transfer belt 718 by the primary transfer roller 720.

For example, when forming a full-color image, the above-mentioned processes are sequentially performed in the image forming portions S701Y to S701K, which are the primary transfer units 1 to 4, so that the toner images of respective colors are sequentially superimposed on the intermediary transfer belt 718.

On the other hand, the recording material 703 stored in the sheet feed tray 702 is fed at a predetermined control timing, and is fed to the secondary transfer unit S702 in synchronization with the movement of the intermediary transfer belt 718. Then, the four color toner images on the intermediary transfer belt 718 are collectively secondarily transferred onto the recording material 703 by the secondary transfer roller 721 which is in contact with the intermediary transfer belt 718 by way of the recording material 703.

Thereafter, the recording material 703 now carrying the transferred toner image is fed to the fixing unit 725. The toner image is fixed on the recording material 703 by heating and pressing the recording material 703 in the fixing unit 725. After that, the recording material 703 is fed to the discharge tray 732 to complete the image forming operation.

Further, the primary untransferred residual toner (waste toner) remaining on the photosensitive drum 707 after the primary transfer step is removed by the cleaning blade 710. The secondary untransferred residual toner (waste toner) remaining on the intermediary transfer belt after the secondary transfer step is removed by the intermediary transfer belt cleaning unit 722. The waste toner removed by the cleaning blade 710 and the intermediary transfer belt cleaning unit 722 is fed by the waste toner feeding unit 723 provided in the main assembly of the apparatus and accumulated in the waste toner collection container 724. The image forming apparatus 800 can also form a monochromatic or multicolored image by using only a desired single or several image forming portions.

<Process Cartridge>

Figure 84:
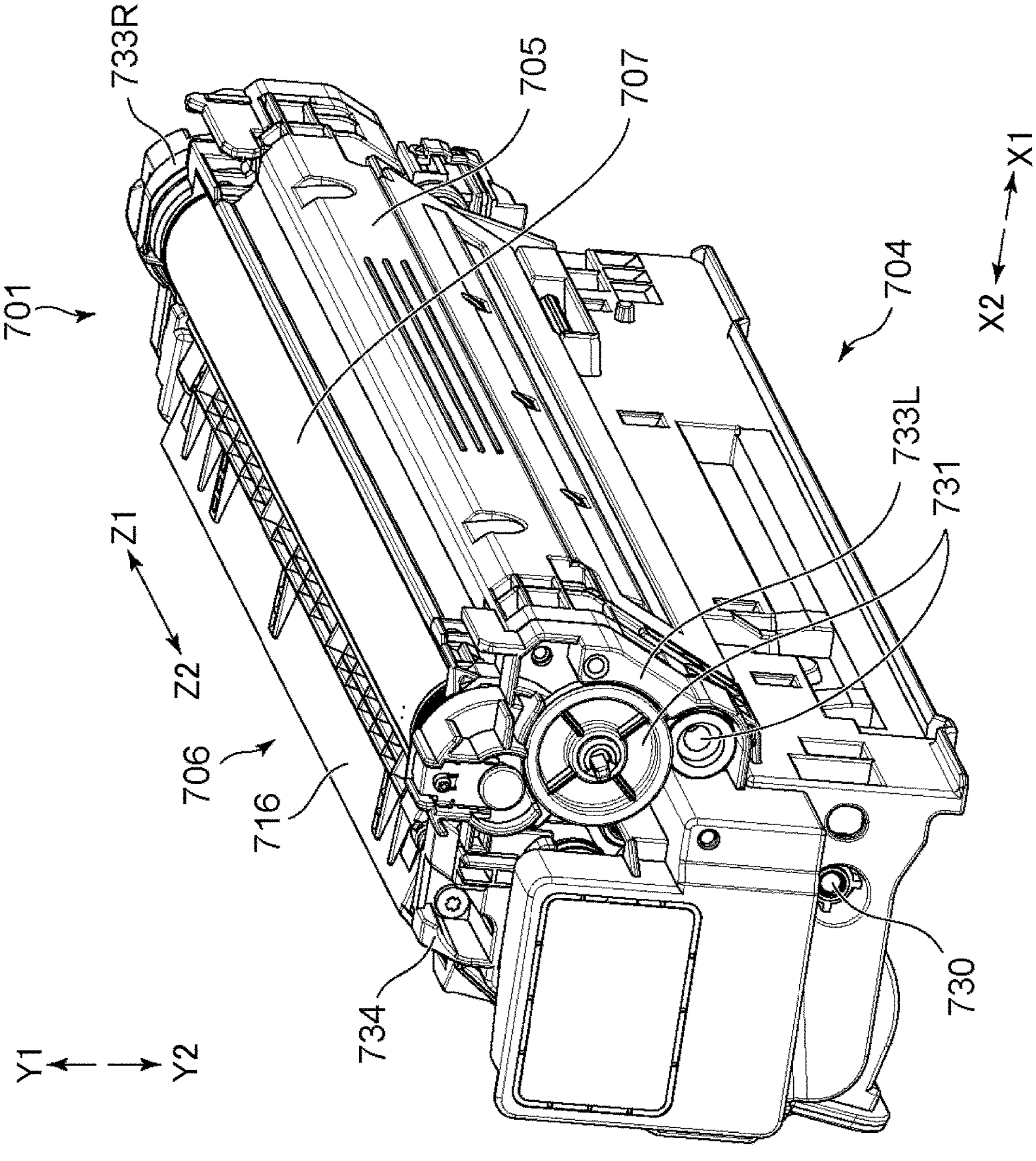
FIG. 84 is a schematic perspective view of the process cartridge.
Figure 85:
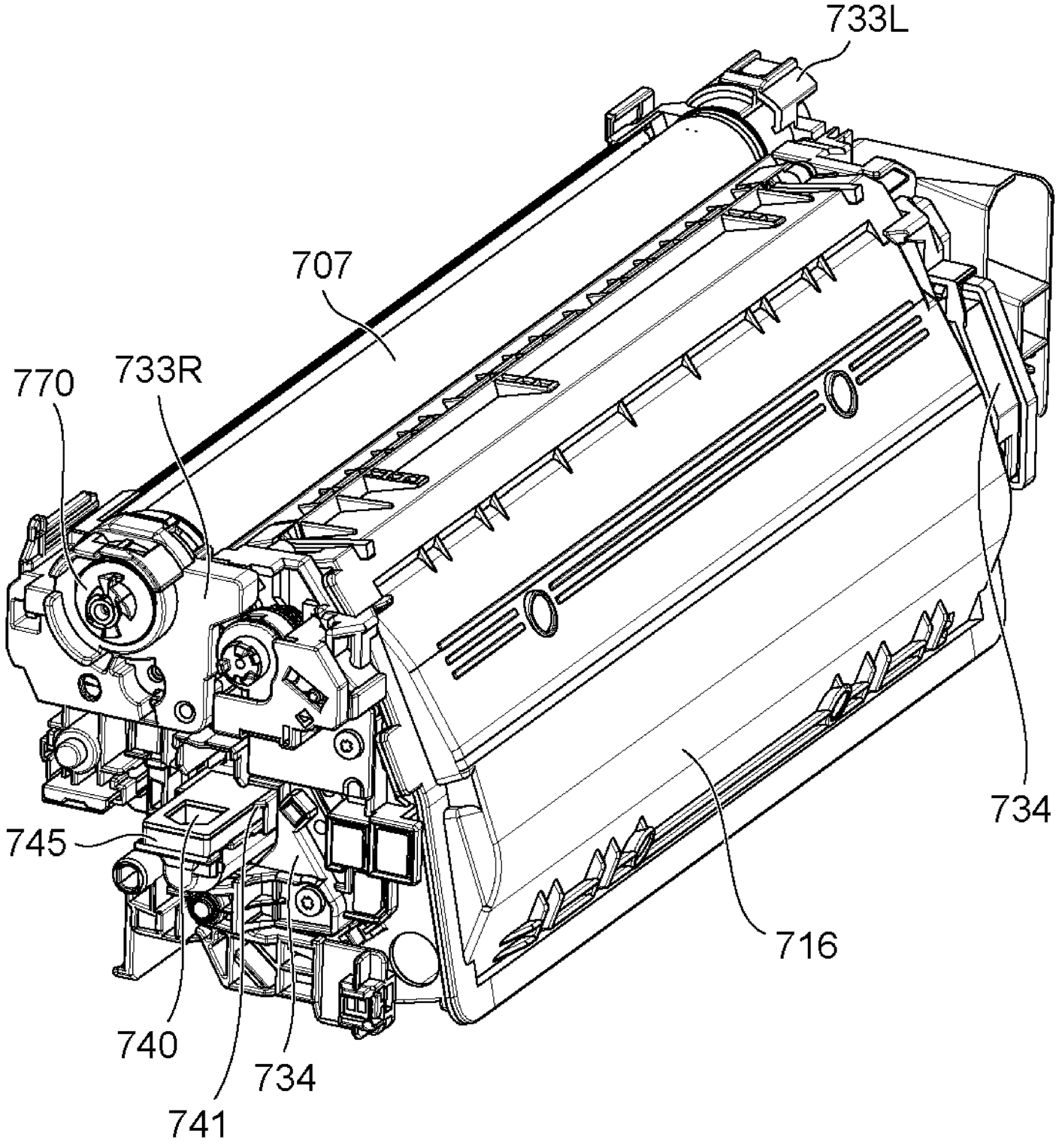
FIG. 85 is a schematic perspective view of the process cartridge.

Next, referring to FIGS. 83, 84 and 85, the overall structure of the process cartridge 701 mounted to the image forming apparatus 800 according to this embodiment will be described. FIG. 83 is a schematic sectional view of the process cartridge mounted on the image forming apparatus 800 and in a state (attitude) in which the photosensitive drum 707 and the developing roller 711 are in contact with each other, as viewed in the Z direction. FIG. 84 is a perspective view of the process cartridge 701 as viewed from the front (upstream side in the process cartridge mounting/dismounting direction). FIG. 85 is a perspective view of the process cartridge 701 as viewed from the rear (downstream side in the process cartridge mounting/dismounting direction).

The process cartridge 701 comprises the cleaning unit 704 and the developing unit 706. The cleaning unit 704 and the developing unit 706 are swingably coupled around the rotation support pin 730.

The cleaning unit 704 includes a cleaning frame 705 which supports various members in the cleaning unit 704. Further, in the cleaning unit 704, in addition to the photosensitive drum 707, the charging roller 708, and the cleaning blade 710, a waste toner screw 715 extending in a direction parallel to the rotation axis direction of the photosensitive drum are provided. The cleaning frame 705 includes a cleaning bearing unit 733 which rotatably supports the photosensitive drum 707 and which includes a cleaning gear train 731 for transmitting driving force from the photosensitive drum 707 to the waste toner screw 715, at both ends of the length.

The charging roller 708 provided in the cleaning unit 704 is urged toward the photosensitive drum 707 by a charging roller pressing springs 736 provided at both ends in the direction of arrow C. The charging roller 708 is provided so as to be driven by the photosensitive drum 707, and when the photosensitive drum 707 is rotationally driven in the direction of arrow A during image formation, the charging roller 708 is rotated in the direction of arrow D (forward with respect to the rotation of the photosensitive drum 707).

The cleaning blade 710 provided in the cleaning unit 704 comprises an elastic member **710*a* for removing untransferred residual toner (waste toner) remaining on the surface of the photosensitive drum 707 after the primary transfer, and a support member 710*b* for supporting the elastic member 710*a*. The waste toner removed from the surface of the photosensitive drum 707 by the cleaning blade 710 is stored in the waste toner storage chamber 709 formed by the cleaning blade 710 and the cleaning frame 705. The waste toner stored in the waste toner storage chamber 709 is fed toward the rear of the image forming apparatus 800 (downstream in the mounting/dismounting direction of the process cartridge 701) by a waste toner feeding screw 715 provided in the waste toner storage chamber 709. The fed waste toner is discharged through a waste toner discharge portion 735 and is delivered to the waste toner feeding unit 723 of the image forming apparatus 800**.

The developing unit 706 includes a development frame 716 which supports various members in the developing unit 706. The development frame 716 is divided into a developing chamber **716*a* in which a developing roller 711 and a supply roller 717 are provided therein, and a toner storage chamber 716*b*** in which a toner is accommodated and in which a stirring member is provided.

In the developing chamber **716*a*, the developing roller 711, the supply roller 717, and a developing blade 728 are provided. The developing roller 711 carries the toner, rotates in the direction of arrow E during image formation, and supplies the toner to the photosensitive drum 707 by contacting the photosensitive drum 707. Further, the developing roller 711 is rotatably supported by the development frame 716 by way of the development bearing unit 734 at both ends in the longitudinal direction (rotational axis direction). The supply roller 717 is rotatably supported by the development frame 716 by way of the development bearing unit 734 while being in contact with the developing roller 711, and rotates in the direction of arrow F during image forming operation. Further, a developing blade as a layer thickness regulating member which regulates the thickness of the toner layer formed on the developing roller 711 is provided so as to contact the surface of the developing roller 711**.

The toner storage chamber **716*b* is provided therein with the stirring member 729 for stirring the accommodated toner T and for transporting the toner to the supply roller 717 through the developing chamber communication opening 716*c*. The stirring member 729 is provided with a rotating shaft 729*a* extending parallel to the rotation axis direction of the developing roller 711, and a stirring sheet 729*b* as a feeding member which is a flexible sheet. One end of the stirring sheet 729*b* is mounted to the rotating shaft 729*a*, and the other end of the stirring sheet 729*b* is a free end, and The rotating shaft 729*a* rotates and therefore the stirring sheet 729*b* rotates in the direction of arrow G, By which the stirring sheet 729*b*** stirs the toner.

The developing unit 706 includes a developing chamber communication opening **716*c* which communicates the developing chamber 716*a* and the toner storage chamber 716*b* with each other. In this embodiment, the developing chamber 716*a* is placed above the toner storage chamber 716*b* in the attitude in which the developing unit 706 is normally used (the attitude at the time of use). The toner in the toner storage chamber 716*b* thrown up by the stirring member 729 is supplied to the developing chamber 716*a* through the developing chamber communication opening 716*c***.

Further, the developing unit 706 is provided with a toner receiving opening 740 at one end on the downstream side in the mounting/dismounting direction. Above the toner inlet 740, an inlet seal member 745 and a toner inlet shutter 741 which can move in the front-rear direction are provided. The toner inlet 740 is closed by the inlet shutter 741 when the process cartridge 701 is not mounted to the image forming apparatus 800. The reception shutter 741 is structured to be urged and opened by the image forming apparatus 800 in interrelation with the mounting/dismounting operation of the process cartridge 701.

A receiving and feeding path 742 is provided so as to communicate with the toner receiving opening 740, and a receiving and feeding screw 743 is provided therein. Further, a storage chamber communication opening 744 for supplying toner to the toner storage chamber 716*b* is provided in the neighborhood of the center of the length of the developing unit 706, and communicates the receiving and feeding path 742 and the toner storage chamber 716*b* with each other. The receiving and feeding screw extends in a direction parallel to the rotation axis directions of the developing roller and the supply roller 717, and feeds the toner received from the toner receiving opening 740 to the toner storage chamber 716*b* by way of the storage chamber communication opening 744.

<Cleaning Unit>

Here, referring to FIG. 86, the cleaning unit 704 will be described in detail.

As shown in FIG. 84, the rotation axis direction of the photosensitive drum 707 is the Z direction (arrow Z1, arrow Z2), the horizontal direction in FIG. 82 is the X direction (arrow X1, arrow X2), and the vertical direction is the Y direction (arrow Y1, arrow Y2).

The side (Z1 direction) on which the drum coupling (coupling member) 770 receives the driving force from the image forming apparatus main assembly is referred to as the driving side (back side), and the opposite side (Z2 direction) is called the non-driving side (front side). At the end opposite to the drum coupling 770, there is provided an electrode (electrode portion) which contacts the inner surface of the photosensitive drum 707, to function as a ground by contacting the image forming apparatus main assembly.

A drum coupling 770 is mounted to one end of the photosensitive drum 707, and a non-driving side flange member 769 is mounted to the other end to form the photosensitive drum unit 768. The photosensitive drum unit 768 receives the driving force from a drive transmission unit 811 provided in the image forming apparatus main assembly 800 by way of the drum coupling 770.

In the drum coupling 770, the outer peripheral surface 771*a* of the cylindrical portion 771 projecting from the photosensitive drum 707 as a supported portion is rotatably supported by the drum unit bearing member 733R. Similarly, the non-driving side flange member 769 is rotatably supported by the drum unit bearing member 733L at the outer peripheral surface 769*a* of the cylindrical portion projecting from the photosensitive drum 707. That is, the photosensitive drum 707 is rotatably supported by the casing of the cartridge (bearing members 733R, 733L) by way of the coupling 770 and the flange member 769.

Figure 86:
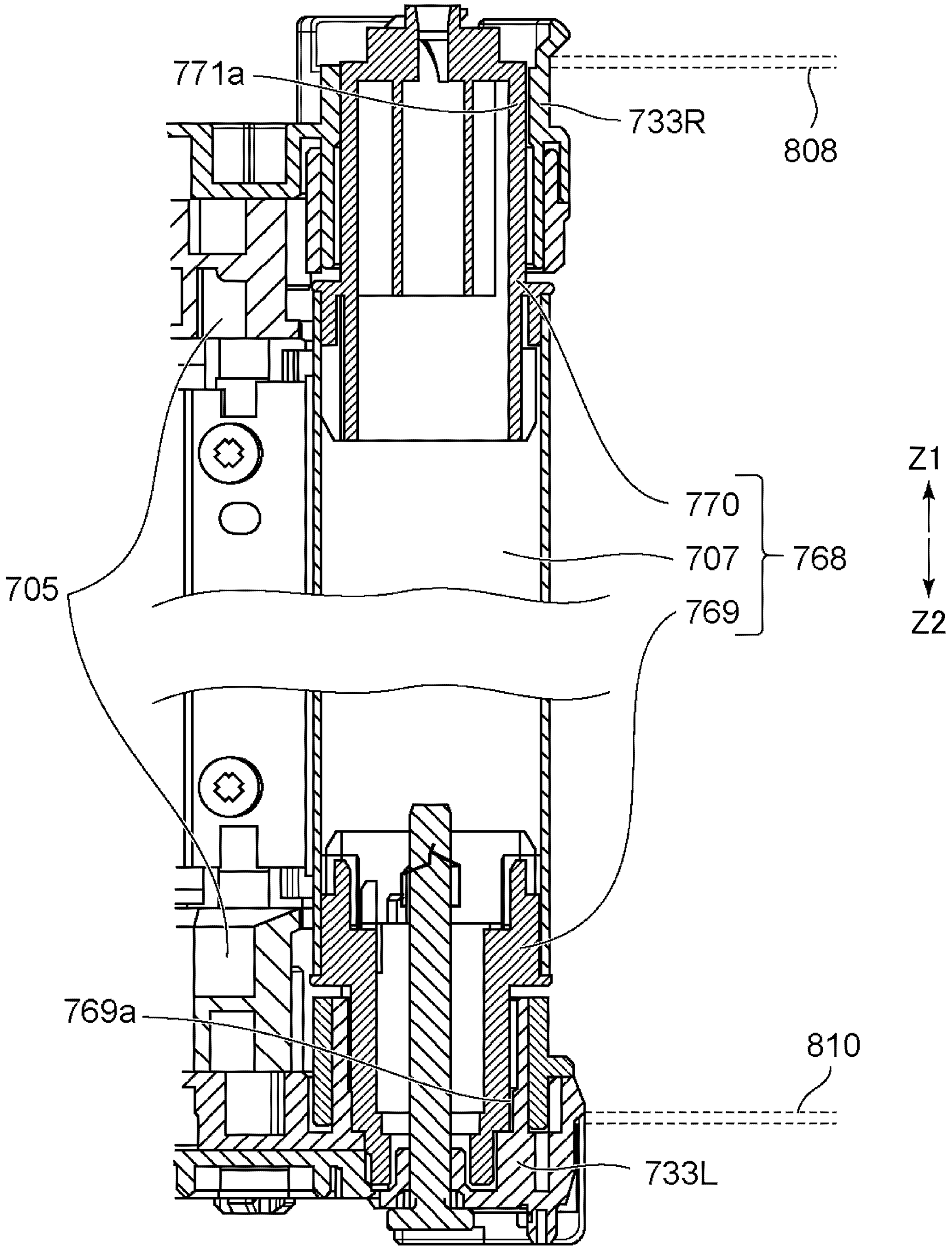
FIG. 86 is a schematic sectional view of the process cartridge taken along a rotational axis of the photosensitive drum.

As shown in FIG. 86, the drum unit bearing member 733R abuts on the rear cartridge positioning portion 808 provided in the image forming apparatus main assembly 800. Further, the drum unit bearing member 733L abuts on the front cartridge positioning portion 810 of the image forming apparatus main assembly 800. By this, the process cartridge 701 is positioned in the image forming apparatus 800.

In the Z direction of this embodiment, the position where the drum unit bearing member 733R supports the photosensitive drum unit 768 is close to the position where the drum unit bearing member 733R is position by to the back side cartridge positioning portion 808. Therefore, in this embodiment, the free end side (Z1 direction side) of the outer peripheral surface 771*a* of the cylindrical portion 771 of the drum coupling is rotatably supported by the drum unit bearing member 733R.

Similarly, in the Z direction, the position where the drum unit bearing member 733L rotatably supports the non-driving side flange member 769 is close to the position where the drum unit bearing member 733L is positioned by the front side cartridge positioning portion 810.

By mounting the drum unit bearing members 733R and 733L to the respective sides of the cleaning frame 705, the photosensitive drum unit 768 is rotatably supported by the cleaning frame 705.

<Structure of Drive Transmission Unit>

Figure 87:
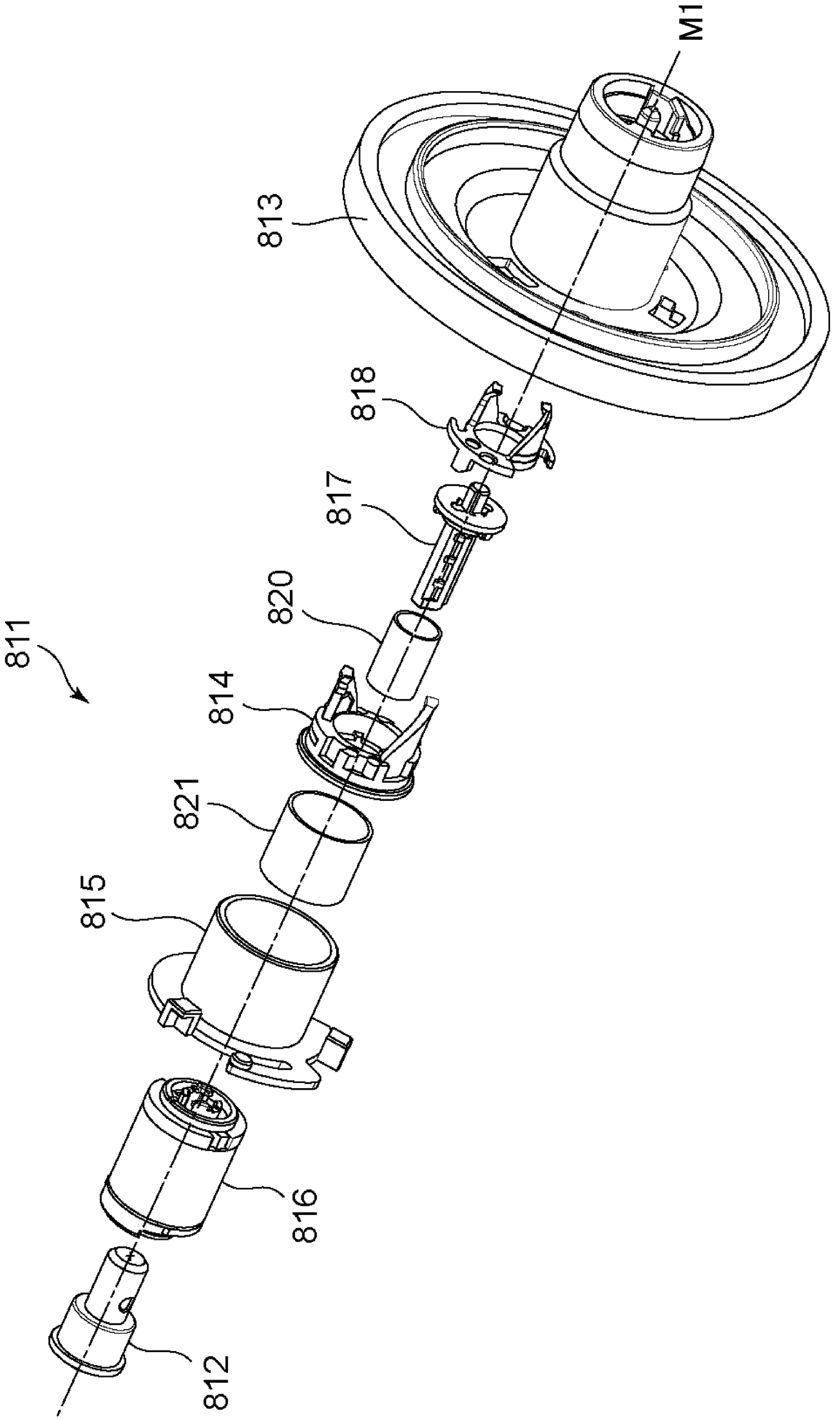
FIG. 87 is an exploded perspective view of a drive transmission unit 811.
Figure 88:
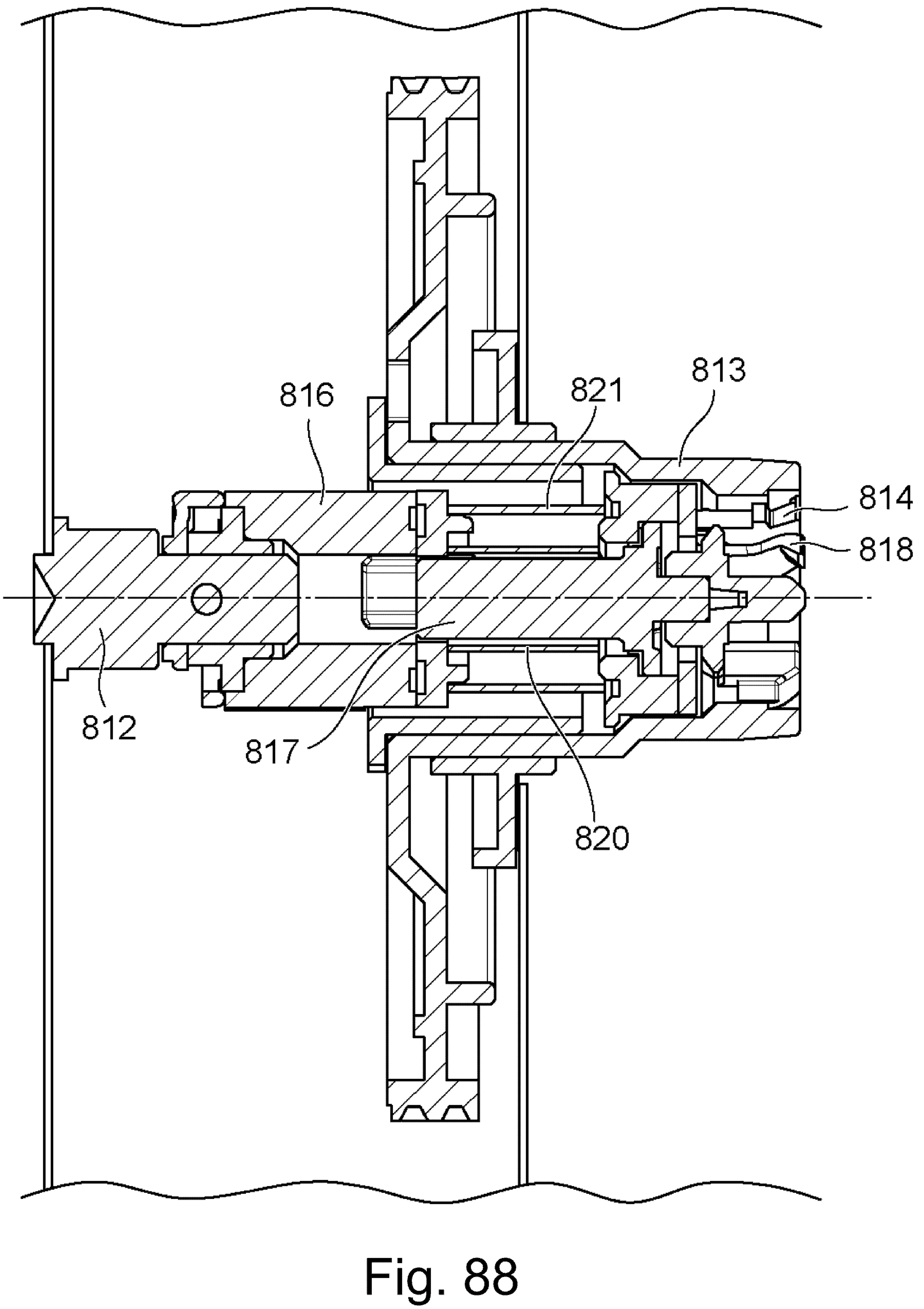
FIG. 88 is a sectional view taken along the rotation axis of the drive transmission unit 811 mounted to the main assembly of the image forming apparatus.

Referring to FIGS. 87 and 88, the structure of the drive transmission unit 811 provided in the image forming apparatus side will be described. FIG. 87 is an exploded perspective view of the drive transmission unit 811. FIG. 88 is a sectional view of the drive transmission unit 811.

A drum drive coupling gear 813 is rotatably supported by a supporting shaft 812 fixed to the frame of the image forming apparatus 800, and the driving force is transmitted from the motor to rotate the drum drive coupling gear 813. As is difference from the structure of the Embodiment 1, the drum drive coupling and the drive gear are integrated with each other in this embodiment. By integrating, the misalignment between the driving shaft axis on the main assembly side and the photosensitive drum shaft axis on the cartridge side is suppressed.

The drive transmission unit 811 includes a plurality of components inside a cylindrical portion of the drum drive coupling gear 813. They are a brake member 816 which is supported and stopped in the rotation by a supporting shaft 812, a brake transmission member 817 which is connected with the brake member 816 to transmit the braking force, a first and second braking engagement members 814, 818 which engage with the braking force receiving surface of the drum coupling 770, a brake engagement spring 821 and a drum drive coupling spring 820 which are extended along a axis M1 and generate an urging force in the direction of the axis M1. The axis M1 is the rotation axis of the drive transmission unit 811.

The drum drive coupling spring 820 is provided so as to be sandwiched between the end surface of the brake member 816 and the brake transmission member 817, and imparts a repulsive force to them. The brake transmission member 817 receives the repulsive force of the drum drive coupling spring 820 while receiving the repulsive force of the brake engagement spring 821 by way of the first braking engagement member 814. As is different from the structure of the Embodiment 1, the stopper 815 is provided in this embodiment. The stopper 815 is assembled to the drum drive coupling gear 813, and is fixed so as to move integrally with the drum drive coupling gear 813 in the axial direction. This prevents the drum coupling 770 from colliding with the first braking engagement member 814 and prevents the first braking engagement member 814 from disengaging out of the drum drive coupling gear 813 when the user mounts the cartridge with a strong force.

The other structures and functions are the same as those of the main assembly side drive transmission unit 203 shown in the Embodiment 1, And therefore the description thereof is omitted in this embodiment.

<Structure of Coupling Member>

The description will be made as to a structure for transmitting a driving force from the image forming apparatus main assembly to the drum unit 768 of the cartridge 701 to drive (rotate) the drum unit 768.

Figure 89:
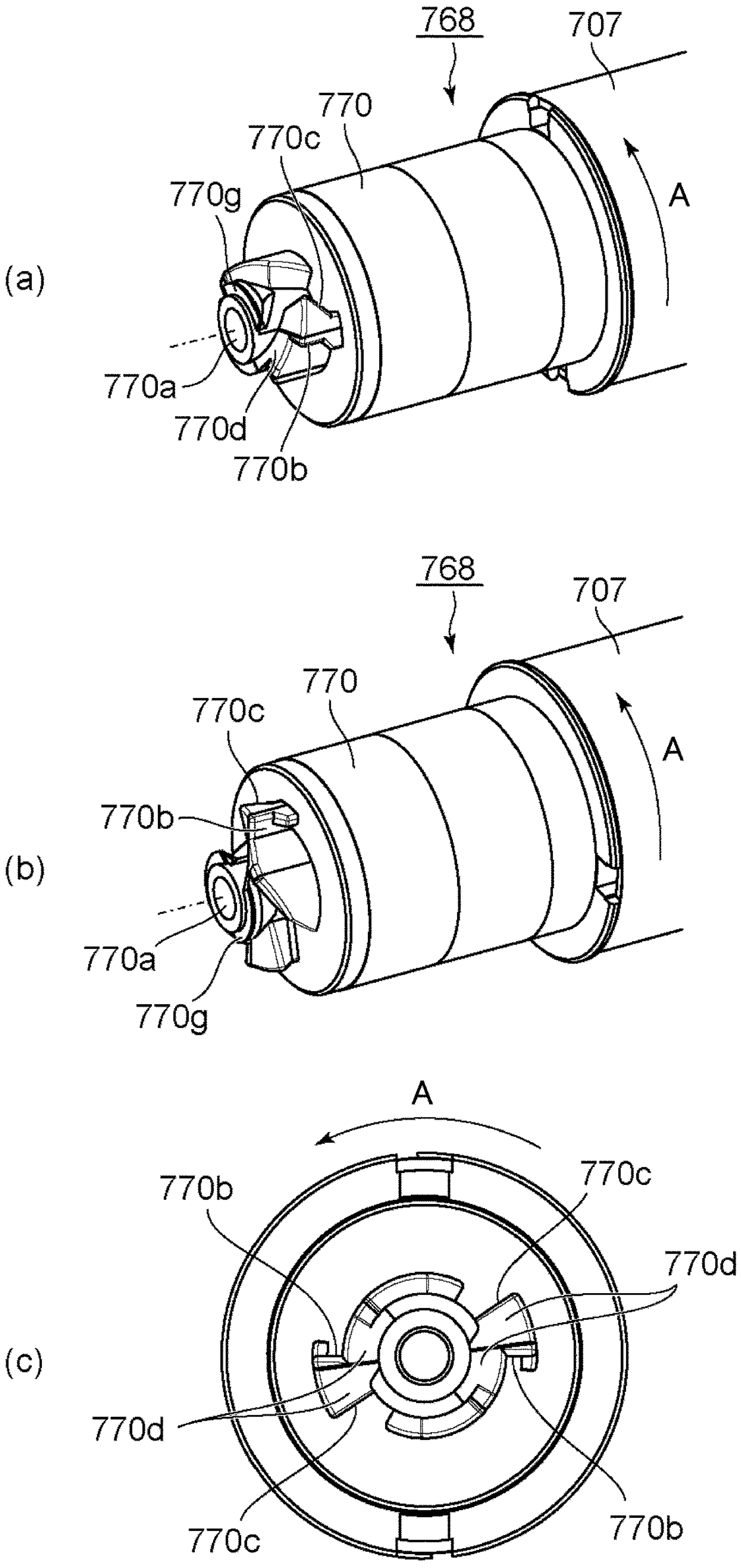
FIG. 89 is a schematic perspective view of another form of the drum coupling 770.

The drum unit 768 shown in part (a) of FIG. 89 to part (c) of FIG. 89 is a unit including a photosensitive drum 707, a drum coupling 770, and a non-driving side flange member 769. The drum unit 768 is structured to be connected to the drive transmission unit 811 provided in the main assembly by being mounted to the main assembly of the image forming apparatus.

During image formation, the drum unit 768 rotates in the direction of arrow A. In this embodiment, as the drum unit 768 is viewed from the driving side (the side where the drum coupling 770 is located), the rotational direction corresponds to the counterclockwise direction. That is, the rotational directions of the drum units of this embodiment and the Embodiment 1 are opposite to each other.

Therefore, the shape of the drum coupling 770 which engages with the drive transmission unit is a shape inverted (mirror shape) in the left-right with respect to the drum coupling 143 shown in the Embodiment 1. Similarly, the shape of the drive transmission unit 811 is also a left-right inverted shape of the drive transmission unit 203 in the Embodiment 1.

Referring to FIG. 83, the rotational direction of the drum unit 768 of this embodiment will be described. FIG. 83 corresponds to a view of the drum unit as seen from the non-driving side, And therefore, the rotational direction A corresponds to the clockwise direction. When the drum unit is rotated in the A direction by the driving force received by the coupling member, the surface of the photosensitive drum 707 is structured to move as follows. The surface of the photosensitive drum 707 approaches to and contacts with the cleaning blade 710 inside the casing of the cartridge. Thereafter, the surface of the photosensitive drum 707 approaches to and contacts with the charging roller 708. After that, the surface of the photosensitive drum 707 approaches to and contacts with the developing roller 711. The surface of the photosensitive drum 707 is then exposed out of the casing of the cartridge above the cartridge. The surface of the exposed photosensitive drum 707 comes into contact with the intermediary transfer belt 718 of the main assembly of the apparatus (see FIG. 82). Thereafter, the surface of the photosensitive drum 707 returns to the inside of the casing of the cartridge again and approaches to and contacts with the cleaning blade 710.

Next, the drum coupling 770 will be described in detail. part (a) of FIG. 89 to part (c) of FIG. 89 are illustrations for explaining the detailed shape of the drum coupling 770. Part (a) of FIG. 89 is a perspective view of the drum unit 768, part (b) of FIG. 89 is a perspective view of another phase of part (a) of FIG. 89, and part (c) of FIG. 89 is a front view of the drum unit 768 as viewed from the Z1 direction. The drum coupling 770 includes a positioning hole 770*a*, a driving force receiving portion 770*b*, a braking force receiving surface 770*c*, a helical slope 770*d*, and a visor portion 770*g*.

The positioning holes 770*a*, The driving force receiving portion 770*b*, The braking force receiving surface 770*c*, The helical slope 770*d*, and the visor portion 770*g* of this embodiment corresponding to the circular hole portion 143*a*, the driving force receiving portion 143*b*, the braking force receiving surface 143*c*, the helical slope 143*d*, and the visor portion 143*g*, of the coupling member 143 of the Embodiment 1 shown in FIG. 1 and so on, respectively. The corresponding portions of the coupling members of this embodiment perform the same functions as in Embodiment 1.

As described above, the drum coupling 770 and the drum coupling 143 of the Embodiment 1 (see FIG. 1) have a left-right symmetry (mirror symmetry) with each other except that the dimensions are partially different. Therefore, the shapes of the respective portions 770*a*, 770*b*, 770*c*, 770*d*, and 770*g* of the drum coupling 770 are the same as those provided by substantially reversing the shapes of the respective portions 143*a*, 143*b*, 143*c*, 143*d*, and 143*g* of the coupling member 143 (mirror image shapes). In this embodiment, the drum coupling 770 rotates in the direction of arrow A shown in FIGS. 83 and 89 (*a*) to 89 (*c*) as described above. The rotational direction (arrow A direction) of the drum coupling 770 in this embodiment is a counter-clockwise direction when the drum coupling 770 is viewed from the front (see part (c) of FIG. 89).

The shape of the drum coupling 770 is not limited to this example. For example, the shape of the drum coupling 770 may have a left-right inverted shape (that is, a mirrored shape) of those of the modified example of the drum coupling 143 shown in FIGS. 52, part (b) of FIG. 54 through part (e) of FIG. 54, FIGS. 74, 75, 77, 78, 81, 97, 100, 102 to 110, and so on.

<Mounting of Cartridge on Image Forming Apparatus Main Assembly>

Figure 90:
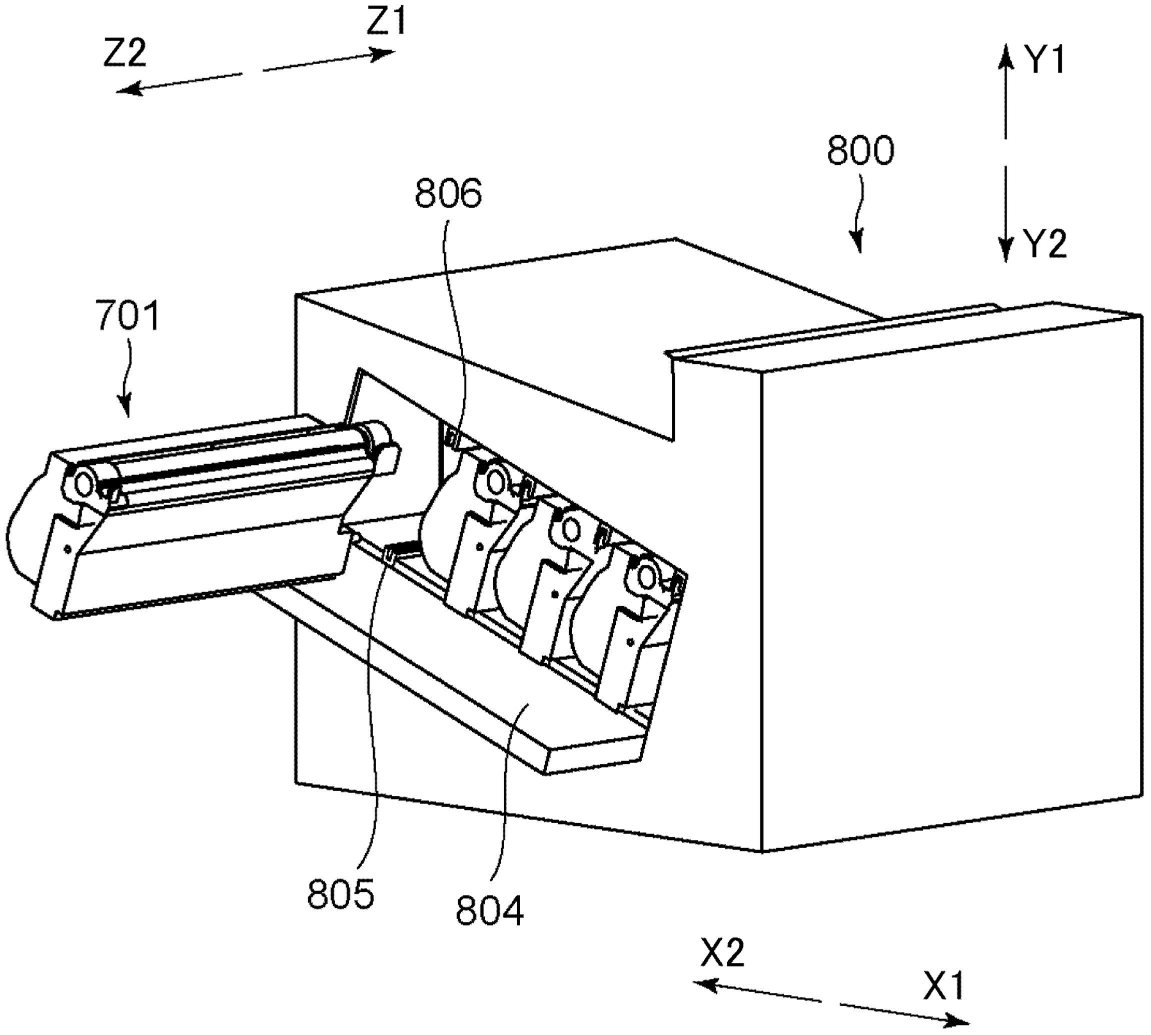
FIG. 90 is a schematic perspective view illustrating mounting of the cartridge 701 to the image forming apparatus main assembly 800.
Figure 91:
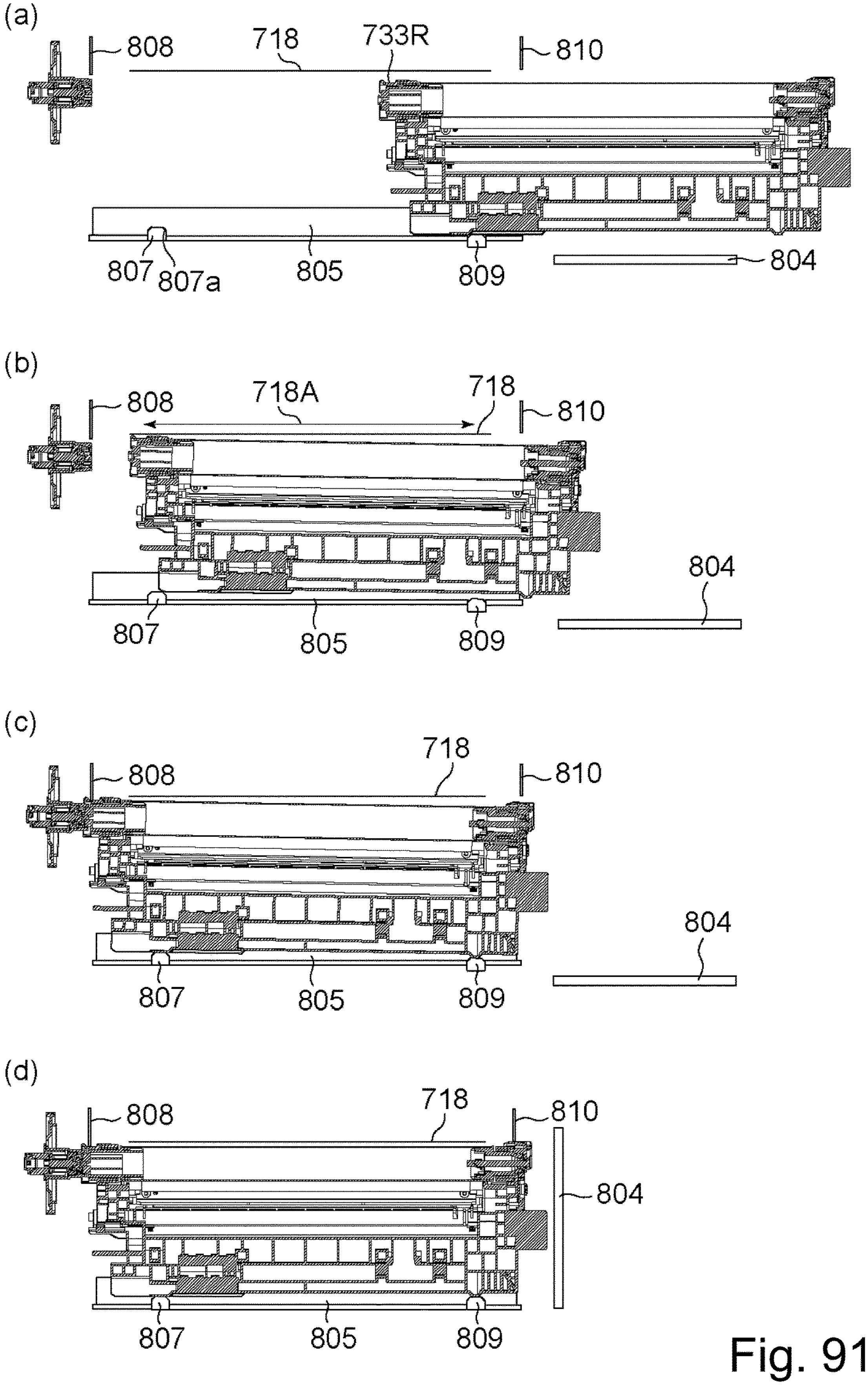
FIG. 91 is a schematic sectional view illustrating the mounting operation of the cartridge 701 to the image forming apparatus main assembly 800.

Referring to FIGS. 90 and 91, The mounting/dismounting of the process cartridge 701 relative to the image forming apparatus main assembly 800 will be described.

FIG. 90 is a perspective view illustrating mounting of the cartridge to the main assembly of the image forming apparatus. Further, FIG. 91 is a sectional view illustrating the operation of mounting the cartridge to the main assembly of the apparatus.

The image forming apparatus main assembly 800 of this embodiment employs a structure in which a cartridge can be mounted in a substantially horizontal direction. Specifically, the image forming apparatus main assembly 800 includes a space in which a cartridge can be mounted. A cartridge door 804 (front door) for inserting the cartridge into the above-mentioned space is provided on the front side (direction in which the user stands during use) of the image forming apparatus main assembly 800.

As shown in FIG. 90, the cartridge door 804 of the image forming apparatus main assembly 800 is provided so as to be openable and closable. When the cartridge door 804 is opened, the cartridge lower guide rail 805 which guides the cartridge 701 is provided on the bottom surface of the space, and the cartridge upper guide rail 806 is provided on the upper surface. The cartridge 701 is guided to the mounting position by the upper and lower guide rails (805, 806) provided above and below the space.

Referring to Figure, The operation of mounting and dismounting the cartridge to and from the image forming apparatus main assembly 800 will be described below.

As shown in part (a) of FIG. 91, the cleaning bearing unit 733R and the photosensitive drum 707 in the cartridge 701 do not come into contact with the intermediary transfer belt 718 at the start of insertion. In other words, The dimensions are selected such that the photosensitive drum 707 and the intermediary transfer belt 718 do not come into contact with each other in the state that the end of the cartridge on the back side in the inserting direction is supported by the guide rail 805 under the cartridge.

Next, as shown in part (b) of FIG. 91, the image forming apparatus main assembly 800 includes a rear side cartridge lower guide 807 projecting upward in the gravity direction from the cartridge lower guide rail 805 on the rear side in the inserting direction of the cartridge lower guide rail 805. The rear side cartridge lower guide 807 is provided with a tapered surface 807*a* on the front side in the inserting direction of the cartridge 701. Upon insertion, the cartridge 701 rides on the tapered surface 807*a* and is guided to the mounting position.

The position and shape of the back side cartridge lower guide 807 may be provided so that a portion of the cartridge does not rub against the image forming region 718A of the intermediary transfer belt 718 when the cartridge is inserted into the apparatus main assembly 800. Here, the image forming region 718A refers to a region on which the toner image transferred onto the recording material 703 of the intermediary transfer belt 718 is carried. Further, in this embodiment, among the cartridges which maintain the mounting attitude, the unit bearing member 733R provided on the back side in the inserting direction of the cartridge projects most upward in the gravity direction. Therefore, the arrangement and shape of each element may be appropriately selected such that the locus drawn by the innermost end of the drum unit bearing member 733R in the inserting direction at the time of insertion (hereinafter referred to as the insertion locus) and the image forming region 718A do not interfere with each other.

Thereafter, as shown in part (c) of FIG. 91, the cartridge 701 is further inserted into the back side of the image forming apparatus main assembly 800 from the state the cartridge 701 rides on the back side cartridge lower guide 807. Then, the drum unit bearing member 733R abuts on the rear side cartridge positioning portion 808 provided in the image forming apparatus main assembly 800. At this time, the cartridge 701 is tilted by about 0.5° to 2° with respect to the state in which the cartridge 701 is completely mounted to the image forming apparatus main assembly 800 (part (d) of FIG. 91).

Part (d) of FIG. 91 is an illustration of a state of the apparatus main assembly and the cartridge when the cartridge door 804 is closed. The image forming apparatus 800 includes a front side cartridge lower guide 809 on the front side of the cartridge lower guide rail 805 in the inserting direction. The front side cartridge lower guide 809 is structured to move up and down in interrelation with the opening and closing of the cartridge door (front door) 804.

When the cartridge door 804 is closed by the user, the front side cartridge lower guide 809 is raised. Then, the drum unit bearing member 733L and the front side cartridge positioning portion 810 of the image forming apparatus main assembly 800 come into contact with each other, and the cartridge 701 is positioned with respect to the image forming apparatus main assembly 800.

By the above-described operation, the cartridge 701 is completely mounted to the image forming apparatus main assembly 800.

Further, the removal operation of the cartridge 701 from the image forming apparatus main assembly 800 is in the reverse order in the above-mentioned insertion operation.

Since the oblique mounting structure is employed as described above, it is possible to suppress rubbing between the photosensitive drum 707 and the intermediary transfer belt when the cartridge 701 is mounted to the apparatus main assembly 800. Therefore, it is possible to suppress the occurrence of minute scratches (scratches) on the surface of the photosensitive drum 707 or on the surface of the intermediary transfer belt 718.

Further, with the structure disclosed in this embodiment, the structure of the image forming apparatus main assembly 800 can be simplified as compared with the structure in which the cartridge is horizontally moved and mounted on the apparatus main assembly and then the entire cartridge is lifted up.

<Process of Engaging Coupling Member with Main Assembly Driving Shaft>

Figure 92:
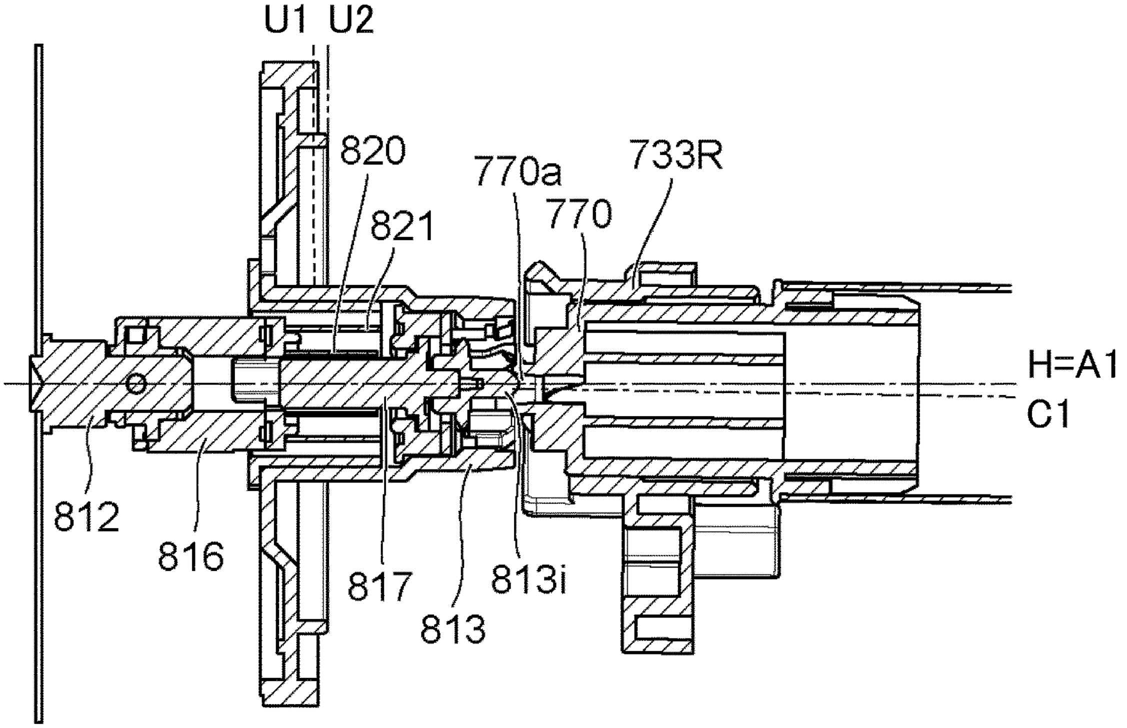
FIG. 92 is a schematic sectional view illustrating the mounting operation of the drum coupling 770 to the main assembly drive transmission unit 811.
Figure 92:
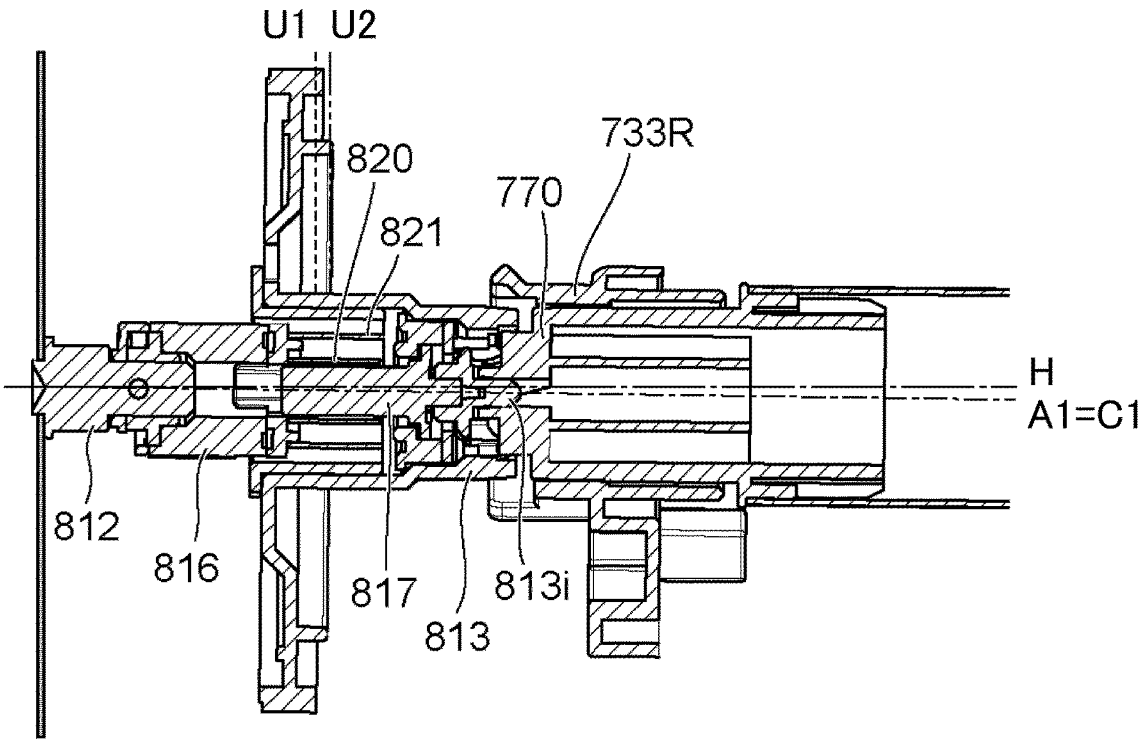
Figure 93:
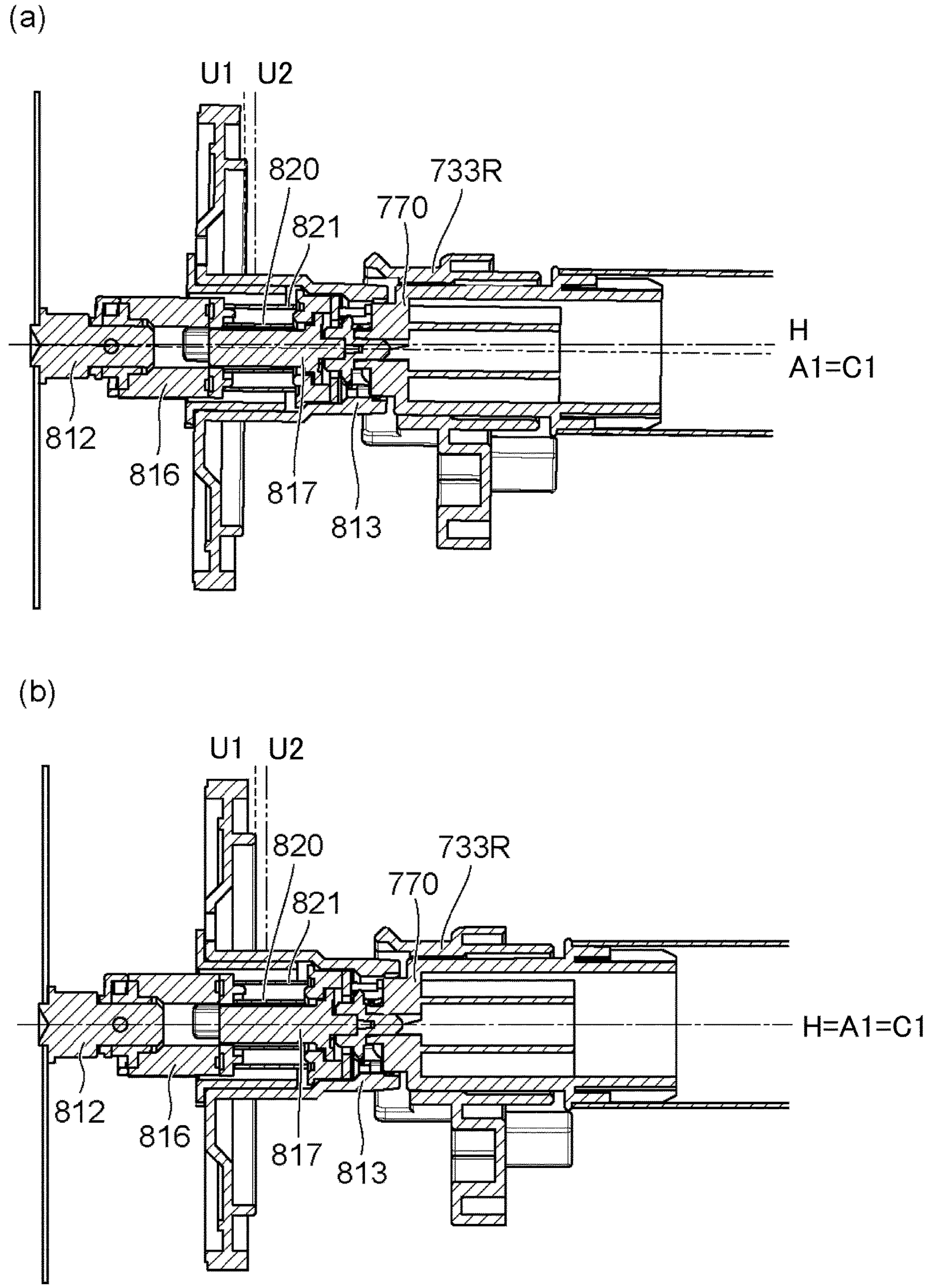
FIG. 93 is a schematic sectional view illustrating the mounting operation of the drum coupling 770 to the main assembly drive transmission unit 811.

Subsequently, referring to FIGS. 92 and 93, the engagement process between the drum coupling 770 and the drive transmission unit 811 will be described in detail. FIGS. 92 and 93 are sectional views illustrating the mounting operation of the drum coupling to the drive transmission unit 811.

Part (a) of FIG. 92 is a illustration of a state in which the drum coupling 770 has started engaging with the drive transmission unit 811, part (a) of FIG. 92 is a illustration of a state in which the process cartridge 701 is abutted to the back of the main assembly, and part (b) of FIG. 93 is a illustration of a state in which the front door of the main assembly is closed and the cartridge is lifted up. Part (a) of FIG. 93 is an illustration of a state in the middle of mounting/dismounting between part (b) of FIG. 93 and part (b) of FIG. 92. That is, the process cartridge 701 is mounted through the steps in the order of part (a) of FIG. 92, part (b) of FIG. 92, part (a) of FIG. 93, and part (b) of FIG. 93.

As shown in part (a) of FIG. 92, when the process cartridge is mounted to the inner side of the main assembly, the positioning hole 770*a* of the drum coupling 770 and the positioning boss 813*i* of the drum drive coupling gear 813 start to contact each other. As described referring to FIG. 91, when the drum coupling 770 starts engaging with the drive transmission unit 811, the process cartridge 701 is inserted in the state (part (b) of FIGS. 91 to (c)) that it is tilted by about 0.5° to 2° by riding on the back side cartridge lower guide 807.

Therefore, the drum drive coupling gear 813 is guided by the positioning boss 813*i* moving along the positioning hole 770*a* of the drum coupling 770, and the drum drive coupling gear 813 is also tilted (see part (b) of FIG. 92). The chain lines in FIGS. 92 and 93 depict the horizontal direction by H, the rotation axis direction of the drum drive coupling gear 813 by A1, and the rotation axis direction of the drum coupling 770 by Cl.

When the process cartridge is further inserted toward the back side of the main assembly from part (b) of FIG. 92, the side surface of the drum coupling 770 comes into contact with the drum drive coupling gear 813. When the cartridge is pushed further from the contact state, the drum drive coupling gear 813, the first braking engagement member 814, the second braking engagement member 818, the stopper 815 and the brake transmission member 817 are pushed toward the back side of the main assembly, until the process cartridge moves to the position where it abuts to the rear side plate of the main assembly. As a result, the process cartridge, the drum drive coupling gear 813, the first braking engagement member 814, the second braking engagement member 818, the stopper 815, and the brake transmission member 817 move to the positions shown in part (a) of FIG. 93. That is, the position of the gear end of the drum drive coupling gear 813 moves from U2 to U1.

Thereafter, when the front door of the main assembly is closed, the lower rail in the main assembly is lifted up and the inclination of the process cartridge is eliminated. That is, as shown in part (b) of FIG. 93, the inclinations of both the drum drive coupling gear 813 and the drum coupling 770 is eliminated, the axes thereof are aligned by the cooperation of the positioning boss 813*i* and the positioning hole 770*a*, and the mounting of the process cartridge 701 is completed.

After the axes of the drum drive coupling gear 813 and the drum coupling 770 are determined in the manner described above, the drive transmission unit 811 rotates so that the drum coupling 770 are brought into engagement with the drive transmission member, and the brake engaging member inside the drive transmission unit 811. The engagement operation is the same as the operation shown in the Embodiment 1 except that the rotational directions of the drive transmission unit 811 and the drum coupling 770 are reversed. Therefore, the description thereof is omitted in this embodiment.

In this embodiment and the above-mentioned Embodiment 1, the process cartridge includes a cleaning unit and a developing unit. That is, the process cartridge includes a photosensitive drum and a developing roller. However, the structure of the cartridge mounted to and dismounted from the image forming apparatus is not limited to such an example.

Figure 94:
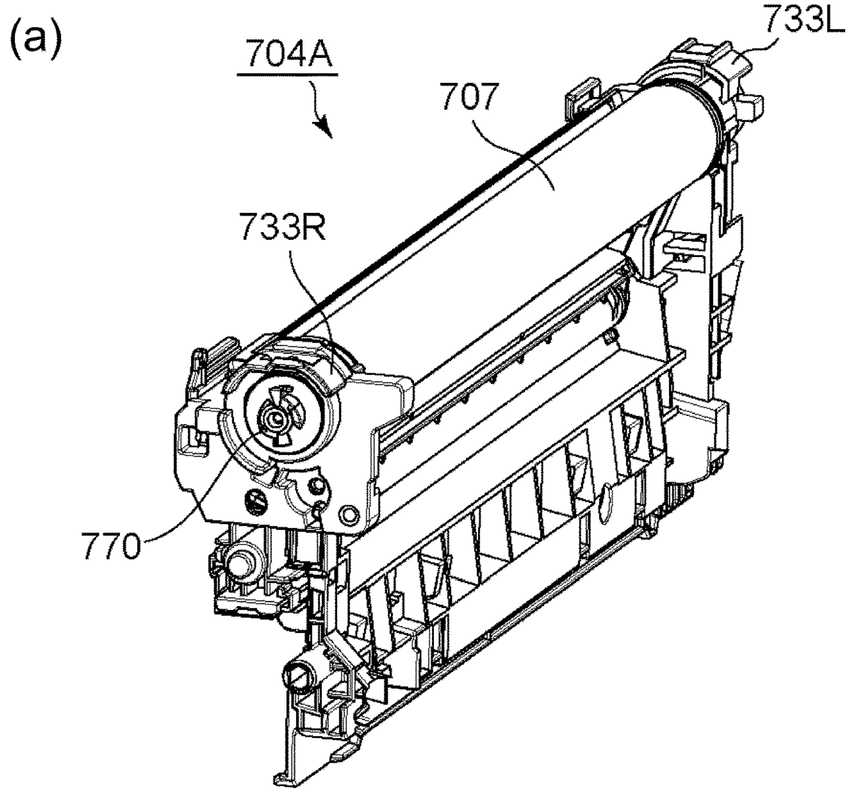
FIG. 94 is a perspective view illustrating another form of the process cartridge.
Figure 94:
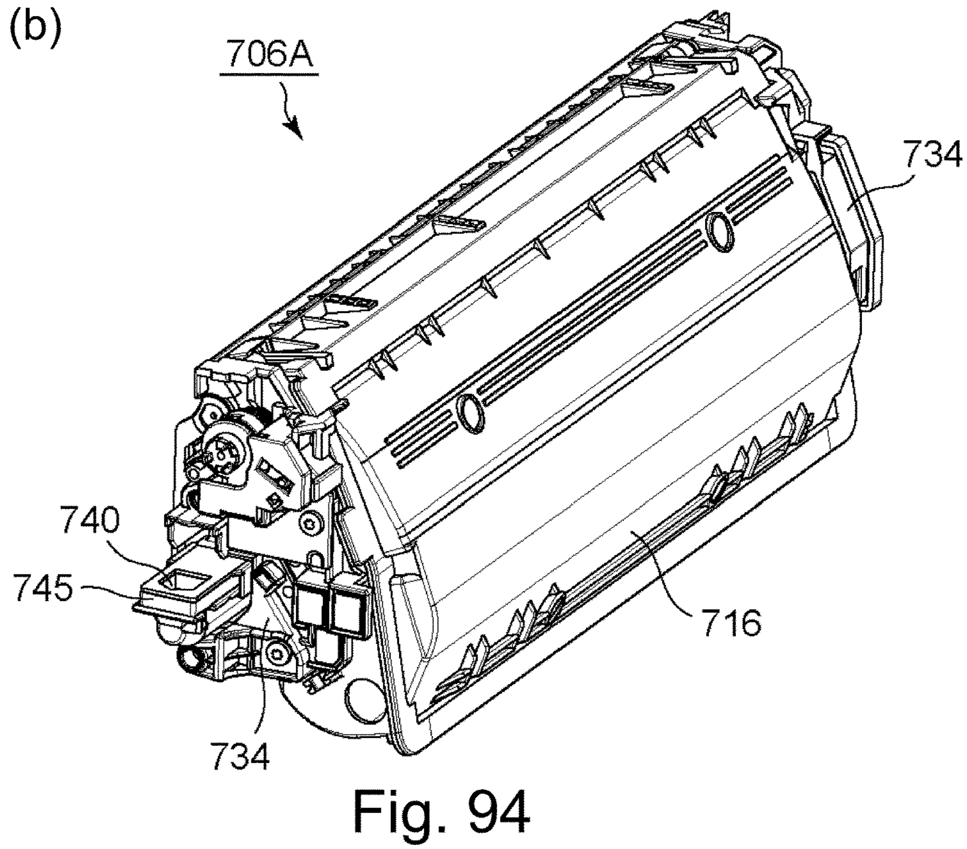

For example, as a modified example of this embodiment, a structure in which the cleaning unit 704 and the developing unit 706 are separately made into cartridges can be considered (see part (a) of FIGS. 94 and 94 (*b*)).

The structure in which the cleaning unit 704 is in the form of a cartridge may be particularly referred to as a drum cartridge 704A, and the structure in which the developing unit 706 is in the form of a cartridge may be particularly referred to as a developing cartridge 706A.

In the case of such a modification, the drum cartridge 704A has a photosensitive drum 707 and a drum coupling 770. The drum cartridge 704A can be regarded as a process cartridge including no developing unit 706.

As described above, according to this embodiment, the drum coupling 770 of the process cartridge 701 receives the driving force from the drive transmission unit 811 of the image forming apparatus main assembly. Further, the drum coupling 770 receives a driving force from the drive transmission unit 811, and at the same time operates the brake mechanism inside the drive transmission unit 811. With this brake mechanism, the load required to drive the cartridge can be set in an appropriate range. By this, the process cartridge can be driven stably.

Industrial Applicability

According to the present invention, there is provided an image forming apparatus and a cartridge and a drum unit capable of transmitting a driving force to a rotatable member of the cartridge and the drum unit.

The present invention is not limited to the above embodiments, and various modifications and modifications can be made without departing from the spirit and scope of the present invention. Therefore, the following claims are attached to make the scope of the present invention public.

This application claims priority based on Japanese Patent Application No. 2019-050355 filed on Mar. 18, 2019, and all the contents thereof are incorporated herein by reference.

The invention claimed is:

1. A cartridge comprising:

a casing having a first end portion and a second end portion opposite to the first end portion;

a photosensitive drum rotatably supported by the first end portion and the second end portion of the casing; and a coupling operatively connected to the photosensitive drum so as to be capable of transmitting a driving force to the photosensitive drum, the coupling being positioned at the first end portion of the casing and being rotatable about an axis of the coupling, wherein the coupling includes a guiding portion, an engaging portion, and a visor portion, wherein the guiding portion includes a remote portion at a position that is more remote from the second end portion of the casing than the engaging portion is from the second end portion of the casing, wherein a distance measured from the second end portion of the casing to the remote portion of the guiding portion along a direction of the axis of the coupling decreases toward downstream in a rotational direction of the coupling, wherein the engaging portion includes a first side surface at a position upstream in the rotational direction of the coupling and a second side surface at a position downstream in the rotational direction of the coupling, wherein at least a part of the engaging portion is more remote from the axis of the coupling along a line that is perpendicular to the axis of the coupling than the remote portion of the guiding portion is from the axis of the coupling along a line that is perpendicular to the axis of the coupling, wherein the visor portion projects outwardly in a direction perpendicular to the axis of the coupling, and wherein (i) the visor portion covers a space downstream of the engaging portion in the rotational direction of the coupling or (ii) the visor portion is positioned upstream of the guiding portion in the rotational direction of the coupling and adjacent to the guiding portion.

2. A cartridge according to claim 1, wherein at least a part of the first side surface of the engaging portion is more remote from the axis of the coupling along a line that is perpendicular to the axis of the coupling than the remote portion of the guiding portion is from the axis of the coupling along a line that is perpendicular to the axis of the coupling.

3. A cartridge according to claim 1, wherein the coupling is configured to transmit a driving force from the first side surface of the engaging portion to the photosensitive drum.

4. A cartridge according to claim 1, wherein the coupling is provided with an opening that is coaxial with the axis of the coupling.

5. A cartridge according to claim 4, wherein the opening of the coupling and the engaging portion are positioned such that when they are projected on the axis of the coupling, an area of the opening of the coupling and an area of the engaging portion at least partly overlap with each other.

6. A cartridge according to claim 4, wherein the opening of the coupling and the guiding portion are positioned such that when they are projected on the axis of the coupling, an area of the opening of the coupling and an area of the guiding portion at least partly overlap with each other.

7. A cartridge according to claim 4, wherein the guiding portion extends in the rotational direction of the coupling around the opening.

8. A cartridge according to claim 1, wherein the guiding portion is positioned upstream of the engaging portion in the rotational direction of the coupling and adjacent to the engaging portion.

9. A cartridge according to claim 1, wherein the remote portion of the guiding portion extends from upstream to downstream toward the engaging portion in the rotational direction of the coupling.

10. A cartridge according to claim 1, wherein at least a part of the second side surface of the engaging portion overhangs open space.

11. A cartridge according to claim 1, wherein the second side surface of the engaging portion includes an elastic portion.

12. A cartridge according to claim 1, wherein the remote portion of the guiding portion has an upper portion on a side opposite from the second end portion of the casing in the direction of the axis of the coupling, and wherein a distance measured from the second end portion of the casing to the upper portion of the guiding portion along the direction of the axis of the coupling decreases toward downstream in the rotational direction of the coupling.

13. A cartridge according to claim 12, wherein the upper portion of the guiding portion is connected to an upper portion of the engaging portion.

14. A cartridge according to claim 1, wherein the coupling includes a first coupling portion and a second coupling portion, wherein the first coupling portion includes the guiding portion and the engaging portion, wherein the second coupling portion includes a guiding portion, an engaging portion, and a visor portion, wherein the guiding portion of the second coupling portion includes a remote portion at a position that is more remote from the second end portion of the casing than the engaging portion of the second coupling portion is from the second end portion of the casing, wherein a distance measured from the second end portion of the casing to the remote portion of the guiding portion of the second coupling portion along the direction of the axis of the coupling decreases toward downstream in the rotational direction of the coupling, wherein the engaging portion of the second coupling portion includes a first side surface at a position upstream in the rotational direction of the coupling and a second side surface at a position downstream in the rotational direction of the coupling, and wherein at least a part of the engaging portion of the second coupling portion is more remote from the axis of the coupling along a line that is perpendicular to the axis of the coupling than the remote portion of the guiding portion of the second coupling portion is from the axis of the coupling along a line that is perpendicular to the axis of the coupling.

15. A cartridge according to claim 14, wherein the visor portion includes a part that covers a space between the first coupling portion and the second coupling portion in the rotational direction of the coupling.

16. A cartridge according to claim 1, wherein the remote portion of the guiding portion includes an inclined portion, and wherein a distance measured from the second end portion of the casing to the inclined portion of the guiding portion along the direction of the axis of the coupling decreases toward downstream in the rotational direction of the coupling.

17. A cartridge according to claim 16, wherein the inclined portion of the guiding portion includes a helical inclined surface.

18. A cartridge according to claim 16, wherein the inclined portion of the guiding portion includes a plurality of surfaces.

19. A cartridge according to claim 16, wherein the inclined portion of the guiding portion includes a step between a first surface of the guiding portion and a second surface of the guiding portion.

20. A cartridge according to claim 1, wherein, as viewed along the axis of the coupling from a position where the coupling is in front of the photosensitive drum, the rotational direction of the coupling is clockwise.

21. A cartridge according to claim 1, wherein the cartridge further includes:

toner accommodated in the casing, a charging roller configured to charge the photosensitive drum, and a developing roller configured to develop a latent image formed on a surface of the photosensitive drum with the toner, and wherein, when the coupling rotates in the rotational direction, a point on the surface of the photosensitive drum moves inside of the casing from a position adjacent to the charging roller to a position adjacent to the developing roller, and then the point on the surface of the photosensitive drum moves to outside of the casing, and thereafter the point on the surface of the photosensitive drum returns into the casing to the position adjacent to the charging roller.

22. A cartridge according to claim 1, wherein the coupling is directly connected to the photosensitive drum.

23. A cartridge according to claim 1, wherein the coupling includes an inclination portion, and wherein a distance measured from the second end portion of the casing to the inclination portion along the direction of the axis of the coupling increases toward downstream in the rotational direction of the coupling.

24. A cartridge according to claim 23, wherein the inclination portion is positioned upstream of the guiding portion in the rotational direction of the coupling and the inclination portion is positioned adjacent to the guiding portion.

25. A cartridge comprising:

a casing;

a photosensitive drum supported by the casing, the photosensitive drum being rotatable in a rotational direction about a rotational axis; and a coupling operatively connected to the photosensitive drum so as to be capable of transmitting a driving force to the photosensitive drum, the coupling being rotatable in the rotational direction about the rotational axis, the coupling including:

a first projecting surface that extends away from the photosensitive drum in a direction of the rotational axis, a second projecting surface that is downstream of the first projecting surface in the rotational direction, the second projecting surface extending in a direction that is away from the photosensitive drum, a sloped surface extending about the rotational axis between a position upstream of the first projecting surface in the rotational direction to a position adjacent to the second projecting surface, and a third projecting surface projecting outwardly in a direction perpendicular to the rotational axis, wherein a distance in the direction of the rotational axis from an end of the photosensitive drum to the sloped surface decreases along the sloped surface in the rotational direction, wherein a distance, measured along a line that is perpendicular to the rotational axis, from the rotational axis to at least a part of the sloped surface that is upstream of the first projecting surface is less than a distance, measured along a line that is perpendicular to the rotational axis, from the rotational axis to a part of the second projecting surface that is farthest from the rotational axis, and wherein the third projecting surface (i) covers a space downstream of the second projecting surface in the rotational direction or (ii) covers a space upstream of the sloped surface in the rotational direction.

26. A cartridge according to claim 25, wherein a first end of the second projecting surface is positioned downstream in the rotational direction from a second end of the second projecting surface.

27. A cartridge according to claim 25, wherein, as viewed along the rotational axis from a position where the coupling is in front of the photosensitive drum, a part of the sloped surface covers the second projecting surface.

28. A cartridge according to claim 25, further comprising an opening formed in the coupling about the rotational axis, wherein a distance along a line that is perpendicular to the rotational axis from the rotational axis to a surface forming the opening is less than a distance along a line that is perpendicular to the rotational axis from the rotational axis to the first projecting surface.

29. A cartridge according to claim 25, wherein an undercut area is formed in the coupling adjacent to the second projecting surface.

30. A cartridge according to claim 25, wherein, as viewed along the rotational axis from a position where the coupling is in front of the photosensitive drum, the rotational direction is clockwise.

31. A cartridge according to claim 25, wherein the cartridge further comprises:

toner accommodated in the casing, a charging roller configured to charge the photosensitive drum, and a developing roller configured to develop a latent image formed on a surface of the photosensitive drum with the toner, and wherein, when the coupling rotates in the rotational direction, a point on the surface of the photosensitive drum moves inside of the casing from a position adjacent to the charging roller to a position adjacent to the developing roller, and then the point on the surface of the photosensitive drum moves to outside of the casing, and thereafter the point on the surface of the photosensitive drum returns into the casing to the position adjacent to the charging roller.

32. A cartridge according to claim 25, wherein the sloped surface is a first sloped surface, and wherein the coupling further comprises:

a fourth projecting surface that extends away from the photosensitive drum in a direction of the rotational axis, a fifth projecting surface that is downstream of the fourth projecting surface in the rotational direction, the fifth projecting surface extending in a direction away from the photosensitive drum, and a second sloped surface extending about the rotational axis between a position upstream of the fourth projecting surface in the rotational direction to a position adjacent to the fifth projecting surface, wherein a distance from an end of the photosensitive drum to the second sloped surface in the direction of the rotational axis decreases along the second sloped surface in the rotational direction, wherein a distance, measured along a line that is perpendicular to the rotational axis from the rotational axis to at least a part of the second sloped surface that is upstream of the fourth projecting surface is less than a distance, measured along a line that is perpendicular to the rotational axis, from the rotational axis to a part of the fifth projecting surface that is farthest from the rotational axis, and wherein, as viewed along the rotational axis from a position where the coupling is in front of the photosensitive drum, the first projecting surface, the second projecting surface, and the first sloped surface are on an opposite side of the coupling from the fourth projecting surface, the fifth projecting surface, and the second sloped surface.

33. A cartridge according to claim 25, wherein at least a part of the second projecting surface has a greater coefficient of friction than a coefficient of friction of another part of the coupling.

34. A cartridge according to claim 25, wherein at least a part of the second projecting surface has a greater coefficient of friction than a coefficient of friction of at least a part of the sloped surface.

35. A cartridge comprising:

a casing;

a photosensitive drum supported by the casing, the photosensitive drum being rotatable in a rotational direction about a rotational axis; and a coupling operatively connected to the photosensitive drum so as to be capable of transmitting a driving force to the photosensitive drum, the coupling being rotatable in the rotational direction about the rotational axis, the coupling including:

a first surface configured to receive the driving force, the first surface extending away from the photosensitive drum in a direction of the rotational axis, a second surface configured to receive a braking force that opposes the driving force, the second surface being positioned downstream of the first surface in the rotational direction, the second surface extending in a direction away from the photosensitive drum, a third surface extending about the rotational axis between a position upstream of the first surface in the rotational direction to a position adjacent to the second surface, and a visor surface projecting outwardly in a direction perpendicular to the rotational axis, wherein a distance from an end of the photosensitive drum to the third surface in the direction of the rotational axis decreases along the third surface in the rotational direction, wherein a distance, measured along a line that is perpendicular to the rotational axis, from the rotational axis to at least a part of the third surface that is upstream of the first surface is less than a distance, measured along a line that is perpendicular to the rotational axis, from the rotational axis to a part of the second surface that is farthest from the rotational axis, and wherein the visor surface covers (i) a space downstream of the second surface in the rotational direction or (ii) a space upstream of the first surface in the rotational direction.

36. A cartridge according to claim 35, wherein a first end of the second surface is positioned downstream in the rotational direction from a second end of the second surface.

37. A cartridge according to claim 35, wherein, as viewed along the rotational axis from a position where the coupling is in front of the photosensitive drum, a part of the third surface covers the second surface.

38. A cartridge according to claim 35, further comprising an opening formed in the coupling about the rotational axis, wherein a distance along a line that is perpendicular to the rotational axis from the rotational axis to a surface forming the opening is less than a distance along a line that is perpendicular to the rotational axis from the rotational axis to the first surface.

39. A cartridge according to claim 35, wherein an undercut area is formed in the coupling adjacent to the second surface.

40. A cartridge according to claim 35, wherein, as viewed along the rotational axis from a position where the coupling is in front of the photosensitive drum, the rotational direction is clockwise.

41. A cartridge according to claim 35, wherein the cartridge further comprises:

toner accommodated in the casing, a charging roller configured to charge the photosensitive drum, and a developing roller configured to develop a latent image formed on a surface of the photosensitive drum with the toner, and wherein, when the coupling rotates in the rotational direction, a point on the surface of the photosensitive drum moves inside of the casing from a position adjacent to the charging roller to a position adjacent to the developing roller, and then the point on the surface of the photosensitive drum moves to outside of the casing, and thereafter the point on the surface of the photosensitive drum returns into the casing to the position adjacent to the charging roller.

42. A cartridge according to claim 35, wherein the coupling further includes:

a fourth surface configured to receive a driving force, the fourth surface extending away from the photosensitive drum in the direction of the rotational axis, a fifth surface configured to receive a braking force that opposes the driving force, the fifth surface being positioned downstream of the fourth surface in the rotational direction, the fifth surface extending in a direction away from the photosensitive drum, and a sixth surface extending about the rotational axis between a position upstream of the fourth surface in the rotational direction to a position adjacent to the fifth surface, wherein a distance from the end of the photosensitive drum to the sixth surface in the direction of the rotational axis decreases along the sixth surface in the rotational direction, wherein a distance, measured along a line that is perpendicular to the rotational axis, from the rotational axis to at least a part of the sixth surface that is upstream of the fourth surface is less than a distance, measured along a line that is perpendicular to the rotational axis, from the rotational axis to a part of the fifth surface that is farthest from the rotational axis, and wherein, as viewed along the rotational axis from a position where the coupling is in front of the photosensitive drum, the first, second, and third surfaces are on an opposite side of the coupling from the fourth, fifth, and sixth surfaces.

43. A cartridge according to claim 35, wherein at least a part of the second surface has a greater coefficient of friction than a coefficient of friction of another part of the coupling.

44. A cartridge according to claim 35, wherein at least a part of the second surface has a greater coefficient of friction than a coefficient of friction of at least a part of the third surface.

* * * * *